US009172738B1

(12) United States Patent
daCosta

(10) Patent No.: US 9,172,738 B1
(45) Date of Patent: Oct. 27, 2015

(54) COLLABORATIVE LOGISTICS ECOSYSTEM: AN EXTENSIBLE FRAMEWORK FOR COLLABORATIVE LOGISTICS

(75) Inventor: Francis daCosta, Santa Clara, CA (US)

(73) Assignee: DYNAMIC MESH NETWORKS, INC., Santa Clara, CA (US)

( * ) Notice: Subject to any disclaimer, the term of this patent is extended or adjusted under 35 U.S.C. 154(b) by 428 days.

(21) Appl. No.: 13/571,294

(22) Filed: Aug. 9, 2012

Related U.S. Application Data

(63) Continuation-in-part of application No. 13/541,446, filed on Jul. 3, 2012, which is a continuation-in-part of application No. 12/696,947, filed on Jan. 29, 2010, now Pat. No. 8,520,691, and a continuation-in-part of application No. 11/084,330, filed on Mar. 17, 2005, now abandoned, application No. 13/571,294, which is a continuation-in-part of application No. 10/434,948, filed on May 8, 2003, now Pat. No. 7,420,952, and a continuation-in-part of application No. 12/352,457, filed on Jan. 12, 2009, now Pat. No. 8,477,762, which is a continuation-in-part of application No. 11/266,884, filed on Nov. 4, 2005, now Pat. No. 7,583,648.

(60) Provisional application No. 61/555,400, filed on Nov. 3, 2011, provisional application No. 61/615,802, filed on Mar. 26, 2012, provisional application No. 61/621,926, filed on Apr. 9, 2012, provisional application No. 61/148,803, filed on Jan. 30, 2009.

(51) Int. Cl.
*G06F 15/16* (2006.01)
*H04L 29/08* (2006.01)
*H04L 29/06* (2006.01)

(52) U.S. Cl.
CPC ............... *H04L 67/00* (2013.01); *H04L 65/403* (2013.01)

(58) Field of Classification Search
CPC ................................. G06F 50/01; G06F 50/10
USPC .......... 705/319, 320; 709/203, 206, 219, 217, 709/204
See application file for complete search history.

(56) References Cited

U.S. PATENT DOCUMENTS

| | | | |
|---|---|---|---|
| 7,420,952 | B2 | 9/2008 | daCosta |
| 7,583,648 | B2 | 9/2009 | daCosta |
| 7,649,852 | B2 | 1/2010 | Thubert et al. |
| 7,738,402 | B2 | 6/2010 | Feldman et al. |
| 8,589,247 | B2 * | 11/2013 | Mesaros ...................... 705/26.1 |
| 2002/0137459 | A1 | 9/2002 | Elbata et al. |
| 2002/0191573 | A1 | 12/2002 | Whitehill et al. |
| 2003/0115282 | A1 | 6/2003 | Rose |
| 2004/0095900 | A1 | 5/2004 | Siegel |
| 2004/0100929 | A1 * | 5/2004 | Garcia-Luna-Aceves .... 370/338 |
| 2007/0183346 | A1 | 8/2007 | Thubert et al. |
| 2009/0304381 | A1 | 12/2009 | Muppidi et al. |
| 2009/0311658 | A1 * | 12/2009 | Polivka ......................... 434/350 |
| 2010/0223581 | A1 * | 9/2010 | Manolescu et al. ........... 715/853 |

(Continued)

*Primary Examiner* — Frantz Jean
(74) *Attorney, Agent, or Firm* — Cherskov Flaynik & Gurda, LLC

(57) ABSTRACT

The system describes a collaborative machine social network system with several elements. There is at least one system participant which communicates with the network. The participant's communications include short bursts of information not directed to a particular recipient but rather the network as a whole. The network further includes propagator nodes and integrator nodes to process communications from participants.

11 Claims, 60 Drawing Sheets

(56) References Cited

U.S. PATENT DOCUMENTS

2011/0208822 A1* 8/2011 Rathod ........................ 709/206
2011/0225293 A1* 9/2011 Rathod ........................ 709/224
2011/0276396 A1* 11/2011 Rathod ...................... 705/14.49
2011/0276628 A1* 11/2011 Pell .............................. 709/204

* cited by examiner

Distributed/Decentralized Collaborative Eco System

COLLABORATIVE LOGISTICS ECOSYSTEM: AN EXTENSIBLE FRAMEWORK FOR COLLABORATIVE LOGISTICS

CLAIM OF PRIORITY

The instant application claims priority as a non-provisional utility application of Provisional U.S. Patent Application Ser. No. 61/555,400 filed on Nov. 3, 2011, and Provisional U.S. Patent Application Ser. No. 61/615,802, filed on Mar. 26, 2012, and Provisional U.S. Patent Application Ser. No. 61/621,926, filed on Apr. 9, 2012, the contents of which are hereby incorporated by reference. The instant application claims priority as a continuation in part of U.S. application Ser. No. 13/541,446 filed on Jul. 3, 2012, presently pending, the contents of which are hereby incorporated by reference. The instant application claims priority as a continuation in part of U.S. patent application Ser. No. 12/696,947, filed on Jan. 29, 2010, presently pending which in turn claimed priority as a non-provisional of U.S. application Ser. No. 61/148,803 filed on Jan. 30, 2009, and also as a continuation in part of the U.S. Utility application Ser. No. 11/084,330 filed Mar. 17, 2005, currently abandoned which in turn is a continuation-in-part of U.S. Utility application Ser. No. 10/434,948, filed on May 8, 2003, patented as U.S. Pat. No. 7,420,952 on Sep. 2, 2008, the contents of which are hereby incorporated by reference. The instant application further claims priority as a continuation in part of the U.S. Utility application Ser. No. 12/352,457, filed on Jan. 13, 2009, currently pending, which in turn claims priority as a continuation in part of U.S. application Ser. No. 11/266,884, filed on Nov. 4, 2005, patented as U.S. Pat. No. 7,583,648 on Sep. 1, 2009.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

There is a plethora of Internet and GPS aware mobile devices used to estimate travel routes and Estimated Time of Arrival (ETA). The objective of this invention is to leverage that information to estimate, to a high level of accuracy, the arrival time of a customer at a store. The store has been notified of arrival a priori and advance purchase for product/service made. On arrival, said product/service is delivered to customer. The tedium of waiting in line, paying etc, is thus avoided.

A scheduler and dispatcher attempts to ensure just in time delivery e.g. the product is fresh and the wait is zero. It does this by accurately estimating customer arrival time and store delivery trends.

The methods taught in this invention are applicable to multiple application domains including: scheduling meeting times for people and resources in motion, optimizing delivery schedules for parcels, and similar problem domains.

Components of one embodiment of the system include:
An aggregate reference signal generator. For example, GPS equipped mobile devices can provide Arrival estimates (ETA). This represents the reference signal in this example. Other reference signals include fuzzy data and external data feeds from other customers/stores etc.

An aggregate control signal generator. This, in response to the reference signals, attempts to "close the loop" and align supply and demand change current behavior. Both quantitative and qualitative data sources are employed.

An adaptive control system that closes the feedback loop, changing its strategies and/or sampling frequencies to minimize the control error (between reference and control systems). The control system must be agile. It may also be back drivable, as in Demand Shaping.

A customizable Alignment Dashboard, which communicates with scheduler and is used to monitor and maintain both demand and supply performance indicators.

A Hierarchical, distributed control system that monitors and tunes overall system behavior. All control systems within it are also designed to support extensibility and scalable performance.

Alignment strategies to support dynamic alignments at multiple levels. The framework also supports simulation and machine learning in both forward and backward control directions.

A collaborative community of such control systems to extend Enterprise Resource Planning (ERP), Supply Chain Management (SCM), Demand Shaping and Customer Relationship Management (CRM) functionality. The control systems are dynamic, distributed (e.g. cloud centric) scalable and autonomously proactive.

Additional Benefits of the Invention Include:
Couching supply/demand chains as hierarchical model based adaptive control systems.
Identifying operating ranges for a discovered or stipulated Demand/Supply curves.
Switching between different alignment control strategies when operating ranges are reached.
Providing a domain independent ("non dimensional") function library via alignment primitives.
Devise collaboration strategies constructed from the extensible alignment function library
Provide a recursive framework and freedom grid to enable negotiations between collaborators
Promote efficient (e.g. tree topology based) collaborative ecosystem networks.

BACKGROUND OF THE INVENTION

Real Time Adaptive Behavior:

There is a plethora of Internet and GPS aware mobile devices used to estimate travel routes and Estimated Time of Arrival (ETA). The objective of several embodiments of this invention is to leverage that real-time information to dynamically estimate, to a high level of accuracy, the arrival time of a customer at a destination, such as a store. In one embodiment, the store has been notified of arrival a priori and advance purchase for product/service made. On arrival, said product/service is delivered to customer. The tedium of waiting in line, paying and other time wasting chores is thus avoided.

Managing Customer Satisfaction:

Customer Satisfaction (CS) is monitored and managed by a process control model that attempts just in time delivery e.g. the product is fresh ("Quality") and the average wait time is low ("Agility"). It does so by estimating (predicting) customer arrival time and current store performance. These two estimates drive the alignment between demand and supply through a process of autonomous negotiations between demand expectations and supply constraints. The alignments are driven by mutual benefit to both parties at multiple levels of the value chain.

The alignment methods taught in this invention are applicable to multiple application domains including: scheduling meeting times for people on the go, providing timed promotions to mobile prospects, based on their ETA near the store, optimizing delivery schedules for packages, shifting schedules to deal with resource constraints, etc.

Scalable Cloud centric Framework

The invention teaches methods salient to providing a comprehensive, scalable, generic yet customizable cloud centric framework, to address proactive routing, dispatching, prioritized scheduling of orders placed in advance, or expected to be placed soon, to a supplier, employing but not limited to:

Software on GPS equipped mobile device preferably with internet access, used to place orders to the system, provide Arrival estimates (ETA) for system self correction.

A generic, scalable, cloud centric scheduler, database and software, which communicates with multiple mobile devices and multiple store locations for multiple service providers.

A customizable prioritized schedule display and input device (e.g. touch screen), at supplier location, which communicates with scheduler and is used to monitor and maintain Customer Satisfaction, based on current store performance and inferred trends.

A generic and extensible framework to support modeling and simulation of viable scheduling alternatives. The methods taught are especially relevant to dealing with bursts/spikes in customer demand and/or where store resources are under provisioned.

Dynamic Process Control Model

The Process controller and Scheduler relays notifications from store to mobile device, suggests scheduling task start time or just in time order pick up, based on a process control model of the store, its operations, current and historical performance. It requests mobile device updates for estimating accurate arrival times. Frequency distributions of salient events at the store, affecting overall Customer Satisfaction are collected, and analyzed. The entire system is framed as a process control model and salient parameters periodically adjusted to ensure stable performance. Example application indicates web page, and/or mobile app interface which, referring to FIG. 1, performs the following functions:

1. Enables user to select a service provider from a library of categories (see dialog box 160)
2. Choose a preferred service provider from that category listing
3. Select a store location
4. Create/Edit an order, 130, from a store supplied menu dialog (not shown)
5. Place the order (for pick up) by one click 120
6. Customer payment is seamlessly integrated.
7. Saving the order specifics (Store location, item, etc) with a user friendly name, see 160
8. Review order history, 140, including past orders, time of arrival, pick up time, store load characteristics, if provided.
9. Review account settings, 150 which include editable identification information, either photo or security questions,
10. Specify preferred alternate store locations, if default selection is not able to provide timely delivery. This would be an editable entry under account settings, 150
10. Receive Text based messages, if requested, on selected store backlog, either provided by the store or inferred based on current increases/decreases in historical backlog for this time period, day of the week etc, under account settings.
11. Change arrival time, by Editing Order, 130.
12. On arrival, the customer picks up the coffee. Customer Satisfaction feedback is obtained, either from the store or from the customer phone regarding whether the coffee was delivered on time and expected quality. A representative dialog box is shown 170.

When the order is placed, the system scheduler receives request and updates ETA and store displays. After placing order, proactive scheduler ensures that orders are completed, preferably just in time for pick up. Work load variance, changes to estimate time of arrival (ETA) etc is monitored. The data is analyzed to dynamically and proactively change priorities to avoid:

1. Customer arrives "early" due to incorrect ETA and has to wait for delivery
2. Customer arrives per ETA computed, but delivery delayed: task execution time (TET) is in variance with current work load
3. The converse of items 1, 2: the coffee is cold; task started too soon, incorrect ETA and/or TET time estimates.

Intended benefits include:

Reducing time wasted waiting in queues, repeating custom preferences each time an order is placed (e.g. soymilk, no sugar)

Seamless payment activated when order is placed: time to pay eliminated.

Visibility into store backlog, enabling load balancing at the store.

Modeling what-if scenarios to identify bottlenecks, explore alternative delivery options Inter store collaboration: when stores cannot deliver in time, rerouting to other less busy store locations, convenient to customer, thus maintaining Customer Satisfaction (measured by wait, in this case), despite hiccups in the delivery process.

Intuitive online interfaces so Customer and Stores can monitor and adjust control parameters.

Provide the ability to run simulations so experts (human and software) can tune the system.

Just in time coffee delivery is chosen as the use case to teach methods broadly applicable to multiple application domains, Components of a "generic" system include:

An aggregate reference signal generator. For example, GPS equipped mobile devices can provide Arrival estimates (ETA). This represents the reference signal in this example. Other reference signals include fuzzy data and external data feeds from other customers/stores etc.

An aggregate control signal generator. This, in response to the reference signals, attempts to "close the loop" and align supply and demand change current behavior. Both quantitative and qualitative data sources are employed.

An adaptive control system that closes the feedback loop, changing its strategies and/or sampling frequencies to minimize the control error (between reference and control systems). The control system must be agile. It may also be back drivable, as in Demand Shaping.

A customizable Alignment Dashboard, which communicates with scheduler and is used to monitor and maintain both demand and supply performance indicators.

A Hierarchical, distributed control system that monitors and tunes overall system behavior. All control systems within it are also designed to support extensibility and scalable performance.

Alignment strategies to support dynamic alignments at multiple levels. The framework also supports simulation and machine learning in both forward and backward control directions.

A collaborative community of such control systems to extend Enterprise Resource Planning (ERP), Supply Chain Management (SCM), Demand Shaping and Customer Relationship Management (CRM) functionality. The control systems are dynamic, distributed (e.g. cloud centric) scalable and autonomously proactive.

SUMMARY OF THE INVENTION

An exemplary method is taught that schedules Just in Time delivery (JIT) of items ordered via a mobile device. Estimated Arrival Time (ETA) is periodically provided by the mobile device. It represents the dynamic nature of demand pressure.

A cloud centric solution is described, whereby data received from the mobile device is collected, analyzed to predict ETA at the Coffee store. The web based system interacts with a product or service provider ("Store") through an intuitive, customizable and conveniently located graphical display interface ("GDI"), preferably touch screen. Through the display, the scheduler notifies the store when customers are expected to arrive, based on inferences drawn from periodic updates.

Using the display interface, store employees record when tasks were started, completed and when customer picks up occurred. They may also record "Quality": the customer deemed the product/service satisfactory (e.g. coffee is warm) and "Agility": the service was responsive (e.g. zero or low wait time). This data is analyzed to improve the timing of events such as Task Start Time (TST), when to start the task of making the coffee, based on specific store load characteristics (SLC) for that store. It also will incorporate customer preferences (e.g. whether he is flexible regarding coffee delivered late) we are in effect aligning "Customer Satisfaction" (CS) on the demand side with Acceptable System Response on the Supply Side, Based on poor recent store performance, the scheduler may infer, the store is not capable of currently meeting customer expectations, it may re-route the order to another store location. This is referred to as backward scheduling in this document. It is an instance of Demand Shaping but it also is gives the store time to "catch up", It is therefore a dual pronged strategy, combining both Supply Chain and Demand Shaping functionality in one framework. The dual mode system is therefore self-correcting. It attempts to stay in dynamic alignment at all times. This is a departure from Prior Art.

Process Control Model:

This self correcting system is control model based. In the example Customer arrival time at the store drives the control system. It is the reference signal. Sampling frequency is adaptively managed to promote accurate inferences and ETA estimations. The control signal is when to start the coffee. Or it can be used to change the Customer Arrival time, to Store to pick up the coffee. The intent is dynamic alignment of Supply and Demand, regardless of the strategy employed. The Process control model, as taught, knows when to self correct at multiple levels, including switching strategies. It employs machine learning to improve its performance, based on trend identifications at both global and store specific levels, Incorporating "Fuzzy" Data:

An integration of both (quantitative) control system models and (qualitative) data needs to be forged . . . . For example, this "alignment" and "shift" based process controller supports allocations of under provisioned resources even when the task start and end times estimates are imprecise. For examples, surgeons are scant resources. Their "task" end time is hazy because complications occur in surgical operations.

The system is capable of modeling that uncertainty and its effects on customer satisfaction and store performance. This is done by introducing minimum and maximum ranges around the best estimates. The ranges are dynamic because they are modified based on recently received data feeds. They are derived from distribution curves that include external data feeds (traffic conditions, weather). Bayesian Logic/Belief Systems is used to form a composite value for the bounds.

Using Alignment Primitives:

The concept of domain independent ("non dimensional") Task Alignment Primitives is introduced, as an effort to bridge that gap between quantitative and qualitative models, both of which are employed by the system Task Alignment Primitives enable collaboration both at intra and inter resource levels. This type of collaboration is represented as numbers related to how task schedules are adjusted by their "shifts". This is a (quantitative) metric that fit into traditional control system models.

Hierarchical Control System

The concept of "shifts" is particularly useful for scheduling of complex tasks involving collaboration between multiple resources. For example, scheduling a patient surgery involves scheduling sub tasks involving equipment, doctors, nurses etc. All these resources may need to "shift" in order to "align" themselves so they are available when needed, during the surgery. There are multiple control systems active when complex tasks are being scheduled. Hierarchical control system architectures address these concurrent needs. The control system inputs and behaviors involve multiple control systems, whose inputs and outputs feed into each other, in accordance with task hierarchy topologies.

The "System" is thus a control system; comprised of other control systems, each of which could also be hierarchical—it is a "system of systems". Its aggregate behavior is driven by the response of its component control systems and the current prime objectives as an analogy a flock of birds flying in formation is a system of systems that is "closing the loop", making quick decisions, based on sensory data and the current response of their sub systems in support of prime objectives. (e.g. staying on course for all).

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 13 displays a representative store front display and event recorder, incorporating simple inputs to record events etc., as would be available on a touch screen. The display unit shows active orders, when orders should be started etc. The timeline, shown as a double line, is regularly refreshed. The store display thus provides an ordered display of when to execute orders, based on current capacity and backlog. Store performance is inferred from when events are recorded: e.g. when tasks started and when completed, supplied by when store workers press the relevant buttons. Capacity adjustments, based on tardy performance, are displayed as is recent aggregated Customer Satisfaction. The store display is therefore a view into what the scheduler sees and this data is provided to the store to close the loop and engender proactive response.

FIG. 14 is later extended in FIG. 44 to include the Collaboration Engine, described in FIGS. 19 through 42.

FIGS. 39 through 40 depict the Dynamic Watch List. Data notifications available through the Freedom Grid provide collaboration functions the ability to reason about who best to collaborate with and the potential benefits to the collaborating parties. Since task objects typically have multiple options for collaboration, this data is instrumental in making the final choice, which is then submitted for final approval to the scheduler. The scheduler reviews all applicant proposals and chooses those that best serve current community objectives (e.g. avoid, cluster)

Figure 42:
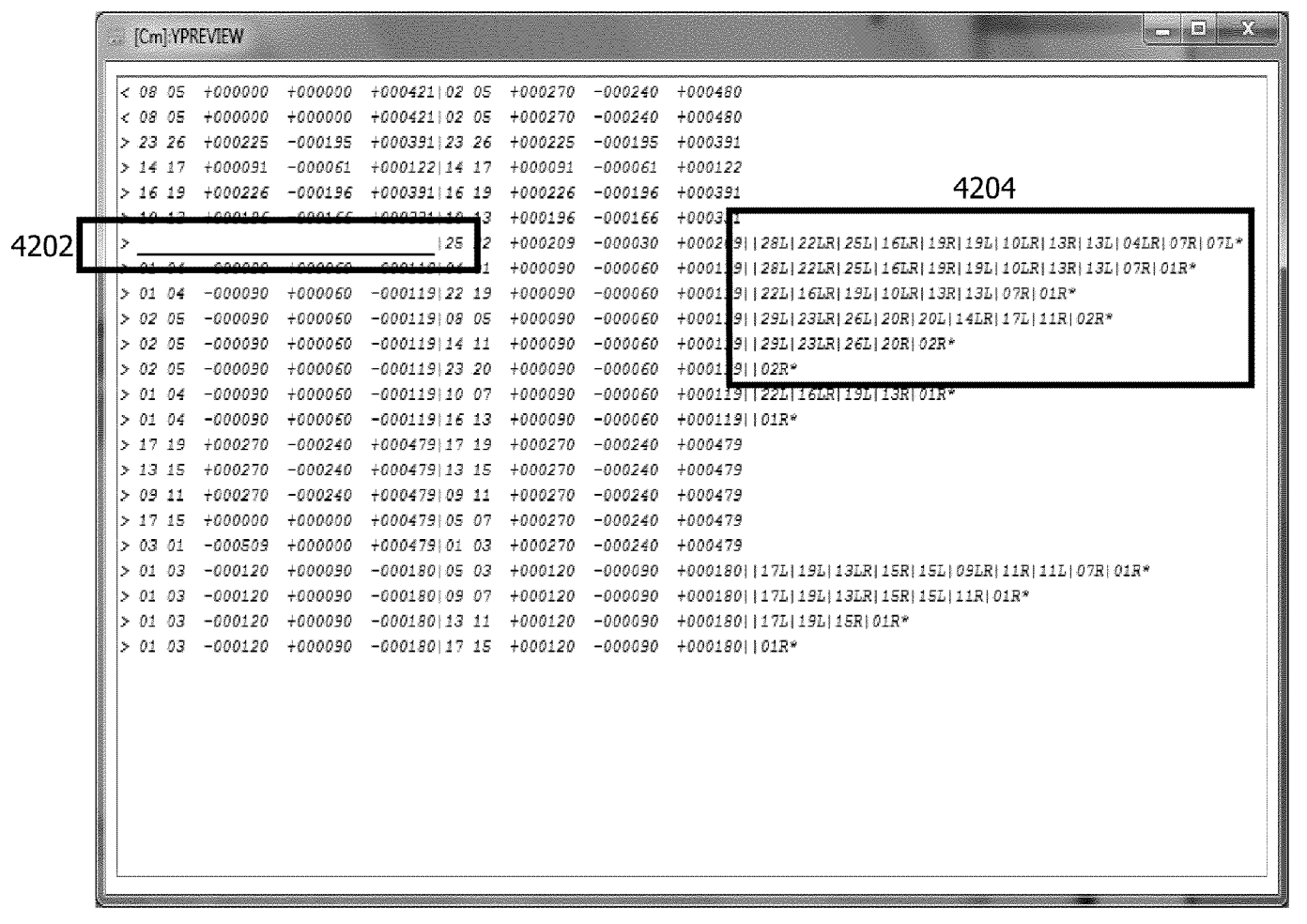

FIGS. 41 through 42 depict the collaboration history maintained by the system to learn and cache frequently used strategies (based on identified patterns). The collaboration history is also used to ensure democratic administration: task that are "looping" or requesting more than their fair share of resources are identified and curtailed.

DETAILED DESCRIPTION OF SPECIFIC EMBODIMENTS

The description of preferred embodiments of the present invention that follow in this section has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

Sections 001 through 013 use the coffee example described to illustrate salient features of a distributed hierarchical control system to provide proactive on time delivery in dynamic environments. Sections 014 through 19 address how the control system adapts to unforeseen spikes in customer demand and/or store performance dips. The concepts of forward and reverse alignment and collaboration are introduced and explained using simulation screen captures. Section 20 introduces the concept of the Collaborative Ecosystem, which brings together the methods taught in previous sections and applies it supporting a dynamic distributed community for collaborators, which includes customers, stores, delivery services, warehouses, factories etc.

01. Coffee Delivery Example

Figure 1:
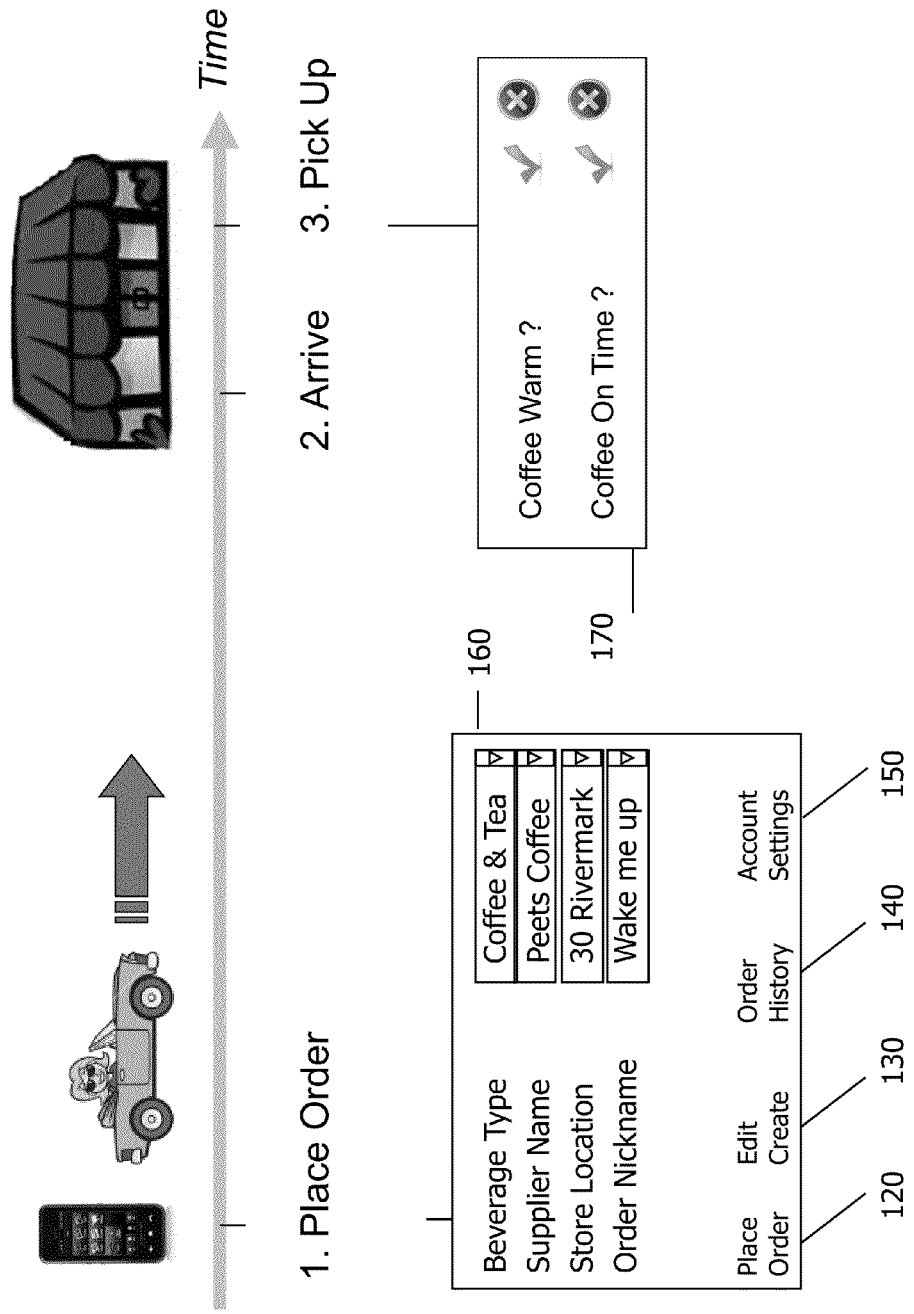
FIG. 1 shows a representative customer user interface on the mobile device. In the depicted embodiment, the customer selects a product/service for advance purchase and expects just in time delivery on arrival at the store. The order is placed through a one click button; payment is automated. On arrival, the customer takes delivery; avoid waiting in line, paying etc. If the service is unsatisfactory, the customer may notify the scheduler/dispatcher through the mobile device or browser. The scheduler will make necessary adjustments on the future orders placed per methods taught in this invention.

FIG. 1 shows a representative customer user interface on the mobile device. The customer selects a product/service for advance purchase and expects just in time delivery on arrival at the store. The order is placed through a one click button; payment is automated. On arrival, the customer takes delivery; avoid waiting in line, paying etc. If the service is unsatisfactory, the customer may notify the scheduler through his mobile device. The scheduler will make adjustments on the future orders placed per methods taught in this invention.

Salient Store performance metrics related to Customer Satisfaction are collected, and analyzed. The entire system is framed as a process control model and salient parameters periodically adjusted to ensure stable performance.

A plausible Customer interaction sequence is shown:
1. Select a service provider from a library of categories (see dialog box 160)
2. Choose a preferred service provider from category listing
3. Select a store location
4. Create/Edit an order, 130, from a store menu dialog (not shown)
5. Place the order (for pick up) by one click [See 'Place Order" button, 120].
6. Customer payment is seamlessly integrated.
7. Customer may Save order specifics (Store location, item, etc) with a user friendly name, see 160, He may also review order history, 140, including past orders, time of arrival, pick up time, current store performance etc.

8. Customer may also review account settings 150 which include editable identification information, such as photo or security questions.
9. Receive Text based messages, if requested, on selected store backlog, either provided by the store or inferred based on current store performance.
10. Manually change arrival time, by Editing Order, 130. Scheduler receives request updates ETA and store display After placing order, the scheduler ensures that orders are completed, preferably just in time for pick up. Work load variance, changes to Estimated Time of Arrival (ETA) is analyzed to proactively change priorities. The following scenarios are detrimental to Customer Satisfaction and therefore to be avoided if possible:

1. Customer arrives "early" due to incorrect ETA and has to wait for delivery
2. Customer arrives per ETA computed, but delivery is delayed: task execution time (TET) is in variance with estimates.
3. The converse of items 1, 2: the coffee is cold; task started too soon, incorrect ETA and/or TET time estimates.

Intended benefits of the system include:

Reducing time wasted waiting in queues, repeating custom preferences each time an order is placed (e.g. soymilk, no sugar)

Seamless payment activated when order is placed: time to pay eliminated.

Visibility into store backlog, enabling load balancing by store management. If the data is made available to the customers, they may also help load balance, by selecting other stores with less backlog/delay.

Figure 2:
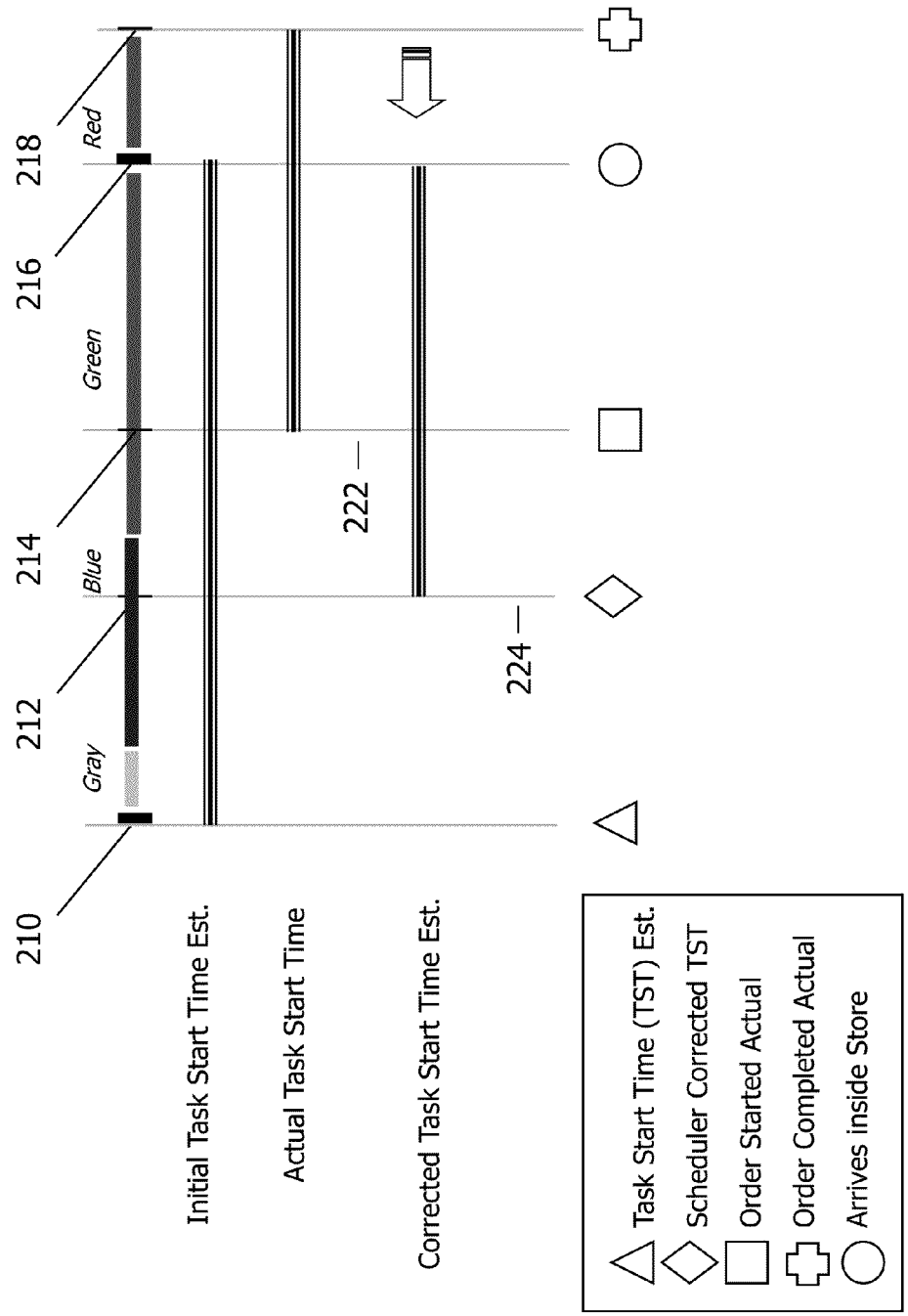
FIG. 2 shows an idealized and simplified time line of events, from placing the order, computing ETA, working backwards, based on time taken to process the order, to when the task should be started at the store. As shown in the depicted embodiment, if the service is delivered either too soon or too late, the deviations are noted by the scheduler, which then, over time, adjusts the control system model to maintain objective criterion indicating Customer Satisfaction.

Foster Inter store collaboration: when stores cannot deliver in time, rerouting to other less busy store locations, convenient to customer. Revenue is not lost, Provide the ability to run simulations so experts (human and software) can tune the system, play back the bottleneck situations etc FIG. 2 shows an idealized and simplified time line of events. It starts with placing the order and computing Customer ETA at the store. Working backwards, the time taken to make the coffee is subtracted to provide an estimate for when the task should to started, Task Start Time (TST).

If the estimates are inaccurate, coffee is delivered either too soon or too late. These deviations are noted by the scheduler, which then, over time, adjusts the control system model to maintain Customer Satisfaction. The system thus self corrects.

The system state machine is event driven the events include variations in supply and demand (store/customer) performance. FIG. 2 depicts a simple case of tardy delivery: The customer places the order, as shown in FIG. 1. The following events occur:

1. Store uses historical data to estimate when order should be started, 210. If coffee is started at time 210, it will be ready for delivery when customer arrives in store for pick up, 216. The estimated time arrival (ETA) provided by mobile device, drives time 216. The ETA estimate is updated periodically. Hence Task Start Time (TST) is a moving target.
2. Store starts coffee at time 212, later than 210. This is may be due to a myriad of reasons, discussed later. Store completes order at time 218.
3. Assume, the customer arrives, as estimated, at time 216 and waits till order is ready 218.
4. Feedback as shown in FIG. 170 is recorded.

The Scheduling system then uses current and recent history to adjust Time Start Time (TST) from 222 to 224. Thus, the system is dynamically aligning demand and supply performance.

Visual Feedback: Colors in the time line display at the store indicate different states noted by the system:

1. Gray: resource may be available for other orders without significantly affecting order delivery, based on current Customer ETA estimates. Store resource not committed yet on this order.
2. Blue: Resources should commit and order started, if it is expected to be delivered on time.
3. Orange: the order execution has started and is in progress. Based on the current ETA, and median time to execute, the Order was committed in the system. We will refer to this time as (Committed) Task Start Time (TST). The system, based on its estimates, suggests that starting the task later than TST will result in "late" coffee delivery.
4. Red: The time from 216 to 218 is colored red. If the execution completion is later than the current ETA, it is color coded red. Else it remains green.

These colors are visual feedback provided to the store, so it can regulate performance to ensure Customer Satisfaction or Service Level Agreements (SLA). As such the system is a control system driven by customer arrival time. Its control signal is Store Task Start Time.

Introducing Blue/Red Bounds:

The control system performs following functions:

1. Construct Control Signal: Adjust ETA, 216 and Task Execution Time (TET), to reflect current trends, based on analysis of recent historical data collected, suggest TST.
2. Close Loops: Collect and analyze store patterns to adjust "error" see shift from 222 to 224. Provide correlating supply behavior (e.g. slow, medium, peak) to store management to help identify causes for unduly large variations in task execution times (TET),
3. Compute Blue/Red. Use the variations in TST and TET to determine Red/Blue Shifts. Red are when TET is larger than expected, causing delivery delays or "red" to occur. "Blues" are the converse situation—orders executed too early before PUT (e.g. coffee too cold). The objective of the process controller and scheduler is estimating a timely Task Start Time (TST) to minimize "red", and "blue" deviations defined as a. $\Delta red = PUT - (TST + TET)$ [If $(PUT - (TST + TET)) > 0$]  Equation 2.1 b. $\Delta blue = -(PUT - (TST + TET))$ [If $(PUT - (TST + TET)) < 0$]  Equation 2.2

4. Refresh the Control Signal: A preliminary TST estimate is adjusted based on red/blue shifts.
5. Employ Strategies. Methods taught include sorting, swapping, bulking and collaboration strategies, described later.
6. Switch Strategies Based on current correlation to Demand/Supply models, the system can determine which control model is now applicable.

Blue/Red Bounds (BRB) represents the control regions for Customer Satisfaction (CS). It is a measure of how early or late coffee delivery can be without adversely affecting customer quality or agility expectations. The Demand expectation is that Supply delivery will fall within those boundaries. For the purposes of teaching the method, a variable time bound represents that acceptance range. Only the left it is the "blue" region—coffee is cold or served too early. On the right it is the "red" region—coffee served late (but not cold). FIG. 17 through 40 is replete with blue/red shifts.

The blue/red shifts define the range of freedom that the demand side has to work with in its attempt to align Supply and Demand. The range is derived from historical trends but are being readjusted based on Customer Feedback when accepting delivery . . . . The system is thus capable of "learning new tricks". Customer Feedback is closing the loop between reality and the models.

02. Control System Module

Figure 45:
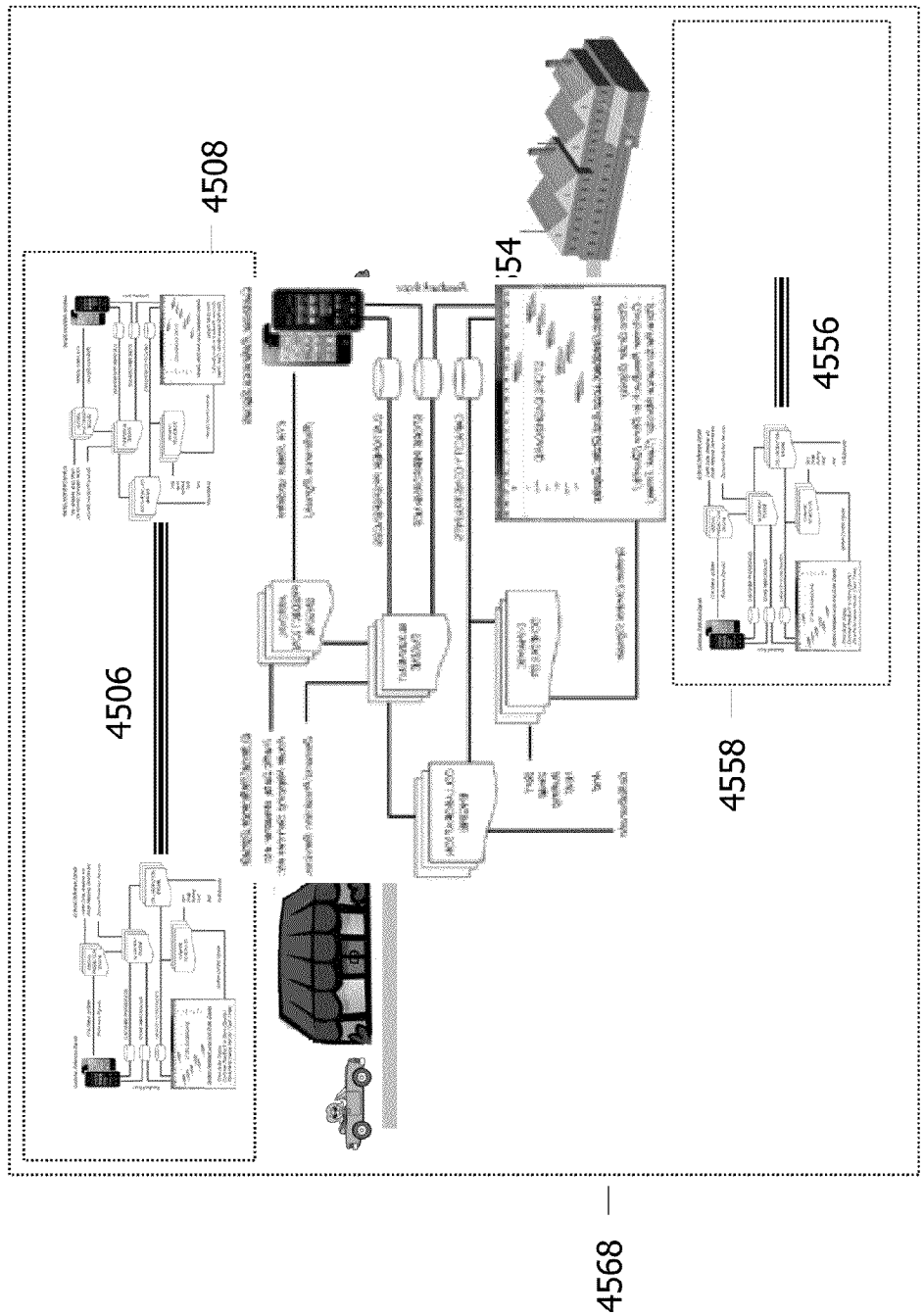
FIG. 45 depicts multiple control systems in collaboration and the resulting composite hierarchical control system network, of collaborating systems.
Figure 46:
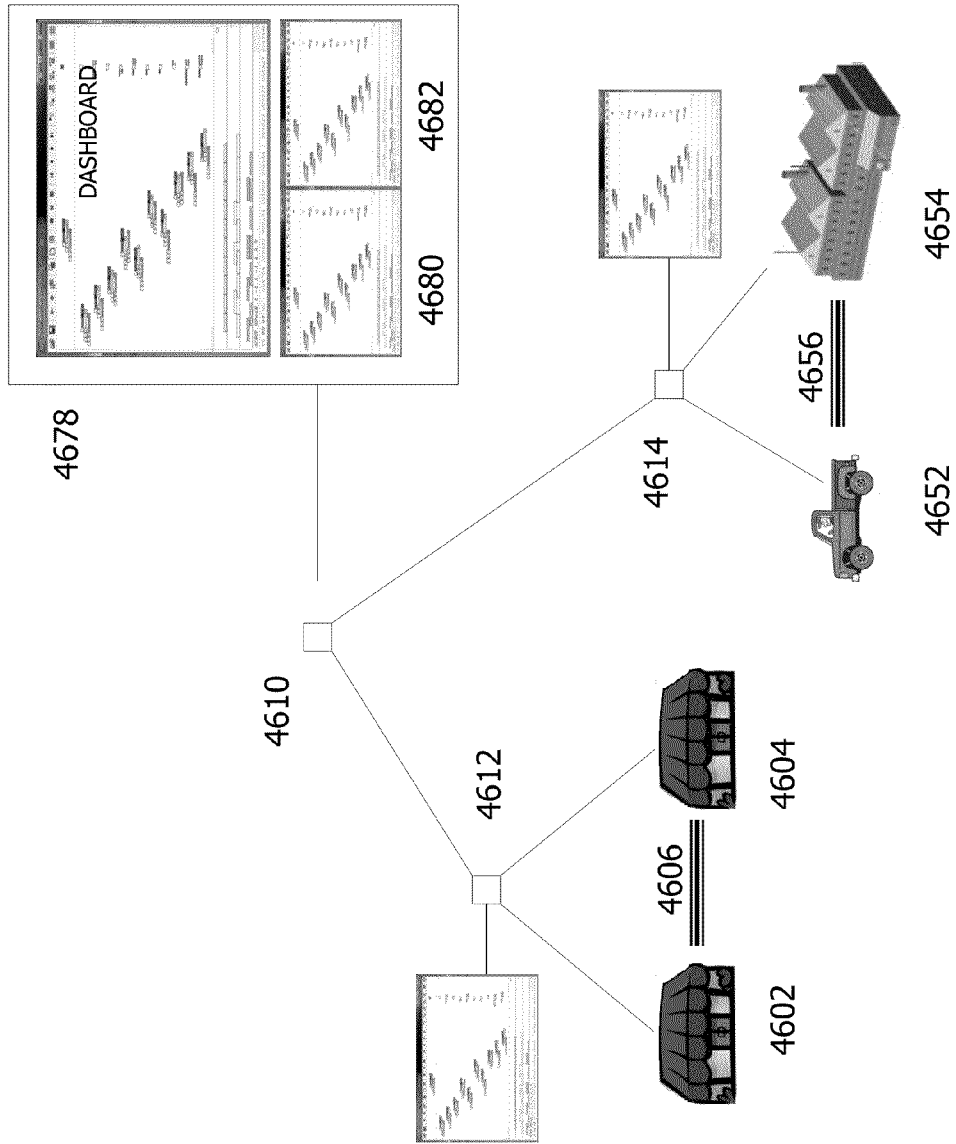
FIG. 46 depicts the hierarchical control system network, with emphasis on its tree structure and efficient data transport between subordinate controls systems.

This invention teaches the construction a scalable, generic, extensible hierarchical process control model, to address dynamic "alignments" between supply and demand components of a global supply chain. This entails multiple customers, stores, different order times, varying capacity available, optimum resource usage, methods to modify backlog etc. The application domain, for teaching underlying concepts, is ordering coffee a priori to arriving at the store, thereby avoiding wait lines etc. The principles and control logic described is relevant to multiple applications Hierarchical control system architecture is selected to address complexity and scalability. FIGS. 45 and 46 are examples. Each of them has subordinate control system representations.

The "System" is a distributed network of collaborating control systems. Each collaborator is constructed from a generic control system template. All control systems have similar schematics. This engenders communication across the network, right down to elemental control modules, through the Collaboration Pipe (see FIG. 45, 4506, 4556).

Figure 4:
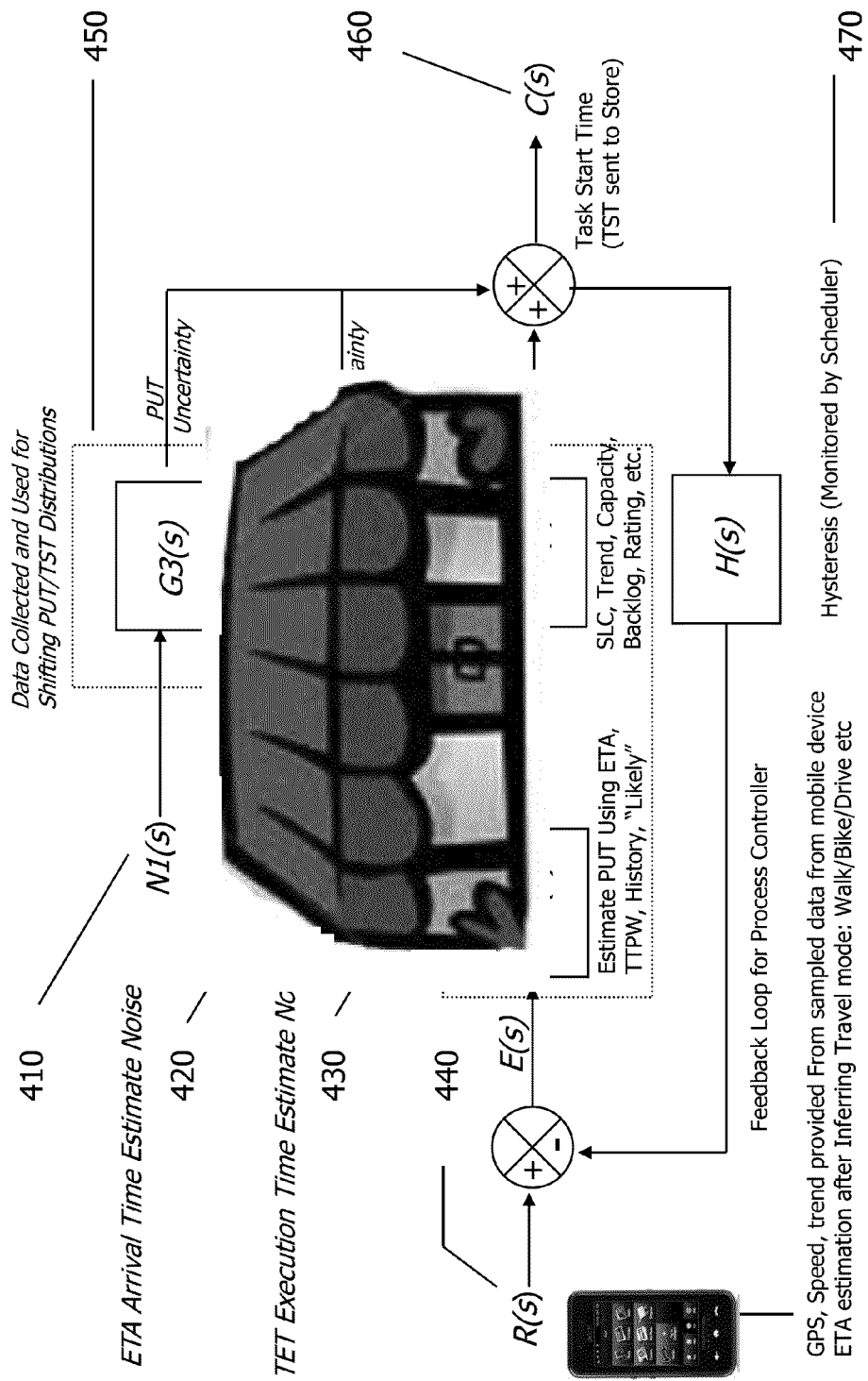
FIG. 4 illustrates the Bayesian Logic inference engine of one embodiment. The inference engine determines the probable cause of why a task was completed later than customer arrival, thereby causing an undesirable wait in the store. The Bayesian inference engine uses multiple data sets and multiple recorded variables including Task Start Time, TST and Time Start Delay TSD, to infer capacity and backlog changes as probable causes for tardy order delivery. This information is used by the scheduler to close the loop, making the adjustments to current store capacity and backlog, in order that to more accurately predict the current Task Execution Time, TET, based on recent trends. The intent is to adjust the process control model for accurately reflect current recent store performance. Similar logic is used to by the ETA estimation engine. It is core piece of the process controller framework.

Each control system is constructed from a control system module, shown in FIG. 4.

In the coffee example, the demand side reference signal 440 from the mobile device drives the system to schedule the time to start the coffee, The Transfer Function G1(s), 430. represents demand prediction time On the supply side, store performance is being adaptively modeled, based on capacity and backlog inputs, to predict the best time start time (TST) see G2(s), 430.

A judicious Task Start Time TST is then system generated and may be modified based on future events. TST is a best estimate when to start the task based on demand prediction.

The Control Signal C(s) 460 is driven by both G1(s) and G2(s). G2(s) models the estimated Task Execution Time (TET) based on store conditions including: Store Load Characteristic (SLC), current capacity and backlog etc.

Noise" effects, caused by inaccurate/uncertain estimates in ETA or Task Execution Time (TET) are also modeled, see N1(s) and N2(s) 410,320 respectively. There are estimation uncertainties N1(s) and N2(s) on PUT and TET respectively. N1(s) is based on current sampled driving pattern variations etc for PUT. N2(s) is based on recorded TET for similar orders/stores and it partially driven by past history.

Figure 13:
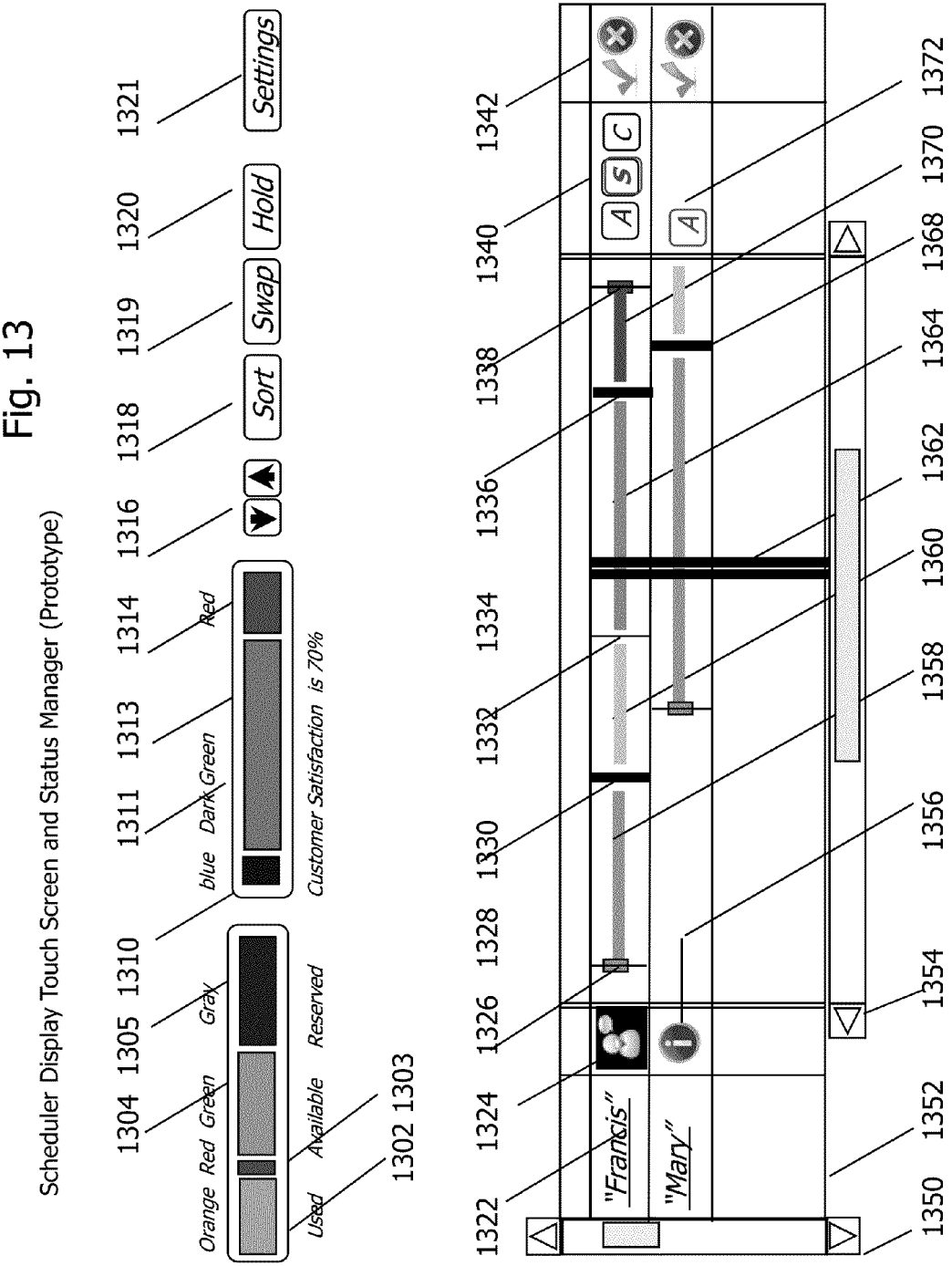
FIG. 13 is refreshed.

This historical data is being collected for PUT, TET and TST, through a store front interactive display, see FIG. 13. The purpose of the display is to enable workers to enter TST, TET and PUT, thereby enabling the scheduler to set better bounds on the uncertainty created by external events endemic to application domain. Thus both human and software agents are collaborating to keep the system within alignment.

H(s) 470 is the Hysteresis Compensation, so that changes made to the control signal C(s) are fed back, through a feedback loop, that takes into account time delays being noted by the Scheduler regarding when the order to start a task was given and when it typically started, It is fed back to generated Error E(s), after, "smoothening" provided by H(s) A closed loop process control diagram emerges. C(s) is defined as:

$$C(s) = \frac{G1(s)*G2(s)}{G5(s)}*R(s) + \frac{G3(s)}{G5(s)}*N1(s) + \frac{G4(s)}{G5(s)}*N2(s) \quad \text{Equation 3.1}$$

Where:

$$G5(s) = 1 + G1(s)*G2(s)*H(s) \quad \text{Equation 3.2}$$

Three distinct control system components are evident, each driving the Control Signal C(s).

The first is the computation to estimate TST. TST is based on estimated PUT and TET. PUT is affected by the Noise or disturbance N1(s) caused by erratic traffic patterns etc. TET is affected by unforeseen (by the Scheduler Process Model) demand spikes (more backlog), machine breakdown (less capacity) etc. It is shown as a composite block 430.

The second and third components are shown as a composite block 450. The process controller uses information from the past to tune the noise uncertainties by shifting PUT and TET distributions, described later. A generic, scalable, closed form solution emerges. But first, we need to be able to correctly estimate the component uncertainty estimations for N1(s) and N2(s), using both current and past trends for this matching time period, store loads and traffic patterns.

Proactive Process Control.

Control Systems self correct towards a (dynamic) equilibrium set point. They can be reactive (e.g. self correcting after the event as occurred). Or they can be proactive (self correcting in anticipation of a future event, based on trends). Proactive systems are preferred; "a stitch in time saves nine".

The Control Model in FIG. 4 has been constructed to model agile and proactive response of a system to a disturbance it then responds, based on expected (modeled) behavior. If the model is incorrect, alignment drifts will occur. Higher level control systems, are "watching" aggregate Customer Satisfaction (CS) and Store Load Characteristics (SLC). They alignment strategies will be revisited.

Determining whether a drift is temporary or a trend calls for inferences drawn sparse, uncertain and qualitative data. A proactive control system should incorporate qualitative ("fuzzy") data. Such as big data feeds on demand/supply. Trends, either provided or inferred, will bias the model in the right direction for proactive response.

03. Incorporating "Fuzzy" Data

A combined Bayesian Logic and Belief System Engine are described. It acts as a Transfer Function (similar to those shown in FIG. 3), in that its output is quantitative.

FIG. 4 illustrates the Bayesian Logic inference engine at work, to determine the probable cause of why a task was completed later than customer arrival, thereby causing an undesirable wait in the store. The Bayesian inference engine uses multiple data sets and multiple recorded variables including Task Start Time, TST and Time Start Delay TSD, to infer capacity and backlog changes as probable causes for tardy order delivery. This information is used by the scheduler to close the loop, making the adjustments to current store capacity and backlog, in order that to more accurately predict the current Task Execution Time, TET, based on recent trends. The intent is to adjust the process control model for accurately reflect current recent store performance. Similar logic is used to by the ETA estimation engine. It is core piece of the process controller framework.

Inferences from the Past:

402 and 408 depict the backlog (inferred by the scheduler and/or supplied by the store) over a daily cycle of store activity. 402 represents the current day demand curve, 408 is the historical data set, a weighted average, favoring recent data, of past data matching the same relevant store criteria. The relevant Store Matching Criteria (SMC) include, day of week, whether holiday or working day, weather (if it affects sales), days when conventions are in the region etc. The historical data is similarly recorded for multiple store a location, providing similar products/services, in the vicinity, hence an aggregate demand curve is constructed for the region, in addition to individual stores. There may be some indirect correlation, which, after sufficient samples are collected, may identify discrepancies in individual store performance. This information will be provided to store management, to reduce the deviance and thus ensure consistent Customer Satisfaction across all stores.

Identifying Causes Through Correlations:

Assume a recent but completed order was placed today at time 404. Historical data for this customer, traveling on the same route etc, and matching customer matching criteria (CMC) is reviewed by the scheduler. A historical SLC demand curve is located and the curve aligned so order placed time (Δ) serves as time datum 404. Now, discrepancies and correlations become apparent and used to infer cause of "Noise" or disturbance in the process control model. The recent data set 402 indicates that coffee was delivered later than customer arrival 416. This has resulted in a "red", inferred from when PUT was recorded by the store display unit. It may also have been supplied as feedback from the customer, through his mobile device. Note that store arrival time, inside the store, differs from actually picking up the coffee, because service may be tardy. Store arrival time estimates are generated by the scheduler, based on which the suggested TST, working backwards by TET was computed for timely delivery. We know approximately when the customer arrived in the store, based on GPS location, walking speed etc. We may also know it accurately, if a customer notification from his mobile phone to the scheduler was sent via the store Wi-Fi network or blue-tooth or Wi-Fi network connected to the store display unit. The recent PUT is then matched to matching historical CMC data.

The PUT times correlate well, see 424. Based on this correlation, ETA estimation error, N1(s) (see FIG. 3, label 410) is probably not the cause of this disturbance. However, it is also noted that the actual TST 412 is delayed from suggested TST, 406 by more than the "usual" amount 420. It is not related to the ETA estimation reference signal error. It may be related to change in store capacity or unforeseen backlog. The system will review both to ascertain root causes for this Time Start Delay, TSD.

Consensus Promotes Credibility:

Excessive TSD also occur when transient demand spikes occur. A flag is set to confirm/deny this hypothesis with more data. Repeated occurrences support the "flag": there are capacity or backlog issues. If another variable, TET, is also repeatedly more than usual, see 410 vs. 418, then two independent inferences are in consensus. This increases the credibility of the hypothesis.

It remains to be determined if this is a temporary aberration or a trend. An aberration is an isolated occurrence. It does not change TET values, but is recorded for the TST/PUT shifting described in FIG. 6, 7. Conversely, a trend is multiple, generally closely following repetitions of a noted aberration. If it's a trend, then the available capacity or backlog data is adjusted.

Note that is form of inferences is not necessarily probability based. It is using independent but correlated events to drive a conclusion. The system is applying Belief Systems: A belief system is a set of mutually supportive beliefs. [Similar consensual reasoning is used for multiple situations and therefore a generic Bayesian Logic based inference engine has been implemented, using consensus (also) to infer higher certainty of a root cause. Same logic applies to ETA estimation, using GPS location, speed and driving pattern etc. It is also used within Collaborative Functions, described later, to identify trends and self correct for them, ahead of time (proactive response).]

04. Switching Control Models

Figure 3:
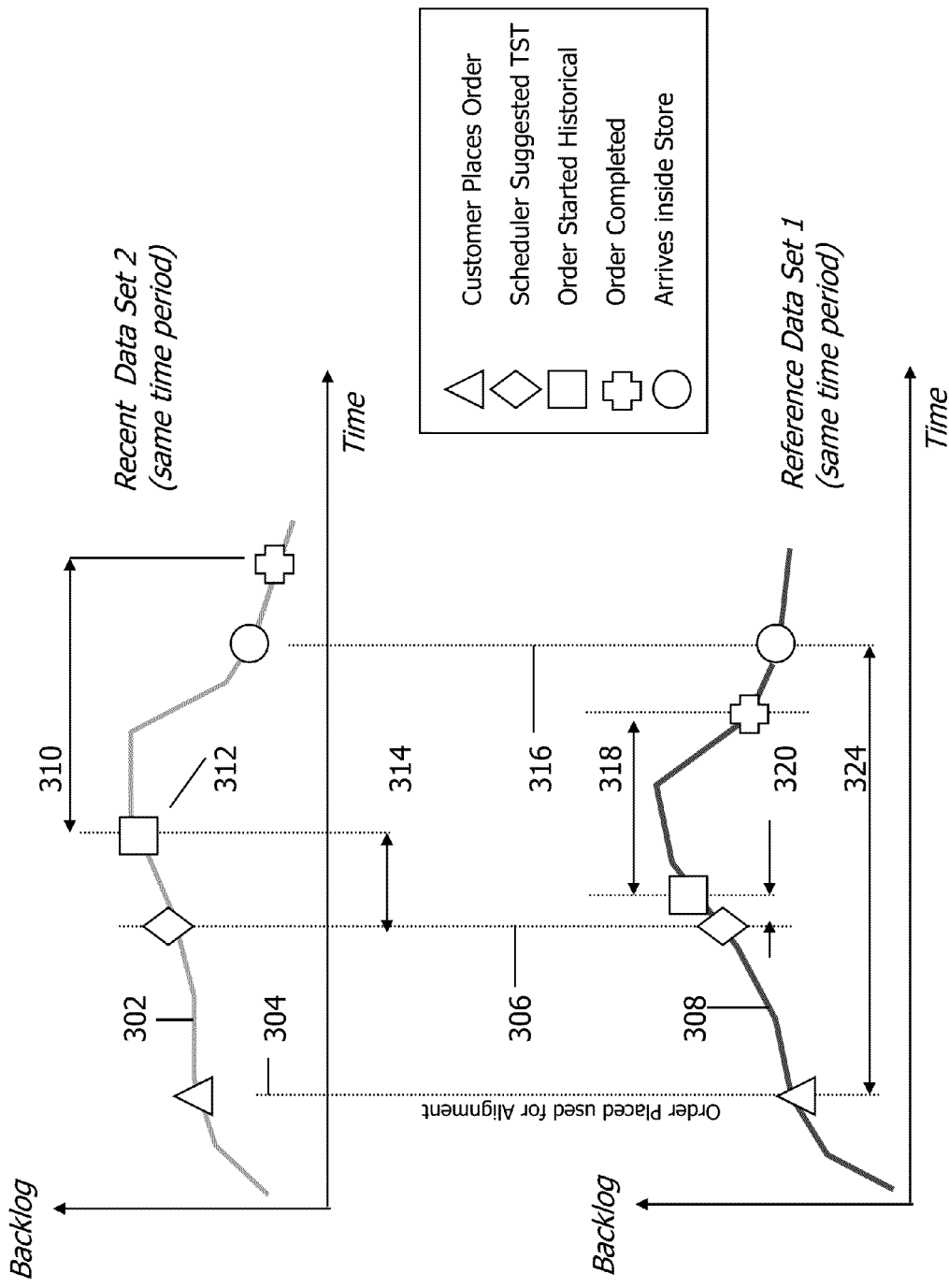
FIG. 3 depicts a process controller formulation of the scheduler functions, whereby the information from the mobile device is used to accurately estimate ETA, after both inference and computational methods are applied. The store performance in terms of capacity and backlog are also modeled and monitored. Noise effects, caused by inaccurate estimates in ETA or Task Execution Time (TET) are also modeled. A generic closed form adaptive model based control system paradigm emerges and is depicted.

Piecewise Linearity:

The transfer functions G1(s), G2(s), FIG. 3, Label 430, are full fledged Proportional, Integral, and Derivative (PID) controllers, with their own feedback loops to correctly estimate PUT and TET times. For TET, the PID parameters are based on historic orders (dispatched by the scheduler), current capacity allocated for them by the scheduler, indication of whether capacity allocated to other customers (e.g. call in, walk in), was insufficient and effectively created backlog etc. Indications such as tardy start times [see FIG. 4, Label 414] etc are used, and described elsewhere.

The PID parameters mirror the response curve of the store to demand supplied by the scheduler. If the capacity allocation matches productivity linearly, then the Proportion P value will reflect that. If there is a lag or lead time, the Integral I and Derivative D parameters will reflect that.

In other words, a PID model of the demand-response curve is derived, based on historical data, employing a full second order system model representation.

Figure 5:
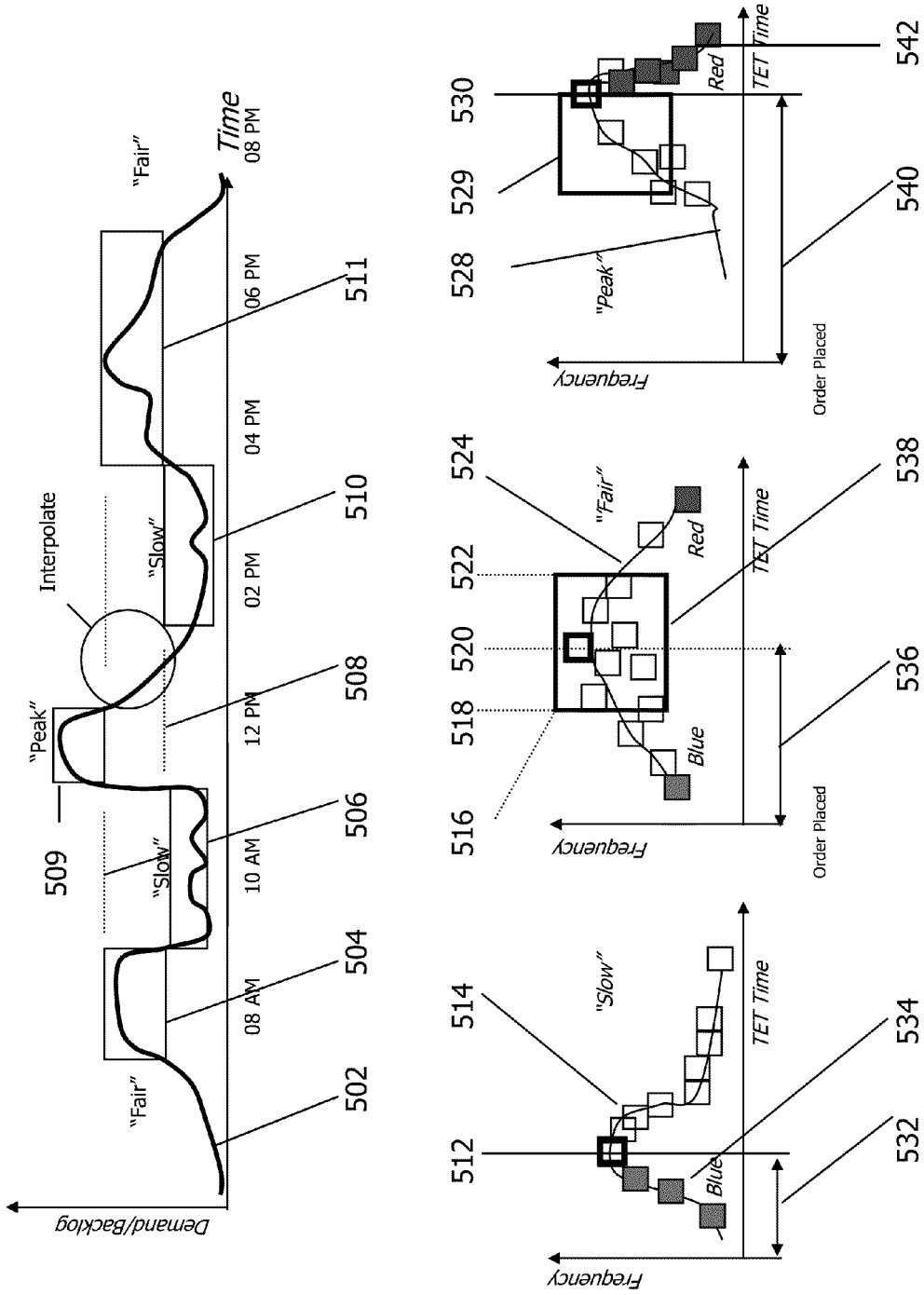
FIG. 5 is a close up view of store demand and backlog fluctuations during a typical day. In the shown embodiment, the focus is on identifying specific store load characteristics (SLC) based on salient criteria e.g. time of day; weather; whether convention is in the region etc. Each SLC has its own frequency distribution. Example frequency distributions are shown SLC "slow", "fair" and "peak". The control regions for each SLC are identified. The control regions are bounds within which the process controller model works correctly. Process control parameters for each region are derived from historical and current data and inferred trends.

FIG. 5 is a close up view of store demand and backlog fluctuations during a typical day. The focus is on identifying specific store load characteristics (SLC) based on salient criteria e.g. time of day; weather; whether convention is in the region etc. Each SLC has its own frequency distribution. Example frequency distributions are shown SLC "slow", "fair" and "peak". The control regions for each SLC are identified. The control regions are bounds within which the process controller model works correctly. Process control parameters for each region are derived from historical and current data and also inferred trends.

PID models work within stipulated operating ranges, beyond which the models "break" e.g. poor correlation to reality. Three regions are shown in the representative 12 hour Demand/Backlog curve 502. The control regions, where a set of PID values correlate well with historical data, are shown as boxes, 504, 506, 510, 511. These are the regions where the system is "piece wise linear". When TET values no longer match the PID model, the system automatically transitions to a different PID set of values. The system switches to another control behavior.

Switching Control Models

Transition points are where scheduler decides that the model (defining the relationship between reference and control signals) is broken. It needs to migrate towards applying another demand curve pattern and its associated control model. Transition points from slow to fair are shown, see 508 and from fair to peak, see 506. The corresponding composite frequency distribution of historical TET times is shown below 502; see 514,524,528 for slow, fair and peak demand. These composite frequency distributions are the Store Load Characteristics (SLC) for that time period.

Ideally the entire work day should have contiguous control regions, see 504,506,508. However, if not, see gap between 509, 510, marked as a circle. Here, there may be insufficient historical data, or the scheduler has reviewed the data and determined that a PID variant created by interpolated blend of the PID value for regions 509, 510, will suffice.

The PID values are computed for each control region by perusing the historical TET and TST delay frequency distribution character of each region see 514, 524, and 528 for the TET distribution for slow, fair and peak respectively. TET gives a sense of historic available capacity. The TST delay distribution [see FIG. 4, 414, 420] provides indication of backlog. The PID values are correlated with the matching frequency distribution. If the values are correctly computed, the predicted and historical values for median TET, 532,536, 540 will correlate well, as will the distribution curve characteristics. Else the values are iterated on to get a better fit.

Computing PID values iteratively can be computationally expensive, if updated often to support recent trends. It would be tempting to use the median TET alone for each control region as and associated demand curve, as in commonly done by other types of schedulers.

Tests indicate that this should be avoided when the distributions are skewed, see 514, 528. A better alternative is Bezier splines interpolations between Min, Median and Median to Max values see 518, 520, and 522 of the control region 516. Note that control regions are not always symmetric, see 529.

The schedule is periodically monitoring TET and its variations through out the day. When sufficient data is available, the TET frequency distribution is constructed for every SLC. An operating range and function is then recomputed for each SLC.

In a later section, we will align that distribution with the PUT distribution, both specific to a Store Matching Criteria SLC and a customer matching criteria CMC. The aligned distribution, will, after some adjustments, be used to suggest Task Start Time, the control signal response to the reference signal provided by the ETA.

If the TST changes, (e.g. ETA changed, Store performance changed) the Scheduler will shift the time start value, change task ordering, swap orders or route the order to another store. If the trend persists it will progressively reduce orders sent to the store, giving it time to "catch up".

Proactive Behavior:

Both task execution time (TET) and ETA have natural variations to them. A review past data before making drastic changes based on one or two occurrences. That would cause instability ("thrashing"), ensuing customer dissatisfaction and general inability of the store to cope with changing schedules in a stable manner.

In one embodiment, the system determines if this is a (temporary) aberration or a trend.

PID based control models provide a proactive, anticipatory/predictive element that improves store performance. A proactive approach also helps maintain customer satisfaction. Further it is efficient—a "stitch in time saves nine".

In contrast, a reactive system responds to events after they have occurred). The overall behavior seems jerky, and unstable. It is not scalable. Prior Art in logistics scheduling is typically reactive.

05. Aligning Distributions

Figure 6:
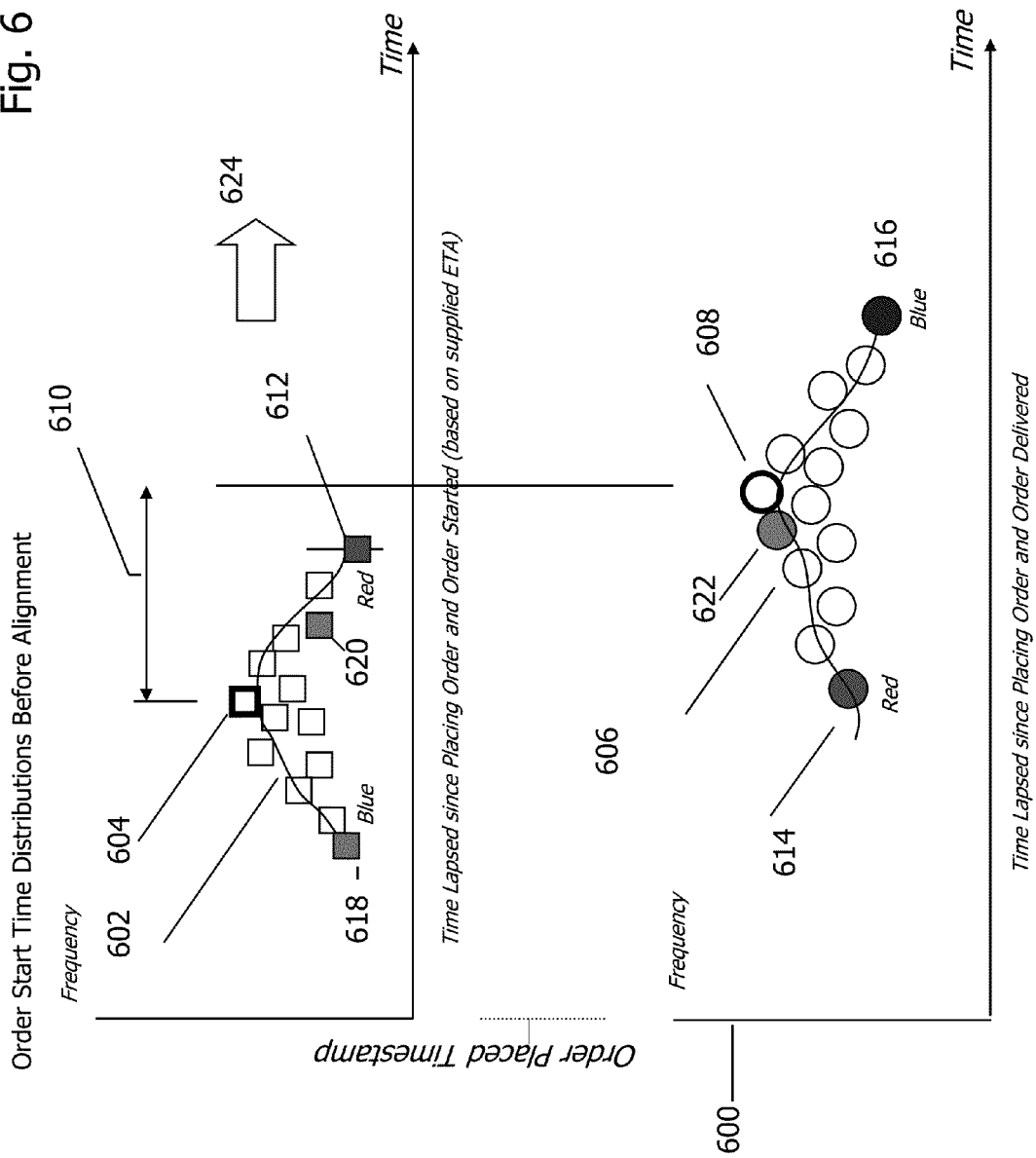
FIGS. 6 through 7 describe the method of aligning two independent historical distributions. In this embodiment, one measurement is the task start time TST frequency distribution, the other the customer actual pick up time PUT. These are independent—neither is driven by the other, if there was no scheduler involved. The alignment optimizes when orders should be started, as suggested by the scheduler through the store display, FIG. 13. The alignment is intended to reduce undesirable delivery variations, per customer expectations. The method of alignment incorporates customer bias/preferences. The method taught and its associated software process is applied periodically, to monitor and maintain Customer Satisfaction. The principles outlined related to multiple application domains, where alignment of two independent distributions is beneficial.

Introducing Alignment as a Strategy:

FIG. 6, 7 describe the method of aligning two independent historical distributions. In this example one is the task start time TST frequency distribution, the other the customer actual pick up time PUT. These are independent, as in; neither is driven by the other, if there was no scheduler involved. "Alignment" optimizes when orders should be started, as suggested by the scheduler through the store display, FIG. 13.

Store Performance Metrics:

For a specific Store Load Characteristic (SLC) the historical Task Start Time (TST) and Task Execution Time (TET) is made available. And deviations from the expected "standard" are identified.

Understanding the root causes for these deviations, may improve store workflow and reduce the deviations. Reducing the deviation has obvious benefits in terms of increased reliability and meeting customer expectations. It is collected and analyzed for multiple stores owned by a chain. Management is provided with aggregate and individual performance metrics. Hence, there are multiple levels and modalities at which the system is "closing the loop". Note that some metrics may be anticipatory—as in Early Warning Systems (EWS).

Individual Red/Blue Shifts,

602 is a Frequency-Time distribution, gleaned from historical data, for the store in question or from sibling stores with similar performance characteristics. The distribution is also for a particular store load characteristic (SLC) and pertinent matching criteria: the current time of day, week or weekend day, holiday or "special" day, as in convention In town, cold or hot weather, causing thirst, etc. Matching criteria are used to categorize, infer and recognize similar Store Load characteristics (SLC)

606 indicate the corresponding Historical Pick up time (PUT) for the same matching criteria (e.g. time of day etc). The data showed in the PUT curve 606 maps to corresponding data points on the distribution curve for Task Start Time (TST) for one specified time period and its load characteristics SLC. Each data point on 602 thus has a corresponding mapped data point on 606, for that customer. The time lapsed for the TST data point, has a corresponding data point on the ETA curve, since both relate to the same order. Note also that both PUT and TST are time lapses from a common reference 600, when the order was placed.

There is a "Red" (late), 612 and corresponding 614. The order completed after customer arrived. This implies a sluggish response, not an agile one. There is also one case marked where the order completed too early, see 618, 616. We refer to those as "Blues". A blue implies that coffee will be cold (hence blue). It implies degraded quality. Thus the extremes of poor quality and poor agility are both marked on the distribution.

An ideal situation colored green, is 620,622: the customer picked up the item "soon" after it was completed. The distribution medians are marked, see 604, 608. Shifting the order start time to get the "best" reduction in both "undesirable red" and "blue" situations is discussed next.

Aligning Distributions:

One approach to reducing "red" and "blues" is to shift the order start time, which in effect shifts the TET distribution to more closely align with the PUT distribution shown below it. The intent of the shift is to reduce the proportion of "reds" [612,614] and the "blues" [616,618] and increase the proportion of "greens" [620,622]. The software runs a simulation, proposing "what if" scenarios, with shifted start time. The simulation for a proposed shift indicates if, overall, "reds" and "blues" proportions are decreasing.

Figure 7:
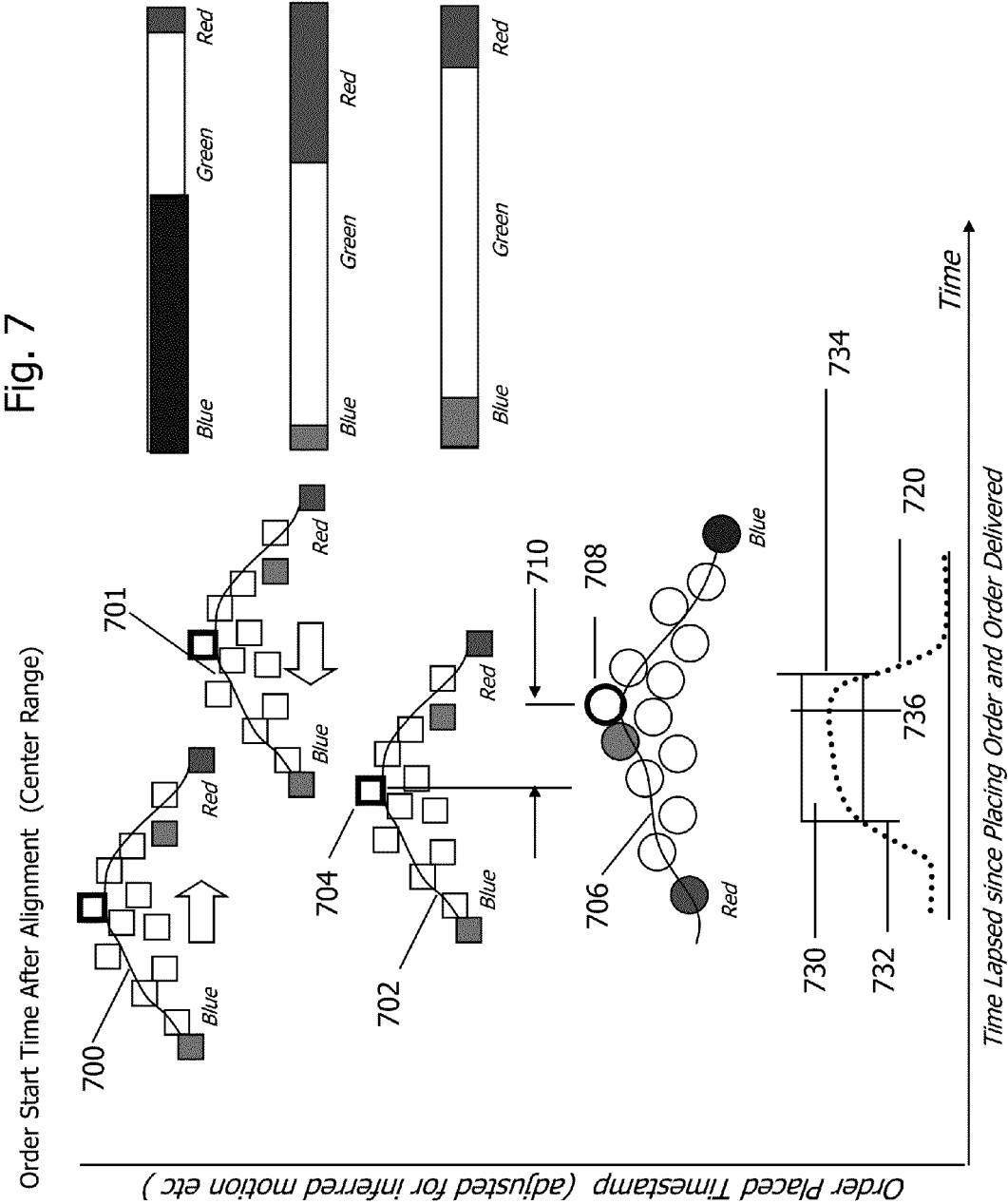

FIG. 7 depicts a shifted start time to the right (later), compare median deviance 610, 710. The optimum shift was determined through shifting the start time for each data point on the distribution in increments and then adjusting the direction of the shift based on the proportion of red and blues, see distribution shifts 700 (too blue), 701 (too red) and 702 (optimum).

720 depict the frequency distribution of a composite frequency distribution of PUT, 606,706 and Shifted Task Start Time (TST) distribution 706. It is the frequency distribution of "green" coffee delivery—The normal operating range 730, is derived from the composite distribution characteristics of 720. 732, 734 mark the lower and upper bounds of the range with a median 736. The asymmetric skew is expected—it's a composite of two distributions that, even if symmetric, are shifted by 710, measured from medians 704, 708

Customer Acceptance Range helps indicate shift direction bias. When the coffee is picked up, the customer is asked if he regards the transaction as blue, red or green. Some are willing to wait ("red") on arrival, but will not tolerate a cold coffee ("blue"). Their shift bias will favor "blue" reduction, at the cost of allowing some "reds". The customer bias is recorded as a modifiable setting, under Account Settings, FIG. 1, 150.

Recall that these distribution curves correspond to one customer, picking up orders during a specific time period and store load SLC The iteration being performed will need to be performed on all customers for this store. The same iteration will then be performed on all stores on all categories. In short, much iteration will be needed, at multiple levels.

If CPU resources are limited, a simplified approach is to compute the median range for ETA and TET for an each order type this simplification should be reviewed, based on the level of customization that each coffee order has. If the orders are identical, the correlation is expected to be high but will be confirmed by the system software. Conversely, if orders have multiple options (e.g. soy milk, whipped cream), which significantly adds to the TET, then an approximation may not correlate well and the store performance display, FIG. 13 will indicate that.

If the correlation is poor, then approximations should be avoided, in favor of a more comprehensive simulation with iteration shifting, see 700, 701,702 to match customer biases.

However, if approximations outlined above are sufficient, then TET is readily computed as a weighted (in favor of recent data) averaged TET for that store, order item and SLC demand curve. The ideal start time for "green" delivery is then the TET offset from the PUT (estimated, since it is not known a priori) for that customer. TST is simply PUT—TET. Since distributions will change with new data, the simulated iterations, shifting the start time to reduce "reds", "blues" and improve "greens", will be performed periodically to align TST shift with customer feedback. The system has this "learned" a customer bias. This knowledge is transportable to other store locations, with similar TET distributions. The customer is thus ensured consistent quality by multiple store locations. The eligible store locations are added as alternatives to the customer lists. This information is useful to the scheduler when orders have to be rerouted to another less busy store, during demand spikes. This is a case of demand shaping, operating within a supply chain framework. This is an inherent advantage of control systems—they self correct it either mode.

06. Formulating Supply Response

The Customer Arrival time at the store is the reference signal. The Control Signal, Task Start Time (TST) represents the Supply response to this Demand. The control system attempts to align the two, so the coffee delivered is neither too early nor too late. This section introduces skeletal concepts of "alignment" to be fleshed out in subsequent sections.

Figure 8:
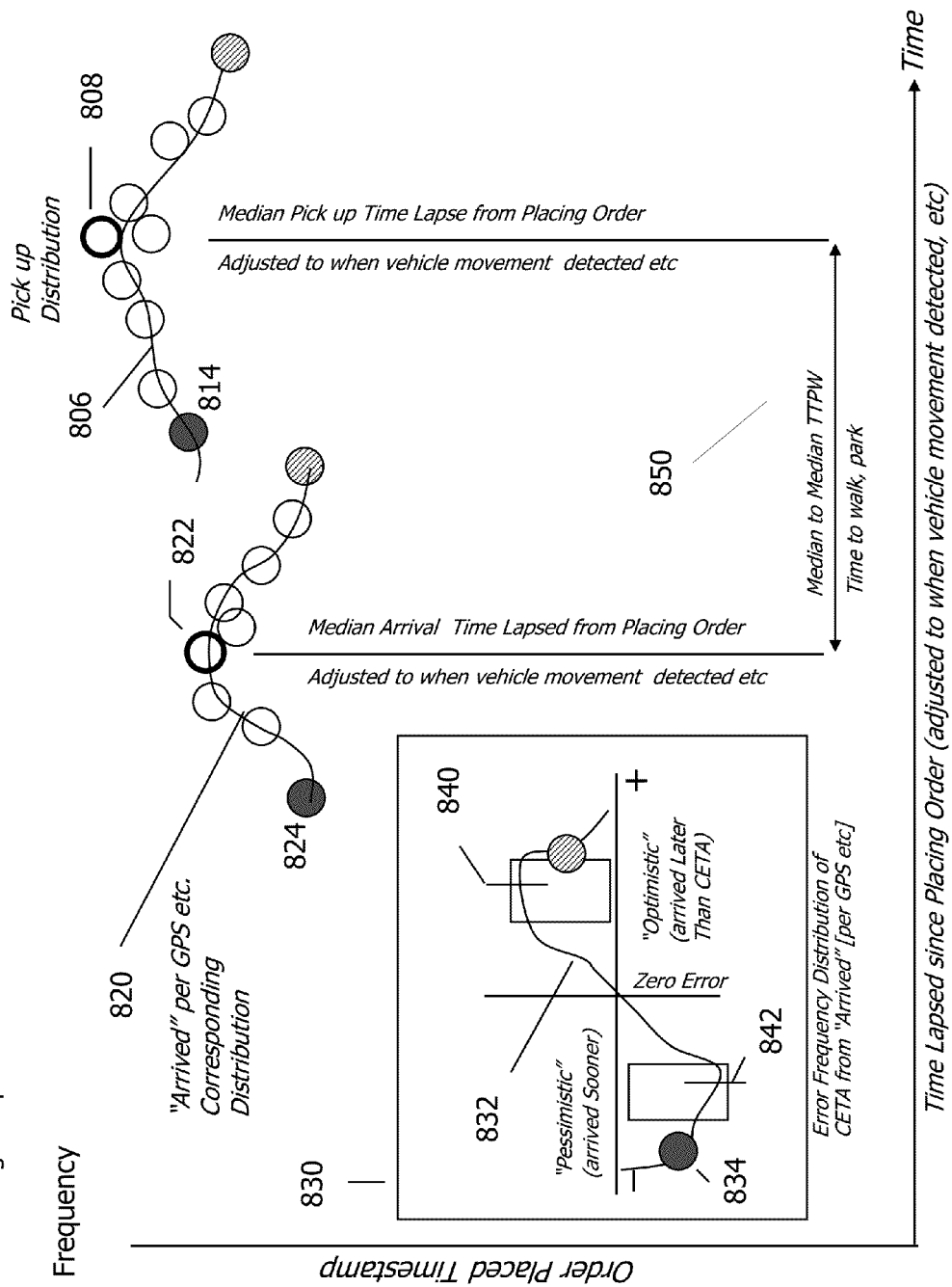
FIG. 8, shows how, using the composite aligned task time TST frequency distribution outlined in FIG. 6, 7, what corrections on the mobile device ETA should be made to include other tasks that the mobile device ETA estimator is not aware of: e.g. time to park and walk (TTPW) etc. In the embodiment, the scheduler is attempting to look backwards and decide when the order should be placed into the store system, based on computing the likely arrival time at the store, the pickup time (PUT). The method to do this, incorporating probability estimations, is described.

FIG. 8, shows how, using the composite aligned task time TST frequency distribution outlined in FIG. 6, 7, what corrections on the mobile device ETA should be made to include other tasks that the mobile device ETA estimator is not aware of: e.g. time to park and walk (TTPW) etc. The scheduler is attempting to look backwards and decide when the order should be placed into the store system, based on computing the likely Arrival time at the store, the pick up time, PUT. The method to do this, incorporating probability estimations, is described.

806 is the Pick up time (PUT) frequency distribution described earlier, see 706. [Median 808 corresponds to 708].

For each point on this distribution, there exists a data point on another frequency distribution, 820, with median 822, that plots the time lapsed from placing the order and "Arriving". "Arriving" is in quotes because it is an approximation, based on what is perceived to be a state change e.g. the car is in a parking lot, inferred from a dramatic change in speed (as perceived by GPS etc.

Identifying Transitions.

After the car/bus/bike/train has stopped, GPS is still available and the Demand Prediction Engine switches from "Drive" to "Walk" mode. It does this automatically whenever speed/acceleration transitions are detected and/or inferred.

For example, one obvious transition is when the mobile device location is close to the store and the speed recorded has dropped from driving to a parking speed or walking speed. There may also be multiple stops and starts along the route travelled by the customer. That implies, being aware of the rate of change of the GPS location to infer whether the customer is walking or driving and make allowances for the same, by switching from walking to driving mode. This requires more sampling when a transition is suspected, to confirm or deny the hypothesis. [Adaptive Sampling is described presently, to address this].

Let us for the purposes of purposes of illustration; assume that is only one walking mode and only one driving mode that comprise this trip. In other words, the order was placed while the customer was driving, not walking One transition between driving and walking is detected, when the customer arrived near the store. 820 depicts the frequency distribution of time taken from that inferred transition (driving to walking), Note that all points on 806 correspond to points on 820, see 814, 824. The median difference in time lapsed is shown 850, based on the medians for the two distributions, see 808,822.

For each point 814, 824, there exists a corresponding data point 834, on another type of frequency distribution 832, shown in inset 830. 832 is the frequency distribution of the following Error:

$$CETA\_Error = ETA \text{ at the last } ETA \text{ Sample} - [\text{Actual "Arrival" time}] \quad \text{Equation 8.1}$$

CETA is the abbreviation for Committed ETA. This is the last ETA reading used to commit to starting the order. Later than this time, is not considered judicious, based on the uncertainty distributions. This is described in more detail in another section. For the purposes of teaching the current method, assume that this is last reading before the scheduler commits starting the order, because to delay further risks a "red". We are attempting, in this section, to determine, based on historical evidence of from other similar trips taken before, what the likely error is based on historical actual arrival time near the store.

Recall Task Start Time TST is time shifted by 710 to ensure timely completion of the task close to Pick up Time (PUT). Working backwards, TST is some time before PUT-TET.

We have a handle on PUT and TST, based on historical information for the same store load characteristics SLC, time of day etc.

We also have recent indication whether the store is performing to the "model" or not, based on recent Task Execution Times (TET).

We therefore have a "reasonable" handle on the CETA_Error. However, this includes multiple modes of travel (driving, walking), each with their own error distributions. We need to work backwards, isolate the different modes.

The CETA error distribution 832, has both a negative and positive errors plotted. 840, 842 are the medians for those two types of errors: Negative errors imply that the CETA prediction was "pessimistic:" the customer arrived sooner than expect, see 834. Positive errors are the converse. 840, 842 mark the medians of the usual operating ranges for each type of error.

Multiple Peak Distributions:

Error clustering around 840, 842 indicate that the frequency distribution has two peaks. This complicates matters. When there are multiple peaks, we will also need to predict, which type of error is more likely and by what range of certainty. Methods employed include both qualitative and quantitative data feeds (Refer FIGS. 3 through 5).

The Demand Prediction Engine is described next. It adjusts the estimated PUT to include an accurate arrival at the store premises after identifying and correcting for walk/drive transitions.

From that point, predicting the correct TST is simplified. Referring to FIG. 7, it has been reduced to Aligning Store performance trends with demand prediction (e.g. arrival time at store premises).

07. Demand Prediction Engine

Figure 9:
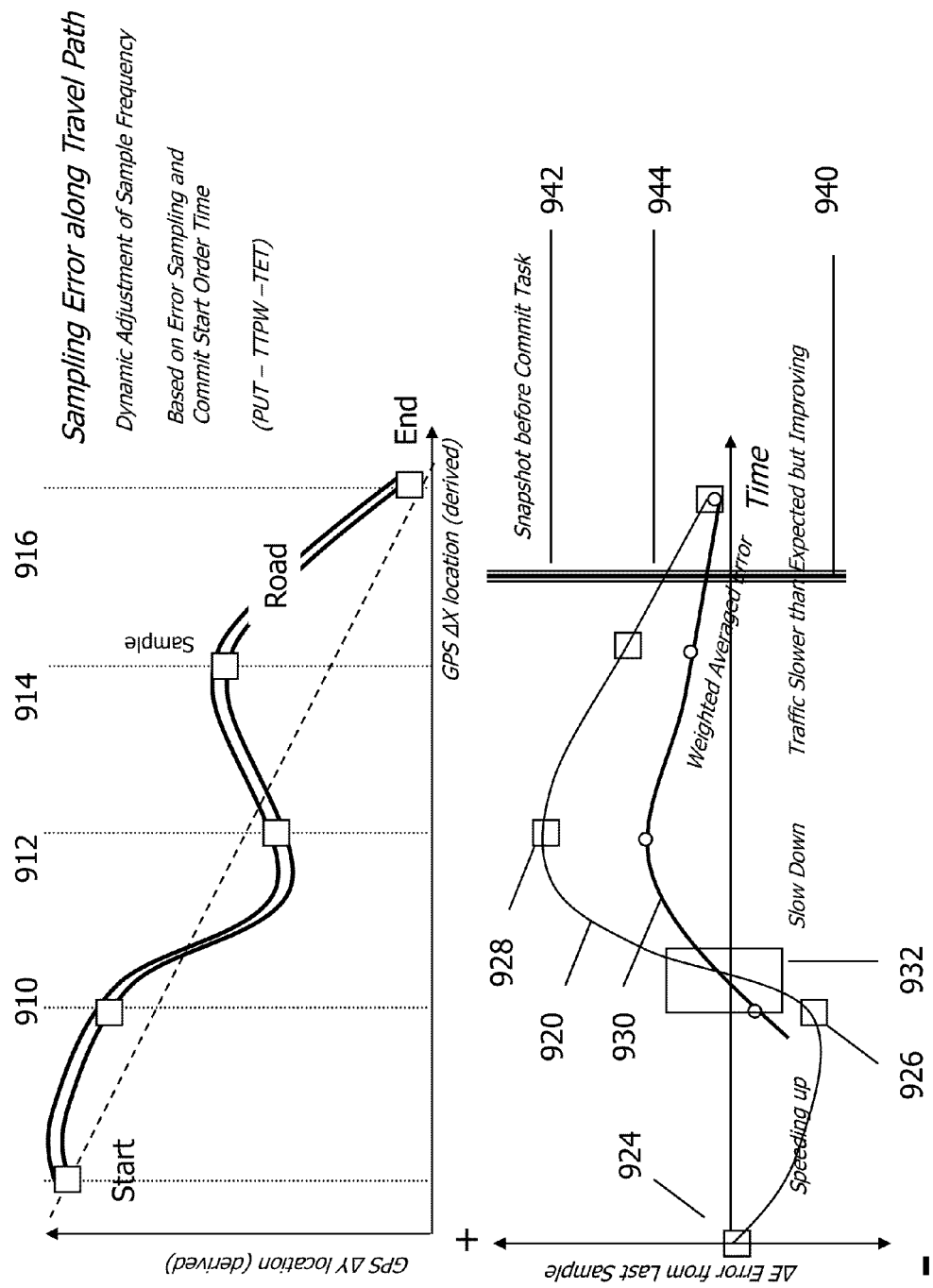
FIG. 9 depicts the ETA errors from actual and previously predicted from previous samples. The mobile device is sampled periodically to provide this information. The error and its trends are computed. Traffic patterns are inferred based on GPS, speed history etc. Sampling frequency is adjusted to improve ETA estimate accuracy. The time to start the task TST, as suggested by the scheduler is updated, store display.

FIG. 9 depicts the ETA errors from actual and previously predicted from previous samples. The mobile device is sampled periodically to provide this information. The error and its trends are computed. Traffic patterns are inferred based on GPS, speed history etc. Sampling frequency is adjusted to improve ETA estimate accuracy. The time to start the task TST, as suggested by the scheduler is updated and the store display, FIG. 13, is refreshed.

Software programs resident on the mobile device are thus communicating with the Scheduler, preferably over internet protocol to provide this information, based on periodic samples of user location, speed etc. The software programs are travel mode aware (e.g. walk/bike/drive) based on inferences drawn and pattern matching against defining characteristics of that mode of transport. Sample frequency is adaptively managed to promote accurate inferences and ETA estimations. Additionally, in situations where maps are unavailable, or the ETA estimation provided by third party suppliers are deemed insufficient, a straight line path approximation is used to predict ETA.

In the absence of knowing a priori when customer will arrive at the store, we need to predict Likely "Arrival" time based on ETA estimates provided by the mobile device software, which is aware of multiple modes of transport (driving/walking) and has the ability to correctly infer the current mode. We assume, for the purposes of communicating core concepts, that at samples intervals 910,912, 914,916, ETA "Arrival" estimates are provided while the customer is driving. Driving includes driving in a vehicle—bus, train, car etc. Walking in indoor malls or underground, where outdoor GPS and/or maps are unavailable, is addressed later.

920 represent error in prediction from the last sample, with Bezier curve interpolation between samples to smoothen out noise in the sampling. Observations:

1. The error at 926 is negative: At 926, ETA is less than at 924, speed has increased.
2. A slow down, inferred from the sharp gradient of 920, is inferred, in the period 932
3. From 928, traffic improved, (error decreasing) however, late arrival is likely A snapshot reading 944 of the Bezier curve interpolation taken between samples, see 940, indicates customer will be late by 942. A smoothened version of 920, see 930, uses a weighted average of past samples. The smoothened version also indicates late arrival, albeit by a smaller amount.

Incorporating Fuzzy Data

Bayesian Logic/Belief System engine is monitoring the trends. If both curves support the same hypothesis—e.g. the customer is likely to be late, there is a higher level of confidence through consensus If, the hypothesis differs, more readings may be request because recent data differs from the trend. [Adaptive Sampling Frequency is discussed presently.]

Thus Fuzzy Data inferences drive when to collect more information to change strategies, change parameters or rapidly flesh out skeletal models. Even with poor initial models, system simulations have demonstrated "learning" and becoming more circumspect over time. Fuzzy Data biases the direction to converge faster towards better set points for the blue/red bounds (BRB).

If the alignments diverge, the system may dispatch a snapshot request to the mobile device, see 940. It may also request a change in the sampling rate, in order to get a better "feel". Current load characteristics may have changed for the store, because of a convention near by, causing erratic demand and backlog spikes. It is therefore, "watching" the demand side.

On the supply side, Task Execution Time, TET, is being monitored periodically. It is derived from when tasks were started (TST) and completed, as is when orders were picked up (PUT). The distribution curves 704 and 706 are periodically updated. Shift correction 710 is performed. Note that, the shift 710 is aligning distributions so the blue and red are "equal". We refer to this as Centered" Alignment.

When recent data indicates that the store is not operating within its normal range 732, the system will first attempt to re align, failing which it will switch to more relevant control model settings.

Concurrent Demand Shaping and Load Balancing

One customer driven decision point is to reverse the flow by demand shaping. The system may concurrently request that customers accept the order being re-routed to another less busy store. Some suggested store locations, within a specified radius, may be provided. The suggestions are preferably along the current route of travel, inferred from the sample data locations; see square boxes on sample lines 910 etc.

If the customer agrees, then the benefits to both are obvious. The system has load balanced, with no loss of revenue. If they do not accept, then the system learns more about their blue/red bounds (BRB). It will reorder the list of amenable customers for future reference. Further, the system also readjusts the BRB for this customer. It may use this to "up the ante" by providing additional incentives. A dynamic form of Demand Shaping is active.

Note that the Supply side scheduling is taking place concurrently while UN supported demand is being siphoned off to another store. The demand pressure in Store A is driving business to Store B. At the same time, the demand pressure in Store A is being managed by adding more capacity, by calling more staff etc. A control system network is managing it all, through its collaborating agents. The "System" is in dynamic alignment if, since it's the sum of its parts, all nodes of the network are also in dynamic alignment.

Control systems fail to "track" the reference signal with the appropriate control signal response when the Transfer Functions are inappropriate (See FIG. 4). Over time, drifts occur. Proactive systems "watch" for these drifts, determine if they are aberrations or trends and proactively self correct. Part of that self correction requires collecting more recent data to flesh out skeletal hypothesis or inferences (from external data feeds etc). Sampling makes the system agile, since decision points are reached before it is "too late". A stitch in time has saved nine.

08. Self Correction with Sampling

Figure 10:
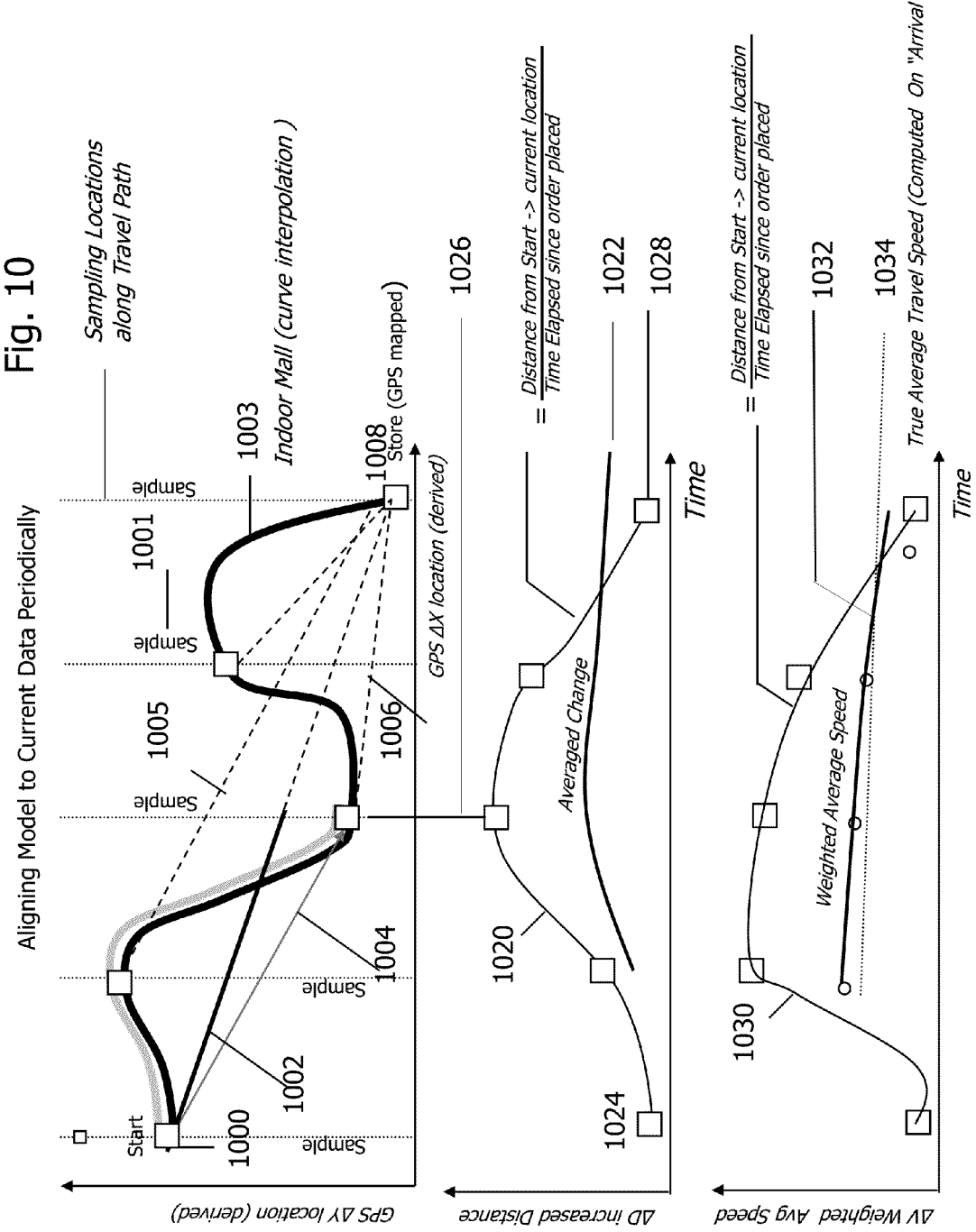
FIG. 10 describes the method whereby, in the absence of map and route data, a rudimentary but proven to be effective means of ETA may be constructed, based on periodic sampling of GPS data. The method outlines how, based on an automatically adjustable sampling frequency, periodic location, speed data is requested by a program, either on the mobile device or the scheduler, the system attempts to progressively reduce ETA estimation error.

FIG. 10 describes the method whereby, in the absence of map and route data, a rudimentary but proven, of Estimating ETA may be constructed, based on periodic sampling of GPS data. When the control models behind the Transfer Functions (See FIG. 4) are either incomplete or no longer relevant, then the system has to "learn" to modulate its control signal to the dynamics of the reference signal.

As skeletal control law (e.g. a spring-mass-damper model) is fleshed out through periodic sampling of both the reference signal and the current control signal error.

The method outlines how, with autonomously adjustable sampling frequency, more data is collected to flesh out skeletal inferences. When reality does not concur with model parameters, and/or the model assumptions, then a "drift" in the overall error presents it self.

One type of drift is as uniform change in the error. Oscillations are another, where over/under correction causes reverse. These patterns are being monitored by overseer programs using trend analysis engines (e.g. curve fitting, zero crossings)

Their inferences then drive the system to adjust control parameters, as a first step. In the event that iteration does that work, the system may escalate its response by switching to another control model that matches the current situation characteristics. Thus, the system is capable of autonomously self correcting its predictions at multiple levels.

A method is taught, that with Adaptive Sampling, provides this self correcting capability. It employs a sub ordinate control system, the Adaptive Sampling Sub System described in FIG. 11

In the coffee example, let us assume that the Store GPS location is known, periodic samples as shown above provide approximation location information, shown as squares on the sample interval lines, 1001. A Bezier curve 1003, interpolated between the sampled locations 1001 etc. . . . This meandering path, as opposed to the straight-as-the-crow-flies path, 1002, is typical, since the purpose of malls is to distract prospects from a straight line path, even if an obstruction free straight line path 1002 exists.

At each sampled location, the deviation from the straight line (and therefore minimum) distance from current location to destination is recomputed; see 1002, 1005, 1006. This is the minimum distance that still needs to be travelled. The challenge lies in using past travel data to adjust this distance left to travel, based experienced road geometry in the recent past and its deviation from the straight line path approximation.

At the third sample 1026, the straight line approximation from start 1000 to end 1008 would be the solid portion of dashed line 1002. The actual distance traveled, based on multiple samples (not shown) would be the sum of distance traversed between samples. If sufficient samples are taken, at short time intervals apart, curve fitting algorithms, such as Bezier splines, are used to construct a reasonably close approximation to the road geometry see double line portion of road, 1003. The difference between the two lines represents the error, plotted for each sample in 1020. Note that if travel was along a relatively straight road (e.g. freeway) then the error would be zero.

In other words, this error represents the "curviness" of the traversed path. The ratio of real distance traversed on 1003, divided by the modeled distance traversed on 1002, is an indication of the curviness experienced. Since it is based on recent samples, it is periodically updated to more closely represent recent history. This ratio may therefore be used to correct idealized distance left to travel, 1006.

Error plot 1020 shows a (smoothened) curve representing the error from the straight line path. As stated, for sample 1026, the error is the difference between the double lined section of 1003 and the sold section of 1002. The weighted average 1022 is shown. Since it is an average, it provides a smoothened effect and a more circumspect perspective on how much distance correction to apply.

The current averaged speed is also computed. There are two versions of this computation, both similar to plot 1030, shown here as a representation for both. The first version computes the speed based an actual distance traveled between time interval samples and averages it to favor recent history. The second version, uses the straight line path distance between 1000, 1026, see 1004. Both will provide different speed estimates, the latter being more optimistic. The variance between them is used predict future speed along the distance yet to be traversed, 1006, corrected by the distance error weighted average, 1022. Curve 1032, the weighted average speed is used to determine the ETA based on the corrected distance left to travel and the corrected idealized speed.

The samples intervals are shown as regular, however, if there is significant change in speed between samples, the sample interval may be adjusted to ensure that data received is not faulty. For example, indoor locations suffer from wave reflections, causing erroneous time delay readings, needed for GPS based triangulations.

While the approach described above seems rudimentary, field tests indicate surprisingly accurate ETA predictions, particularly for repetitive routes, where, the system has "learned" the route previously and apply its "memory" to further improve the ETA at each sample interval.

Self-correcting systems employ sampling and interpolation in a variety of application domains. When reality diverges from the model, they help close the loop between reference and control systems. We are using it to also confirm or deny an inference hypothesis.

Even rudimentary models, with significant sampling evolve over time because history repeats itself. The core causal model, being "discovered" will provide the clues needed to model it. For example one may start off with a generic spring mass damper model and then find that this second order system model does not fit reality. A hypothesis that this is a third order system is made and either verified or rejected. Fitting the correct model to behavior patterns is being done autonomously or under supervision. [Supervised Autonomy is covered in a later section]

In the domain of supply chains, suppliers attempt to align their supply throughput to demand forecasts from the customers. If a control model approach is adopted, then frequent conversations (e.g. sampling) can help suppliers more effectively "track" a more realistic aggregate demand, The frequency of sampling is driven by how well reality matches the forecasts (e.g. model).

When the divergence exceeds preset limits, then the control system must question whether this divergence is an aberration or an early warning to switch to another aggregate control strategy. More sampling may be needed. Adapting sampling frequency is discussed next.

Adaptive Sampling.

Figure 11:
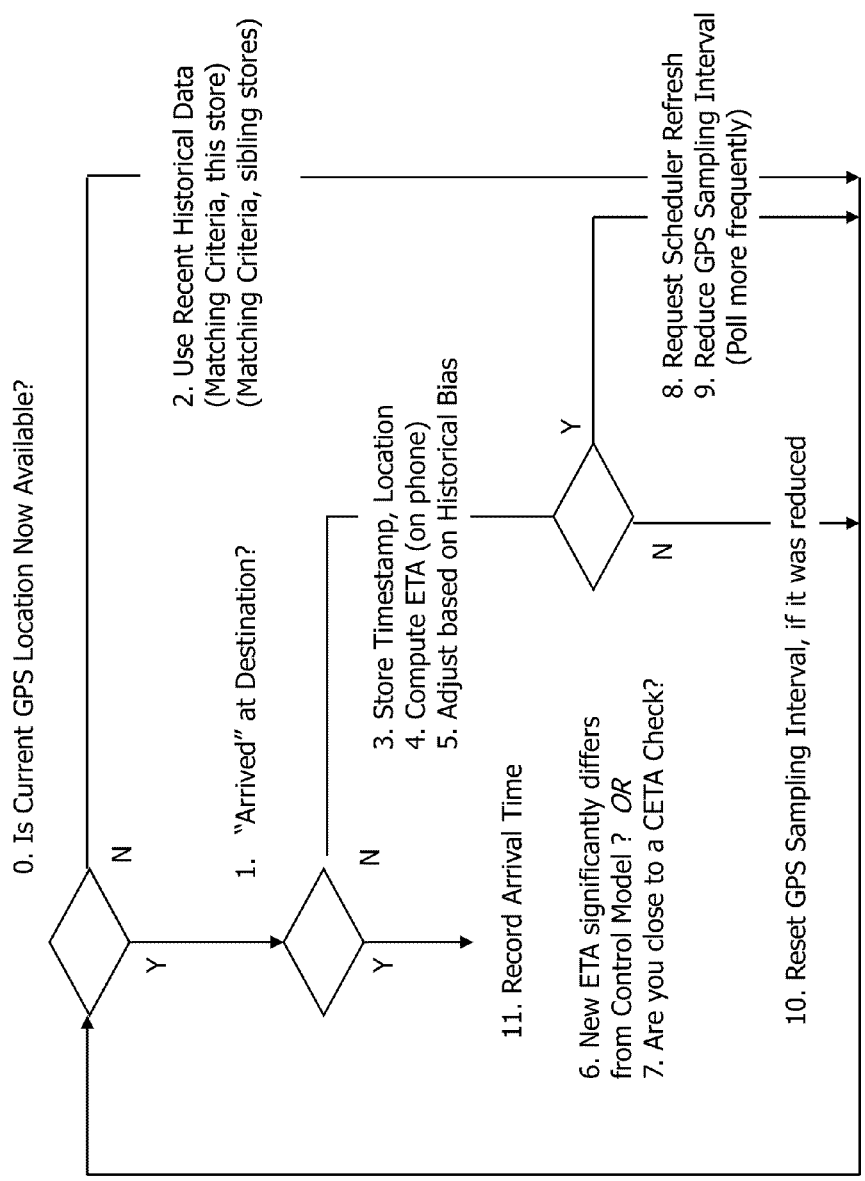
FIG. 11 depicts the logic control flow for the mobile device adaptive sampling engine. When adaptive sampling is needed, and why, is described.

Returning to the coffee example, FIG. 11 depicts the logic control flow for the mobile device adaptive sampling engine. Methods taught in other sections require that the information from the mobile device be recorded, at each sample period. This is needed to build the history. From the past, the future is predicted, based on a control model template (See FIG. 4).

Corrective action is needed, when either reference and/or control systems are out of alignment with the control model Transfer Functions, Patterns being monitored are attempting to infer if the misalignment is a temporary aberration or a trend? More data needs to be collected.

The sampling frequency may be adjusted proactively by a (software and/or firmware based) process controller resident on the mobile device.

The request for more data may be directed to the demand (e.g. mobile device) and/or the supply side (e.g. current store performance, backlog) In general, there will be some collaboration between both approaches which take into account other factors such as battery life on mobile devices etc, its access to the internet, store history etc.

As an example the control model for ETA may switch from driving to walking modes because the speed "trend" indicates an abrupt decrease. Polling frequencies are dependant on the speed of travel and its rate of change. Less polling, sufficient for walking speed, also conserves battery life.

As shown, see FIG. 11. Logic Step #6, one reason to adjust sample rate is if that error in sample readings significantly differs from the previous estimate. Note that the Adaptive Rate Control algorithm shown is also a closed loop self correcting control system module.

Logic Step #7 makes reference to CETA or Committed ETA.

This is the time, based on current Pick Up Time PUT estimates and the current store load conditions (capacity, backlog, changes in TET and TSD etc) that the scheduler decides that the order should be started to ensure timely order completion, preferably sooner than PUT time. Note that since both PUT estimates, TET estimates etc are, at best, likely predictions; there is an element of uncertainty. Managing that level of uncertainty requires more information, particularly from the inputs used to estimate Arrival time at the store PUT.

At each sample, the CETA min and max range is computed as:

$$CETA_{min} = ETA_{min} + \text{Probable Optimistic\_CETA Error (trend)} \quad \text{Equation 11.1}$$

$$CETA_{max} = ETA_{max} + \text{Probable Pessimistic CETA Error (trend)} \quad \text{Equation 11.2}$$

Based on the ranges and the likelihood of each event, the Scheduler has to decide whether to change the TST as suggested. This obviously has to happen before TET time passes, working backwards from PUT.

In the ideal case of just in time delivery PUT matches task completion time. The relationships are:

$$ETA + TTPW = PUT \quad \text{Equation 11.3}$$

$$TST + TET = PUT \quad \text{Equation 11.4}$$

$$TST = ETA + TTPW - TET \quad \text{Equation 11.5}$$

$$TST_{min} = ETA_{min} + TTPW_{min} - TET_{max} \quad \text{Equation 11.6}$$

$$TST_{max} = ETA_{min} + TTPW_{min} - TET_{min} \quad \text{Equation 11.7}$$

$$\text{Time Left to Commit (optimistic)} = (TST_{min} - \text{Now}) \text{ (should>0)} \quad \text{Equation 11.8}$$

$$\text{Time Left to Commit (pessimistic)} = (TST_{max} - \text{Now}) \text{ (should >0)} \quad \text{Equation 11.9}$$

In other words CETA is the committed ETA value used, for TST, based on the mostly likely prediction. After that time the scheduler waits till the order is started, see FIG. 13, 1340. It then allocates the capacity needed to execute the order. Timing the suggested TST is therefore important, since it will soon lock up resources.

When time left to commit, equations 11.8, 11.9 are small but still both positive, more samples are taken to get a better sense of which bound is more likely. At that time, if a later arrival seems likely then the ETA estimate is changed and the time left to commit, Equations 11.8 and 11.9 updated, at each succeeding sample. When, again it seems that that time left to commit is nearing zero, more samples as taken.

Let us assume that, at last reading, an early arrival is estimated. The task start time is then prioritized and committed. The store display is updated, see FIG. 13, 1330. Note that the actual start time is later, see 1332. The scheduler monitors this Time Start Delay, TSD. In the future it should make compensatory adjustments depending on whether it is an aberration or a trend, as described in Section 4.

Some essential components of a proactive control system are beginning to take form. These include: Identifying Control Regions, Bayesian/Belief Inferences, Alignment of Distributions and Adaptive Sampling. These are skills in the tool box for predicting PUT and then Store Arrival time. This is represented in FIG. 4 as the transfer function G1(s) in the box labeled.

After starting the task, changes in current store performance and/or Customer arrival time, needs to drive corrective action. That is represented by transfer function G2(s) in the box labeled 430. Methods to compute this portion of the control system is described next.

09. Supply Response Model

A circuitous route has been taken to meet the end objective (predicting Task Start Time TST). This perambulation highlighted the importance of incorporating both fuzzy and non fuzzy data in both supply and demand estimations needed by the control system of FIG. 4. When models are rudimentary, incomplete or dynamic, adaptive sampling helps fill in the blanks Thus, the control system attempts to stay in dynamic alignment between the Reference signal (e.g. Customer ETA) and its Control response (e.g. Store Task Start Time).

Figure 12:
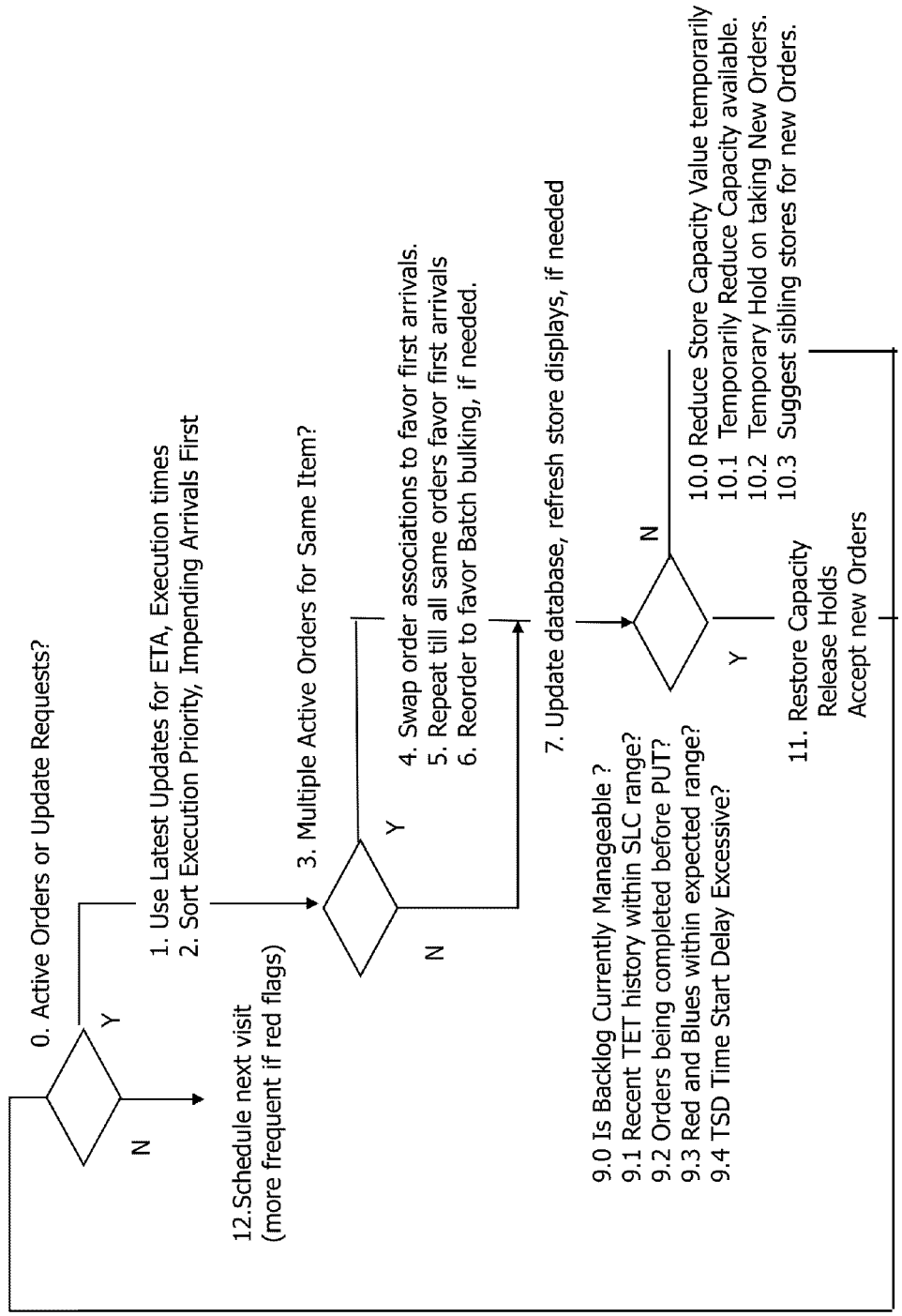
FIG. 12 depicts a simplified logic flow for the scheduler and process controller, outlining the functions of sorting, swapping, and bulking. It also shows when store capacity is temporarily reduced and, based on monitored store performance, is restored. The trigger points for holding orders, switching orders to another store, etc are shown in the diagram.

FIG. 12 depicts a simplified logic flow the control system scheduling task start times, outlining the functions of sorting, swapping, and bulking. It also shows when store capacity is temporarily reduced and, based on monitored store performance, is restored. The trigger points for holding orders, switching orders to another store etc are shown in the diagram.

In the coffee example, the scheduler initiates and monitors other processes including,
5. Periodic evaluation of PID parameters see FIGS. 4 and 5;
6. Inferring Store load deviations, see FIG. 3 and FIG. 5
7. Periodically shifting distributions to reduce "red" and/or "blue" conditions, see FIGS. 6 and 7
8. Estimating PUT from ETA
9. Adjusting for TTPW and optimistic/pessimistic estimates, see FIG. 8;
10. Requesting change in mobile device sampling rate, see FIG. 11.

The scheduler is thus dynamically re arranging task start times to match reality, as it perceives it. The logic flow diagram, FIG. 12, will be easier to understand after some background terminology is covered, explaining what is meant by backlog, capacity, sorting, swapping, bulking and holding Inferring Backlog and Capacity The transfer G2(s) function in the controller model, FIG. 4, label 430 requires both recent capacity and recent backlog information to predict Task Execution Time TET correctly. TET is (ideally) added to scheduler suggested Task Start Time TST, so the task is completed shortly before estimated Pick Up Time PUT. If the scheduler does not have direct access to the current state of capacity and backlog, it needs to infer this from recent trends in TET and TSD, the delay recorded between suggested and actual TST.

Consider a coffee store with two functioning machines (capacity) and zero backlog. If the scheduler dispatches four identical orders, it expects the total time for all orders to be completed (TTALL) to be 2*TET, since the machines are working in parallel.

In general, Capacity defines the maximum number of tasks that may be executed concurrently. In there are multiple orders (all scheduled to be started as soon as possible, then capacity may be inferred by registering the total number of orders that started around the same time and could not be consuming the same resource, if it also started while the other task was being executed. In pseudo code:

```
Capacity = 0
Sort Order list History in descending order of Actual Start Time,
   earliest first.
   For I = 1 to max (active orders)
      If Order [i+1]. Actual Start Time >= Order [i+0]. Actual Start
      Time then
         If Order [i+1]. Actual Start Time <= Order [i+0]. Actual End
         Time then
            Capacity = Capacity +1; these two tasks are running
            concurrently
         End if
      End if
   End for.
   Print "My current capacity is at least:" Capacity
```

Capacity will, of course, change since the store resources are being shared by both the customers of the scheduler and also by others e.g. walk in etc. The system is able to get a sense of the current capacity only when a bulk order—as multiple orders sent to be executed as soon as possible, preferably concurrently, is dispatched. At other times, it has to infer reduced capacity or backlog based on Time Start Delay, TSD, see FIG. 4.

Fuzzy Reasoning about Capacity:

Historical data is available on Capacity generally allocated to the scheduler in this time period and for this matching Store Load Characteristic SLC (FIG. 5) Based on that seed data, some further inferences may be drawn regarding non-interfering vs. interfering back log.

Consider an order of 5 coffees that takes a total of 3*TET. There are two machines in the store. If the machines were running concurrently, they would each process 2 orders in one TET, 4 orders in 2*TET, leaving one order left to run on one machine and available capacity to run one more order—other or from the scheduler.

In general the total time taken to process tasks with maximum concurrency is:

Let N=number of active orders to be started.
Let C=Capacity of Store
If MOD (N/C)=0 then '; the line is balanced, as in even N for even # machines
   $TTALL_{Parallel}$=INT (N/C)*TET
   Unused Capacity=0
Else
   $TTALL_{Parallel}$=INT (N/C)*TET+1*TET; ← unbalanced remainder
   Unused Capacity=(C*$TTALL_{Parallel}$)-N; ← last run used partial capacity
End if
Print "N orders with capacity C will take time:" $TTALL_{Parallel}$
Print "Unused capacity for other orders/backlog is:" C*$TTALL_{Parallel}$-N In other words it will take 3*TET to complete 5 orders in a two machine store, with available capacity, unused by the scheduler of 3*2-5=1. Now, if the "other" backlog increases to 3 (from a permissible 1) then, if we run the pseudo code again, pretending that the orders were from the scheduler, then If MOD (N/C)=0 then; 3 "pretend"+5 "actual"=8, divisible by two (capacity=2)
   $TTALL_{Parallel}$=(3+5)/2=4
Unused Capacity=0; both N and C are even, MOD (N/C)=0
We expect the 8 orders to complete in 4*TET. If the actual 5 order takes 4*TET, we know either the capacity has changed or the backlog has increased.

If TTALL is 4*TET then Fuzzy reasoning can infer that, at the very least one "other" backlog order was inserted, if both machine was running. The TSD [from suggested TST to Actual TST] is then examined to confirm this hypothesis. The hypothesis is confirmed if the TSD is the same for two sets, implying that both machines were working. If one was not, TTALL would be 4*TET and the TSD would be offset by 1, 2 and 3 times TET, since the coffee is being made on one machine.

If, on the other hand it takes 4*TET then this could be either because
   The capacity is reduced to half for some of the time.
   2 backlogged orders, from others(walk in, phone in) was inserted in between this 5 order
   3 backlogged orders, from others(walk in, phone in) was inserted in between this 5 order In general, however, there can be situations where it's unclear whether its backlog or capacity that is the bottleneck. To reduce the variables, The "Other" Backlog data could be requested from the store. Or it may be inferred, indirectly from store performance.

Sampling System Performance:

In the event the additional data is not available, then we are working with incomplete data. Store performance must be sampled at adaptive frequencies, to accurate ascertain when its performance no longer matches the model based on the Transfer Function G2(s), 430. The inferred (or store supplied) changes in capacity and/or backlog, directly affect TET estimations. A means to record TST, suggested and actual, TET and PUT are described in the next section. [The event recording process, needs to be described first, hence how capacity/backlog drive TET estimations is deferred to the next section. Teaching the method is resumed there, under the same sub heading. after describing the means to record TST, TET, PUT].

Proactive Scheduling Strategies:

As the capacity (inferred or actual) changes, the system must provide corrective action. Some strategies are:

Sorting/Swapping: The scheduler is receiving updates regarding ETA of imminent arrivals. The store display, FIG. 13, will display a sorted list—the store knows which Active orders need to go out first. While sorting serves an obvious purpose, swapping is less intuitive. Swapping is performed when the scheduler has inferred that a customer on the imminent arrive list has been delayed. The coffee for him has already begun, so the resource has to be "paid for". However, it can be "exchanged" or "swapped" with another identical or similar order, so the coffee is not wasted. For this to work, the scheduler runs a what if scenario and selects the swap partner or partners that would most easily permit an exchange of TST and TET values, without creating "red" or "blue". If acceptable, the TST, TET times are also swapped and the scheduler notes that this data is not to be used in the historical distributions for alignment etc.

A variant of Swapping is collaboration, where, one customers exchange their places in the task queue to mutual benefit. This is described later in more detail, under collaborative logistics.

Bulking: is a variant of swapping, where, if it improves work flow, the scheduler can swap in similar orders and swap out the dissimilar ones. Doing so will streamline the production line, now running in batch mode. The scheduler runs a what if test, based on PUT times. Eligible candidates will cause zero or acceptably low "red" or "blue" conditions, Bulking has been found to be useful in demand spike situations or "peak" SLC, where other customers (e.g. walk in) are contending for the shared capacity in the store. Bulking makes more efficient use of the capacity available to the scheduler's customers.

Integrated Control Strategy.

Refer to the logical flow diagram, FIG. 12.

STEP #2: Sort the active orders, not yet started, in order of imminent arrivals first.

STEP #3: If there are multiple similar orders, swapping is possible.

STEP #4 through 5. If there are multiple similar order items, perform Swapping, so coffee made for delayed customers is swapped.

STEP #6: If the capacity is stable and high, consider using bulking, if swapping is not an option. Bulking utilizes capacity upswings well, but Arrival times may not match delivery times. If the coffee is blue or red, (early, late) then Customer Satisfaction is adversely affected. This cost must be weighed against the benefit to the store regarding better capacity utilization. In short, use bulking if there is no downside in terms of Customer Satisfaction STEP #9.0 through #9.4: Run a battery of tests to determine if Capacity should be reduced. This is the effective capacity that the Scheduler "sees", from recent TST, TSD, and TET data. It also sees the PUT and Task completion times (FIG. 3.)

STEP #10.0 through #10.3, The capacity may be progressively reduced or temporarily holds placed to avoid creating unhappy customers. The scheduler is acting as their virtual assistant and advocate. It will review the capacity reductions made periodically and restore values if the current backlog becomes manageable.

STEP #11: includes the strategies to proactively adjust capacity to current trends (see above).

STEP #12: Adaptively select the new sampling frequency. If the trend is escalating, increase the frequency to collect more data. More data points will be needed to infer the correct set of root causes. That will drive the correct "stable" corrective action.

Hitherto, it has been assumed that the Store treats customers in the same priority queue as sequential. Each Customer must wait his turn, regardless of his level of urgency or willingness to pay a premium to be moved ahead of the queue. In the same queue, there may be two potentially collaborating customers, willing to switch places. One is willing to wait till later in the queue behind him, because his fellow collaborator paid for his coffee. This was in internal negotiation—the supply chain has not been affected. Customer labels switched around. Customer Satisfaction is preserved, with no increased expense (e.g. additional capacity).

Individual Customer Satisfaction is based on the Blue/Red Bounds (BRB) described in FIG. 5 through 7. Hence the Blue/Red Data for individual customers in line may be used to autonomously switch then, if they are willing to collaborate. The customer willing to give up his spot would be compensated. The customer placed ahead of his current position, would be willing to pay for this privilege.

The price to be paid between the parties is a function of the level of urgency in the demand and the availability of supply. Additionally, the Store may be willing to chip in, because now both customers order coffee. Else, there is a risk from people will simply leave if the line does not move fast enough. That reduces both revenue and Customer Satisfaction.

When resources are under provisioned, supply will lag demand. Wait lines will grow. The conventional First-Come-First-Served rule, does more harm than good, when applied indiscriminately and without knowledge of customer levels of acceptance. The Blue/Red Bounds (BRB) provide a means to collaborate autonomously Collaborative Logistics are described presently. This is a departure from Prior Art.

10. Feedback Loops

FIG. 13 displays a representative store front display and event recorder, incorporating simple inputs to record events etc., as would be available on a touch screen. The display unit shows active orders, when orders should be started etc. The timeline, shown as a double line, is regularly refreshed. The store display thus provides an ordered display of when to execute orders, based on current capacity and backlog. Store performance is inferred from when events are recorded: e.g. when tasks started and when completed, supplied by when store workers press the relevant buttons. Capacity adjustments, based on tardy performance, are displayed as is recent aggregated Customer Satisfaction. The store display is therefore a view into what the scheduler sees and this data is provided to the store to close the loop and engender proactive response. The Store Display thus serves multiple functions:

Closing Management Loop:

Management metrics are provided for the following categories Active Tasks Usage (orange), 1302; Active Tasks predicted to be "red" (red), 1303; Available Capacity for scheduler to dispatch new tasks (green), 1304 and computed as Capacity allocated to scheduler minus 1302 and 1303. Also supplied is Reserved Capacity (Gray), 1305. Reserved Capacity is a percentage of the store's total capacity (based on number of coffee machines, workers present and active etc). Total capacity is a function of the store resources. It is the same for similar stores. Reserved Capacity is modifiable by each store's management, in order to allocate resources for other types of customers (e.g. walk in, etc).

Revenue Maximization:

With these metrics available, store management can now set the reserved/available capacity to levels that ensure blue/red shifts are within acceptable ranges for both online and walk in traffic, based on Revenue Maximization, for example.

Dynamic Self Correction:

The system self corrects, if management set points are unrealistic. For example, management incorrectly sets the reserve capacity to zero, thereby implying that all capacity is available for the scheduler's customers and none for walk in traffic. This is foolhardy. The scheduler may indeed, based on this setting, dispatch more customers than it should have. But a "trust-but-verify" edict is inherently place in adaptive control systems. Task Execution Time (TET) is being monitored and compared to recent and/or matching SLC demand curves.

When disparities are noted the system "samples" related data more closely/frequently. Performance metrics, based on blues, reds and greens also provide some indication of the "health" of the store . . . . Store capacity will be then be adjusted to be more aligned to reality, see FIG. 12. The current set point will therefore be adjusted. Over time the, "character"

of the store, in terms of its idle, peak and sustainable performance. This is useful information for store management.

Dynamic Load Balancing.

Store performance is being periodically monitored and in the event the green percentage drops, the scheduler determines if the capacity allocated to it (sum of 1302, 1303, and 1304) should be reduced, to restore stability. Thus, regardless of what the store setting is, it will be revisited periodically and revised, if needed. Revisions include reducing the available capacity 1304, while Orders are active and later adjusting the total capacity available to the scheduler.

Further, scheduler may temporarily reduce the capacity allocated for its customers, in order give the store some breathing space and not dispatch more customers to it. In short it behooves the store to pay attention to the Customer Satisfaction reading 1310 and set realistic allocation levels to the scheduler. And also, change them before the scheduler needs to step in. A Hold Button is provided 1320, which effectively does the same thing, but is under store control. When active, the button will be lit. Pressing it again will release the hold. This gives the store some control over its destiny.

Performance Monitoring and Control (resumed from previous section). When customers pick up their coffee they provide feedback either at the store or later through their mobile device. When the coffee is picked up, either the check or cross button is pressed 1342. If the coffee is not picked up, (e.g. neither button pressed), after a reasonable time after task completion, the system regards them as a no show. No shows trigger a verification request from the customer, which, if false, affects the store rating. In general, orders remains active till one of buttons in section 1342 are pressed.

Customer Feedback.

Once a button in section 1342 is pressed, the Pick up Time PUT is recorded. It can be inferred whether it was a green (check mark) or Other (Red or Blue). The system infers which end of the spectrum that was (e.g. too early or too late), based on:

When the task completed button is pressed, see unlighted C (Completed) button 1340,
When the PUT occurred, see 1342, and,
The likely time the customer entered the store, based on ETA and TTPW, shown in FIG. 8. Means to determine when the customer entered the store are described later.

Customer Satisfaction Index:

The relative proportion of Greens, Reds and Blues are an indication of store performance and are periodically updated based on recent history for multiple customers. This is shown in the Customer Satisfaction display 1311. 1311 displays the relative proportion of blues, 1310, greens 1313, reds 1314 and also the current percentage 1311, shown above at 70%. This information cannot be manipulated by the store, since it is based on TET, PUT and customer feedback, either at the store or via his mobile device. No store accessible inputs to it are provided.

Closing the Supply Loop

Based on the periodic monitor of Customer Satisfaction and TET values, the system suspects that the store available capacity value is no longer valid. It will reduce it and then on future polled samples, reduce the capacity further if warranted. At some point the Hold button will be activated by the scheduler and then be lit up. The store rating chart will reflect this decision. Pressing the hold button will record store desire to resume. Capacity will then be slowly ramped back, while TET and Customer Satisfaction ratings are monitored closely to justify the increased capacity. The scheduler is dynamically closing the loop between the current store performance and its model. It is adjusting capacity and TET, thereby adjusting modeled behavior to correlate with the monitored trend.

Closing the Demand Loop

If the demand exceeds supply, demand will seek its supply elsewhere. That reduces both Customer Satisfaction and Revenue. The Store is motivated to offer the Customer incentives to come in later. The Blue/Red Bound (BRB) indicates which customers will be willing to wait for a lower incentive than others. They will be contacted first. The system is thus using demand shaping as part of the feedback loop to the customer. Note that the system, is shaping demand to align with supply, is, in effect sending a reference signal to the Customer (if she is being treated as a control system), monitoring the control signal response back and aligning the reference signal by changing incentives as part of the process of negotiation. The system is learning more about specific customer trading dynamics in the process. This will help in the future also, to "cut through the chase", reducing negotiations and engendering higher Customer Satisfaction, through better models.

Active Orders Status Display:

Until the time an order is picked up, it is considered an Active Order. All active orders are displayed; see 1322, with their associated states. Active orders must not be confused with Active tasks. Active tasks consume resources, after the task is started but not before. Hence an Active order that has not been started consumes no store resources. Active Orders with completed tasks, also consume no store resources but remain Active till the order is picked up and one of the buttons in section 1342 pressed. Till the order is picked up or cancelled by the customer it remains active. Note than when a task completes, resources allocated to it are returned to the scheduler and will be reflected in the capacity display, see 1304.

As an illustration, consider the state button section 1340 for customer Francis 1322. Note that the button S, (Started) in 1340 is shown lit for Francis, implying it is this state of the order is active but not completed When the Button C (Complete) is pressed, it will be lit and the TET recorded. For Customer "Mary", however, the order state is Acknowledged; note button A, 1372 is lit for Mary while it is dimmed for Francis State S is. Buttons S and C are invisible for Mary. The time to start this order is in the future. Note double line 1362 as a marker of the time "Now".

The time to start Mary's order is on the right of now, indicating a time in the future. Events that have occurred are to the "left" of the time "Now" 1362. The display is scrollable in terms of going back or forward in time 1354. Active Orders are displayed first, there is a separator and then past orders are displayed, more recent first. The customer history is scrollable, see 1350.

The acknowledge button "A", see 1340 for Francis and 1372 for Mary, serves two functions. First it records when the task was accepted by the store, so the scheduler can allocate resources for it when the S button is pressed. As described above, a task cannot start unless it has first been acknowledged. Second, if a task has been acknowledged but, even if the store has started or completed the task, if the button A is pressed again, it is signaling the scheduler that the store wishes to restart the clock on the order, if still active. The customer is notified of this request, with the option to cancel the order and render it inactive, or route it to another store etc. If he chooses to keep the order active at the current store, then the scheduler will restart the clock as requested. The task order on the status panel will change accordingly with refreshed order placement times, 1326 and recomputed suggested start time 1330, new estimated arrival time 1336 and task completion time 1338.

Suggested start time should not be confused with the actual start time when button S is pressed. For Francis, the suggested start time is 1330, the task was started at 1332, resulting in a delay past Customer ETA 1336. The suggested start time is not necessarily when the task was started. The task could have been started either before or after. For Francis it was started after, see task start time marker 1332. Color change of the color coded bars mark the transition: 1360 is yellow, 1364 is orange until the customer ETA time is reached, after which it changes to red, see 1370. The variation between suggested start time 1330 and actual start time 1332 is noted by the scheduler, when button S is pressed. It is used to gauge the store performance and loading. Excessive delays in starting order execution does not bode well for the store since it will eventually trigger reductions in store allocated capacity for the store, by the scheduler.

Customer Identification

On arrival, a customer is identified by employing one or more than one of six approaches: First, he provides a photo Identification 1324. Second he provides a secret question and answer, set by him on Accounts Settings see FIG. 1, 150. When photo 1324 or a substitute information icon 1356 is pressed, this data will temporarily display on the screen. The customer may change this periodically. Third, if a key pad interface is available at the store, he may key in a secret code. This is verified by the scheduler, it is not available to the store. Fourth, the customer may choose to use his visa card or drivers license for identification. Swiping it will provide the store employee with identification. If a scanner/reader is hooked in to the display unit, then the scheduler performs this identification directly. Fifth, when the order is placed, the scheduler will send the mobile device an email or text message with a random number. The same number is provided to the store front display, available when photo ID icon 1356 is pressed. The customer shows text message to store employees, for identification. Sixth, when the mobile device is in the store or nearby it will automatically connect via the Wi-Fi network in the store to the scheduler, that will validate, securely, that the customer is in the store. A Wi-Fi or blue tooth small area network, controlled by the store display unit, may be used, if the store prefers. Otherwise a "close enough" outdoor (GPS does not work well indoors) GPS location update may serve as valid approximation. The user can initiate this on the walk over to the store. Whether by outdoor GPS or indoors Wi-Fi/bluetooth, pick up would be allowed only after location is confirmed and for a short duration, that expires on pick up or times out, which occurs first.

Handing No Shows

If a customer does not arrive per the estimated ETA (which is being updated as long as the mobile device is active and has access to GPS) and he has not manually provided an estimated through the mobile device interface 130, then he has the option to cancel the order if it task execution is not in progress and will be notified through the scheduler. If the task has started, then the customer has the option to reschedule the order, if permitted by the store. If the item order can be salvaged or swapped with another order for that same item, without affecting Customer Satisfaction of the scheduler's customers, then the scheduler will automatically attempt to do so. If not the store has to accept the reschedule, based on their backlog from other customers (e.g. walk in or phone in). If not accepted, the customer is charged.

Manual Overrides:

The scheduler performs the Sort/Swap/Hold functions automatically. It also refreshes the active order status display with imminent Arrivals shown first. The store may have other information that requires it to Sort/Swap/Hold and buttons are provided see 1318, 1319, 1320. Buttons 1316, if enabled, allow the store to reorder active orders. A dialog box for each of these actions appears (not shown). If there are no conflicts detected by the scheduler and the changes have negligible negative repercussions on Customer Satisfaction, then it will be permitted and the status display refreshed.

Dynamic Adjustments of Transfer Function:

Using a combination of both qualitative and quantitative data the Demand Prediction Engine drives store delivery time. Changed resource capacity or backlog may affect that and needs to be reflected. The transfer function G2(s) 430, FIG. 3, is dynamically modified to more closely resemble the current scenario. This feedback is noted on the Store display, FIG. 13, and label 1302.

The store may be given some time to "catch up". If the store does not self correct, the trend continues. "Reds" will occur, and the store display performance updated, see FIG. 13, label 1311. If the trend is not arrested, the scheduler will progressively modify parameters to G2(s) and further reduce the effective capacity assigned to its customers. At some point, no further orders will be taken for that store. This give the store needed breathing space. Customer will be proactively directed to other, less busy, store locations along their travel routes.

Proactive Control System.

The scheduler is thus striving to maintain its objectives (e.g. Customer Satisfaction) under adversity. Quantitative data (e.g. Customer GPS location) is combined with Qualitative data (e.g. Bayesian Logic) to define a hybrid Process control function. An "intelligent" control system learns from frequent trends. It recognizes them a priori and changes its system parameters to respond ahead of time. It exhibits proactive behavior. It may also be able to simulate (in its spare time), what-if scenarios to explore alternative strategies. The essential components span multiple application domains. The next sections describe salient components of intelligent, proactive, process control systems.

11. Proactive System Circuit

The previous sections walked through an example application of dynamically adjusting task schedules to meet Customer Satisfaction metrics (e.g. coffee too cold or coffee made late). The dynamic adjustments depicted in FIGS. 5, 6, 7 are based on Expected Time of Arrival (ETA) provided by GPS enabled devices. Managing resource constraints (e.g. store capacity) were addressed in terms of dynamically load balancing such as described in FIG. 12. FIG. 13 depicted one means to "close the loop" between Control Signal (model driven) and Reference Signal (reality).

In the coffee example, a control system stays "in step" with ETA, making adjustments to task start times, TST, Customer Satisfaction is dynamically managed. The adjustments include aligning customer patterns with store performance patterns (FIGS. 2 through 7), and also from correlations to external effects (e.g. cold weather=more coffee demand).

Figure 14:
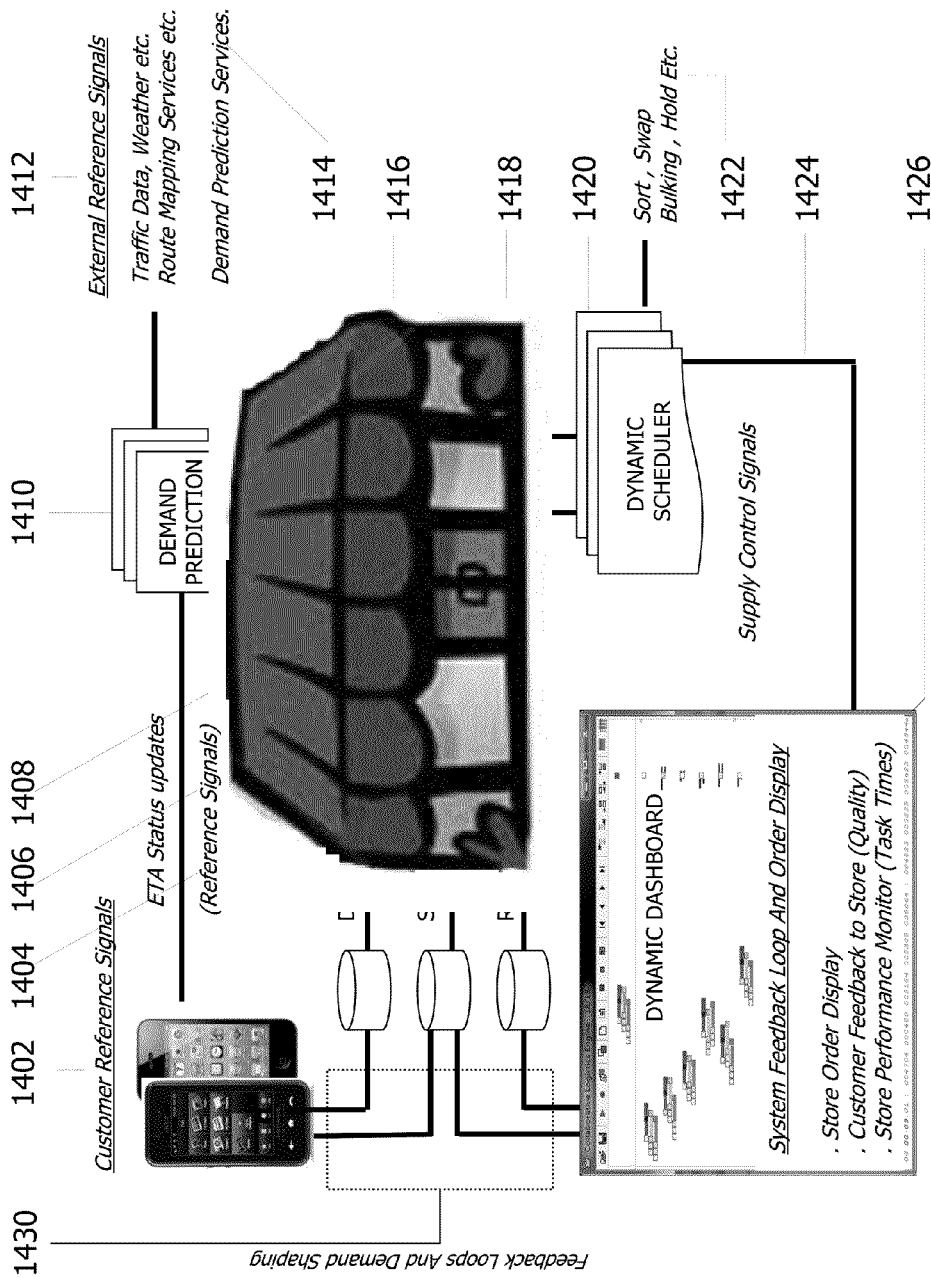
FIG. 14 identifies the key components of the process controller paradigm being described in this patent. In particular, it shows the data flow from the Demand Prediction Engine (for customer eta) to the Alignment Engine (which aligns customer expectations with store demand).

FIG. 14 is a schematic view of salient control system components and how they are "wired" together. The circuit/wiring diagram may be implemented in software or hardware. The circuit is designed to be generic, extensible and domain independent.

Components of such an extensible circuit include:

The Reference Signal/Driver

1402 provided by the customer, is depicted in this example as GPS based ETA. Based on this Customer "reference signal" the appropriate control signal is generated by the system, to provide service that meet/exceed customer expectations.

The Demand Prediction Engine

1410, take as input the customer driving function 1402 and other data including past correlations (e.g. cold weather=more coffee demand). Both quantitative (GPS ETA) and qualitative data (Cold weather, Convention in town) are used to predict demand. The Prediction Engines employs Adaptive Rate control and other strategies, refer FIGS. 08 through 11. Its objective is to provide reference signal changes proactively—as in predictive or a priori. This is more useful than reactive approaches (e.g. after the fact)

The Alignment Engine

1416 matches the Customer and Store demand distributions as shown in FIGS. 5, 6, 7. It accesses Customer Data, 1404 and Store demand and performance history 1406 and Estimated times of arrivals (for multiple customers), provided by 1410. Customer past history and stated preferences (too cold, too late) are data feeds that help formulate the probability distributions for the customer. Corresponding past history and available store capacity help formulate the corresponding distribution for the store.

The Demand Prediction Services,

1414 feed into the Alignment Engine. Demand prediction services would indicate that a convention is in town: hence store delivery may be slower than usual, because of higher walk-in traffic. Or that cold weather is predicted for the next two days, implying, again, more customer demand. The output of the alignment engine is fed into the Dynamic Scheduler, see 1418.

The Dynamic Scheduler

1420, attempts to match the "aligned" customer and store demand curves with current capacity constraints 1408. It may use techniques for sorting/swapping/bulking etc, depicted in FIG. 12, and FIG. 14, 1422.

Dynamic Dashboard

1426 receives the scheduler dispatch orders 1424. The store executes on the orders, in the priority specified by the scheduler. On delivery, Customer feedback is solicited and recorded. This feedback (e.g. "too cold", "too late") helps define acceptable "satisfaction" ranges. The Dashboard is therefore a visual reflection of the (current and dynamic) state of alignment between customer demand (reference signal) and store supply (control signal) response.

Closing the Loops

Customer/Store Feedback 1430, "close the loop" of the control system. Customer feedback includes whether the coffee was cold or late, store feedback includes data on when tasks were actually started and finished. This data helps inferences on the current store capacity, as explained in Section 12. There are also reverse control loops where demand shaping is used to divert excessive demand. Closing the loops is bi directional Control systems are defined by Transfer Functions. The alignment primitives drive their construction. These are described next.

12. Alignment Primitives

Figure 15:
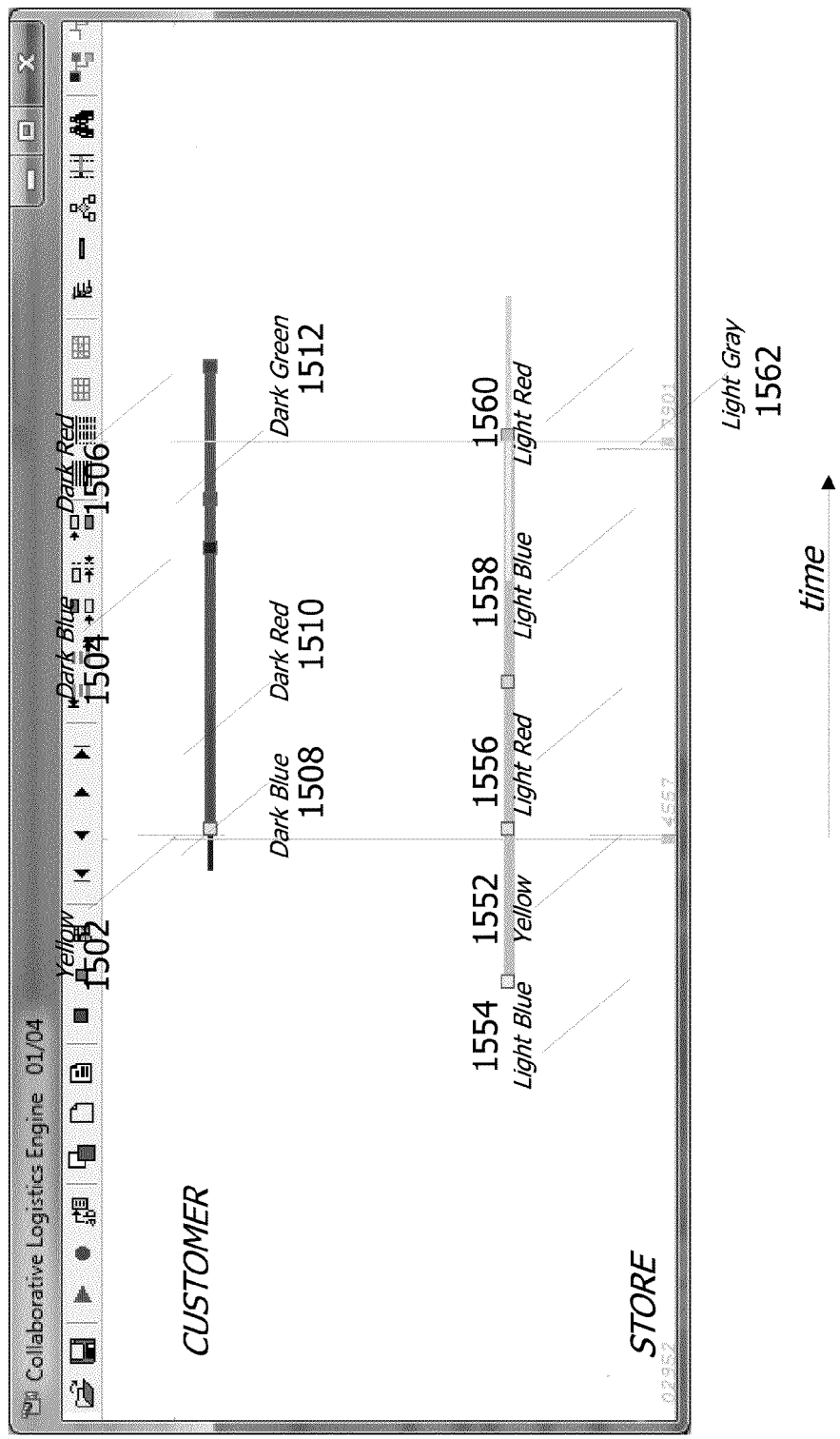
FIG. 15 is a variant of FIG. 2. It is re introduced with extensions to show how tasks are aligned to start or end times by Task Alignment Primitives shown in FIGS. 17 through 18.

FIG. 15 is a variant of FIG. 2. The customer time line is shown first, with the current ETA as dark green 1512. The current best estimated start time (to begin production) is shown as yellow, 1502. The range of red and blue shifts (as shown in FIGS. 5, 6, 7) are marked at 1506, 1504 respectively. The range marks the earliest and latest expected arrival times.

The store schedule matching this order is shown below. 1552 is the expected start time TST, shown aligned with 1502. The store may start earlier or later, shown by 1554 and 1556 respectively. This range marks the range of variation in TST start time.

The two lines are interconnected—they are part of a control system. The upper line, the customer arrival estimation, is the reference signal, driving the lower line, suggested store delivery schedules. The store schedule is a follower function. Both types are referred to as "Events. The grouping of drivers and their followers is expressed as an Event (Group).

Figure 19:
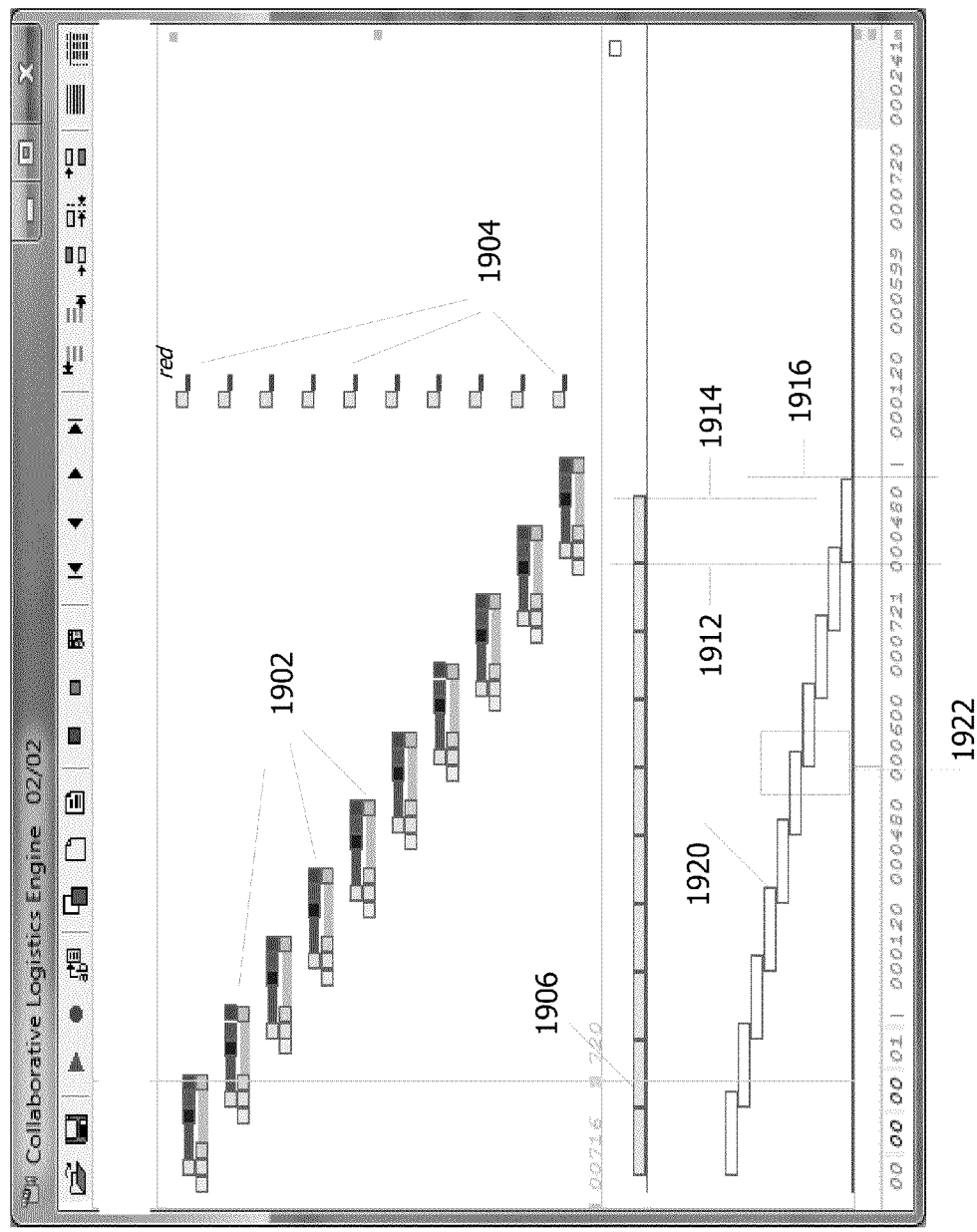
FIGS. 19 through 21 are visual views of what the scheduler "sees" when it attempts to reduce stacking (the build up of resource demand at some times). Visual contrasts between First Come First Served forms of scheduling are compared with the notion of Collaborative Logistics.

FIG. 19 shows ten such groupings or Events. Event Groups may have multiple driver and follower task objects, see FIGS. 32 through 36. Inside each event, 3200, there are two sub events e.g. 3202, 3203. 3203 may be driven by both 3201 and 3202. The domain defines those inter relationships.

Returning to FIG. 15, if production starts at time 1552 then it is expected to be completed at time 1562, shortly after customer ETA 1512. If it is started earlier or later, then the light blue ranges 1558 and 1560 show the range for when the product will be completed. The length of the light blue line 1558 correlates to the distance between 1554 and 1552. Note that these are distribution range correlations—the distance from 1554 to 1552 may not be identical to the length of 1558.

Figure 16:
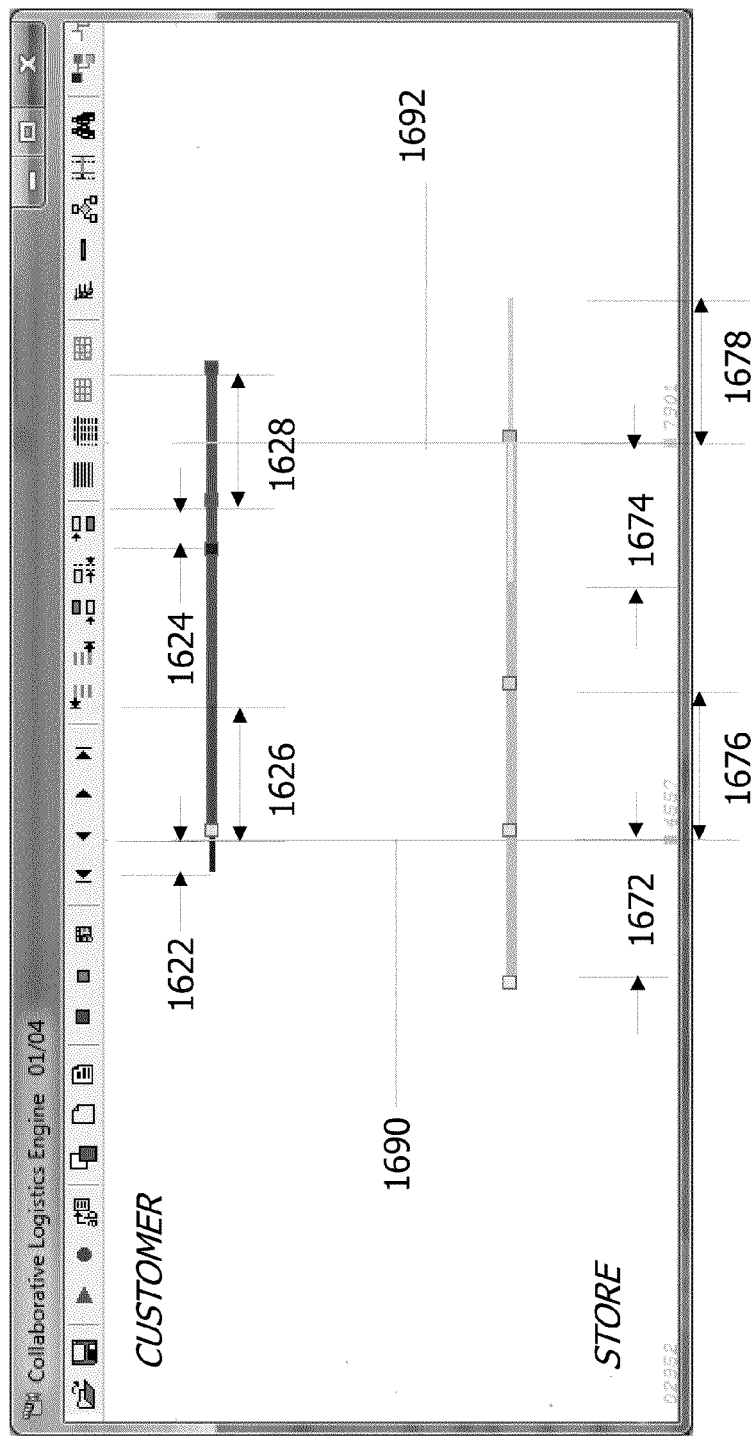
FIG. 16 shows the ranges of blue and red shifts for a task and how those relate to aligning the blue or red ranges with other tasks, based on task alignment strategies shown in FIGS. 17 through 18.

FIG. 16, 1622 correlates with 1624 and 1626 correlates with 1628 for the customer ETA timeline. Similarly, 1672 correlates with 1674. 1676 correlates with 1678. Cursor Line 1690 indicates the task started 1552 at the estimated start time 1502. This was based on previous customer history. At this moment, however, the task is taking longer to complete based on recent trend data. The estimated time to completion is marked by cursor line 1692, which is later than current Customer ETA. The system will correctly infer:

"The Customer time line and Store time line are (currently) out of alignment".

Alignment Primitives:

Alignment primitives are defined as functions that "shift" customer arrival and store delivery times to align their distributions as shown in FIG. 5 through 7.

Figure 17:
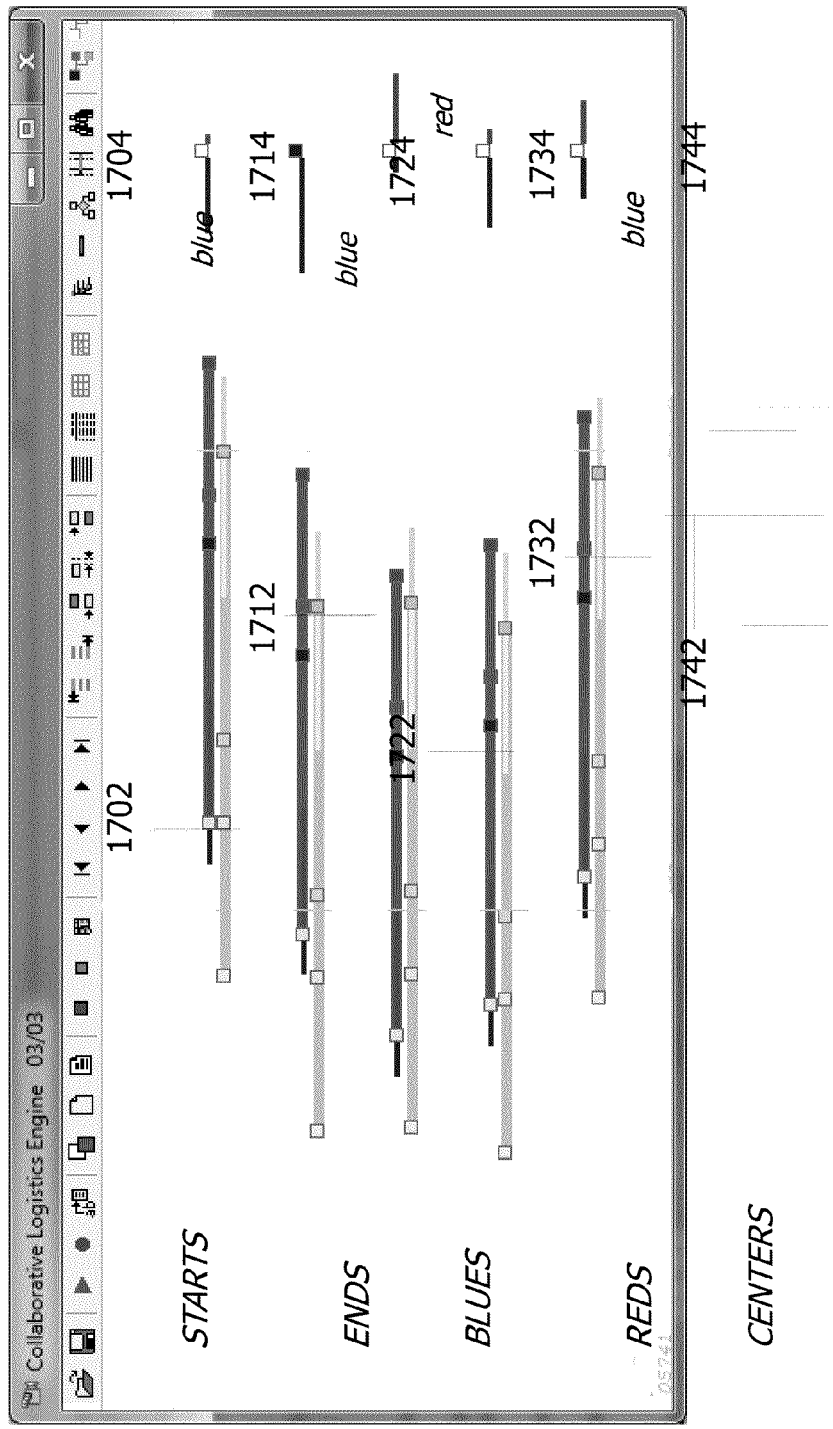
FIGS. 17 through 18 are visual interpretations of basic Alignment functions/strategies (Task Alignment Primitives). These Alignment strategies are the basic building blocks for collaboration at both intra resource and inter resource levels. The process controller framework uses these alignment task primitives to devise complex collaboration functions.

FIG. 17 shows some "transfer functions that maps expected overall arrival time to store delivery, in different ways. These ways are the Alignment Primitives. The range of blue/red shift for the task time line is shown on the right side of each alignment strategy. In 1704, 1714, 1734, the task time line should be shifted right (started later). This is depicted by (blue) lines 1704, 1714: skewed to the left (task started too early). Conversely line 1724, indicates that the (red) line is skewed right—the task should be started earlier.

The alignment primitives depicted in FIG. 17 are:

Align Start Times: Start time of task 1702 aligns with estimated start time.

Align End Times: Estimated end times 1712 (based on current data) are aligned.

Align Blue Inner Bounds: See 1722, here the "blue" (or early) ranges are aligned.

Align Red Inner Bounds: See 1732, here the "red" (or late) ranges are aligned Align Centers See 1742, here the red/blue line is "balanced" or equidistant, see 1744.

Notes:
1. Alignments are based on composite distribution curves. They may not be linear. Their behavior is expressed by control transfer functions related to relative "shifts" between lines.
2. Align Centers 1742 marks a "neutral" probability position. The red and blue probabilities are balanced. The relative shift has equal wiggle room in either direction. Biases, in either direction, are shifts away from this center equilibrium position.

Blue/Red Acceptable Operating Ranges

Alignment functions indicate a probable outcome in terms of customer/store alignment. Note that the mapping is based on Bayesian distributions. It is, by design, incorporating uncertainty and recent information (recent Customer ETA and recent Store performance). Additionally, the blue-red shifts shown in 1704, 1714, 1804, 1814 etc. indirectly represent predicted satisfaction indexes. Aggregated, they represent an overall customer satisfaction index for a specific segment of customers at this moment in time. [Note: Conventional scheduling approaches either do not model uncertainty well or do not provide dynamic and proactive realignment]

Long Term Sustainability:

Alignment functions provide an insight on whether Customer Satisfaction is sustainable long term. In 1742, either the customer range has increase or the task distribution range decreased or some variation of both. Starting the tasks earlier or later are a temporary fix. The system is thus providing management with metrics needed to ensure long term Customer Satisfaction.

Identifying "Wiggle Room":

Note that the larger distribution range dominates the effective "freedom" to shift schedules. The customer distribution is contained in the task distribution. If the customer distribution is larger then Customer Satisfaction is easier—there is more wiggle room for the task process to start and finish within more flexible customer expectations. Conversely, if the task distribution range is larger, as shown in 1742, then the probability of a disappointed customer is larger.

Reverse Alignment Primitives

Figure 18:
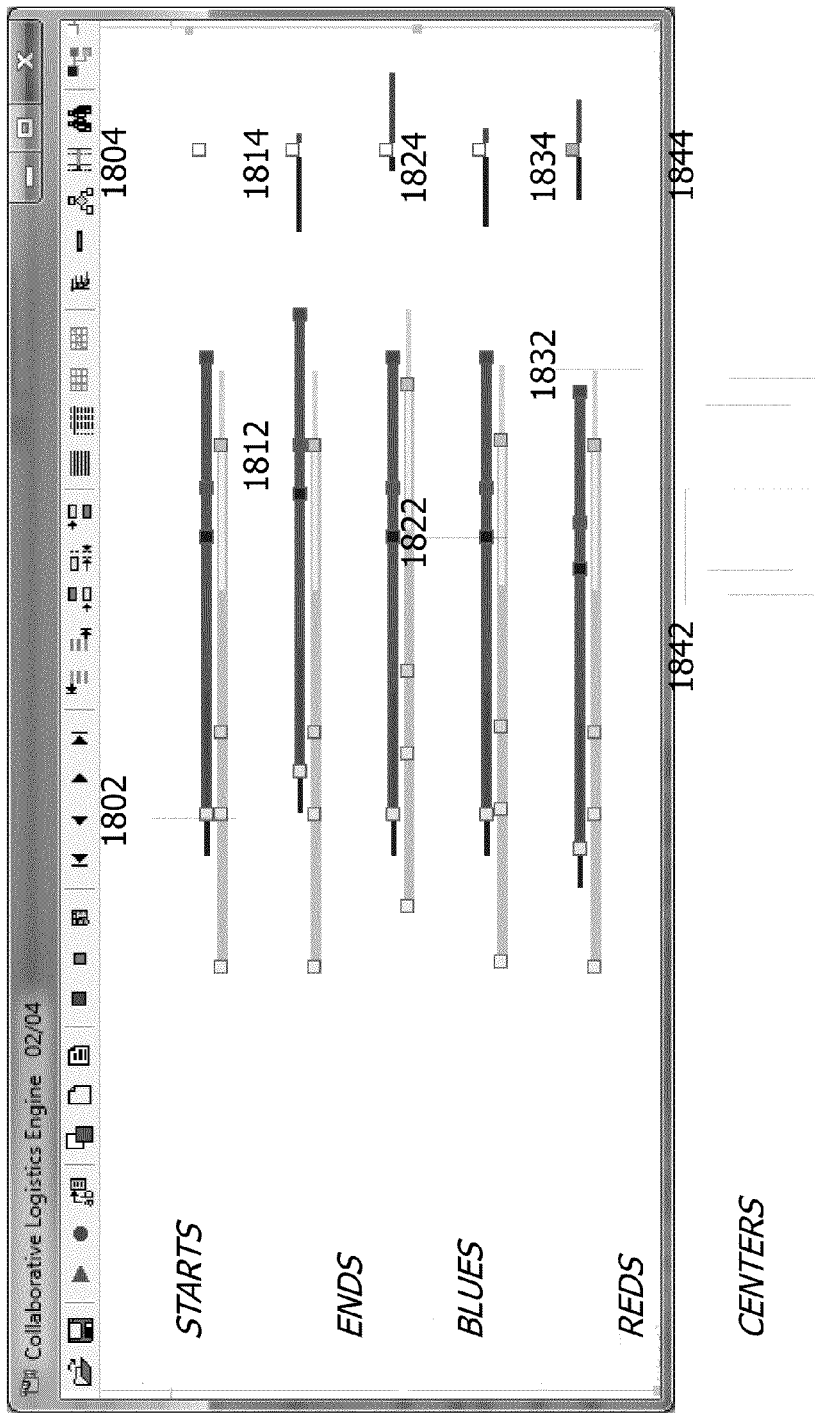

When customer demand exceeds capacity, management may provide customer incentives to arrive at times of slow demand. For example, restaurants advertise a "Blue Plate Special": reduced fare for serving dinner before rush hours. The customer arrival schedule is (desired) to be shifted in conformance with task capacity constraints. FIG. 18 shows the Reverse Alignment counterparts to those in FIG. 17. Note Driver-Follower relationships are reversed: the customer time line is being aligned to the Task timeline now.

Alignment Primitives Library:

These illustrative alignment function primitives (FIG. 17 through 18) form a rich building block vocabulary from which more advanced functions/strategies are constructed. In subsequent sections more advanced functions identify which customers in the queue should be moved ahead or behind others, to maintain Driver-Follower alignment or its reverse, for Demand Shaping.

13. Collaboration Strategies

Collaborative Shifts:

The core of all alignment function is a concept of shifting left (start earlier) or shift right (start later). This is also the core concept behind all forms of friendly collaborations. It's easiest to think of this as give and take. Two friends rearrange their schedules so they can meet for lunch. One wishes to lunch at 10 am, the other at 12 pm. One may agree to arrive earlier (shift left), the other later (shift right), so they meet each other "half way" at 11 am. Both shifted their schedules but in opposite directions. Note this is a sustainable strategy since neither party feels disproportionally inconvenienced.

Mating Blue/Red Bounds:

The red and blue ranges (see 1704, 1804 etc) provide the basis for more sophisticated queue ordering and scheduling of tasks within priority queues. The blue/red bounds (BRB) indicate customer preferences and their flexibility. Some customers may be agreeable to allowing a delay-they have a larger "red" margin of acceptance. Others, with more "blue", accept earlier delivery. This information may be inferred from the customer specific blue-red shifts (see 1704, 1804 etc). Hence mating a "blue" with a "red" is win-win, Customer blue/red acceptance ranges thus provides the basis for collaboration between strangers, who shift in opposite directions to meet each other "half way". This strategy was alluded to under "swapping" in FIG. 12. Note this is a significant departure from the conventional first come first served approach.

Collaborative Avoidance.

FIG. 19 depicts a "stacking" caused by customers arriving one after the other see 1902. 1906 depicts the time line projection for customer arrivals 1902. Note also that store delivers the coffee just a little later in each case, see 1904. In each case the "start times" are aligned, see 1912. However the "end times" differ, see 1914, 1916. The cumulative effect of that small delay (1914 to 1916) stacks up, as shown 1920. Stacking is a measure of the store capacity needed to maintain the current throughput. There are time overlaps, see 1922, where multiple concurrently running machines will be needed.

Figure 20:
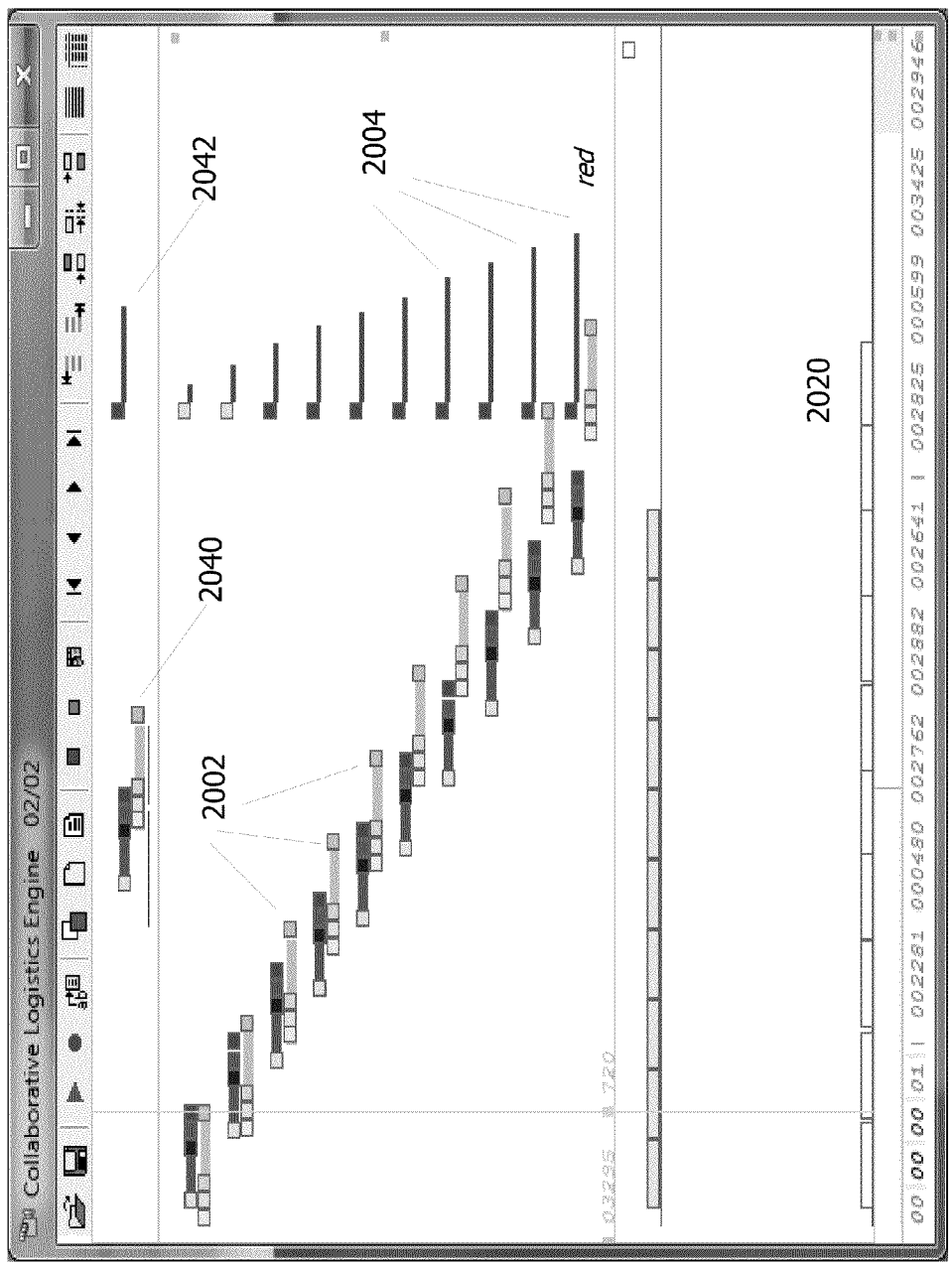

On the flip side of this coin, if the store capacity is limited to one machine then traditional scheduling reverts to first come first served, see FIG. 20. To fit all the tasks 2020 to run on one machine, the wait continues to increase 2004. 2040 depicts the average weight for all 10 customers and it is significant, see 2042.

Figure 21:
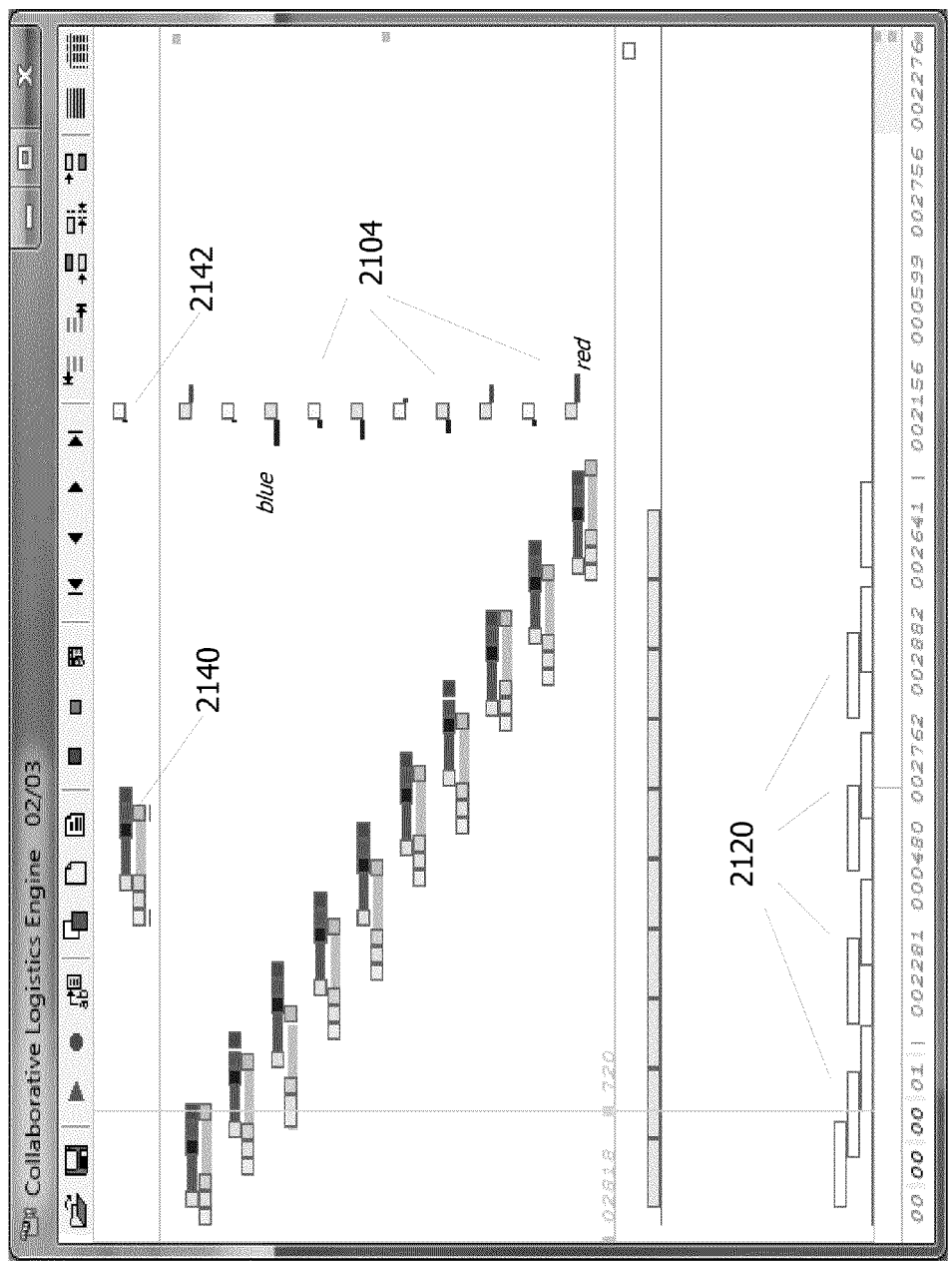

FIG. 21 depicts a happy medium between the two extremes. This is, in essence, collaboration between strangers. Based on the blue-red customer preferences, customers are paired by the system so one shifts left for the other customer shift right. Both sides achieve their objectives but with reduced shifting, because of the collaboration. Compare: Pattern 2120 with Pattern 2020 and the corresponding blue-red shift pattern, 2104 to 2004. Note also that the average customer wait has decreased dramatically, compare 2142 with 2042. The overall wait times of 2104 also compares favorably with that of 2004 (with a higher stack/capacity requirement). In other words, when capacity is under provisioned, collaborative shifting is superior to first come first served (FIG. 20) and compares favorably with other more resource intensive options (FIG. 19).

In the face of under provisioning, conventional scheduling reverts to first come first served, see FIG. 20. To fit all the tasks 2020 to run on one machine, the wait continues to increase 2004. 2040 depicts the "average customer" based on the 10 customers shown. The average customer wait is 2042. Since the average changes slower than its constituents, it is a damped response, useful for inferring trends.

Significance of Stack Levels

Figure 22:
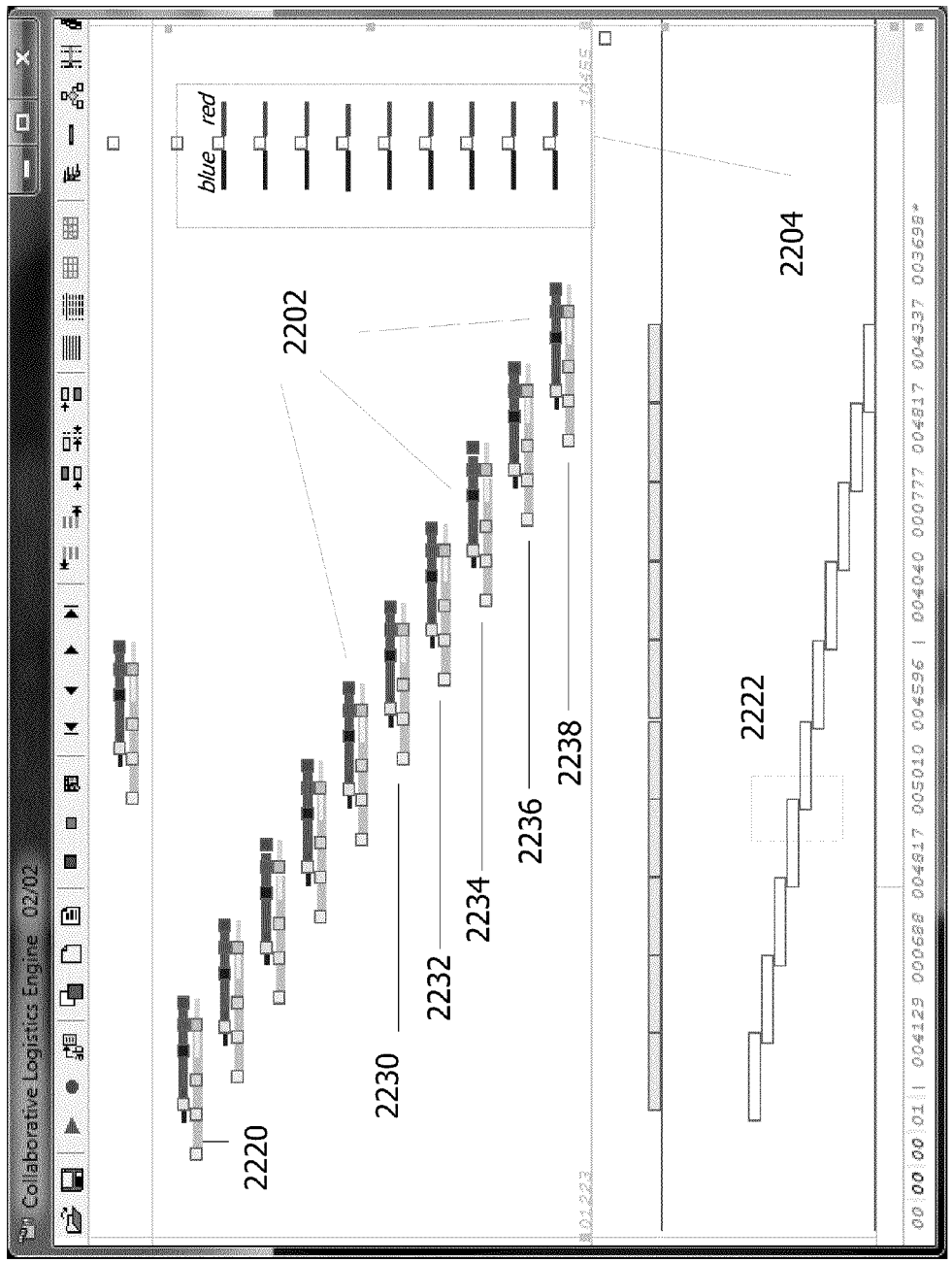
FIGS. 22 through 26 are visual views of a bilateral collaboration process, showing two task moving small amounts in opposite directions to avoid each other and thereby reduce stacking (the build up of resource demand at some times).
Figure 23:
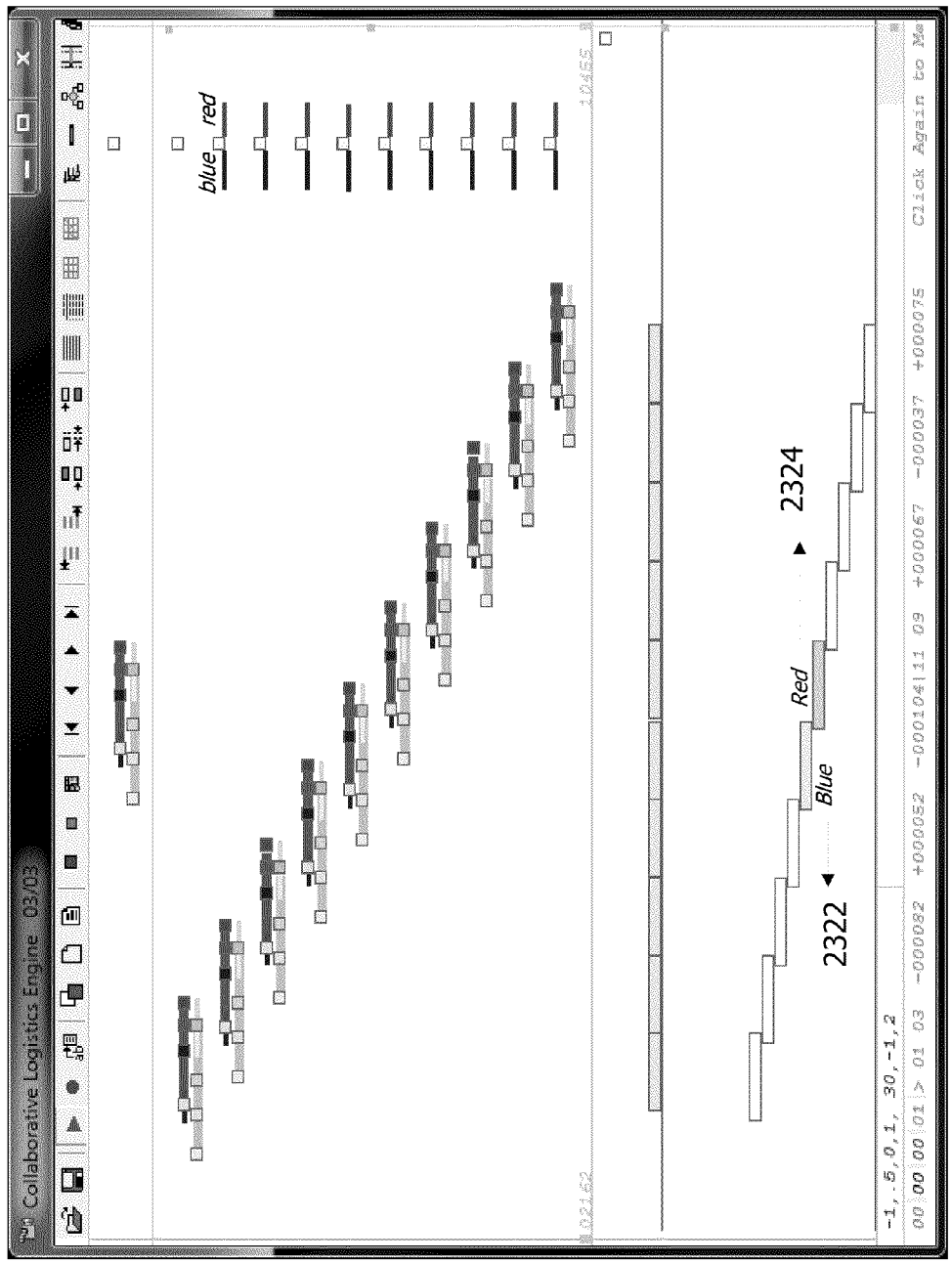

Consider the stack of task objects shown in, FIG. 22. Time is moving from left to right. Tasks at the "head" of the wait queue are in front of those who are positioned to occur later. These are "behind" the wait queue. There are multiple tasks shown with overlaps in time with others. See 2222, for example. These overlaps in time indicate "stacking" or propagating and increasing delays. Some dynamic adjustments are needed. If not, things will simply get worse. FIG. 20 showed what can happen when the capacity/performance continues to be under provisioned. Hence the level of "stacking" is a powerful indicator of the "health" of the system. Healthy in this context implies the ability to rapidly counteract and self correct for temporary bursts/spikes in either supply or demand chains.

In the coffee example, stacks referred to resource overlaps in time (X axis). But the concept is generic. Stacking could also represent rising inventory costs in lead times reduce. As lead times reduce, customer orders are pushed towards each other, competing for limited time windows. Stacking thus provides an indication of the level of discord between the control model and reality. Stacking is an indication of the "lumpiness" of demand/supply response and breaks in its "flow" As such, it provides a corrective signal to reduce the discord, Thus, collaborative strategies around managing "stacks" have multiple applications within the enterprise.

Maintaining Customer Satisfaction:

Based on the blue-red customer preferences, customers are paired by the system so one shifts left for the other customer shift right. Compare: Stack 2120 with Stack 2020 and corresponding blue-red shift values, 2104 with 2004. Note also the decreases "average customer" wait, compare 2142 with 2042. The overall wait times of 2104 also compares favorably with that of 2004 (with a higher stack/capacity requirement). FIG. 21 depicts an alternative to first come first served.

When capacity is under provisioned, collaborative shifting (FIG. 21) generates better customer satisfaction. It also provides a quantifiable metrics on the cost/benefit of customer satisfaction with increasing resource requirements. For example: Screen captures from the simulation software written includes record/playback—further flattening of the stacking 2120, will increase the blue/red 2104. Resource and customer satisfaction inter-relationships become visually apparent.

FIGS. 22-26 show steps of a collaborative process in slow motion. A stack is presented 2202; multiple options exist for collaborative shifts. These options are derived from alignment primitives, FIGS. 17, 18. One option, to reduce the stack through "avoidance", is selected see FIG. 23. One task, 2322 shifts left, the other right, 2324. The colors blue and red indicate their direction of collaboration, see 2422, 2424. Note that the shift is away from each other ("avoid").

Figure 24:
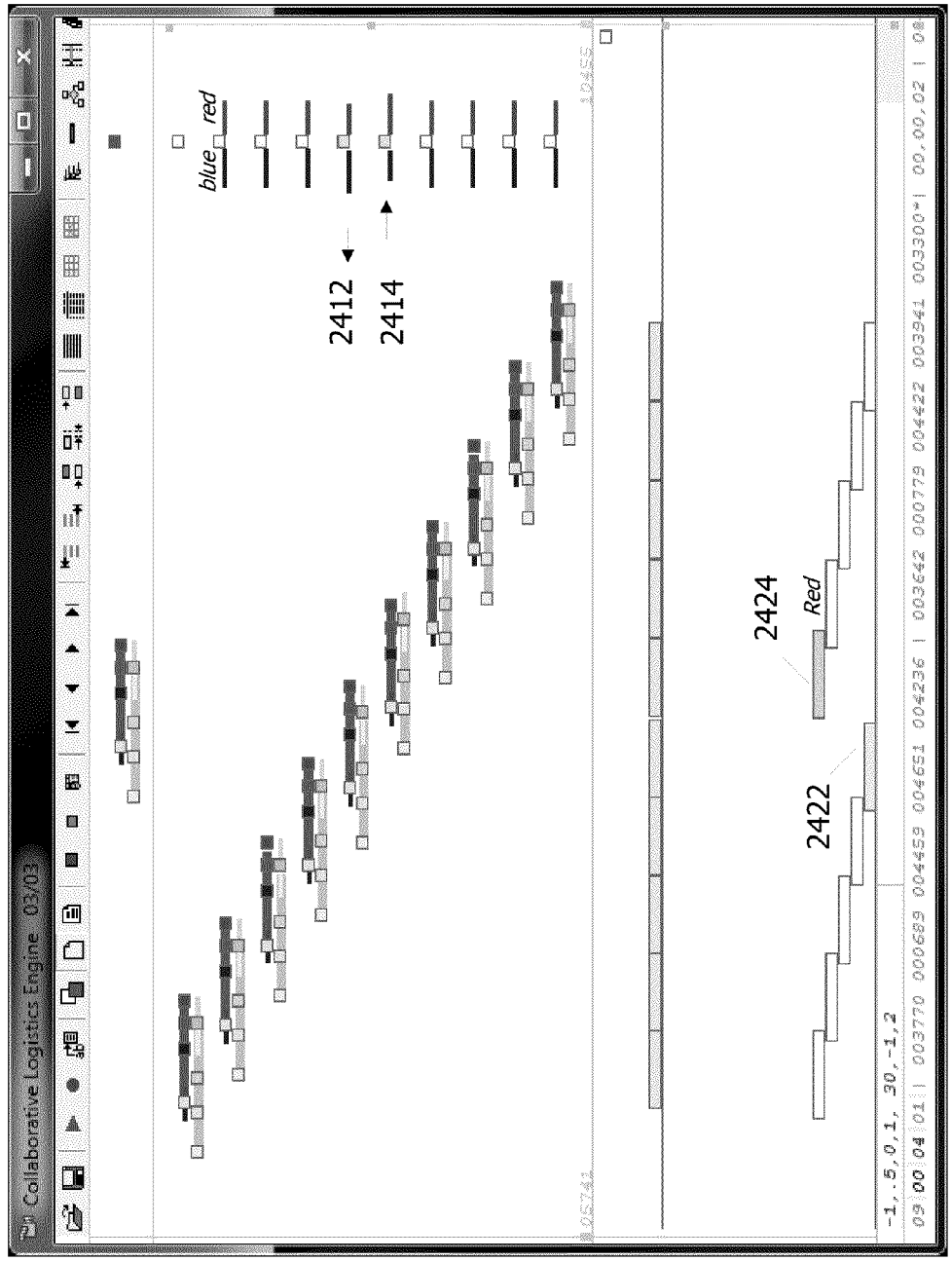
Figure 25:
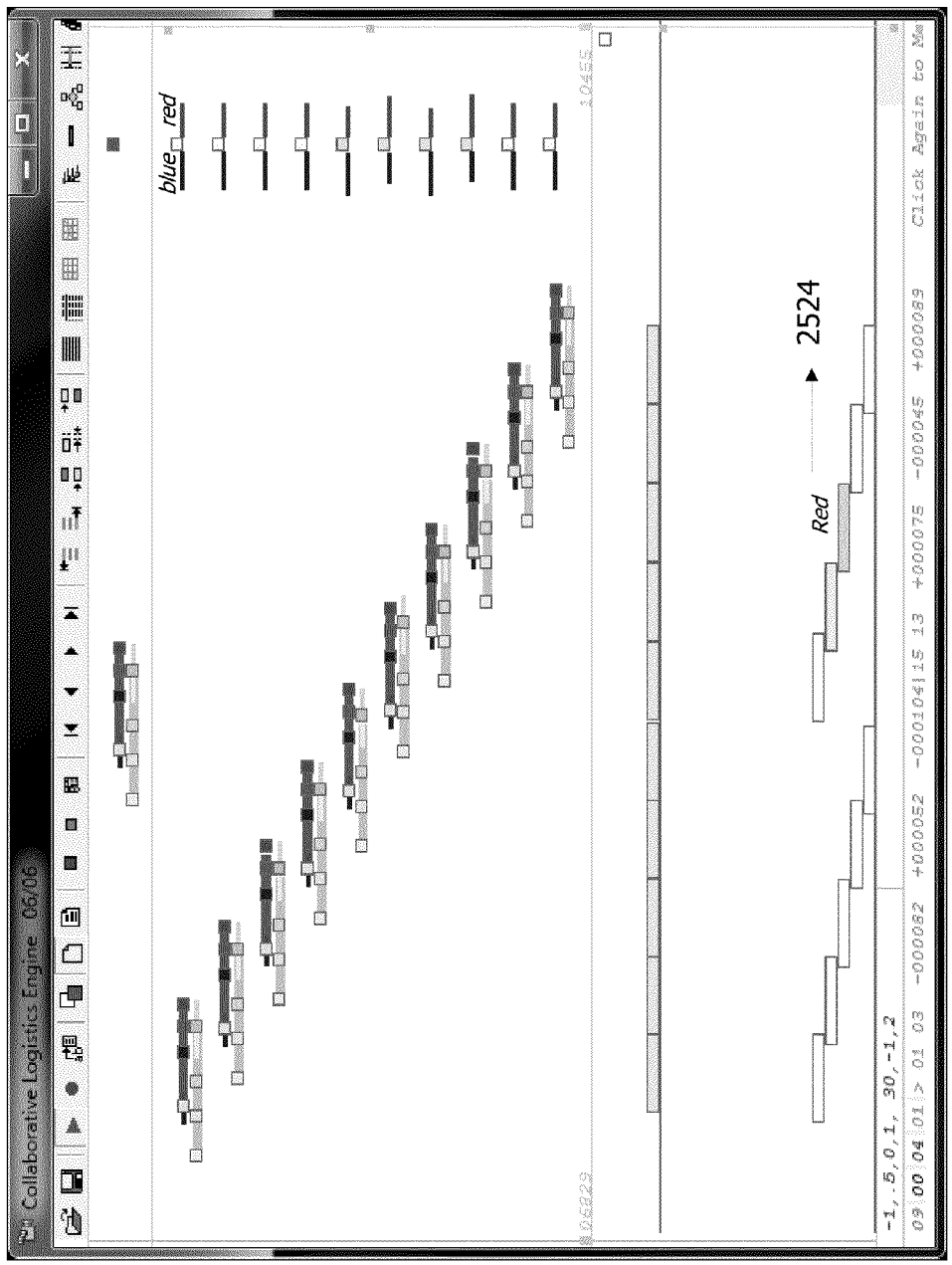
Figure 26:
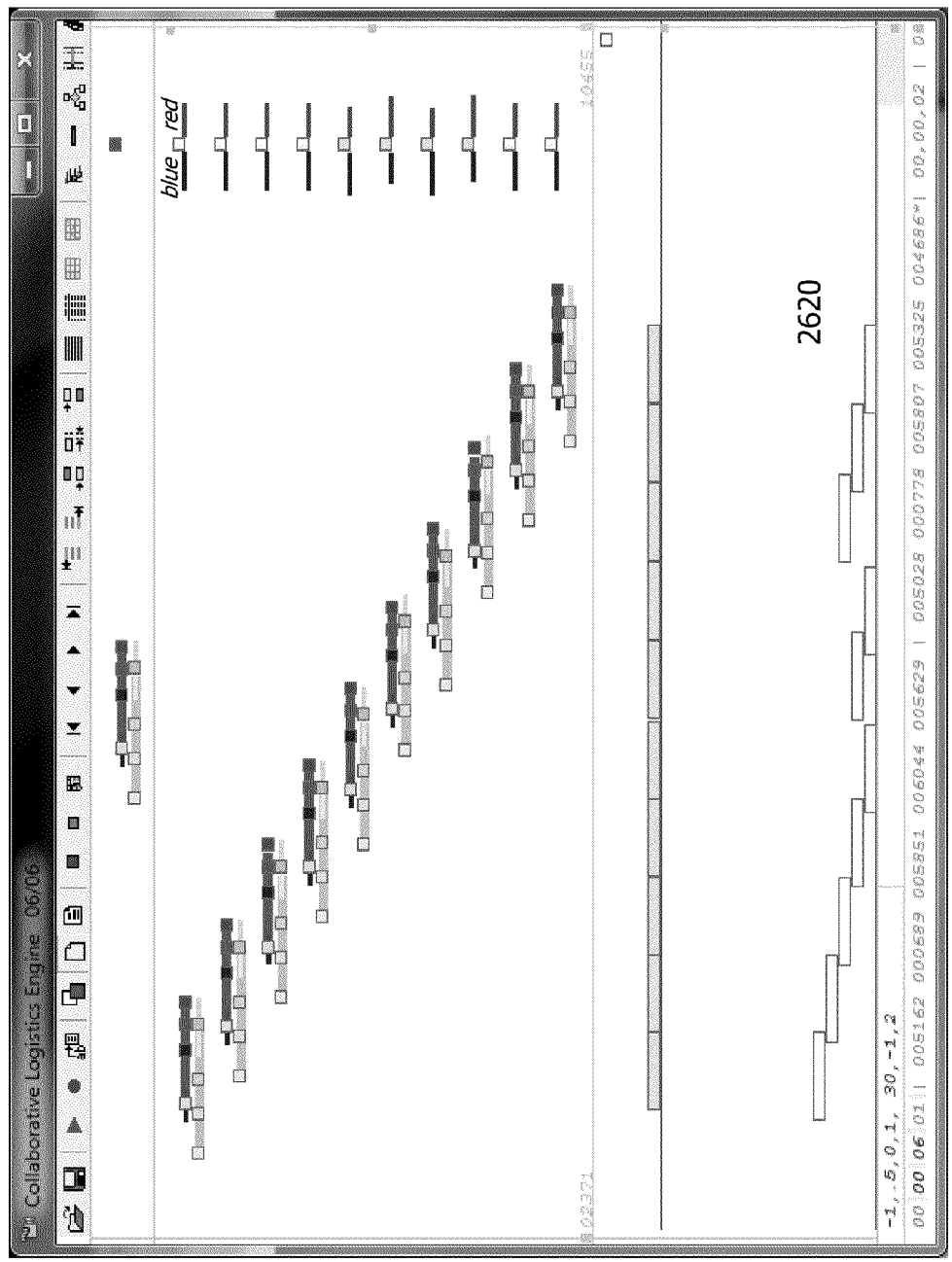
Figure 27:
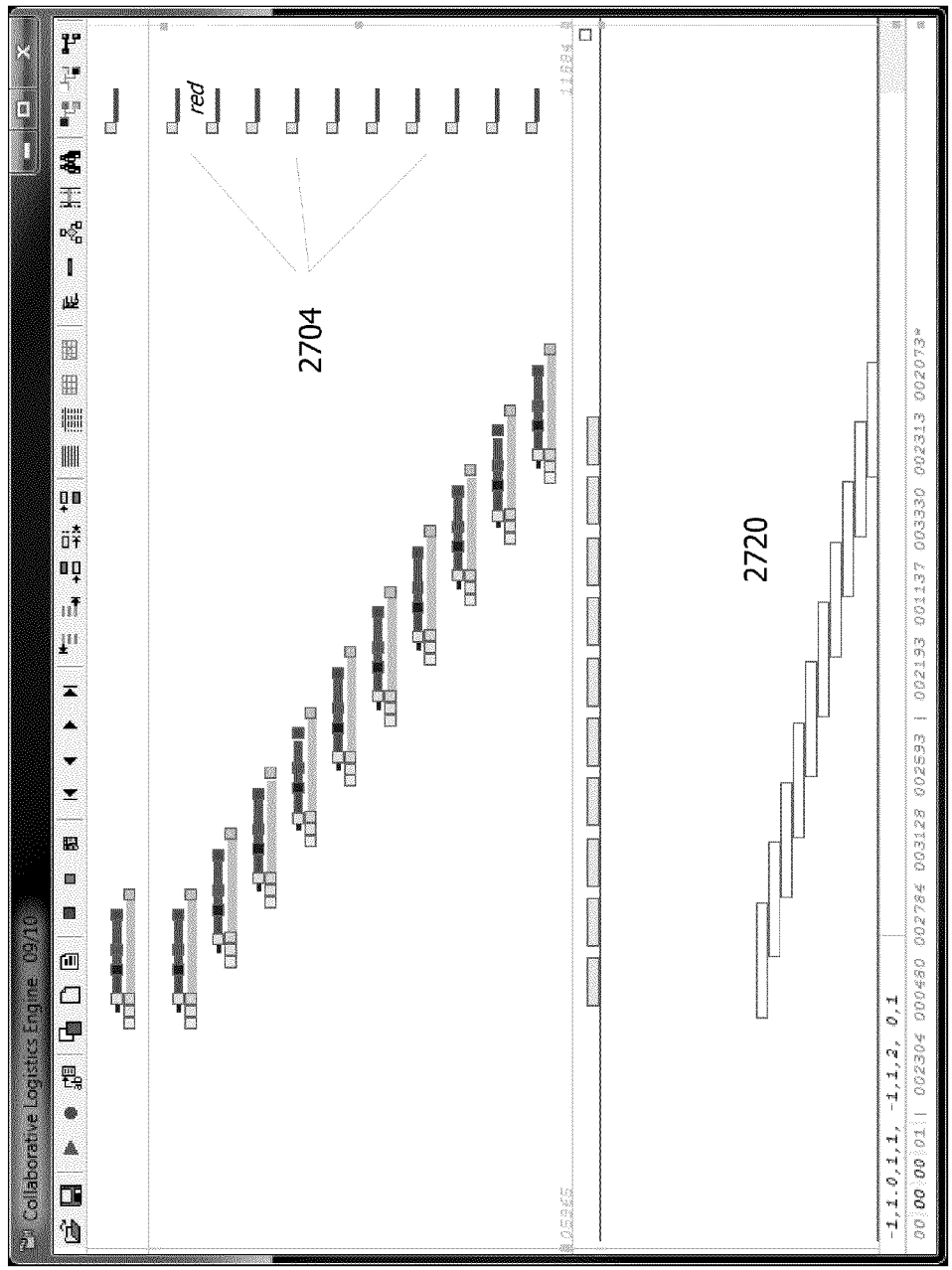
FIGS. 27 through 28 are visual views of a unilateral collaboration process, where the blue red shifts preclude motions in both directions, forcing the system to resorting to unilateral moves in the permitted direction only.
Figure 28:
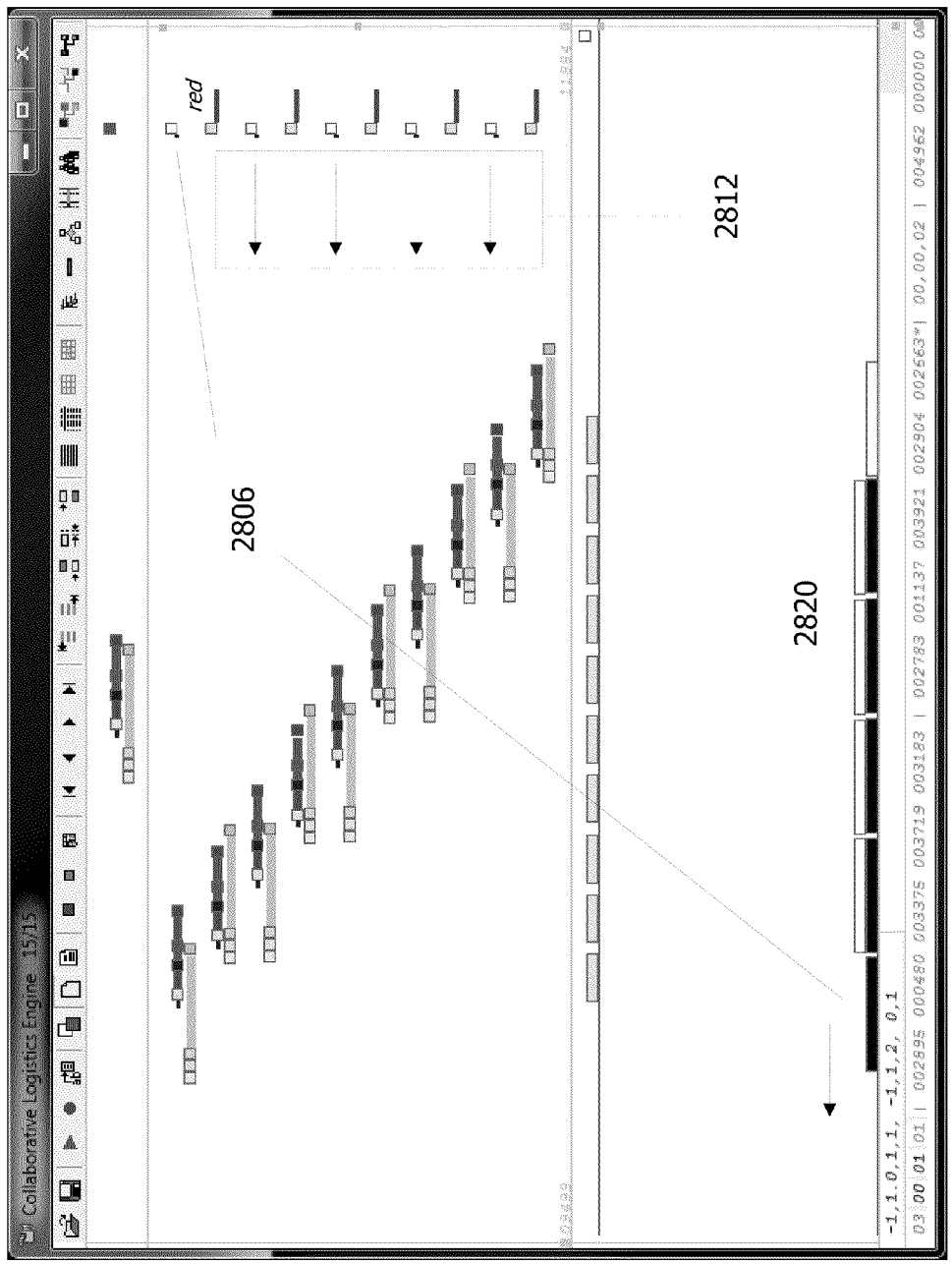
Figure 29:
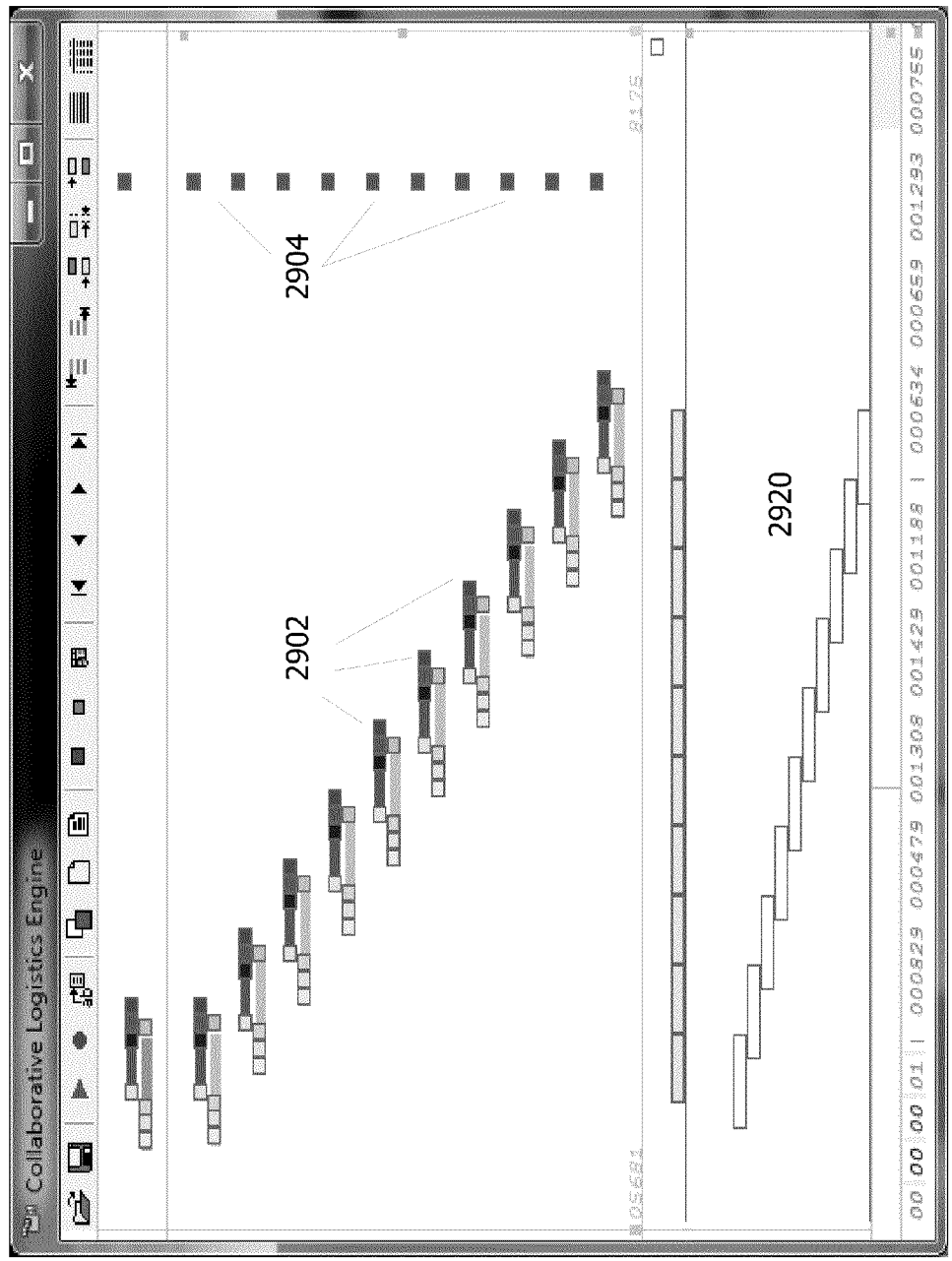
FIGS. 29 through 36 are visual views of the collaboration process extended to support performance comparisons between diverse collaboration functions. It also depicts the ability to scale upwards to support multiple sub tasks for an event, each with their distinct resource pools (e.g. Surgeon, Nurse, Operating room) and their interdependencies (e.g. Surgeon and Nurse to be present in same Operating room with Patient).

FIG. 24 shows the resulting stack pattern. Note also the blue red shifts are in opposite directions, see 2412, 2414. FIGS. 25, 26 repeat the logic, and show another collaborative iteration Unilateral Shifts:

FIGS. 22-26 showed tasks shifting in both directions. Note that acceptance ranges 2204 are large. This provided the freedom to shift in either direction. That is not always the case, In FIG. 27; all customers are in already "red", only blue shifts are deemed acceptable.

There may not be a collaborator to help share the total shift desired to meet an objective. If requested to comply with stack reduction requests, this task object may propose making the entire shift on its own, see FIG. 28, 2806 and task objects represented in 2812, colored black in the stack pattern 2820. Accepting early delivery and/or modifying arrival time to meet store preferences is akin to the restaurant "blue plate special" example described in another section.

Collaborative Clustering

FIGS. 19 though 28 introduced the concept of collaboration between tasks. The objective described was to reduce stacking without unduly increasing customer wait time by a collaborative strategy of "avoidance".

Figure 30:
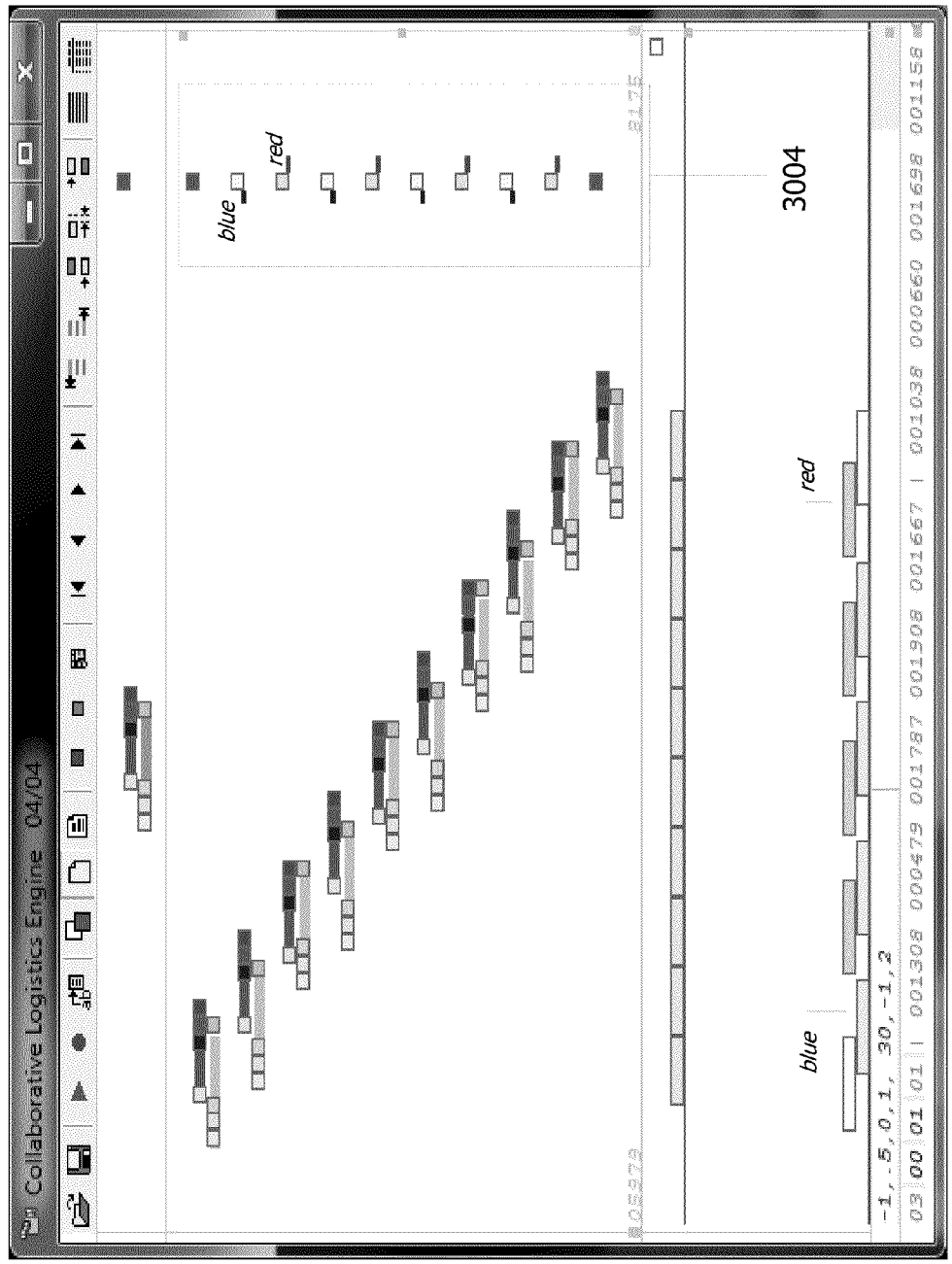
Figure 31:
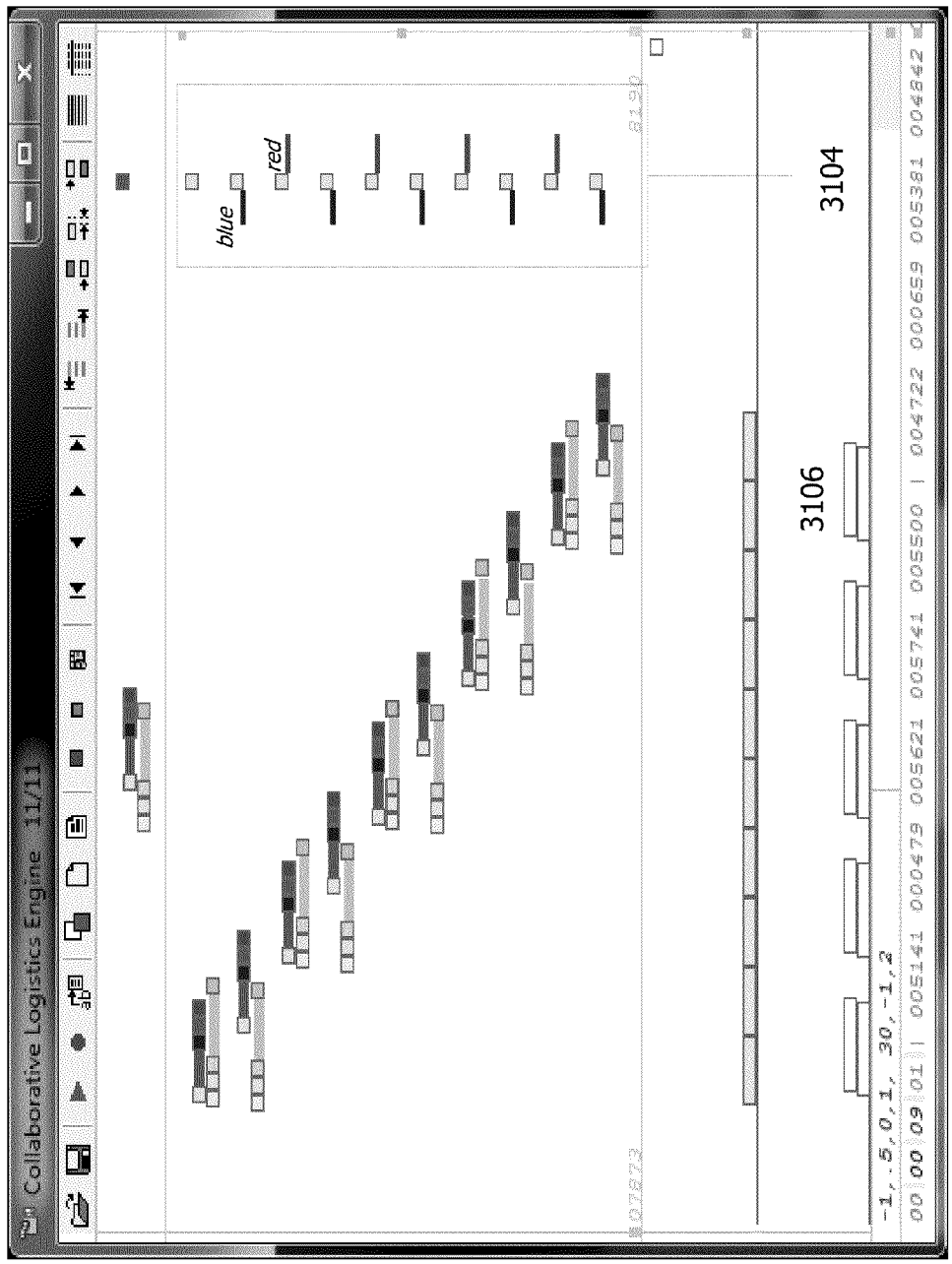

Other objectives may be similarly devised. FIGS. 30 and 31 depict two different schedules. Both start with the same data set FIG. 29. In FIG. 30, the objective is to reduce stack size by 'avoidance': shifts in opposite directions to reduce mutual overlap. The pattern of shifts is small and symmetric, see 3004.

In FIG. 31, the pattern is still symmetric but larger, see 3104; the shifts are larger because the collaborators are "clustering". The function is shifting them to increase (not decrease) their overlap with each so that they form couples see 3106. In effect, the objective is not increase stacking to better avail of plentiful resources in a time window This is referred to as "clustering" Demand Shaping would suggest moving customers so that the demand and supply are better aligned.

If resources are plentiful in the evening then tasks may be encouraged to combine forces with another to help form batches. Both task objects shift in opposite directions but towards each other. The directions are still opposite and hence the symmetry 3104. However, on closer comparison between FIGS. 30 and 31, the tasks are shifting "away" from each other in FIG. 30, and "toward" each other in FIG. 31. Thus, Attractive or Repulsive potential fields, applied to task shifts, cause different stacking and blue-red patterns.

Section Summary:

Collaborative Logistics is presented. This is a departure from Prior Art. The core concept is based on mutually improving Customer Satisfaction by jointly and proactively adapting to changing resource availability. Advanced Alignment Functions, constructed from alignment primitives, are pressed into suggesting and simulating alternative shifting options that engender objectives like Customer Satisfaction, despite limited resources.

14. Supervised Learning

Backtracking and Switching

FIGS. 22-26 show steps of a collaborative process in slow motion. Progressive applications will continue to reduce the stack level. However, as shown, it also may affect system blue or red shifts and consequently Customer Satisfaction.

The system is maintaining a state record and can edit, rewind or retry iterations. Customer Satisfaction (blue/red) or store capacity (stacking) may be evaluated at any stage of a simulation and used to direct the system behavior to meet conflicting objectives "halfway". If the current control model is no longer deemed applicable, the process control model will modify process parameters. Failing that, the system will switch to a more relevant control model In theory, there is an infinite number of collaboration functions that could be constructed from the extensible alignment primitive's library. Further, since the functions can call themselves recursively and also each other, there are multiple solutions, with slight variations. One genre of functions may perform better than another genre. Additionally, within that genre, some variants may be more effective (e.g. converge faster). Learning, through both historical data and simulations, is desirable. It promotes proactive/predictive response.

Recall that the system supports both recursion and hierarchy. Both simulated and actual task objects may collaborate in their explorations/iterations. Some task objects may have been spawned to conduct depth first searches for "better" resource utilization alternatives. Other task objects may be composite abstractions of a group of tasks (e.g. the average, 3520, 3620, 3720).

The system is capable to learning and fine tuning complex collaborative strategies. Examples are presented in FIGS. 32 through 36 and described previously. With learning and accrued historical data ("experience') the "gaps" between the control boxes shown in FIG. 5 begin to diminish.

Task inter-relationships and interdependencies may be expressed as supervisory alignment functions that are "watching" and modifying subordinate collaboration strategies accordingly. Or one task collaboration strategy may include an overall objective such as combined stack value. This was described in FIG. 36. Hence, the framework and alignment primitives form a self sufficient core capability to mediate between multiple task objects and their (potentially conflicting) objectives. The system evolves as collaborative, since all parts of the systems are also designed to be recursively collaborative.

(Autonomous) Learning:

The simulation environment depicted in FIG. 17-40 keeps track of the system state before and after iterations. It can edit, rewind or fast forward like a tape player. It can also spawn child instances to conduct depth first searches and use the results to decide next steps. Additionally genetic algorithms and machine learning techniques may be applied to identify when the patterns start to change adversely and what to do about it. More complex collaborative functions thus emerge, as composites of the comparisons.

Figure 32:
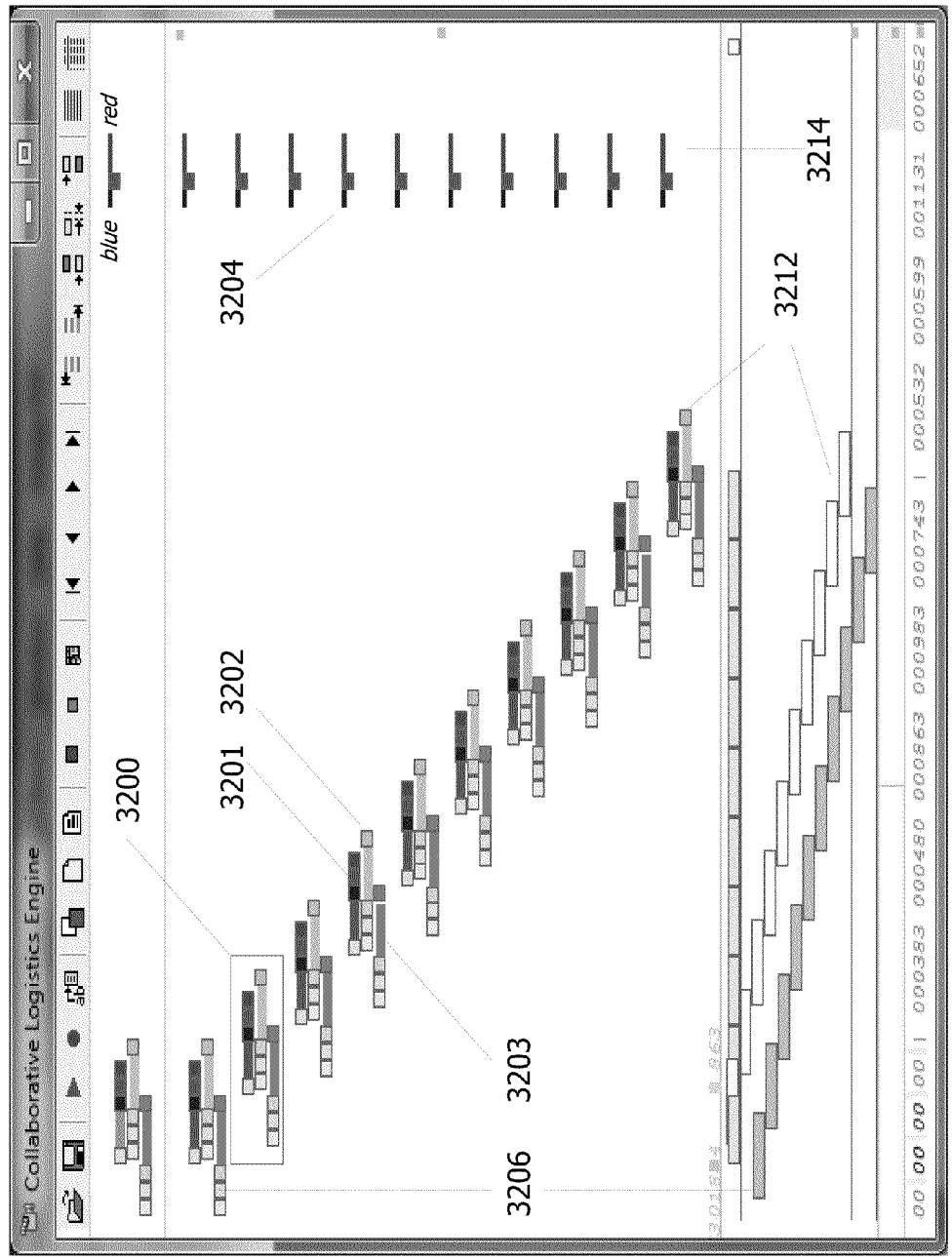
Figure 33:
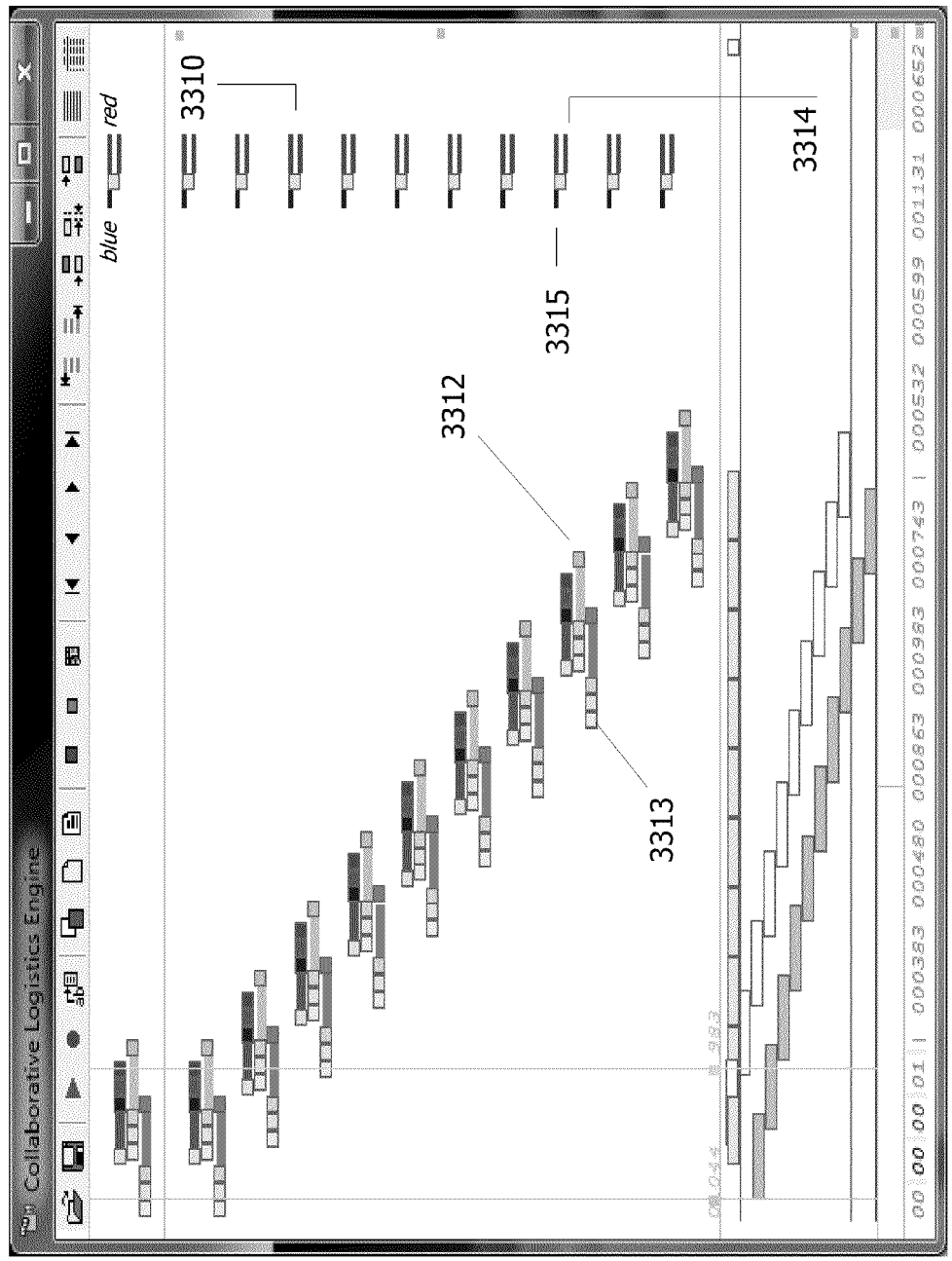
Figure 34:
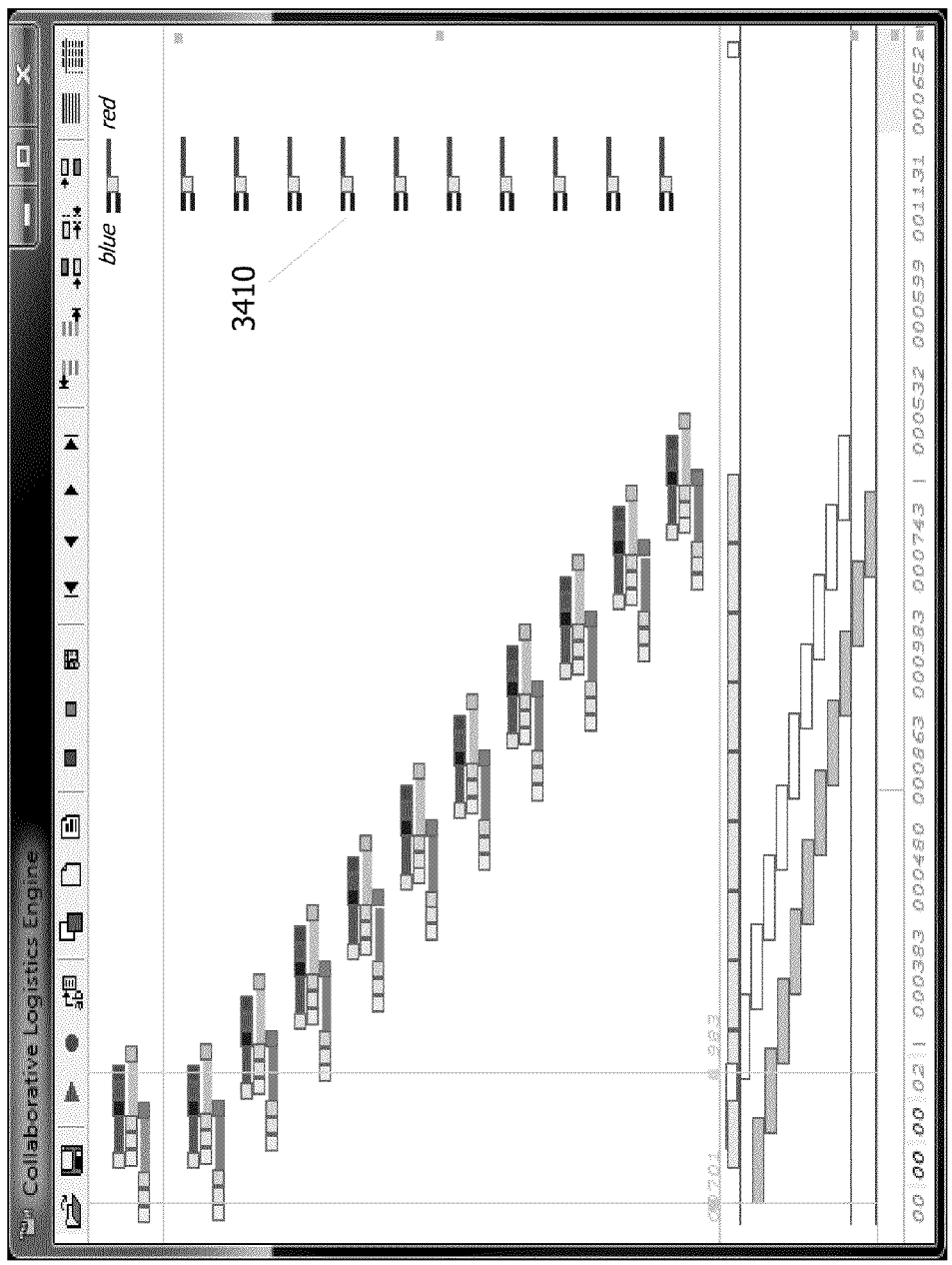
Figure 35:
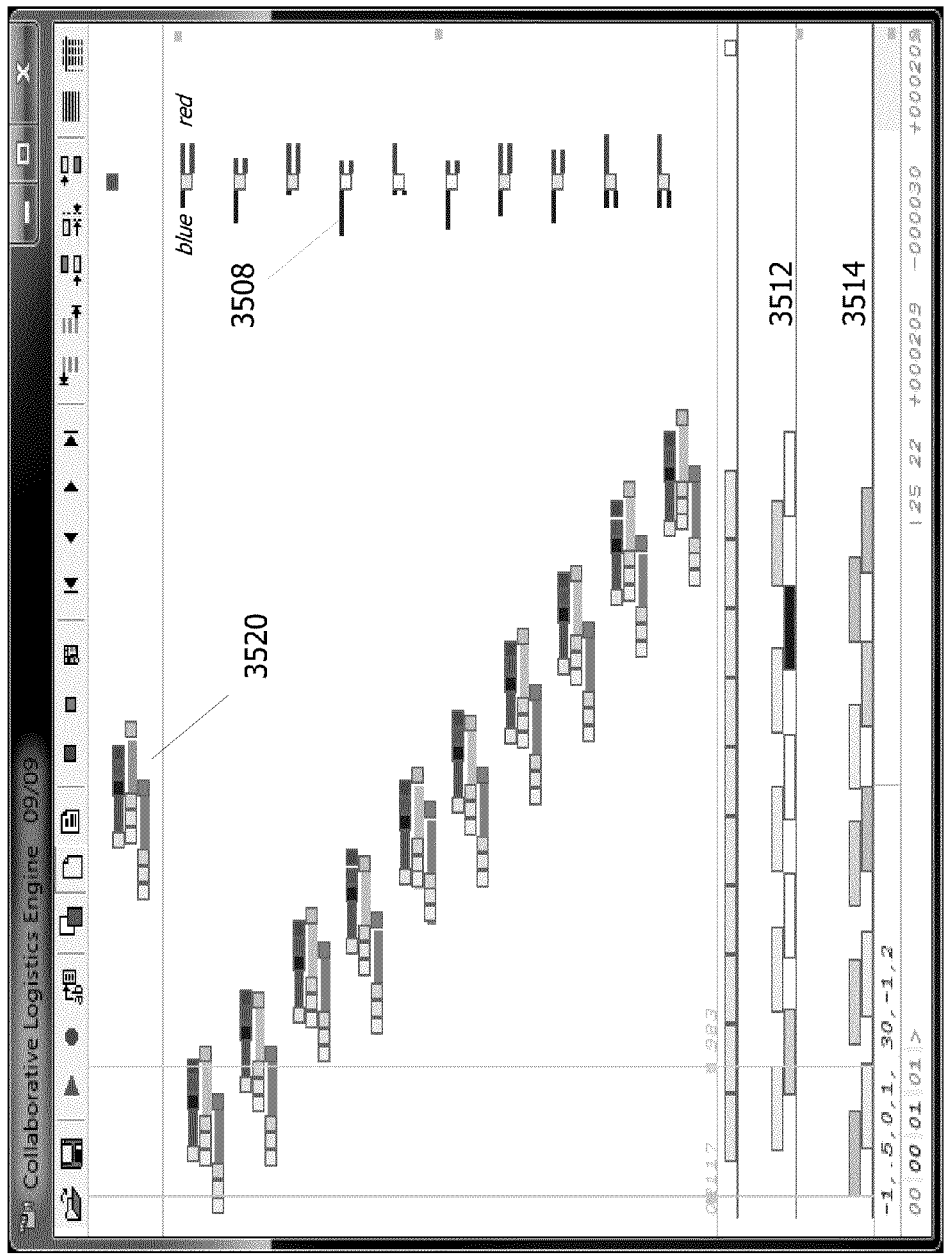

An example will help clarify this feature of generating variants and pruning ineffective variants (as in genetic algorithms), In FIGS. 32-34, two child tasks are shown for each parent arrival event. Assume, temporarily, that both tasks are identical in all respects other than their starting times. One 3206 begins earlier, see blue shift 3204. The other task 3212 starts later, see the red shift 3214. This is also apparent from their respective resource stacks, see 3212, for example.

Note also, that the system is aware of which task is adding to the overall blue or red, see double line correlations 3310 and 3410 respectively. In other words, the system is aware of which tasks contribute to overall red or blue shifts. This is available at both the aggregate level and individual event levels, see 3315 for sub task 3313 (blue) and 3314 for sub task 3312 (red).

A simulation is now run with an "avoidance" collaboration strategy for both tasks at the intra-resource level, similar to the collaboration strategy shown in FIGS. 22 through 26. Since the strategy is the same for both tasks at their intra-resource level, the two collaborations produce similar stacking patterns see FIG. 35, 3512, 3514.

Figure 36:
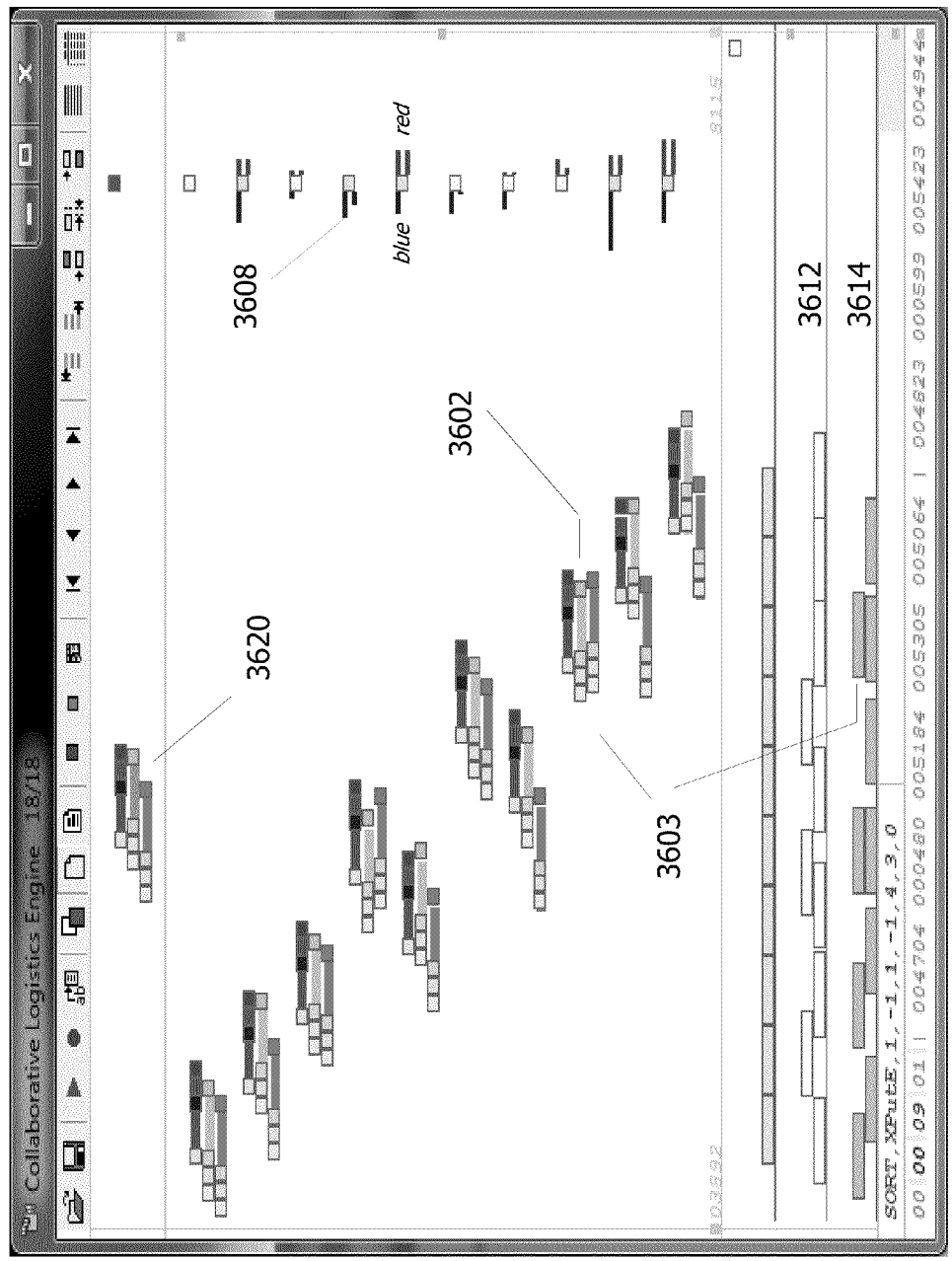

In FIG. 36, the lower task collaboration strategy is modified slightly. Tasks for resource 3614 is "watching" tasks on resource 3612 and modifying its strategy so total resource consumption (of both tasks) is also being monitored, in addition to reducing its own stacking on resource 3614. FIG. 36 indicates the system attempt to "balance" the shifts to reduce stacking but stay within acceptable red/blue shifts (at both aggregate and individual task levels).

To reduce the combined stacking value, avoidance collaboration was selected by the system. Task 3603, for example, is more "stacked" at a place when the upper task 3602 is less "stacked".

Now there are three "stacks" being monitored/managed—two individual task resources and their weighted aggregate. Note that there are still two control systems being run. One has two objectives: to reduce its own stack and also avoid overlapping its time windows with another task. Reduced inter-resource overlaps reduce the combined stack value. The end results of simulating this additional inter-resource collaboration constraint is visually apparent, compare 3508, 3608

One type of strategy may be preferred (based on user/system defined metrics) and is therefore "naturally selected" and the other less desirable strategy is pruned. Note that the generation of the slight variation of strategies and their evolution is a classic form of genetic algorithms. The simulation thus promotes this form of learning. Note also that the simulator is capable of recursively spawning alternate child strategies, so the system is capable of deep searches.

Supervised Learning/Autonomy.

The simulator is a recorder and therefore also a playback machine. It is also recursive, which means it can spawn copies of itself to explore multiple decision trees concurrently. Overseer programs, including instances of the simulator may be tasked to watch changes and decide when human assistance is needed or a new strategy should be taught, since the system is not converging within a set number of iterations. Therefore, the system can be taught specialized strategies and also be directed when to ask for help. This type of supervised, semi-autonomous learning is defined as Supervised Autonomy.

Supervised Autonomy includes both Humans and Expert Systems developed to provide overseer services. They (human and programs) may rewind the state, analyze it, and "tune" collaboration function parameters, define control branching and termination conditions, notify the system when to switch strategies etc. These macro level strategies may be cached (as in machine learning) e.g.

If these conditions occur, run cached function Functions/Stack-Family/Avoid,

Else on these conditions switch to Functions/Stack-Family/Cluster for 3 Cycles . . . .

15. Departures from Prior Art Part 1/2

FIG. 14 underscores salient departures from conventional scheduling/logistics approaches:

Autonomous Alignment

Hitherto, the conceptual vocabulary of predictive alignment, to autonomously and proactively align Customer Satisfaction (e.g. Blue/Red) to task resource constraints/schedules does not exist.

Schedules are based on marking and reserving time slots, generally on a first come first served basis. Typically, all task time lines (within a priority class) get treated more or less equally-their task order is first come first served. Human intervention, in the form of Triage nurses, is the norm-this is not autonomous or scalable.

Contrast that with the efforts of the Alignment Engine, where the shifts are driven by the current blue/red shift for the customer and their margin for acceptable service fulfillment. The system is autonomous, scalable and its performance is not disjointed.

Modeling Fuzzy Data:

Alignment is founded on predictive alignment of the system driver-follower uncertainty distributions (see FIGS. 5 through 7). The dynamic driver reference signal is shown (as an example) as Customer ETA.

Conventional scheduling programs do not model dynamic uncertainty to this fine level of granularity. They place a guard band around the events—as in 10 minutes on each end of a 40 minute doctor visit. They either do not have individual customer preference data in an actionable form or the conceptual vocabulary of alignments is alien to these software programs. Over time, humans and past history may change those guard bands. Then, the modified guard bands remain in effect till they are changed again. The system updates are disjointed. The system is in piece wise reactive mode.

In contrast, the components outlined in FIG. 14 interoperate in a proactive, predictive mode, autonomously and at all times. The supply chain is autonomously and proactively managed through its reference signal data feeds.

Beyond FIFO:

Prior art schedulers operate on some variant of a First In/First Out (FIFO) or first come first served basis. The variants may include sophisticated algorithms to reduce the contention in a time window by devising priority queues. Priority queues provide the needed segmentation into differentiated classes (e.g. First Class, Business Class, and Economy Class).

Customers pay more for that differentiated service/product Hence; rules are supplied to the scheduler, to generally prefer a higher priority class object. For example, the First Class passenger boards and deplanes first. Now, some contention is alleviated because there are at least two smaller waiting lines, as opposed to one large one. So Priority Queues reduce contention.

Inside the priority class (e.g. First Class passengers), things get murky. Within each Priority class, the tie breaker remains some variant of FIFO. If an irate passenger needs preferential treatment human must perform the arduous task of manually reassigning the wait line order. The squeaky wheel may get preferential treatment, to the chagrin of others in the line. This adversely affects overall Customer Satisfaction and is therefore avoided in the long run. We continue to come back to first come first served as the tie breaker.

It has been argued that sophisticated purpose built systems don't suffer from this rudimentary approach. For example, commercial air traffic control systems have multiple layers of sophisticated rules. But if schedules are not adhered to, then planes pile up too, Aircrafts in the same priority queue will wait in line to take "delivery" of the runway.

In contrast, the (predictive) alignment based approach shown in FIG. 14 does not use first-come-first-served. Instead, it more closely resembles human collaboration between friends. For example, when scheduling a meeting between friends win-win attitude is adopted. Everyone bends a little. Those preferring to meet later change their plans to come in earlier and vice versa to accommodate others. Both sides play fair and try to "meet in the middle" to minimize the inconvenience to both themselves and collaborators.

The simulator screen captures FIGS. 19 through 21) show Collaborative Logistics in action. FIG. 19 indicates customer 1902 arriving one after the other in an ordered and non overlapping manner, see 1906, the time projection of 1902. We shall assume that the coffee machine is normally capable of supporting this demand. However, today it is malfunctioning and/or the employee is learning on the job. The coffee delivery is just a little "late" see 1904. The "start times" are aligned, see 1912 but the "end times" differ, see 1914, 1916. There is a small time "overlap" see 1922. The cumulative effect of that small delay (1914 to 1916) "stacks" up, as shown 1920. Each delay adds to the next, see FIG. 22, 2238 upwards to 2230.

That overlap is the extra "wait" created by misalignment between the control model and reality. It is a measure of temporary store capacity needed to maintain the current throughput with the current store capacity/resources. In the coffee example, more coffee machines and/or a more experienced operator are needed. Neither may be available, in short order. Further, resources may not be procurable in fractions (e.g. coffee machines, airport runways) and investment costs may be prohibitive and therefore not a practical option.

In the face of under provisioning, some variant of First In First Out (FIFO) is the default. Its effects are unpleasant, see FIG. 20. To fit all the tasks 2020 to run on one machine, the wait continues to increase 2004. 2040 represents the composite "average" customer (of the ten shown). 2042 depicts the average wait for 10 customers. The average wait relates to average customer satisfaction.

FIFO based approaches break when demand/supply bursts or spikes occur and resources are temporarily under provisioned. The enterprise is aware of this and stocks inventory to smoothen things out. This comes with its provisos. You cannot, for example, build an inventory of custom products or where freshness matters (e.g. soy milk based coffee)

It has been argued that some form of Just in Time (JIT) delivery is a viable option. Kanab addresses Just In Time (JIT) Delivery. The time overlaps (1922) represents obstruction of the work flow, Each delay adds to the next, see FIG. 22, 2238 upwards to 2230. Thus, reducing stacking is akin to sending a pull signal down a Kanab assembly line, with each subsystem repeating the pull signal, till the model and reality are in alignment again. Kanab is demand based and therefore reduces inventory buffers. However, if the inventory resource is under-provisioned, then when inventory runs out production halts during the wait for replenishment. Stacking provides an indication of the level of discord between the control model and reality. As such, it help reallocate resources so throughput in maintained.

Collaborative Logistics

FIG. 21 depicts an alternative to first come first served. Based on the blue-red customer preferences, customers are paired by the system so one shifts left for the other customer shift right. Compare: Pattern 2120 with Pattern 2020 and the corresponding blue-red shift pattern, 2104 to 2004.

The blue and red shift patterns 2004, 2042 and stacking 2020, together define the cost-benefit-analysis between customer satisfaction(Demand) and resource needs (Supply) Further flattening of the stacking 2120, will increase the blue/red 2104. Resource and customer satisfaction inter-relationships become visually apparent. Note that:

The average customer wait has decreased dramatically, compare 2142 with 2042.

The overall wait times of 2104 also compares favorably with that of 2004

The "Customer Satisfaction" is high, despite a low stack/capacity requirement

Customer Satisfaction has not required the additional resources prior art would estimate.

Further, in under provisioned resource situations, collaboration is superior to FIFO (FIG. 20). Additionally, it utilizes under provisioned resources efficiently, so revenue is maximized in addition to higher Customer Satisfaction.

In other words, the benefits are two fold. Customer Loyalty is improved at no additional expense. Ironically, the Customer, through increased loyalty, is paying for the privilege of a better "User Experience". With Collaborative Logistics it is possible to get your cake and eat it, too.

Negotiations drive both Demand and Supply towards a dynamic equilibrium state. Subsequent sections refer to this style of negotiation as Collaborative Logistics.

Collaboration is a strategy to autonomously re arranges schedules to provide agile response to demand/supply fluctuations. It attempts to do so with minimal resource waste. It also, because of its agility, reduces the "buffer" provided by increased inventory. Reducing buffer inventory serves one of the objectives of lean systems in manufacturing. Collaboration is one strategy to do this.

Beyond inventory, collaboration is a viable option when building up inventory cannot resolve "flow" obstructions. For example, coffee has to be made so it is delivered warm and fresh.

Prior Art Schedulers will break down when (generally a few) critical resources become scant, causing delays in throughput. Supervisors (human and software) then attempt to locate those bottle necks from past data. However, despite best efforts, bottlenecks still occur, e.g. one working coffee machine, one available airport runway, one doctor on duty, etc. All prior art schedulers then resort to some variant of first come first served, see FIG. 20. That does not improve Customer Satisfaction and consequently Customer Loyalty and Future Revenue.

As demonstrated in FIG. 18 through 20, Collaborative Logistics continues to provide a more satisfactory alternative, where these less resilient systems break. This is because the concept behind it models (resilient) collaboration between friends and applies it to collaboration between strangers. The strangers temporarily, agree to act like friends . . . . Friends willingly shift their schedules to accommodate each other, because they want to preserve a long term relationship—a personal version of "Customer Satisfaction". Strangers collaborate for more immediate gain but the net effect is the same. In both cases the parties are motivated to meet each other "half way".

Hierarchical Control Extensions:

The simple coffee delivery example was intended to teach the concept of alignment between customer arrival, store delivery and Customer Satisfaction. More complex scenarios involve task hierarchies and call for an extensible, scalable framework to support the dynamics of their interdependencies, proactively and autonomously. In subsequent sections, the control system schematic shown in FIG. 14 will be extended to address task hierarchies and interdependencies between tasks. This is addressed in simulation screen captures FIGS. 32 through 36. It is described presently.

Reverse Scheduling

Conventional schedulers are driven off a reference signal such as completion time, driven by customer time lines. They then attempt to fit the tasks to meet that completion time. The Reverse schedule would involve motivating customers to shift their schedules to accommodate store demand curves, is not implemented within the current framework of conventional scheduling systems. Again, the conceptual vocabulary of alignment does not exist, hence nor does its Reverse.

An example of Reverse Scheduling is a restaurant "Blue Plate Special". Dinner before peak hours is offered at a reduced price, thereby motivating a segment of customers to arrive earlier. The task is now the driving function, desired customer arrival, the follower function. Another example is overbooked airline flights and then motivating someone to take a later flight. In both cases, the customer is being encouraged to modify his schedule. The ramifications of Reverse Scheduling go beyond one customer/task relationship.

Collaborative Logistics can be used at multiple levels as attested by FIGS. 30 through 40 and described presently. It supports complex time line hierarchies. It can also drive the system is both forward and reverse alignments. see FIGS. 30 through 31. Additionally, since this is an internet based application, current capacity constraints can drive exogenous inputs in reverse manner: if the airport runway has a backlog, planes will be autonomously routed to other airports, people who are picking up passengers will be automatically notified via internet or text messages etc. If a restaurant receives Data feeds indicating today there will be a demand burst or spike, it now has multiple options to proactively address this. It can call in for more kitchen staff. Or it can incentivize its customers to stagger their arrivals. Or it can do both. There is thus a multi-pronged approach, satisfying multiple objectives, at each level of the time line hierarchy.

Hybrid Control

The system strives to maintain its objectives (e.g. Customer Satisfaction) under adversity. Adversity indicators are both quantitative data (e.g. Customer GPS location) and qualitative data (e.g. Bayesian Logic/Belief systems, Management Bias). Together they define a hybrid Process control function.

Schedulers typically use one type of data or the other. Incorporating both in one system comes with its challenges. The simulation screen captures, FIGS. 19 through 38, (visually) teach some implemented solutions and are discussed presently.

Section Summary:

This is an overview section. Subsequent sections underscore differences with prior state of art scheduling and Alignment Based approaches. Differences include: modeling uncertainty of arrival, store performance, customer preferences and devising means to provide Customer Satisfaction-even when resources are under severely provisioned. Other differences include Autonomous Reverse Scheduling, support for hierarchical control systems and recording/playback for human and machine based "tuning". Collaborative Logistics is introduced presently and it's departures from prior art is described subsequently.

16. Collaboration Platform

The predictive logistic system being described is intended to be autonomous, extensible and scalable. This section describes the core framework needed to support the interaction between multiple task objects operating within a distributed and hierarchal control system paradigm. Distributed and hierarchical control systems support scalability.

Figure 37:
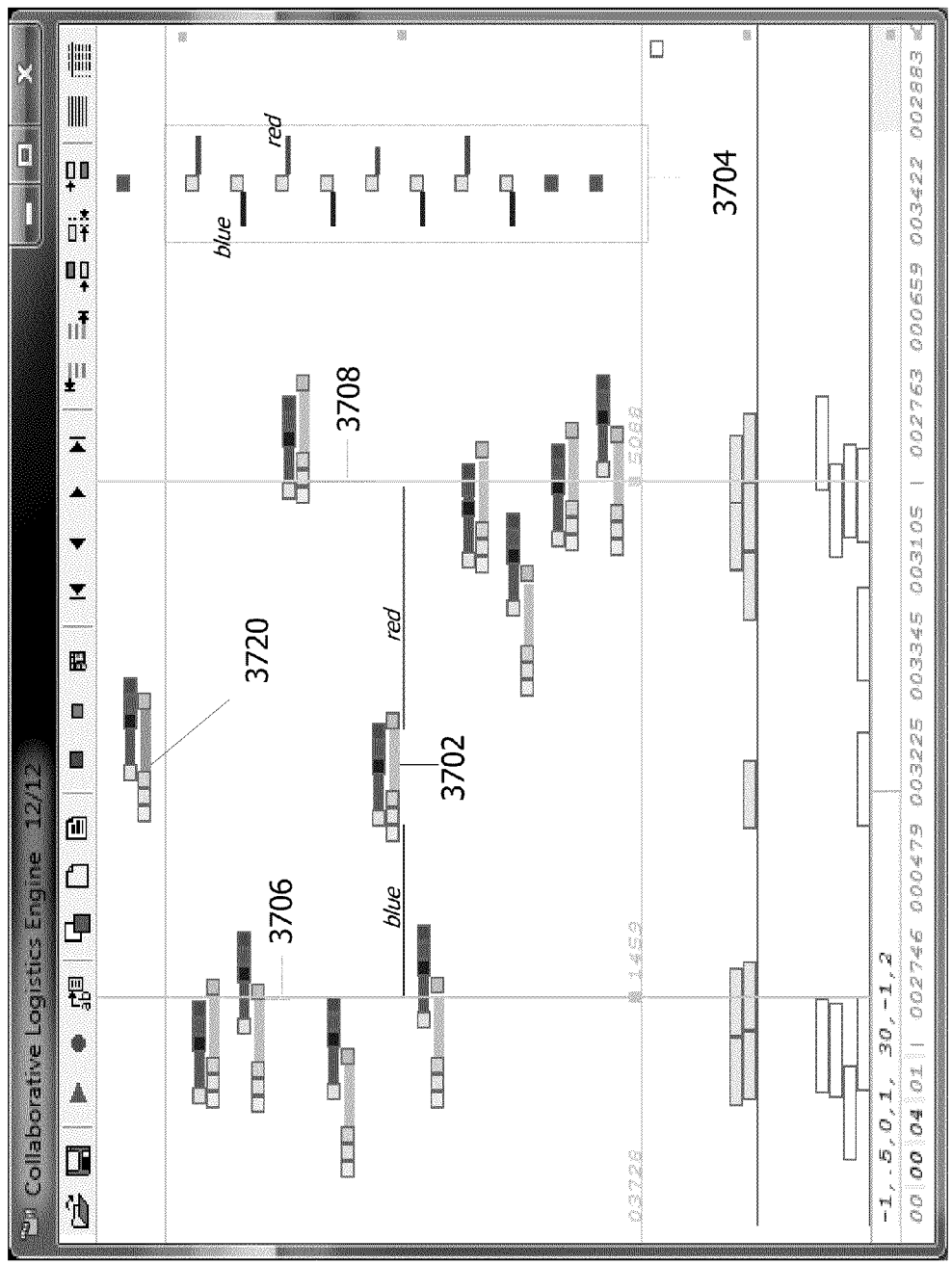
FIGS. 37 through 38 introduce the concept of upper and lower freedoms. Upper and lower freedoms define the permitted and safe range of motion for tasks collaborating with other tasks with their specific freedoms. It ensures that collaborative motions do not cause undue interference with other task plans. The Freedom Grid is also used to rapidly prune the set of eligible task objects for collaborative negotiations.

Freedom Grids:

FIG. 37 introduces the concept of Upper Freedoms. Consider Task object 3702 which is running an avoidance form of collaboration. It needs to know the amount of shift left (start earlier) permissible without overlapping with other task "above" it (based on some priority function). Cursor line 3706 marks the maximum shift left currently permissible before interfere with a "higher" task (see. Similarly 3708 marks the maximum red shift (start later). Together, they define the Upper Freedoms of permissible motion.

Figure 38:
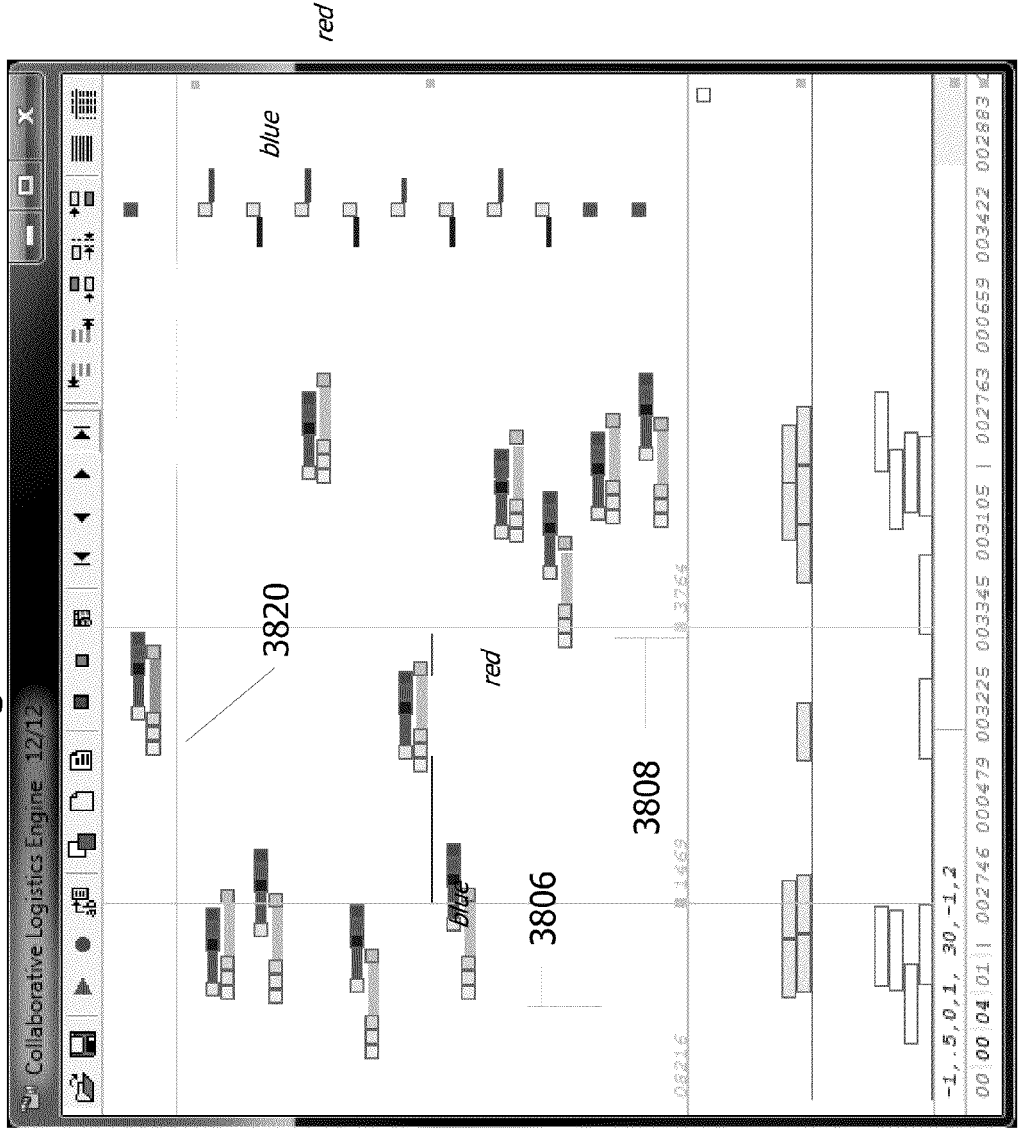

Now, based on customer preferences and their red-blue shift 3704, collaborative functions can decide which direction and how much the task should move to meet Customer Satisfaction objectives. By the same token, FIG. 38 shows the Lower Freedoms (for task below it), see 3806, 3808.

Note that these are task operating on the same resource—the avoidance is intra resource. Similar freedom maps exist across resource boundaries. Recall FIGS. 35 through 36, where diverse collaboration functions were active. In other words, tasks can avoid/cluster with tasks on other resources (e.g. doctors and nurses "clustering" for a surgery), at the inter-resource level.

Supporting both intra and inter resource collaborations calls for a domain independent and extensible framework that can support collaborative shifting at this more abstracted level, across disparate resources.

Domain Independence

The alignment functions form the backbone of this domain abstracted framework. Recall, from FIGS. 17 through 18 that alignment primitives are inherently domain independent: All "events" in the system are reduced to four distinct variables in the time window of interest:

Start time,
End time,
Red Shift Range,
Blue Shift Range.

It is thus possible to collaborate across disparate resources with this "non-dimensional" framework in place. For example, interference or overlap is readily computed based on whether task start times fall within the active region of another task. It is also now possible to quickly ascertain how much shift a task can safely perform before it violates an "avoid" relationship.

In general a freedom grid of four variables, (e.g. upper, lower, left, and right) defines the permissible range of motion without violating an "avoid" objective/constraint. This range grid exists for each task at both intra and inters resource levels. The Collaboration functions and their parameters define which of those range restrictions are observed. Thus for each task, there are a total of 4 freedom values (upper left, lower left, upper right, lower right). The total freedom grid for 10 independent but inter related resources is therefore a manageable 40 variables for each task.

Dynamic Watch Lists

The Scheduler is intended to be an online application. It receives reference signal updates (e.g. GPS locations, ETA) and also Store performance data (see FIG. 14, Dynamic Dashboard. When event timelines changes or task are rescheduled, the freedom grids for a task are affected—if event timelines impinge on the "safe" region define by the upper/lower/left/right bounds of the freedom grid. Conversely, the task object is indifferent to changes that do affect regions of interest defined by the freedom grid. The grid is therefore also a filter, pruning non salient event updates. It limits irrelevant information overload.

A prototype publish/subscribe model implementation includes defining task notifications requests in the abstracted and non dimensional higher level language of alignments, e.g.

"Watch for tasks that impinge on my Upper Left bound". The grid then provides the tasks with a "dynamic watch list" for those salient task activities.

Figure 39:
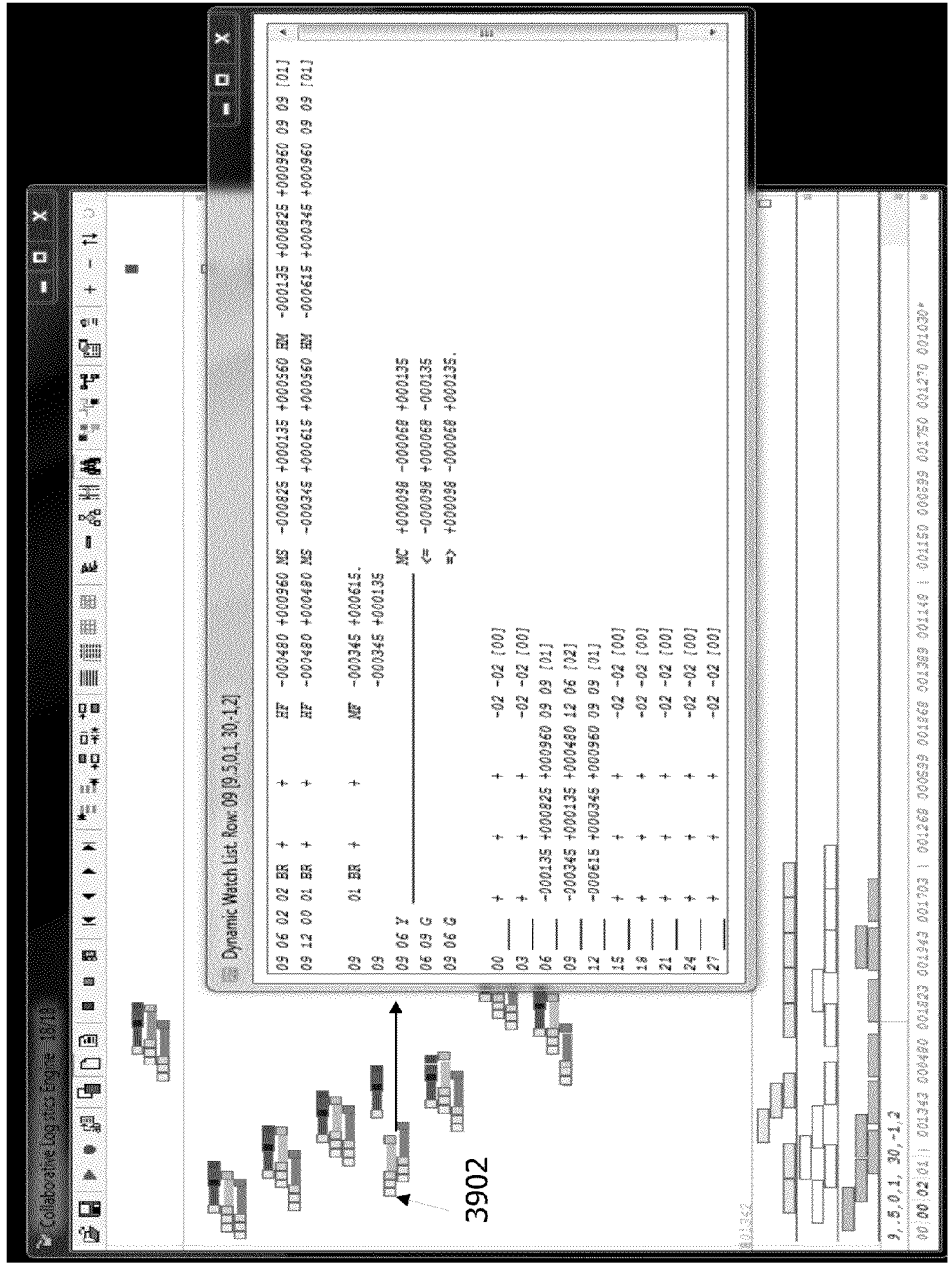
Figure 40:
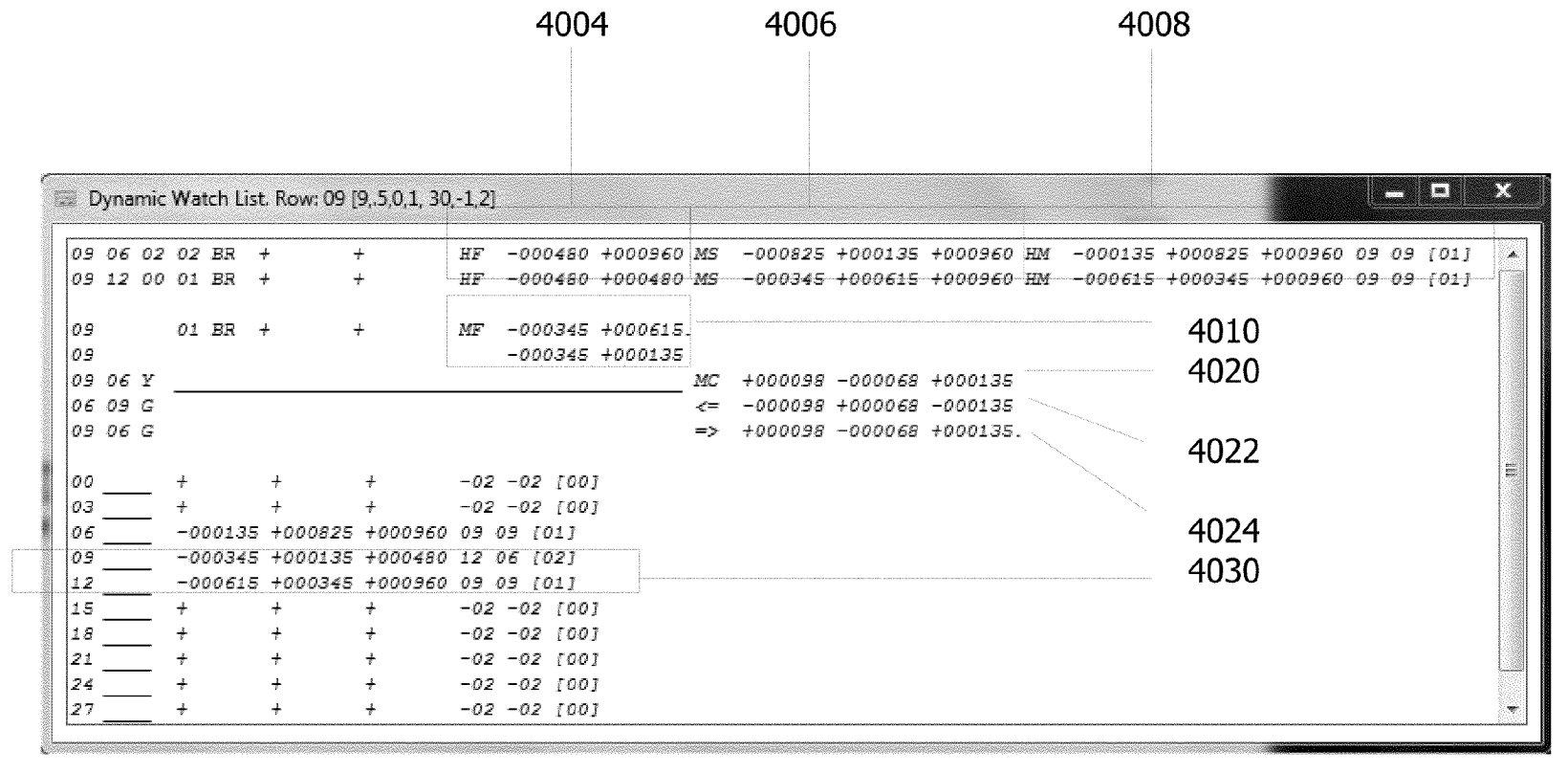

FIG. 39 is the Dynamic Watch List provided by the grid, for task 3902. Details of the Dynamic Watch List are shown in FIG. 40. His Freedom [HF] 4004 indicates the freedom ranges for the current control setting of upper/lower/both/neither. My Freedom [MF] 4010 is the freedom ranges for the task.

Setting up Negotiation Parameters:

Based on His Freedom [HF] and My Freedom [MF], tasks can determine, independently, the acceptable shift range for a potential collaborator and itself. Alignment based collaboration functions are thus possible across resource boundaries.

My Minimum Shift [MS] 4006 and His Minimum (Shift) [HM] 4008 respectively are proposed. The Minimum Shift is the starting point for "My" to collaborate with "His". "My" is requesting "His" to shift by at least HM. "My" will then take up the rest of the slack,—by shifting either towards or away—meeting "His" half way (or better). A negotiation is then initiated between "My" and "His". The negotiation between the task and its collaborator is who should shift by how much and in which direction takes less iterations when it is mutually beneficial to both. Negotiations terminate when the two task objects agree to collaborate or decline the "best" offer.

Note that each task object has options regarding who to collaborate with. And each collaborating task has similar choices available to it. "His" may decline the collaboration because his shift proposed is not desirable and/or "His" has "better" offers-less shift, preferred direction etc.

Conversely, when negotiations succeed, both task objects are motivated. Customer Satisfaction is then enhanced and without expending additional resources (e.g. stacking) This is win-win for collaborators. It is also a win-win for the resource/service provider (e.g. store), In FIG. 40, My Committed 4020 [MC] indicates that an agreement to collaborate between two task objects has been reached. The directions of shift are shown as "<=", "=>", 4022, 4024. There are multiple steps to any negotiations and each party has to reconsider its options in the light of new data. Adaptive Sampling requests may be brought to bear to support those requests The framework supports those requests by percolating the requests up or down the control system hierarchy. Additionally, "Watch List" updates are monitored before each negotiation. The information being used to drive the negotiations is current. Finally, the request percolates up the task hierarchy, where its request is reviewed with other contending task requests by task parents and, if selected, onwards, for final system approval.

Arbitration Between Requests:

Recall that tasks may have sub tasks, each using different resources and contending with sibling tasks (from other events) for those same resources. For example, FIGS. 32 through 36 show two separate stacks. A task may receive multiple collaboration requests. Some are potentially more attractive than others.

For example in FIGS. 32 through 36, one sub task is "blue" or early—it has more leeway starting later, than the other "red" or late. Task 3312, FIG. 33 is "red" or later, see 3314. Approval is more likely for Task 3312 to move left (early), if it finds a collaborator, contending for the same resource, willing to move right (later).

Unilateral Shifts:

FIGS. 22-26 showed tasks shifting in both directions. Note that acceptance ranges 2204 are large. This provided the freedom to shift in either direction. That is not always the case, In FIG. 27; all customers are in already "red", only blue shifts are deemed acceptable.

There may not be a collaborator to help share the total shift desired to meet an objective. If requested to comply with stack reduction requests, this task object may propose making the entire shift on its own, see FIG. 28, 2806 and task objects represented in 2812, colored black in the stack pattern 2820. Accepting early delivery and/or modifying arrival time to meet store preferences is akin to the restaurant "blue plate special" example described in another section.

Switching Strategies.

Reference signals (e.g. ETA updates) are being continuously received potentially over the internet or private local area network (LAN). When event timelines change and tasks are rescheduled, collaboration objectives may also change from avoidance to clustering. And so do the control strategies used. FIGS. 20 through 21, 30 through 36 depict some diverse strategies, from the family of "stacking" strategies.

Control parameters and Transfer Functions (see FIG. 3) will consequently change with each strategy. Fortunately, the control model template defined in FIG. 3. is sufficiently generic. For the most past, changes in strategies may be efficiently implemented by swapping out one set of Transfer Functions for another. Each set of Transfer Functions provide predictive behavior within a control box or region, 504, 509, and 511. A small set of control strategies can address a wide variety of applications.

In the event the generic model needs domain specific extensions, these would be added inside the control functions. Thus, the ability to recursively modeled as generic control systems, is preserved. The framework can thus support an arbitrarily large depth of collaborating control systems.

Monitoring Frequency

Control systems layers operate at polling frequencies germane to that task layer. Some tasks are "bursty": short durations but require resources quickly. A high polling frequency is needed to close control loops effectively. Other tasks are "sluggish" and a lower frequency of polling suffices. Still other tasks are "trickles": they need the same resource over a long period of time. Each of these different task characteristics (and their resource contenders) needs different polling frequencies and polling patterns.

A simplification would be to allocate task characteristics based in "experience". This is what an (experienced) Triage nurse does. This may be a valid starting point. However a static, pre-assigned polling frequency approach fails when assumptions made about task behavior are no longer valid. Some checks need to be in place to test and dynamically adjust polling frequencies at each task resource level. FIG. 11 and section 11 described using Adaptive Rate Control and how the sampling frequency adjusts to the rate of change of the ETA, in the Demand Prediction Engine (See FIG. 14, 1410). A similar approach is adopted for the hierarchical control model. Transfer functions being gleaned at each resource level, are thus dynamically being adjusted, keeping in step with current task behavior (e.g. Bursty/Sluggish). Note that, with PID control systems parameters in place, system self correcting behavior is proactive and predictive.

System Governance.

Note that the system is designed to be decentralized control, since centralized control is not scalable beyond small task hierarchies or a small set of events. With decentralized control, some overall (top level) form of governance may be needed and is therefore supported by the framework/platform. One way to democratize the process of selection and to prune persistent and/or greedy task objects is to check for "looping"—repeated requests from a small group of persistent collaborators.

Looping is an example of such behavior. Proven techniques to ensure fair allocations of resources include round robin forms for ensuring every voice is heard. However, there is always the danger of over throttling the system. Hence a counter balancing measure is introduced. The system pays more attention to changes in the blue/red shifts at both individual and aggregate levels of granularity. Tasks objects that are affecting Customer Satisfaction are identified (see FIG. 32 through 36). Their polling frequencies for those tasks is adaptively increased, while others may be polled less frequently The system thus attempts to stay in touch with the current situation pattern and self correct accordingly. This is described under System Level Indictors, described next.

Thrashing is another, where Tasks shift back and forth as a group, periodically. These oscillations are damped by Proactive Self correction.

Proactive Self Correction

Figure 41:
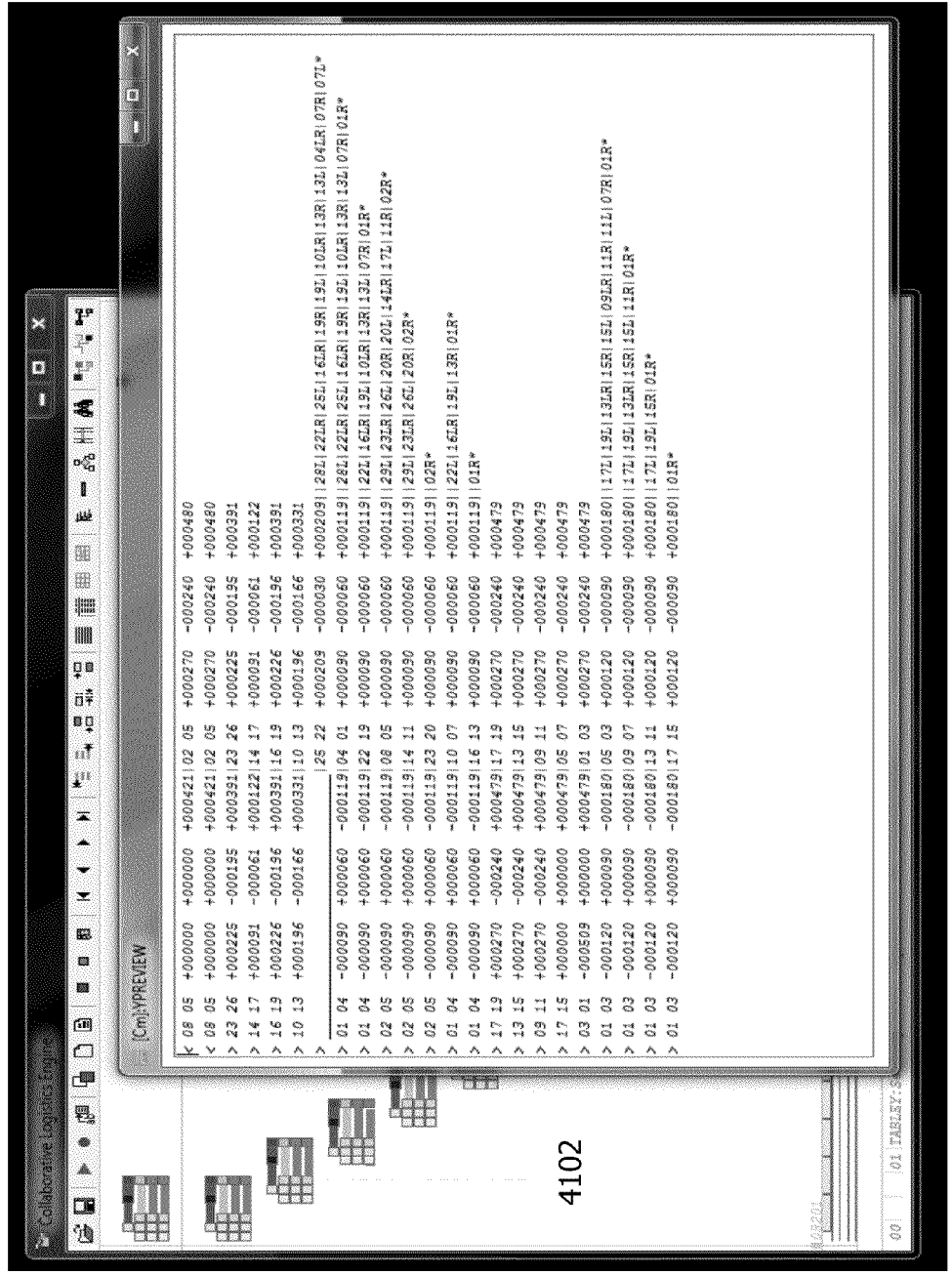

The system is capable of running as an exploration/simulation mode and/or in proactive control system mode. In all modes, it maintains a list of the collaboration requests that were "final" selections. FIG. 41 shows the collaboration history for arrival events comprising of three sub tasks 4102. Each selection is recorded with the direction of shift for the initiator, denoted by either <"or ">" at the beginning of each line.

Some lines, such as 4202, have blank sections: The left shift is blank. The initiator could not/did not wish to find a collaborator for that shift direction. In other cases, the constraint list expands on the why other proposals "failed" such as freedom violations: Left (L), Right ("R) or Both (LR) constraints. See markers "28L", "13R", "22LR". Looping is marked as "LP". None are shown because the Looping Checks Flag was automatically enabled in the simulation.

The pattern of event groups 4102, FIG. 41, indicates a repeated symmetry. A "learned" strategy (taught by the author, in supervised autonomy mode), was to expect looping and therefore proactively avoid it, when this situation pattern emerges. The pattern is based on multiple identical tasks seeking collaboration with the same needs.

The confidence is this pattern was reinforced by presenting repeated instances of correlated patterns. The number of events in the event groups differed but overall patterns were the same. The system was able to make the correct classifications. This is shown in FIGS. 20 Through 41. It is predicting based on validated past reinforced pattern. across multiple types of event groups. Confidence in the "better" patterns improves. The machine learning begins to more closely resemble "experience". Experience promotes stable and proactive response.

Over time, and with this "experience", errant reinforced learning will self correct, based on metrics provided, see FIG. 13. However Supervised Autonomy (to "Un-learn) would accelerate the rate of learning. In effect the system would be adding more strategies to its skill set with human assistance during the initial model building phases.

Hierarchical Control:

The framework provides the necessary tools for minimize ineffective collaborations. Note that the double lines in FIGS. 34 through 36 indicate the aggregate (top line) and individual shifts (bottom line), see 3410, 3510. Both Local (intra-resource) and Hierarchical/Global (inter-resource) collaboration preferences are thus surmised. Looping and Thrashing is thus proactively minimized throughout the system. A learning and yet stable control system emerges. System Stability in terms of sampling frequency has been addressed previously and will be re addressed under network topology considerations.

A Dynamic, Distributed, Decentralized, Hierarchical (and Recursive), Stable control system model emerges. It is Hierarchical because it supports multiple events within an Event Group (e.g. elements 3201 through 3203 FIG. 32). It is Recursive because it can spawn child instance for simulation, running variants of a theme, see FIGS. 19 through 21. It is Distributed because the tasks objects can reside in a cloud centric framework, they do not have to run on the same machine. It is Decentralized because tasks have autonomy within their (dynamic) freedom grids. It is Stable because, with learning, Looping and Thrashing are proactively minimized throughout the system. Scalability and performance will be addressed presently.

17. The Collaborative Network

Common Collaboration Language

Hierarchical control systems support interrelationships and interchanges between their child control systems. Additionally they may also be "collaborating" with other control systems whose requests must be interpreted easily. The alignment vocabulary supports distributed control. Recall that the data internal to the collaborative framework is abstracted and non dimensional: salient variables of start/end/blue/red are inherently generic in concept. Additionally, the alignment functions (and their reversals) are also intended to operate primarily on these non dimensional variables. A common collaboration language is possible.

As an example application, multiple task frameworks also need to collaborate with each other to service complex Supply Chain Management (SCM) scheduling objectives. Therefore, domain abstracted states and their relationships (e.g. the collaboration strategies adopted) needs to be expressed across collaborative task framework boundaries. Alignment primitives fulfill this need.

Common Data Transport Protocol:

There needs to be a common extensible interface protocol to communicate across these multiple collaboration frameworks. Further, it should be able to work with both real and simulated data. Preferably, there should be no distinction within the system between real and simulated data, since both are used interchangeably. In Reactive Mode, the system is learning from real data and building control models from it. Later, it migrates to Proactive Mode where it uses the model to correct for anticipated events in the future from trends gleaned from recent store performance etc. In the Proactive mode, real data is still being sampled, and the control system model self corrects. Thus, both real and simulated data are interchangeably used. The protocol must support both.

Figure 43:
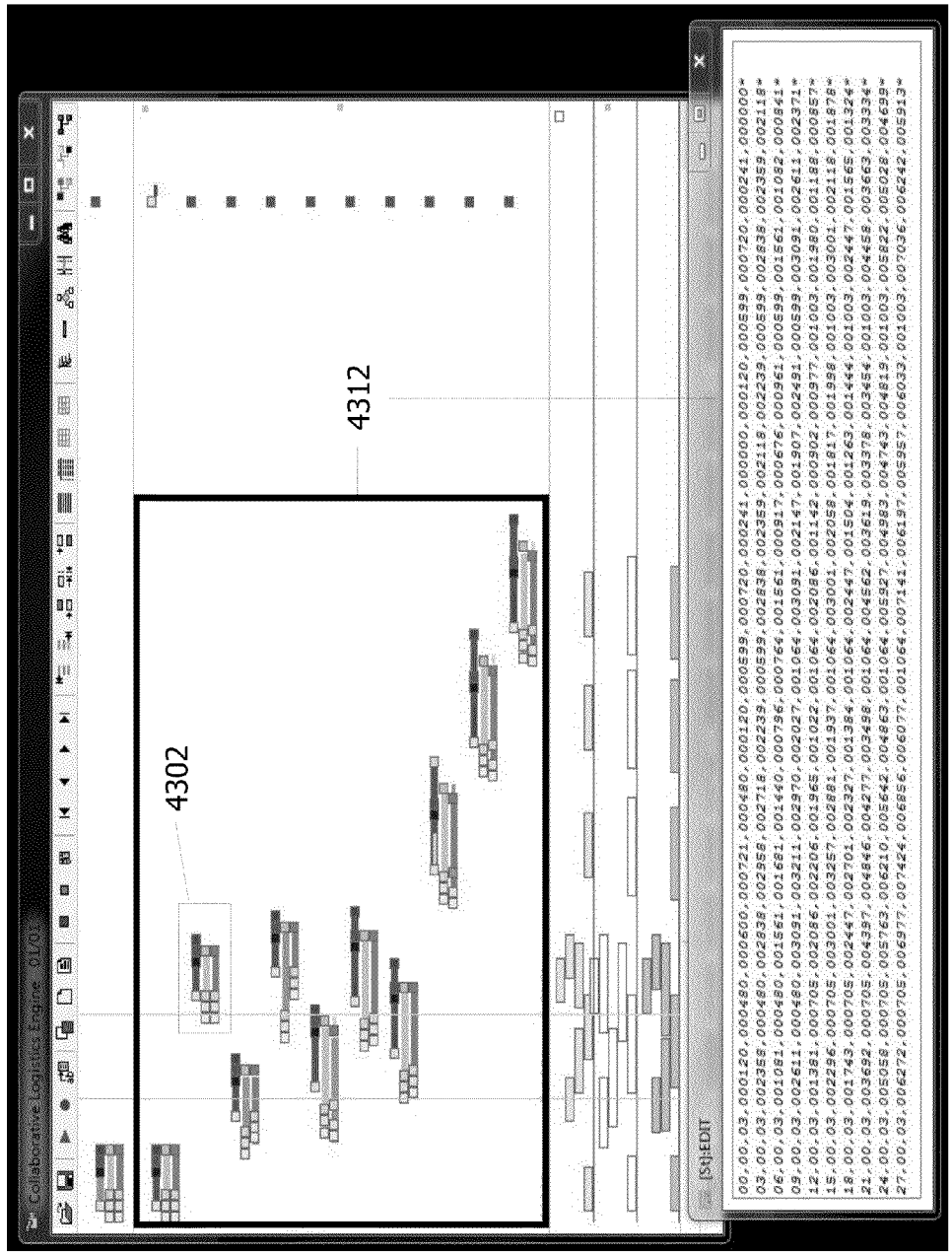
FIG. 43 depicts the configuration of time-dependent objects in one embodiment of the invention.

FIG. 43 shows 10 "Events". Events are a connected grouping of (driver) reference signal task objects and (follower)

control signal task objects. Event 4302 has two sub tasks followers and one driver object. A total of ten (10) such events are represented. Each event line has four boxes, denoting the start/end/blue/red ranges. Twelve (12) data points, four for each line, would uniquely define the current time data state of one event. Each event is represented by one line in the comma delimited state snap shot, 4312. Note that:

There are fifteen (15) variables recorded. Twelve were needed to define the four line parameters (see the small boxes in each line). Three "extra" variables related to inter relationship data between event lines.

The freedom data is not recorded—it is a dynamic, derived relationship and can be inferred from other data, as can the desirability of specific alignment/collaboration functions.

This compact snap shot of ten events is now available for safe export/import across collaboration boundaries. It is in comma delimited form for access by standard analysis tools (e.g. spreadsheet programs). Collaborating frameworks may now run their own simulations and explorations, and their specialized analysis on (duplicated) sibling collaborator data to determine, autonomously, how best to service the emergent collaborating ecosystem.

Collaborative Pipes

Figure 44:
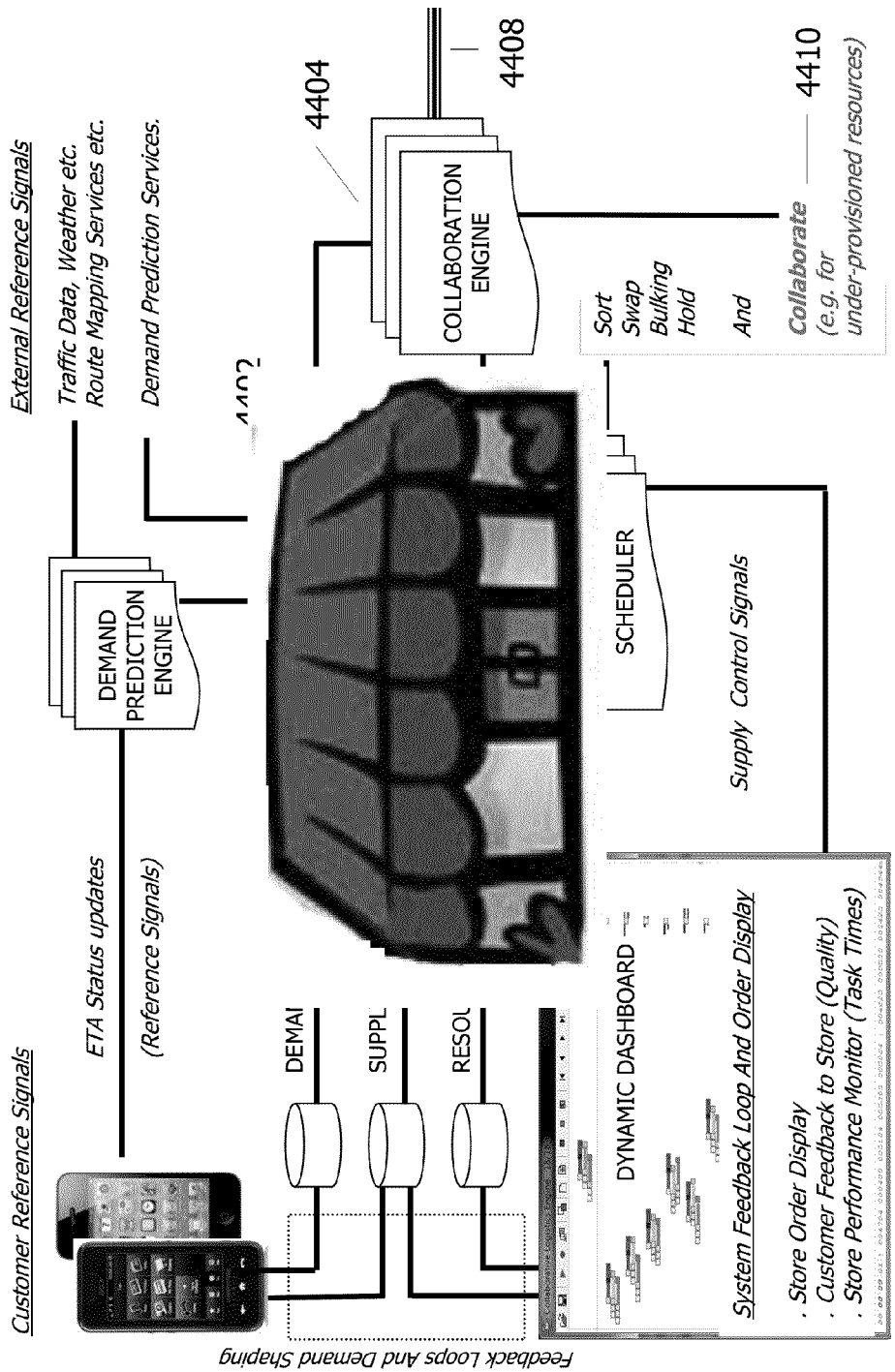
FIG. 44 is a modification of FIG. 14, to include the Collaboration Engine and its interfaces.

FIG. 44 is a variant of FIG. 14. The alignment engine 4402 now connects to the Collaboration Engine 4402. It is also listed as one of the "skills" available to the Scheduler in its capabilities tool kit 4410. Note that the capacity constraints feed is connected to scheduler and collaboration engine, 4406, The "pipe" 4408, enables collaborations across local control system/resource boundaries. Other collaborative task objects may be resident on the same computer server or distributed across an internet or LAN network.

A collaborative ecosystem germinates, as a network of cooperating resources, communicating over a common networked interface (Example shown in FIG. 43). FIG. 45 illustrates independent but collaborating control systems.

4502 and 4504 are two sibling coffee stores, each with their local customer queues and resource constraints. They choose to collaborate, see line 4506, in the event customers need to be routed from one store to another. If one store cannot meet the demand adequately, it would reverse align—requesting some of its customers to visit its sibling store. Thus, reversed scheduling provides dynamic, autonomous load balancing across a chain of sibling stores. [Reverse alignments were described in Section 15]. Both Sibling stores 4502, 4504 receive their supplies through an intermediary delivery service 4552. The delivery service picks up supplies from the factory/warehouse 4554. One more collaborative pipe is shown, see 4556.

There are three collaboration "boxes" depicted:
1. Inter store, see 4506, 4508
2. Inter delivery service/warehouse, 4556, 4558
3. The aggregate of the two: 4568

With these levels of collaboration in place, complex proactive behaviors are supported:

Store A predicts it cannot meet its backlog and automatically reroutes some customers to store B. Dynamic load balancing is achieved, attempts to maintain customer satisfaction are made, despite the inability to support this burst of demand at Store A due to unforeseen resource constraints.

Delivery Service receives a data feed from the weather channel. It's going to be a cold day. It has not yet received any increased delivery requests from Stores. However, it proactively contacts the factory/warehouse and increases the order quantity. Note, the delivery service is acting as a customer (driving function), the factory/warehouse the store (follower function).

Delivery Service Estimated time of arrival at Store A is expected to be delayed, due to both traffic conditions (from external data feeds) and the current GPS location of the delivery truck (from Demand Prediction Engine tracking the truck). Store A requests that the delivery be made to Store B, and attempts to route some its customers to Store B. This process involves collaborative negotiations between multiple task objects, each operating with their own constraints and potentially on different freedom grids. However, all collaborative systems are online and salient information is available through the collaboration pipes. The aggregate system, or collaboration network, is capable of running iterations, using both forward and reverse alignment strategies to arrive at reasonable decision points speedily. Note this is a departure from conventional scheduling approaches that are driven by optimization functions and perform poorly in dynamic and uncertain environments.

The Supply Chain is reversed: Store a, notes that the delivery truck is delayed. It contacts its customers and offers them incentives to arrive later (akin to the restaurant "Blue Plate Special"). This is an instance of Demand Shaping.

All of the above scenarios are simulated, by recursively spawning what-if scenarios. Top level strategies are determined and cached in a strategies library. The scope of the strategies can span the entire collaboration network (all collaborating entities) or be limited to one task resource (e.g. Nurses in Hospital A).

A dynamic community framework, thus germinates. Customer Satisfaction is maintained in spite of demand/resource disruptions. This autonomous, scalable, distributed control system maintains and manages it control system parameters to ensure a state of dynamic equilibrium. Both "real" and simulated task objects are supported, the latter employed to conduct internal stress testing, explore alternatives and thus adapt to changing circumstances.

Tree Topology

Recall that the network is latency sensitive. When data arrives and is processed matters. Multiple control systems are active and running at their (adaptive) polling frequencies. The system mandates the network architecture support latency bounds. Further, as the system scales, those latency bounds should degrade gradually, according to an understood and definable pattern. For example: "Every 100 objects added degrades top level agility by 10 seconds".

Both the network itself and all its node control systems are intentionally designed to be tree based hierarchies. Tree Topologies connect any two nodes, at both intra-resource and inter-resource levels. All nodes in the network are on branches of the tree and the topology is recursively tree based, all the way from root nodes, down to its leaf nodes. This stringent adherence to a tree based topology ensures that the connectivity links are acyclic and there are no "flow loops".

In a tree based topology, data flows up and down the main tree arteries and recursively to sub arteries that connect branch descendants. Data flow can be controlled on a need to know basis and thus prune the broadcast stream at each branch node.

FIG. 46 depicts a tree topology defining the information flow between the collaborating sub control systems. In a tree topology, sibling nodes are connected via a parent node. Thus the collaboration pipe 4606 between siblings 4602 and 4604 is actually not direct but via the parent node 4612. This supports extensibility. If more siblings are added at a later date, communications links are simply are added from them to the parent node 4612. No other modifications are needed. All siblings can communicate with each other and other nodes in the tree, via the parent node. This is a significant advantage over peer to peer networks.

Similarly parent node 4614 provides the collaboration pipe for the delivery and factory/warehouse sub systems 4652 and 4654 respectively.

Parent node 4610 provides collaboration between all sub systems. The control system running at this level is the aggregate control system marked 4568 in FIG. 45. Its Dynamic Dashboard, 4678, presents the overall performance of the entire system. "Performance" in this context, is how well supply and demand time lines are aligned. Three Dashboards are shown. The top row is the root of the "stack" and therefore has visibility into its "lower" stack elements and their control systems, shown below. "Drill down" access to lower levels is achieved through traversing the tree down to sub trees. (Dashboards 4680 and 4682 are the same as those shown at 4612 and 4614).

Hence, higher level control systems, in a tree hierarchy, provide comprehensive visibility into the entire supply/demand chain. Further, they are also capable of providing overseer services since they have access to the "big picture" and the current behavior of sub ordinate control systems.

Dynamic Collaboration Topologies

FIG. 46 depicts a structured flow of data and collaboration, where data flows upwards to a parent node and then downwards to a sibling. In a tree topology, sibling nodes are connected via a parent node. Thus the collaboration pipe 4606 between siblings 4602 and 4604 is actually not direct but via the parent node 4612. This supports extensibility since all data flow downwards is emanating from the same place, e.g. parent node of the sub tree e.g. 4612. This is inefficient. If there are only two siblings then why not delegate responsibility/authority between them, so they can manage their inter resource collaborations internally and not send everything, "up and down the tree"?

Figure 47:
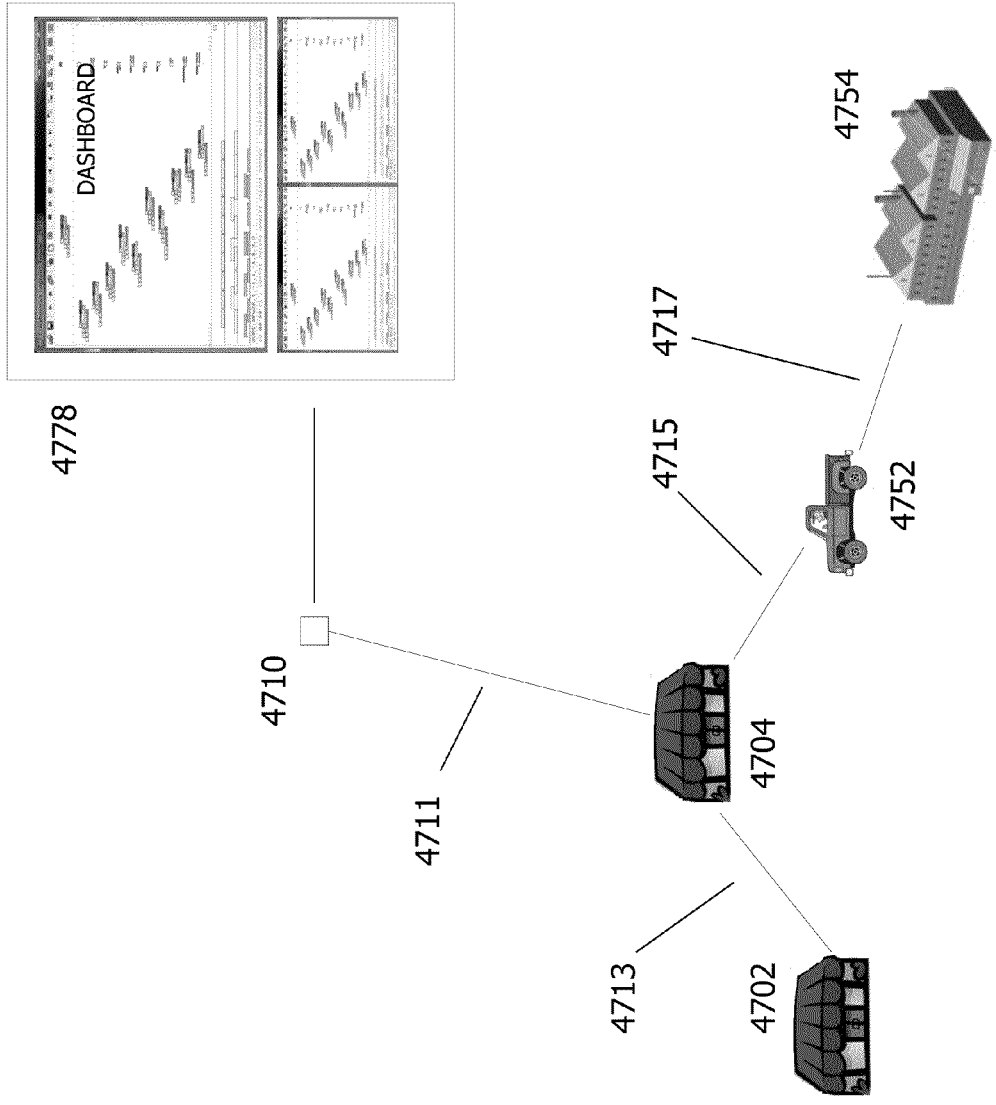
FIG. 47 depicts a modified collaboration topology to address delegation of responsibilities from a parent node to child sibling nodes. These delegations are temporal and conditional in nature. The collaborative network should be able to support dynamic collaboration topologies.

FIG. 47 depicts a direct relationship between node 4710 and store 4704. The collaboration between store 4704 and 4702 has been delegated to store 4704, as has the delivery truck communications see link 4715 to Truck 4752. The truck is also communicating directly with the Warehouse 4752, see link 4717. The intermediate "parent" nodes in FIG. 46, 4612, and 4614 have been eliminated. The data needed for the Drill down Dashboard 4778 is still available, but the delivery mechanism for that data has changed. Further, the collaboration agents are now localized. This is more efficient. Note that overseer functions that 4612 and 4614 have been removed in this more flat organization of labor. Now, exception handling percolates directly to the top, e.g. 4710. Overseer functionality is now top heavy.

Situations will arise where collaboration topologies need to dynamically shift from FIG. 46 to FIG. 47 and back again. Initially, the collaborations between sub tree elements is being fine tunes and consequently the control models are rudimentary. Overseer functions will be more active during this phase. As the network scales, more child nodes are added, a parent node will be overwhelmed with data. It may temporarily delegate control to a "master" store 4704 to manage satellite sibling stores 4702, see link 4713. The master store 4704 may also be delegated to order deliveries etc within prescribed spending limits, see link 4715 to the truck. Further, the delivery sub system 4752 may be further authorized by its new "master" 4704 to handle communications with the warehouse directly see 4717.

In the event store 4704 performance is adversely affected, the relationships can migrate back to FIG. 46. In some cases, Store 4704 may be managing the collaboration but a shadow oversight is also provided—both topologies, shown in FIGS. 46 through 47, may be active concurrently.

Figure 48:
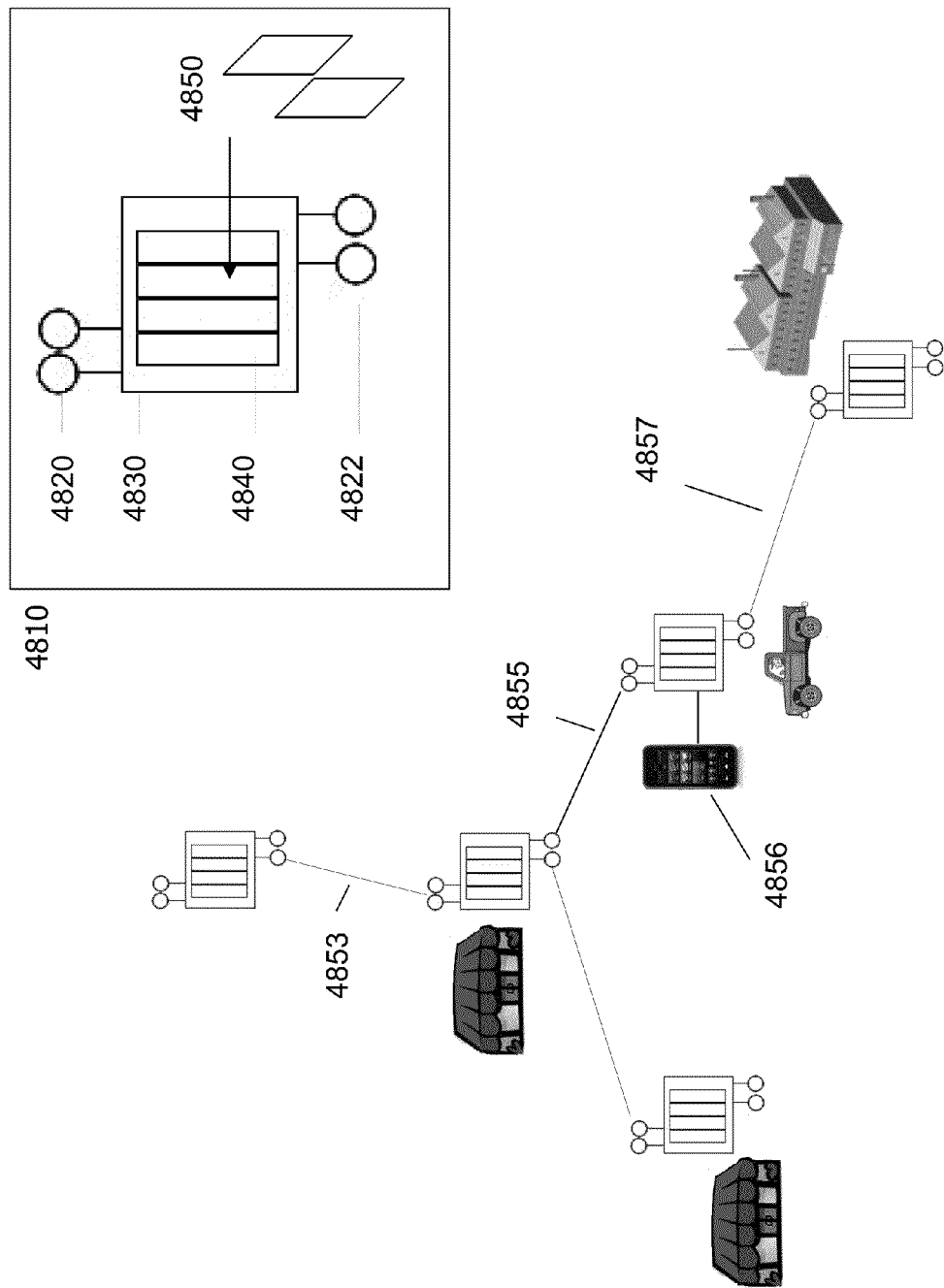
FIG. 48 depicts a conceptual firmware module used to manage communications across the collaborative network, in a secure, modular and extensible manner. The analogy to a blade server with reconfigurable "blades" is made.

FIG. 48 depicts the conceptual "collaboration box" capable of supporting multiple concurrent dynamic collaboration topologies. Referring to the insert 4810, the "box" is a hardware/software suite of modular capabilities. Every box contains the following:

Multiple Communication/Collaboration links. Each collaboration box has multiple uplinks (4820) and downlinks (4822). Multiple links support differing modalities of communication. For example the delivery truck may have only phone access 4856, which may not be deemed sufficiently secure by the enterprise. The uplinks and downlinks are how tree topologies are maintained see 4853, 4855, and 4857.

Secure Networking Abstraction Layer. 4830 depicts a common secure network communications support layer. It support multiple collaboration engines "slots" see 4840

Modular Collaboration "Slots". 4840 depicts multiple "slots" or capacity availability for collaboration engines and their agents. The slots are populated by those engines best suited, from a library of such engines, see 4850. Swapping in/out capabilities is thus possible. Further, multiple modes of collaboration is supported, based on the number of slots available-each of which share the common secure communication layer 4830.

Modular Collaboration "Boards": 4850 depicts multiple collaboration engines, designed to conform to interface specifications of the "slot". Note that both slot and engines are conceptual. One option is to provide the engines as hardware pluggable cards, with resident logic in either Firmware (e.g. FPGA) or stripped down version of an Operating System (e.g. embedded Linux). This is further described in Ser. No. 10/434,948 This embodiment circumvents security related "hacking" concerns. Other options could be downloaded software modules, based on a need to have basis, as the collaboration ecosystems evolves. Since collaborations engines are based on the dynamic topology being sought, the code downloaded is ephemeral: hence the value of multiple boards and slots—supporting multiple collaboration topologies concurrently.

Linear Tree Growth.

The Hierarchical control system is modeled as a recursive tree topology. This is preferable for reasons explained shortly. Since it is recursive, All types of "stacks" modeled in the system, are also based on a tree topology. This includes the task objects and their collaborations.

Consider the stack of task objects shown in, FIG. 22. The stack, as shown, is the simplest "tree" structure—it is a string of pearls configuration: one child to a parent, all the way down the chain.

There are multiple tasks with overlaps in time see 2222. Time is moving from left to right. Tasks near the tree "root" 2220 occurred before those below it. Thus, it is possible to construct a tree structure where events occurring later are added "below" in the tree hierarchy. Thus the tree grows in time from its roots to its branches.

Such trees have efficient ways of traversing between non contiguous nodes/junctions of the tree branches. This is important because data flow is occurring throughout the network, at multiple levels. Recall since both intra-resource collaboration and inter-resource collaborations are allowed. A multi-level collaboration was shown in FIGS. 32 through 36. Multi-layer collaborations are powerful. However, the number of negotiations increases exponentially. There is more "traffic" on the collaboration pipes.

The application of Hierarchical Control systems are enterprise level. They are also, by necessity, distributed and connected through internet or LAN clouds. Traffic across distributed networks has to be efficient. It is intended to provide near real time response. A design preference is that:

The network topology should be designed to be latency sensitive.

Throwing more bandwidth at a poorly designed network topology is not sustainable as the enterprise supply and demand chains grow. The system is not scalable because inefficiencies also "stack up" and increase exponentially. Bandwidth improvements are more linear. A second design preference is:

The network should not restrict the number of inter-resource collaborations.

The following approach supports both latency and linearity requirements with one restriction:

A higher (or parent) task must notify tasks below it of their position in the hierarchy.

This means that Parents must inform Children of the connection. Recall that the system is recursive, A parent, through its children, is connected to its grand children and so on down the tree to its leaves. Each node in a task tree topology is thus indirectly aware of all its descendants.

Further, all relationships in the system are reversible. Grandchildren, through their parents, can communicate with their grandparents and so on up the tree.

Thus nodes can ascertain information about other nodes by hopping "up" or "down" the connectivity tree. The hopping is across generations. This form of tree traversal is inherently efficient. Entire sub trees are accessible through one link. A sub tree includes all descendants of that parent node.

As the number of nodes increase, the tree grows. What makes this a tractable problem is that the tree spreads out too, since parents have multiple children. The number of "hops" from the "root" to the "leaf" (extremes) grows linearly with the number of generations, not the number of nodes. The system performance will change linearly with the "depth" of the tree.

Note that the number of inter-resource relationship may grow exponentially. However the traffic across the collaboration pipes is now manageable, since entire sub trees can be accessed in one data exchange.

Global Freedoms

FIGS. 37 through 38 depicted the Upper and Lower Freedoms. With each resource collaboration relationship, there is an additional set of four freedom variables (Upper/Lower/Left/Right) that may require "Watching".

A conservative strategy dictates propagation of all freedom range constraints to arrive at a "safe" globally acceptable freedom range of shifts. There are pruning options available regarding which types of constraints to include in these "safe" values. For example, it may prune only those above it (FIG. 37) or below it (FIG. 38) or both. Note this is an option at every intra-resource or inter-resource level. The global freedom is therefore what the task object/system deems is a "judicious" first-pass filter/prune.

Subsequent filters, (e.g. loop detection), may further prune the selection list. If the first pass filter is too broad, the system will eventually self correct, as collaboration requests percolate the tree hierarchy. However more iteration is needed, during which system agility degrades till recovery.

Similarly, if the first pass filter is too conservative, then tasks requesting large time shifts, may be filtered out—their requests violate freedoms of other tasks at multiple levels.

This will also eventually self correct. Initially, the system metrics as shown in FIG. 13 will reflect degraded performance metrics. If a trend is established, the control system, FIG. 14, will switch strategies accordingly. But switching takes time while the system determines if a trend exists . . . . Here again, global system responsiveness degrades till recovery. Hence the need for "judicious" selections in the choice of control parameters. Supervised Autonomy and exploration through simulation provide accelerated convergence to stable settings. This was demonstrated in FIGS. 32 through 36. One collaboration strategy included both intra-resource freedoms and the inter-resource freedoms of the other task . . . . The global freedom was thus used to arrive at a globally satisfactory alternative.

It is beneficial for task objects to comply with Global Freedom constraints. Their compliance ensures that their collaboration requests are approved, as it percolates through the system. Further, since the system discourages looping and thrashing, collaboration and "playing fair" is, over time, a reinforced collaboration strategy Global Freedoms, as a first pass pruning filter thus reduces the number of negotiations/iterations since the tasks are complying with multiple constraints simultaneously . . . . This reduced time enhances system agility and also damps oscillations, caused by "back and forth" negotiations.

With the tree topology in place, Global Freedoms may be ascertained in linear time. It is linear because the maximum delay in accessing a sub tree is based its number of hops from the root. Multiple collaboration relationships receive their updates from a single sub tree access. Hence Global freedoms may be ascertained in time proportional to the depth of the sub tree they are accessing.

Global Agility.

Hence, the global or "root" collaborative system agility will degrade, typically, no worse than linearly with its tree depth. Control Systems running at the root of the control system tree will seem sluggish to those running at the "bottom" This is because the information delay increases with each hop.

In FIG. 22, There are 10 task objects shown (see 2220 through 2238) The tree, in this case, is a chain 10 "hops" deep. For 2238 to receive information on the whole tree, it needs to access its parent 2236 and traverse up the tree. After 10 "hops" it reaches the root node 2220. At that point it has access to all elements of the tree. The number of hops related to the "depth" of the tree.

The average number of hops to the root node is Order (D) where D is the average depth of the tree. This linear relationship supports scalability. Note that latency sensitive networks are tree like e.g. Local Area Networks, The Postal Service etc. Data exchange collaboration within tree structures is thus inherently efficient since entire sub tree data is being exchanged and extended at each hop. This is one reason why it is judicious for the "upper" nodes of the tree to provide access to "lower" nodes. It is expecting its parent node to provide the same service.

Implementation Specifics: Regarding implementation, this is an activity delegated to the Framework through dynamic watch lists (See FIG. 39). so the entire process is handled for all task objects inside one framework transparently. Note that since the framework has access to all the task objects, it simply needs access to just one node in the event trees. Through any one point of entry, any node in the task tree is accessible by "hopping" either up or down the tree to the parent sub tree that contains the destination node. The Framework keeps track of where the system alignments are, either by polling the system components or await change notifications. In both cases, the Global Freedoms are recomputed for relevant tasks objects. The system attempts to stay aligned to changes, germane to the task objects being "watched".

Collaboration relationships change with strategies. Some favor restriction the field of view to one or two generations. Others wish to assimilate longer term trends and therefore will accumulate more samples and over more hops. Hence, some strategies are inherently more "sluggish" than others. On the other hand, they are circumspect and less oscillatory.

Oscillations caused by thrashing and cycling strategies are wasteful Hence the decision to switch must be based on "judicious" inferences. Trends need to be delineated from temporary aberrations. Adaptive Sampling helps collect the data. Note that the Adaptive Rate Control algorithms is also a closed loop self correcting control system, so it is capable of sensing (autonomously) when more data is needed. It can notify tasks being "watched" after it self corrects the sampling rate. Thus, the system is collaborating at multiple levels to remain globally agile, proactive and stable.

Some simple pruning algorithms have been implemented and validated. One instance is a round robin ordering scheme, where a sub tree control system that is switching strategies frequently (e.g. thrashing) is monitored more frequently. For starters, it may modify the pruning options set for Global Freedoms. The system is therefore capable of identifying, isolating and repairing errant control system settings and strategies. Sustainable (long term) global agility is engendered.

18. Departures from Prior Art Part 2/2

Global Level Collaborations Complex tasks involve multiple sub tasks each with their dependencies. FIGS. 32-36 are now used to represent a different scenario. Now, in this scenario it is two different tasks, each employing different resources.

The "event group" 3200 depict the schedules for a surgery. Three types of tasks, 3201, 3202, 3203 are depicted. 3201 may represent the start and end time lines for the patient. 3202 and 3203 may represent the time allocation start and end times for two resources (e.g. Doctor, Nurse). Those resources have their own resource stacks see 3206 for one resource stack and 3212 for the other resource stack.

The surgery requires that the nurse resource allocation must overlap with the doctor resource, for some of the time, see 3202, 3203. This is the case when the doctor is being assisted by the nurse. This is an example of inter-resource collaboration. Additionally, tasks must collaborate with each other to address contention within the same resource pools of doctors/nurses. That is an example of intra resource collaboration.

Collaboration at the inter-resource level is more likely when the shifts being requested favor a reduction in the current aggregate blue/red shift shown by the top lines in 3310, 3410. This biases the direction of the shift. Another bias may be to reduce stacking. The two objectives may be biased in conflicting directions. Some form or arbitration is needed.

The solution being presented in FIG. 36 is both locally (e.g. intra-resource) and globally (e.g. inter-resource) satisfactory. Collaboration strategies at multiple levels are also collaborating to meet each other "half way". The system is therefore aware of both local and global constraints and how to steer away from proposing shifts that are not broadly acceptable. The bias favoring broad consensus reduces backtracking in simulations, enhancing system agility. ["Dynamic Watch Lists" and "Freedom Grids" help tasks judiciously prune their collaboration options before presenting them for approval.].

Reactive and Proactive Modes:

From a black box perspective, there is one control system supporting the entire time region of interest. Internally, the system is switching between strategies and their associated transfer functions, $G1(s)$ and $G2(s)$ in FIG. 3. The control system aggregate behavior is piecewise linear within each control box region.

Within each control box region (FIG. 5), the control system can function in either reactive or proactive modes. In reactive mode, it responds to event changes after they occur: this mode is the default, if it is in learning mode. After the transfer functions have been identified, the system mode gradually migrates to proactive mode, where it estimates and predicts event changes before they occur. In proactive mode, the system is continuously monitoring the "actual" data feeds (from the simulation based models) to determine the deviation between real and expected outcomes. It is therefore using the real data to provide the reference signal to its control signals and close the corrective loops appropriately.

Push Versus Pull Systems

The system described here attempts to automate this function by representing/modeling both intra-resource and inter-resource collaborations within one system, so corrective measures may be applied at multiple levels of collaboration.

Supply Chains are inherently "Push" systems. Customers, for example, are "pushing" the store to manufacture the coffee, based on their orders. The store in turn, is "pushing" the delivery service for a "timely" deliver of raw materials. A Pull system works in reverse: the store is now "pushing" customers to accept deliveries in a more "timely" manner. The restaurant "Blue Plate Special" was an example of this reverse push. Demand shaping is an example of pull systems.

Bi-Directional Switching:

Conventional Logistics systems are unidirectional. They may be either forward driven (e.g. estimated delivery time for this current order) or backward driven (e.g. plan ahead for estimated customer demand in the future), but not capable of switching directions mid stream. They are not typically modeled as adaptive control systems. Hence, they cannot switch directions e.g. go from push to pull mode proactively autonomously and in a stable fashion. They are also application domain specific and contain many custom features.

Collaboration functions are bi-directional; they work for both pull and push systems, because alignment primitives are bi-directional. Further, each component of the system described is an element of a (hierarchical) control system. Control systems are inherently bi-directional, since they self correct deviations (in either direction from a dynamic equilibrium state. The overall system is therefore bi-directional and capable of dynamically and autonomously switching directions to support both pull and push modes.

Regarding application domain knowledge, the start/end/blue/red variables are generic. Hence, collaboration strategies are portable across application domains, because they are constructed from domain independent Alignment primitives which in turn use generic concepts like start/end etc.

An example may help solidify these assertions. Consider the example use case of the coffee store. If demand picks up suddenly, the store manager, based on experience, may proactively call in for coffee beans to be delivered sooner. He may call in his back up Barista and tell her she needs to come in earlier (e.g. shift her task start time left). Or he may choose to "pull" some customers to accept a later delivery by offering them incentives. Or he may redirect some customers to another store, which has available capacity. Or employ a combination of these alternatives.

The system described is capable of learning through simulation. It is also capable of un-learning (from past errors). It is also capable of pruning poor strategies and rapidly applying complex strategies it has cached, to address complex situation patterns. Further, through supervised autonomy, and its own explorations, it is capable of correction. Lastly, the control system aspect of the system ensures stable and speedy response, even under dynamically changing situations. It is capable of emulating good judgment.

Emulating Good Judgment.

Inter-resource relationships are not easily modeled in conventional scheduling systems. In conventional schedulers, the problem space rapidly becomes intractable, which is one reason why, when scheduling hospital visits, large safety buffers are placed on both start and end times (each end of the line) to provide some margin of safety. Note this is at the cost of poor resource utilization and more cost. "Good Judgment" is needed to ensure optimizations at one level do not "break" dependencies/constraints at other levels.

Currently, experienced triage nurses dynamically shift schedules around. They have modeled the levels of interdependencies through experience. Those who act proactively and can predict and self correct for future mishaps are rewarded because they "nipped it in the bud". The best act quickly on a "gut" feel which, in machine learning terms, is a set of cached learned strategies that fit the current situation "pattern". The more complex the pattern, the more experience is needed.

This is one reason it has hard to duplicate human triage nurse functionality: this sort of learning comes with experience. And experience takes time. And since experienced personnel are an under provisioned resource, automating portions of this functionality becomes critical.

The system described attempts to automate this learning function by representing/modeling both intra-resource and inter-resource collaborations within one system, so corrective measures may be applied at multiple levels of collaboration. The corrective measures may be applied by both humans and their representatives (e.g. a simulation program).

This "bird's' eye" view engenders proactive control at a global level of granularity. Drilling down to identify root causes for blue/red shifts is supported, (see FIGS. 32 through 36). The system also attempts to learn (or unlearn) based on both supervised and unsupervised learning. These are all attributes of good judgment, worthy of emulation.

19. Collaborative Ecosystems

The example of ordering coffee helped to outline the core concepts of adaptive and predictive scheduling, dispatch and routing to be explained within a familiar context. Other example applications, employing the core technology of alignments and collaborations, include:

Team Schedules:

Multiple members of a team wish to meet at a restaurant. The system has the capability, based on ETA, restaurant loading, current backlog etc, to predict wait time for tables and the best time (within specified limits) to book a table for a time that will ensure timely service for the customer and provide some load balancing for the restaurant. A similar application would be coordinating the time when all parties will arrive at the airport to take a flight together. The flight is changed automatically to accommodate delays in transit; all parties are informed of suggested changes to earlier itineraries. Similar solutions for predicting spiking demand, based on clustered ETA arrivals, may be used to redistribute load by transferring orders to different store locations preferably along current travel paths.

Task Planning:

A customer wishes to stop along his route to home to pick up grocery, food and beverages from different providers, each with their store locations, differing load characteristics and current backlog. Multiple store locations for the providers exist along the route that provides the service. The system is capable of reviewing the chore order priority, re ordering it, and suggesting other store locations with better service efficiency, in order to reduce the total time taken for chores to be completed within a stipulated time period and/or travel radius.

Bulk Dispatching:

Multiple consumers, at home, office, hotels etc, may request order delivery. The order is placed with the provider, not a specific store location. The order is examined by the system and routed to the store best suited to fulfill the order so that, ideally, one bulk delivery is made for all customers in the specific time window ad/or travel radius.

Opportunistic Demand Shaping:

In places like Airports, Shopping Mails etc, potential customers may have access to WI-FI based location transmitting Access Points or other means of communicating GPS location through triangulation software on the mobile device that based on signal delays from three or more transmitting devices can pin point, prospect location with reasonable accuracy. Stores along the inferred travel path of the prospect (based on periodic sample points), have some indication when the prospect would pass their store. Based on this information, proximity based offers may be made in advance of inferred arrival.

Synchronized Package Delivery

Packages often need delivery at peak hours and/or times when recipients are available to accept delivery. As a variant to suggesting alternate store locations, delivery of packages are re ordered so the truck schedule matches where customers will be, based on predicted ETA of both. This assumes some sharing of information between customer and provider, on a need to know basis. It may be monitored and provided by trusted intermediaries using the scheduling system.

Reverse Supply Chain Management:

An earthquake has hit Japan and the supply of electronic components has been disrupted. Based on available inventory, enterprise collaborates with its largest customers to reschedule its deliveries. This is version of persuading some customers to "come later", by providing other incentives. ["Blue Plate Special"]. A simulation is run to determine how best to meet revised customer expectations. This is done over all product lines. Decision points are reached regarding the best revised product mix.

Early Warning System.

When outsourced delivery services are out of alignment, corrective actions can be taken to prevent a crisis. These corrective actions include load balancing between suppliers, allowing them to (collaboratively) avoid bottlenecks. Stacking and blue/red trends can act as an early warning system.

Bi-directional Supply/Demand Shaping.

Customer retention and revenue maximization is easier when both supply and demand curves can be shaped. The system is bi-directional; hence both forward and reverse alignments are possible. Further, switching strategies midstream is supported.

Machine to Machine Collaborations:

The smart appliance in the home note that today is sunny. There are more energy resources available and solar energy is free. A home-network wide collaboration directive is energy saving mode (reduce stacking). Non critical energy intensive appliances are activated. The system mode is to "make hay while the sun shines."

Another example of Machine to Machine collaboration: electric cars internally scheduling their recharge times. If electric power resources are limited, cars could schedule recharge times in terms of a need basis. not first come first served. The collaborative scheduling would reduce demand surges in the evenings, when all cars come home to dock.

Smart Packet Flow

Another example is smart packet flow over the Internet. Contention over the Ethernet is managed by first segmenting the packets into priority classes. Contention within a priority class is managed by variants of the first-come-first-served rule. For example, random back offs are introduced, so packets don't contend for resources at the same time. For example, CSMA/CA is the abbreviated form of a networking protocol where CS and CA stand for Collision Sense/Avoidance respectively. Regardless of the protocol, when bandwidth is throttled, packets "stack" as shown in FIG. 20. Without some form of collaboration between the packets, the response is effectively (randomized) first come first served, such as CSMA/CA. Additional intelligence, based on packet latency requirements ("blue/red') and "Ethernet pipe "capacity", can collaboratively schedule packet flow within priority queues more effectively.

Edge Device Collaboration

Smart packet flow becomes increasingly important for last mile connectivity. At the edge of the network, wireless networking typically connects remote or mobile devices. Limited wireless spectrum is a constrained resource, mandating efficient and proactive collaboration topologies at the edge of the collaborative network. This becomes increasingly important when collaboration partners are mobile or remote and are not always connected to the Internet.

For example, consider two mobile, portable diesel generators in need of repair. Their software agents/advocates have surmised the best time to schedule a repair visit, based on their usage and urgency, similar to scheduling hospital visits. They are in the same geographic region and could collaborate on the optimum use of the repair technician, a constrained resource. But they do not have internet connectivity. However they do have a local wireless radio (e.g. Wi-Fi, Bluetooth). The wireless communication link is provided for software updates, performance monitoring, usage statistics, diagnostics support tools etc.

Owners have smart phones, laptops etc, with Wi-Fi and blue tooth connectivity. Those devices have internet access. For example, software on phones is now capable of connecting the diesel generators to a support center. If both generators are connected, through the cloud, then they can "see" each other. They can now "collaborate" to reduce "stacking" of the repair technician "resource". The collaboration topology would resemble FIG. 46. The stores 4602, 4604 are now the diesel generators. The repair technician is now the delivery truck 4652, collaborating with the parts department 4654.

Machine Social Networks

If the generators are in the same vicinity, perhaps they "see" each other, wirelessly. If so, they can form an extensible wireless mesh network, so information can be shared between them in a private distributed control system network. Information is shared in the trusted private network. Now, either generator, when connected to the internet, can upload/download data for itself and its friends in the mesh "community" of "stores" requesting service. Also, either generator can act as the "master store" and schedule "deliveries" for both of them, see FIG. 47. As more generators are purchased, in the vicinity, more generators will join the wireless mesh network. Each can act as a temporary mailbox for its "friends" and fellow collaborators. Thus, a machine "social network" is formed, that picks up and delivers messages for each other and keeps everyone apprised of recent events. A machine based collaborative social network forms. (Embodiments of machine social networks are described in U.S. patent application Ser. Nos. 11/818,899 and 61/148,809)

A machine based collaborative social network forms.

This social network supports each other to avoid contention of resources, which may be scant. The repair technician is coming down to repair the two generators. A third generator has newly joined the mesh network. It can also request repair and collaborate with the other two to ensure minimal "stacking" of the revised schedule. This is better usage of the repair visit resource. As more machines join, they are incorporated in the collaborative sub tree. Dynamic Topologies shift focus where needed.

Further, information is locally shared inside the trusted community. Any time a generator has internet access, it will communicate news about its entire community, as last known to it. Message for itself and others in the community are received for later onward transmission. Thus, through this proxy, all generators in the mesh network are effectively being connected to the internet also. Data for their support centers is sent and received from the clones of the mesh community mailbox or transaction server. Additionally, generators can also communicate over the mesh directly with the support center if a mesh is formed that links them to the "root" node. Further, two distant mesh communities, may provide in route mail boxes for each other. Smart phones etc, can act as couriers between the two meshed communities. Collaboration scope has enlarged. The wireless mesh network thus provides high scalability collaborative support for edge devices through this form of shared intermittent internet connectivity.

Private Study Groups Students learn faster in study groups. Student collaboration agents deserve the same privilege. Through the mesh, they share information. They learn the behaviors of their siblings and how to "tune" themselves to collaboratively favor "Customer Satisfaction" e.g. meeting Service Level Agreements "SLA" in timely and proactive manner, By developing "history" with each other, trust is automatically engendered and behavior patterns are more predictable. The "students" have collaboratively all got "better". The private meshed community is an important key to accelerated learning. Salient group forming/dispersing methodology is described in U.S. Application Ser. No. 61/148,809.

Hybrid Social Networks In accordance with Metcalfe's law; the "value" of the wireless mesh community network increases with the square of the number of participant members . . . . The collaboration of the shared internet connection over the mesh network also engenders more frequent conversations with the support center. Frequent sampling improves models and hence also predictions on impending failures etc. It also enables inter-resource collaboration. Perhaps a neighborhood community project requires multiple generators. The owners of the machines can now more easily collaborate internally to determine the most convenient time to schedule a shared use event, because their machines can now collaboratively "cluster" In accordance with Metcalfe's law, the "value" of the collaborative network, with wireless mesh, is at least quadrupled, since two social networks (Human Neighbors and Machine Generators) are now "joined"

Neighborhood generators plugged into a smart grid energy network, may now also be used, to support excessive loads during peak times for home appliances. The generators are "friends" of their human owners. Their owners introduced them to their home appliances. Perhaps the home appliances are part of a Neighborhood Home Appliances machine social network. Their internet connectivity may be intermittent. At the edge of the network, "always on" is harder to support. But the larger the network, the aggregate effect is almost "always on". Each device in the network, cooperates to conserve the joint resources of battery life etc, by studying the patterns in when devices connected and which ones. The distributed system can thus "schedule" nodes into timeslots where their internet connectivity access probability is higher, using Bayesian Reasoning.

During this period, the node will be using internal resources (e.g. battery), in service of the community. This "community service" benefits all. The intermittent connectivity "performance" is improved through collaboration agents (e.g. cluster, avoid). The system begins to resemble "always on". With almost "always on", sampling frequency upper limits are higher. This promotes agility and rapid convergence.

Over time, Machine Learning agents may suggest that some competencies be "fused". Fused competencies are, as the name suggests, a tightly coupled, largely self sufficient capability.

For example, nodes schedule when to perform the "community service" of playing the village postman. In a wireless mesh network, for example, there are costs associated with picking up the mail "bundle" and then, through mesh node relays, distributing the mail to each "home". The aggregate community cost (e.g. battery consumption, time) and "Customer Satisfaction (e.g. latency and jitter) are based on the type of mesh network and its topology. Thus, with machine learning, a fused competence emerges, one that adaptively manages connectivity services efficiently.

Fused competences may be thought of as "shareware" in the community, available at low or nominal cost. It may be available as rules, code or RTL logic for remote FPGAs. The machine social network thus shares both data and competence for the "common good".

Nodes may be purpose built, like ant types. Some may be just an FPGA and no microprocessor and vice versa. Speed and low battery consumption favor FPGAs for "auto pilot" repetitive tasks. FIG. 48 depicts a modular approach to extensible competences (e.g. multiple slots) and connectivity links, (e.g. multiple uplinks, downlinks) Some competences may be fused and provided as FPGA or Asics. Others may be provided as "Soft" chips", where resident or remote software is capable of caching learned best practices. Software automatically converts code to cost efficient RTL logic and store it on an available FPGA/EEPROM "slot". These are analogous to the "soft "chips" embodiments described in U.S. application Ser. No. 10/434,948.

The human neighborhood social collaborative social network, connected to these collaboratively learning machine networks, can encourage/discourage errant behaviors. There are specialized early warning systems deployed in their service. The "system" includes humans who have now become part of the "system", In the coffee example, humans were customers and the store scheduler the "system". Now, humans are also collaborators. They are owners in a cooperative enterprise. They can monitor and regulate activities to ensure "avoiding" and "clustering" occur at the right times. And bias control responses to favor "Customer Satisfaction" Dynamic Collaboration Topologies, in conjunction with Adaptive Sampling ensure "stacking" is proactively managed in a stable, scalable collaborative framework. A resilient multi-functional collaborative community of men and machines emerges.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

20. Summary

There are a number of moving parts to the framework for Collaborative Logistics. The framework, so described, through numerous examples, attempts to teach how next generation "friend" networks will evolve. Next generation social networks will be, in the authors view, a recursive and hierarchical tree of hybrid social networks of men and machines. A social network of social networks is powerful, provided it is stable, agile and adaptive. Further, it should be self-healing and have the ability to "localize" a spreading "virus" or other unexpected behaviors. A hierarchal and recursive adaptive and modular control system approach meets these requirements. The slides depict essential components of this emergent control system: The application starts with a simple example of ordering coffee, with the expectation of satisfactory "just in time" delivery. FIGS. 1 through 14 describe how to (adaptively) align demand and supply to meet customer satisfaction metrics, in one embodiment of the invention.

FIGS. 1 through 2 define the "alignment" being sought. The alignment is dynamic. Bayesian Logic reasoning, familiar to those in the art, is needed, see FIG. 3. It "feeds" into the control system model, attempting to close the loop between Supply and Demand, see FIG. 4.

Control systems have operating ranges. A piecewise linear approach may be constructed, see FIG. 5. To model uncertainties, Bayesian Logic and Adaptive sampling are both needed. As examples, Bayesian logic is used to infer causes, when to switch to another supply/demand curve and when to switch travel modes. FIGS. 4,5 and 8 describe scenarios where Bayesian Logic is needed. FIGS. 5 through 8 also describe the dynamic alignment of independent distributions that define reference and control signals. Adaptive Sampling is needed to help fill in the question marks in incomplete models. This is described in FIGS. 8 through 11. FIGS. 12 through 13 describe how a control system, in this scenario a scheduler, applies taught strategies and customer feedback to allocation of resources. FIG. 14 defines the "wiring diagram" taught thus far.

After FIG. 14, this application focuses on how the control system deals with under provisioned resources, by reordering tasks, for best customer satisfaction, beyond the conventional techniques of first come first served. The concepts of domain abstracted alignment primitives is introduced in FIGS. 15 through 18.

FIGS. 19 through 31 describe their application in two simple collaborative agents "avoid" and "cluster". FIGS. 32 through 36 describe its extension to mediation between multiple inter dependant resources (e.g. doctors, nurses). A hierarchical collaborative framework emerges.

FIGS. 37 through 44 describe why system stability and scalability are tractable with Global Freedom and tree based topologies. FIGS. 45 through 48 introduce dynamic collaborative network topologies and how to manage them.

Figure 49:
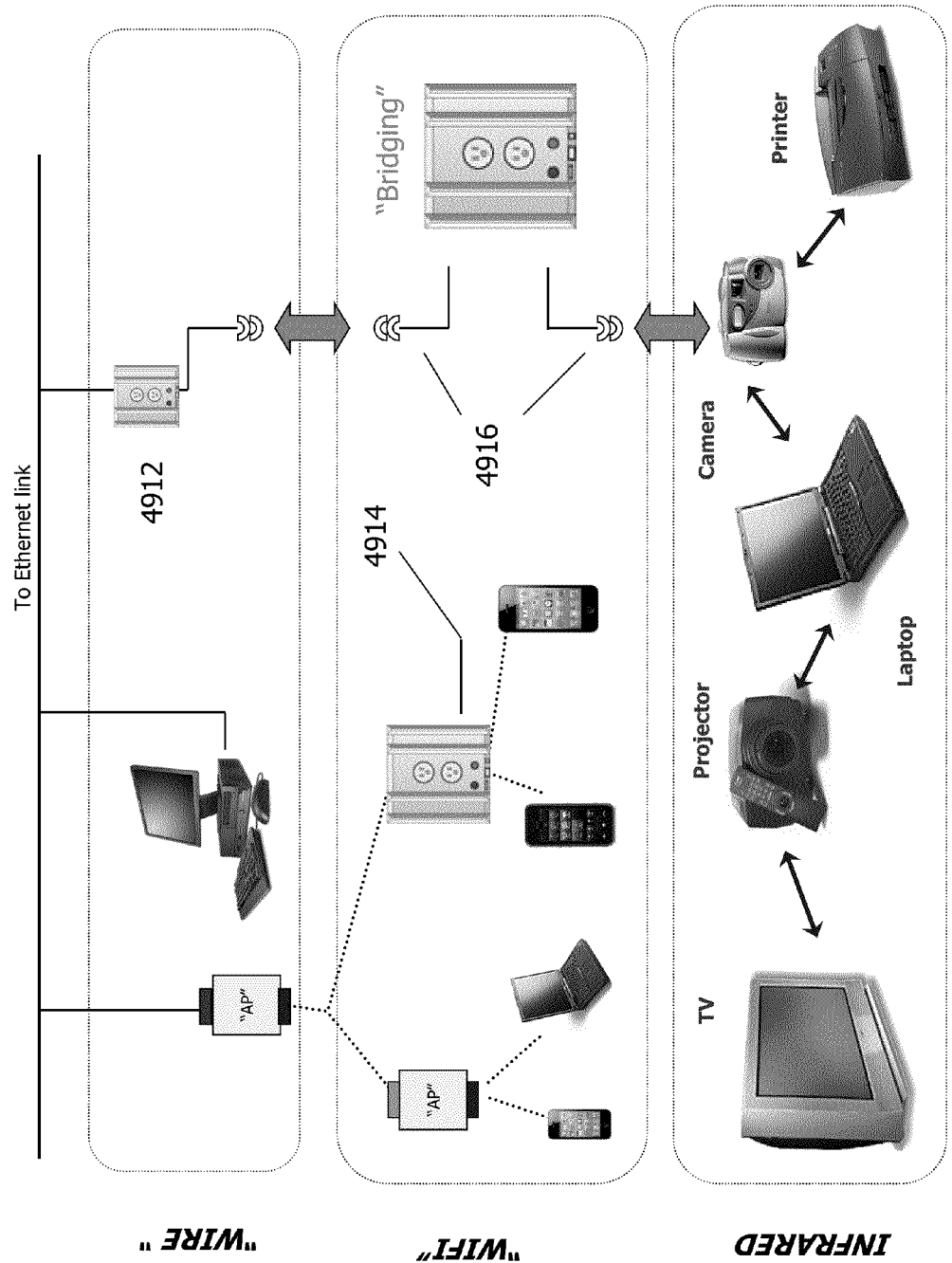
FIGS. 49 through 50 introduce an embodiment bridging across diverse wireless medium using the example of a N-Logical wireless medium bridge, referred to as the "nightlight" In one embodiment, the nightlight serves as both range extender and intermediary between device "chirps" and more conventional, IP based, communication devices and protocols.
Figure 50:
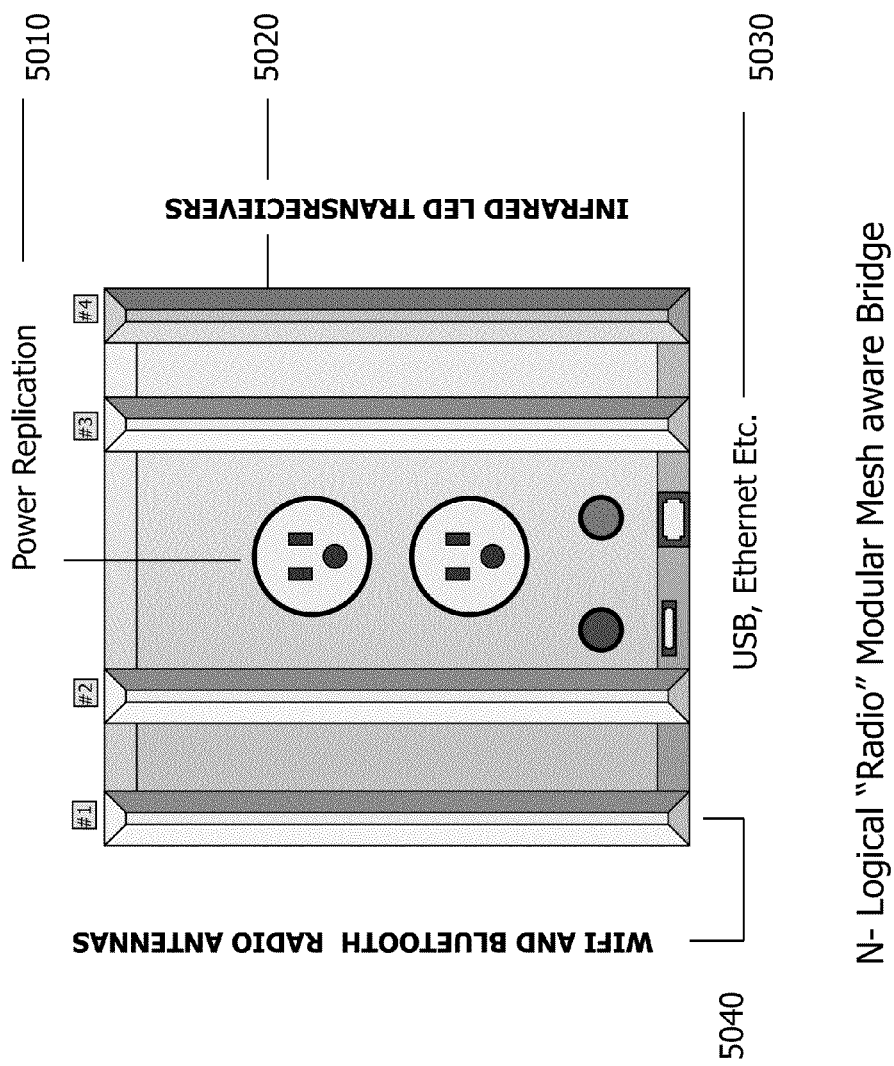

FIGS. 49 through 50 describe an application where collaborative agents can communicate wirelessly. e.g.—non wired connectivity. Bridges between communication media provide a multi-medium hierarchical control system architecture, with collaborative agents operating in each "nightlight" and the network of such "nightlights."

21. Perspective

Nature has amply demonstrated that complex systems do not require complex components. Ant hills and Bee hives are complex. The ability to build complex systems with simple artifacts is noteworthy. Embodiments discussed herein demonstrate stable, scalable distributed control systems. In all cases, each node in the network, was relatively simple. The collaboration "agents" are often abstractions of "avoid" and "cluster" behaviors. The agents operated, collaboratively. Embodiments include traveling together as mobile robot communities, forming self-healing networks to share bandwidth, incorporating new members, adjusting to the changes to its overall topology in stable, scalable manner. Further, with Machine Learning, their stimulus-response improved with "experience" and "age."

The methods taught in this patent application; start with the simplistic online coffee order example. The objective is to demonstrate that supply/demand alignment, is difficult, because life is dynamic and periodic adaptation is needed, by periodic "sampling". The frequency of "sampling" matters.

Scheduling was chosen to demonstrate embodiments of the invention because it is a familiar real world problem. Humans spend resources to align requests for their time by setting aside time "time blocks" with guard bands on each side, to avoid "stacking" them. Perhaps machine networks can emulate that and do better, by virtue of their superior processing speed. Scheduling is an NP complete problem: there is no closed form solution to it. Hence the "control system" module needs Bayesian reasoning and adaptive sampling methods to track moving targets without excessive lag or lead. Further, it needs agents/advocates that will negotiate with others in the network hierarchy. A hierarchal and recursive adaptive and modular control system approach meets these requirements.

Using Scheduling as the example, the concept of alignment in time was introduced, as a means to track the reference signal. Since the system is hierarchical there are multiple reference signals being tracked, all in the service of some prime objectives such as Customer Satisfaction, or Service Level Agreement. The "system" is complex, like ant hills, built from simple collaborating agents.

Two Collaborative agents, "avoid" and "cluster," were introduced, as exemplary instances. The simple agents were able to collaboratively reduce stacking of tasks where needed. There was sharing of information and the ability to use data like global freedoms to accelerate negotiations and provide proactive response. As requests for scheduling changes, percolate up the system (for approval), they are attempted to be collaboratively resolved. This reduces information overload at higher levels. Local disturbances are also thus contained. Private study groups within machine social networks, accelerate learning and adaptation. Since agents can replicate themselves and delegate some to work with others on concurrent simulations, within a study group context. The system develops experience. Local Control system models are thus refined over time. Their refinement is an "event" that drives higher level control logic. The system thus adapts at multiple levels.

Several embodiment of the system has successfully deployed such simple agents, in diverse application domains. A variant of "avoid" and "cluster" has successfully negotiated/collaborated collision free paths for a "team" of mobile robots. Another variant was used to provide dynamic load balancing in wireless mesh networks. In both cases, with machine learning, performance improved with "age."

Other embodiments function as a Social (collaborating) Networks for the Internet of Things, with "collaboration pipes" to the Social Networks for the Internet of Men. The collaboration medium would probably favor voice, since machine voice recognition and synthesis are sufficiently advanced. Further, "code" words/inflexions in voice transmissions provide additional security related information, in additional to existing encryption methods.

In addition to voice, some form of machine Esperanto will emerge. Abstract but widely understood concepts like "avoid" and "cluster" will be interpreted in the application's contextual domain, different for mobile robots, wireless mesh networks and schedulers. Defining collaborative relationships in resource allocations (e.g. time, energy) and the application specific interpretation of "alignment" will be an essential part of this language.

All control systems have an operating range. In one embodiment, Monitors of the control system are capable of recognizing when a "module" is reaching its performance boundaries and needs to be swapped out. Interoperable modularity is assured in the hierarchical control system approach, because it is a control system of collaborating control systems, using the same common language across layers.

New Collaboration Paradigms.

One embodiment comprises building a wide variety of "bare minimum" systems which demonstrate that the real power of the Internet of Things will be quite different from either a traditional network centric or universal inventory perspective. The Internet of Things represents a completely different worldview: one where the machines take care of themselves and only trouble operators for exceptions. Simple devices will be speaking "simply" to each other and humans. It doesn't make economic or technical sense to add a lot of costly electronics/power consumption to these devices merely to gather or impart the tiny amount of data they create or need.

This calls for a new approach to connectivity. From an architecture perspective, the "cloud" is pretty much the same IP-based networking we've been using for decades. Recall that the "cloud" was primarily intended for point to point connectivity between well defined and generally stationary host end points. Hence the need for unique IP addresses, MAC-IDs etc.

In contrast, "thing" based networks are multiple end point to multiple end point based, as part of how collaborative information will be shared. Further, some form of distributed, decentralized control is mandated, in order to support high scalability.

Further, in this embodiment, all devices are not "always on". Wire-less (e.g. radio, infrared, beeps etc.) communications are already common place. A wire-less mesh community is self-forming and self-healing. In one embodiment, a mesh network manages the Shared connectivity for "sometimes on" devices. The wireless mesh is thus another ant hill that "adjusts" internally to constrained resources of connectivity by managing stacking and topology in service of SLA. It will provide the connectivity layer for "thing" collaborative agents.

The Internet of Things thus shares only a need of wide connectivity with conventional IP based networking Beyond that, it's completely different: crowds of millions of end devices that connect intermittently at very low speeds to other machines, not to humans. Just as pollen waits for winds in general, pollen does not wait for specific "wind" transport—the routing for an individual pollen particle is not planned prior to the "wind" event. In my picture of the IoT, this makes traditional protocol stacks and routing irrelevant—or at the very least, overkill.

Further, rather than treat intermittent connections, data loss, and low data rates as problems (as they are in conventional point based IP based systems), several embodiments embrace these as facts of life in the Internet of Things. It's a "lossy" world on the IoT frontier, and that is acceptable—if the embodiments engineer the architecture with that in mind. Most of these end devices won't need constant check-ins with a central site to function. They'll simply keep running, functioning with or without network updates. If an update comes, fine, but there's no immediate response required.

Low Content Chirps:

Turning to nature, birdsong and pollen give us another picture of how the IoT devices will treat communications. Many birds sing without expecting (or waiting for) an answer. They sing "blindly" to mark territory, advertise mating availability, or signal danger—and trust in the universe to deliver the message to hearers who may act upon the message. Similarly, trees and other flowering plants broadcast pollen extremely broadly (hence, allergy season) without any feedback on whether the "message" is received. Propagated by winds, pollen may be carried hundreds or thousands of miles away from the originating source.

All of this leads to embodiment of the very edge of the Internet of Things: it just isn't reliable when viewed from the perspective of a single message. The devices may be switched off at various times, propagation paths may be lost, etc. Yet by sending the same small data chirps over and over, eventually there is a good chance that some or a few will get through. This will mean over-transmitting on a massive scale. But because each data chirp is so small, there is virtually no net cost involved in this over-provisioning.

In one embodiment one of the key things about the Internet of Things that is completely different from the "Big I" Internet: the very small amount of data in each transmission and the lack of criticality of any single transmission. As the traditional Internet becomes clogged with ever larger real-time data streams such as those generated by video and multi-player gaming, the IoT's growth will be at the fringes of the network with billions of low-duty-cycle, low-data-rate devices.

In place of the traditional IP protocol stack with hierarchical layers of routing topologies, embodiments comprise instead be a gigantic crowd of devices speaking and listening—each unconcerned with what's happening anywhere else in the network. Instead of rigid routing paths the embodiment comprise transient clumps and aggregations of unrelated devices sharing propagation facilities. It's a truly best-effort world.

Limited Hops.

The prospect of billions of devices seamlessly interacting with one another, as peers, seems to allow the Internet of Things to escape limitations of central control, instead taking full advantage of Metcalf's Law to create more value through more interconnections.

But true peer-to-peer communication isn't perfect democracy—it's senseless cacophony. In the IoT, some devices may have no need to be connected with other devices—These devices have simple needs to speak and hear: sharing a few bytes of data per hour on bearing temperature and fuel supply for a diesel generator, perhaps. Therefore, burdening them with protocol stacks, processing, and memory to allow true peer-to-peer networking is a complete waste of resources and creates more risk of failures, management and configuration errors, and hacking.

Having said that, there is obviously a need to be transport the data destined to or originating from these edge devices. The desired breakthrough for a truly universal IoT is using increasing degrees of intelligence and networking capability to mange that transportation of data.

Three-level Model:

Conceptually, a very simple three-level model is used in one embodiment. At the edge of the network are simple Devices. They transmit or receive their small amounts of data in a variety of ways: wirelessly over any number of protocols, via power line networking, or by being directly connected to a higher level device. These (simple) edge devices simply "chirp" their bits of data or listen for chirps directed toward them Edge devices are fairly mindless "worker bees" existing on a minimum of data flow. This suffices for an overwhelming majority of devices in the Thing world.

The emphasis in the last sentence above is key. Much of what has been written about the IoT assumes an IP stack in every refrigerator, parking meter, and fluid valve. These devices don't need the decades of built-up network protocol detritus encoded in TCP/IP. Embodiments of the invention are instead free our thinking from our personal experience of the networking of old age computers, "Wireless" now supports multiple mediums. New age computers (e.g. Smart phones) are capable of bridging the divide between Thing based and Human based communication styles/media. Their networking "topologies" are more complex—point to point communications are now expensive, hence the "social" networks communication style has emerged.

Traditional networking styles/protocols may make sense for connecting Propagator nodes and Integrator functions. But the overwhelming majority of connections will be to relatively low-data-needs devices—HVAC units, air quality sensors, and delivery trucks. This is the segment of the communications architecture that needs to be re-thought from the ground up.

Propagator Nodes:

As the name suggests, these are store and forward entities. They could be blind relay nodes, or they may possess the ability to store, and then provide bulk transport services. Other salient Propagator functionality is described in Ser. No. 10/434,948, see Appendix A.

Integrator Nodes:

Integrator functions reside in the third layer. It is where chirps from hundreds to millions of devices are analyzed and acted upon. Integrator functions also send their own chirps to get information or set values at devices—these chirps' transmission arrow is pointed toward devices. Integrator functions may also incorporate a variety of inputs, from big data to social networking trends and "Likes" to weather reports.

Integrator functions are also the human interface to the IoT. As such, in some embodiments, the nodes are built to reduce the unfathomably large amounts of data collected over a period of time to a simple set of alarms, exceptions, and other reports for consumption by humans. In the other direction, they will be used to manage the IoT by biasing devices to operate within certain desired parameters.

Simple collaborative agents, in service of SLA etc will reside at this layer and above it. Using simple concepts such as "cluster" and "avoid", integrated scheduling and decision-making processes within the integrator functions will allow much of the IoT to operate transparently and without human intervention. One integrator function might be needed for an average household, operating on a Smartphone, computer, or home entertainment device. Or the integrator function could be scaled up to a huge global enterprise, tracking and managing energy usage across a corporation, for example.

When it comes to packaging and delivering products, in some embodiments, physical devices are combinations of functions. Propagator nodes combines with one or more end devices certainly make sense, as will other combinations. But the important concept here is to replace the idea of peer-to-peer for everything with a graduated amount of networking delivered as needed and where needed. In the Internet of Things, we need a division of labor (like ant and bee colonies) so that devices with not much to say (or hear) receive only the amount of (shared) networking resources they need and no more. Collaborative agents manage these resources and network topology Edge "Routing"

The challenge, is at the edge of the network/ecosystem where intelligent edge routers (as opposed to core routers) are needed. The challenge is that these edge routers are resource constrained, yet key to ensuring that data flow is managed at each layer.

End devices that simply "chirp" may not require or be capable of protocol intelligence. But that intelligence has to reside somewhere. Major elements of it are in Level II Propagator nodes. These "edge" "routers", are technologically more like conventional IP based Layer 2 and Layer 3 networking bridges/routers but operate in a different way, in one embodiment. Propagators listen for data "chirping" from devices. Based on a simple set of rules regarding the "arrow" of transmission (toward devices or away from devices), propagator nodes decide how to broadcast these chirps to other propagator nodes or to the higher-level Integrator device Chirp Mesh Networks:

In order to scale to the immense size of the Internet of Things, these propagator nodes must be capable of a great deal of discovery and self-organization. They will recognize other propagator nodes within range, set up simple routing tables of adjacencies, and discover likely paths to other appropriate integrators. One embodiment solves this sort of problem with wireless mesh networking Like other emergent systems, the topology control display complex behavior but the amount of data exchange needed is small and instability is contained. Other mesh-related patent applications have covered some of the concepts of propagator nodes.

Propagator nodes use their knowledge of adjacencies, in one embodiment, to form a near-range picture of the network, locating end devices and nearby propagator nodes. Using techniques patented for wireless mesh networking, the propagator nodes intelligently package and prune the various data messages, in one embodiment, before broadcasting them to adjacent nodes. In one embodiment, the nodes use simple checksum and the "arrow" of transmission (toward end devices or toward integrator) functions, redundant messages will be discarded. Groups of messages that are all to be propagated via an adjacent node may be bundled into one "meta" message for efficient transmission. Arriving "meta" messages may be unpacked and re-packed. This is described in more detail in application Ser. No. 11/084,330.

Propagator nodes are biased to forward certain information in particular directions based on routing instructions passed down from the integrator functions interested in communicating with a particular functional or geographic neighborhood of end devices, in one embodiment. It is the integrator nodes that function to will dictate the overall communications flow based on their needs to get data or set parameters in a neighborhood of IoT end devices. Thus integration functions manage the wind direction for diverse pollen types.

Discovery of new end devices, propagator nodes, and integrator functions is again similar to my wireless mesh distributed control architecture, in one embodiment. When messages from-or-to new end devices appear, propagator nodes forward those and add the addresses to their tables. Appropriate age-out algorithms allow for pruning the tables of adjacencies for devices that go off-line or are mobile and are only passing through.

One of the important capabilities of these collaborative propagator nodes is their ability to prune and optimize broadcasts, in one embodiment. Chirps passing from and to end devices may be combined with other traffic and forwarded in the general direction of their transmission "arrow". In one embodiment of the IoT, propagators are the closest thing to the traditional idea of (collaborative) peer-to-peer networking, but they are providing the networking capability on behalf of devices and integrators at levels "above" and "below" themselves. Any of the standard networking protocols are used in various embodiments, and propagator nodes perform important bridging and translation functions between different networks (Infrared or LED devices, power line or Bluetooth to ZigBee or to WiFi, for example). FIG. 49 depicts a logical hierarchical topology, spanning multiple communication media, of one embodiment.

Naming Challenges

Naming issues inherent in an Internet of Things, is addressed in several embodiments. True, there are existing ways to identify end point devices, such as MAC IDs (Media Access Control) and IPv6 addresses. Such naming techniques are very familiar from work with wireless mesh networking. Nonetheless, these paradigms won't work for the Internet of Things.

Instead, embodiments of naming schemes address the matters of complexity and lack of centralized control. The billions of devices in the IoT can't be burdened with the memory demands, power requirements, and management overhead associated with a heavyweight protocol stack such as IPv6. And since these devices will come from millions of different suppliers of varying degrees of technical skill, managing a central repository of the equivalent of MAC IDs would not work, either. Not to mention that connections to IoT end devices are expected to be lossy, intermittent, and uncertain.

At this scale, only self-organization works, just as it does in nature. In one embodiment, there are some key components of a massively scalable naming scheme:

1) Non-guarantee of absolute uniqueness; and
2) Derivation from environment.

Given the example of first name and last name combinations, there are many "John Smith"s in the world. Yet generally for any one John Smith, relatively high quality identification can place him in the context of the environment: where he lives and works, who he knows, to whom he is related, etc. John Smith is not a unique name, yet society can keep things straight when communicating with the particular John Smith of interest. Any interaction may be unique, but the uniqueness is not necessarily name driven. John Smith, son of James Smith and father of Eric defines a specific interaction relationship, used in "routing tables" of human based networks.

The same is true for the billions of "thing" devices of the three main types identified above: End Devices, Propagator Nodes, and Integrator Functions form the environment of network participants. Consider birds, each with distinctive "chirps." In one embodiment, an individual device has a relatively simple "base" chirp "address" and there is additional context applied to the headers of data "chirps" destined to-and-from that device. In one embodiment, this context includes the addresses of the propagator node(s) to which it was first (or is now connected). Just as with our friend John Smith, embodiments of the system are be able to distinguish among similar device "base" addresses by the company they keep, where they live, and what they do.

In one embodiment, these base addresses for individual end devices come from multiple sources: pre-set factory identities like a model number; one or more environmental inputs such as the time of day of first operation, GPS location, supplied voltage, temperature, etc, user defined nicknames etc. In another embodiment, the address may also be the identity of any other devices or propagator nodes that detect this device (e.g."toaster client of device hub in kitchen"). All of these inputs are then "hashed" with a simple algorithm into an address that while the address is not guaranteed to be unique in the world, it is very likely to be unique from any other device in the neighborhood, in one embodiment. "Neighborhood" here might be geographical, purpose-based, or defined by the integrator functions interested in a particular set of end devices.

Again, as with our "John Smith", even though these end device addresses may not be universally unique, they will be distinctive enough to be recognized individually in context. Uniqueness mattered historically, since the Arpanet was intended to ensure redundant point to point communications. We have rapidly migrated to a multi-point to multi-point communication structure. In many cases, broadcast based, region to region communications suffice.

Defining a new naming scheme for the Internet of Things may seem redundant, but that's only if one is looking at the world from a legacy based network-centric perspective. When we turn the telescope around to view the word from the end device perspective, we can see that the billions of simple, low power, intermittently connected end points have completely different needs than does the traditional Internet. In the IoT, numbers rule—and the numbers favor the end points by several orders of magnitude.

Bridging Networks.

Nevertheless, some traditional MAC ID and IPv6 addresses are needed to bridge between "thing" based "social" networks and the IP based enterprise networks. The bridges also provide integrator functions, in one embedment, and have the resources to manage the protocol stacks for both connectivity and for collaboration (e.g. "avoid", "cluster").

For example, in one embodiment specialized "night lights", throughout the house, form a local mesh network. Further, they serve as bridges, see FIG. 49. There are three distinct communication media depicted in FIG. 49. The TV and home appliances communicate through chirps via light based medium, e.g. Infrared or visible light. The night light is shown bridging between "Light" and "Radio" based transmissions, see 4916. A variation of FIG. 49 was first depicted in application Ser. No. 11/084,330.

The nightlight also serves as an Access Point ("AP") bridging between Wire based Ethernet and Radio based Ethernet, see 4912, in one embodiment. Further the nightlight may also serve as range extender see 4914. Here, one of two radios in the nightlight is the uplink, connecting to an AP in client mode, while another radio is acting as an access point for other wireless devices, e.g. smart phones. This device is thus acting also as bridge or "common router" as described in patent application Ser. No. 10/434,948.

Logical N-Radio,

A multi-purpose N-logical wireless trans-receiver module is depicted in one embodiment, see FIG. 50, with integrated power replication (5010), Light based "chirp" sensors and transmission (5020), Ethernet and USB connectivity (5030) and multiple wireless radio antennas for up links, down links and diverse protocol support. (5040).

FIG. 50 depicts four such transceivers. In a modular construction, the base unit comprises be the core housing with four interchangeable slots for different types of "chirp" and IP based data transceivers, in one embodiment. Each transceiver supports multiple protocols, with the nightlight supporting the "middleware" to interpret between communication media and protocols. Manufacturers of the edge devices would design them to be able to talk with specific slot transceivers/protocols supported. The logical and modular N-Radio agnostic concept was first introduced in application Ser. No. 11/084,330, Smart Phones Couriers:

Smart phones, with appropriate light transmitters and receivers extensions, are capable to bridging between home chirp based devices and conventional IP based networks, in one embodiment. Further, they are mobile, and thus also serve as store and forward mail box couriers between networks, as first described in application Ser. Nos. 11/084,330 and 11/818,899

Chirp Networks:

In one embodiment of communication within and beyond an Internet of Things, it helps to forget everything one knows about traditional networking schemes—especially wide area networking and wireless networking In traditional wide area and wireless networking, the bandwidth or spectrum is expensive and limited; and the amount of data to be transmitted is large and always growing. While over-provisioning data paths in wiring the desktop is commonplace, this isn't usually practical in the WAN or wireless network—it's just too expensive.

Besides cost, there's the matter of potential data loss and (in the wireless world) collisions. Traditional networking needs lots of checks and double-checks on message integrity and order to minimize costly retransmissions. These constraints led to the protocol stacks with which we are familiar today such as TCP/IP and 802.11.

In most of the Internet of Things, however, the situation is completely different. The costs of wireless and wide-area bandwidth are still high, to be sure. But the amounts of data from most devices will be almost immeasurably low and the delivery of any single "chirp" or message completely uncritical. The IoT is lossy and intermittent, so the end devices will be designed to function perfectly well even if they miss sending or receiving data for a while—even a long while. It's this self-sufficiency that eliminates the criticality of any single "chirp," in embodiments of the invention.

But what's the point in having an IoT if nothing ever gets through? How can we deal with the unpredictable nature of connections? The answer, perhaps surprisingly, is over-provisioning. That is, we can resend these short simple chirps over and over again as a brute force means of ensuring that some get through.

In one embodiment, because the chunks of data are so small, the costs of this over-provisioning at the very edge of the IoT are infinitesimal. But the benefits of this sort of scheme are huge. Since no individual message is critical, there's no need for any error-recovery or integrity-checking overhead (except for the most basic checksum to avoid a garbled message). Each message simply has an address, a short data field, and a checksum. In some ways, these messages are what IP Datagrams were meant to be. The cost and complexity burden on the end devices will be very low, as it must be in the IoT.

The address will incorporate the "arrow" of transmission discussed above, identifying the general direction of the message: whether "down" toward end devices or "upwards" toward integrator nodes or functions. In one embodiment, messages moving to-or-from end devices only need the address of the end device—where it is headed or where it is from is unimportant to the vast majority of simple end devices. They're merely broadcasting "chirps" and listening for them, in some embodiments.

In one embodiment, the end devices are awash in the ebb and flow of countless transmissions. But replicating this traffic willy-nilly throughout the IoT would clearly choke the network, so we must apply intelligence at levels above the individual end devices. For this, we'll turn to the propagator nodes. In one embodiment, these are the "edge routers" for this new form of networks.

Chirp Routing.

It is increasingly more cost effective to design and deploy autonomous agents such as sensors that communicate home temperature. The primitive nature of the device requires only rudimentary communication transceivers (e.g. Light Emitting Devices, beepers or low bandwidth power line network).

In one embodiment, the night light is plugged in and therefore uniquely positioned to receive a) power line based, b) Ethernet based, light or sound based "chirps" or IP based data. This night light, can pick up and route chirps from multiple devices in the home or factory network, in one embodiment. It can also drive inference engines "ants" to route exceptions over for further processing other "ants" at an IP based layer. Translator "ants" include middleware, between chirp devices and IP based networks/clients.

In one embodiment, the night light supports both integrator and propagator functionality The nightlight then services multiple local primitive chirps using communications media such as Sound, Infrared, Light, radio, etc. Middleware interprets the chirp languages and bridges the chirps to IP based Radios and their protocols (e.g. WiFi, Bluetooth, Zigbee). Middleware also provides the integration functions to know what to address at the hub level and what to forward upwards.

In an ideal world, only exception chirp/IP data is forwarded. Recognizing an "exception" demands the collaborative control system and ecosystem/framework described in this application.

Chirp Contention.

One other aspect of communication to be addressed within the Internet of

Things is the matter of "wire-less" networking In most embodiments of the system, many of the end device connections in the IoT are be "wire-less", using a wide variety of frequencies, e.g. light, sound or radio. This fact seems to suggest a need for something like CSMA e.g. as used in 802.11 WiFi.

Data rates will be very small and most individual transmissions completely uncritical. Even in a location with many devices vying for airtime, the overall duty cycle per chirp will be very low. And most messages will be duplicates, from our earlier principle of over-provisioning. With that in mind, an occasional collision is of no significance. All that we must avoid is a "deadly embrace" in which multiple devices, unaware of one another's presence, continue transmitting at exactly the same time and colliding over and over. In one embodiment, the solution is randomization in multiple dimensions: e.g.

1. RF Frequency band of transmission e.g. infrared, ultrasonic or radio frequency based chirps Chirping Intervals (e.g. multiples of 1 second, in one embodiment).

Chirping protocol: to ensure that devices operating in nearby or same frequency band do not interfere. That includes beacon based synchronization, in one embodiment.

Amplitude of transmission. Lower amplitudes for local networks and lower power. Power level drives transmission range and hence the region the device wishes to cover.

These random functions are generated, reset, or modified as needed e.g. when unacceptable interference is detected, "Wireless" should also includes other non wired ("wire-less") "chirp" based communications—Infrared, light or sound based flashing or beeping chirps.

The resulting communication scheme is different from traditional networking protocols Further, the objective is communication at low cost and complexity, like pollen. We will be well advised to emulate Nature in our version of her super organisms, e.g. ant hills and bee colonies.

Appendix A: Distributed Adaptive Control
Algorithm for Ad-Hoc Wireless Personal Area
Networks (Reprinted from U.S. Application Ser. No.
10/434,948)

Abstract

Mesh networks have been around for years now, the Internet being an excellent example. Routers exchange information about each other and build up their routing tables, and use the entries in the routing table to make routing decisions. Although they work, these algorithms are sub-optimal at best and are more oriented towards wired or wire-like interfaces, which are exclusive "non-shared" communication mediums.

Wireless Personal Area Networks (WPANs) pose an entirely different set of challenges for AD-HOC networks because of the following reasons:

Shared non exclusive medium with finite communication channels
Dynamically changing environment
Shorter distances
Used by resource constrained low power devices This document outlines the ACG approach to solving these sets of challenges, using a low footprint distributed adaptive control layer that is aware of the above set of problems.

Chapter 1

Technology Description

Conventional Routing Protocols
  Distance-Vector Routing (DV)
    Each node maintains a table of approximate distances of nodes. Nodes send the table out to nearest neighbors. The receiving nodes update their tables and recalculate routes using a shortest path algorithm. Thus routing decisions are made using sub-global approximations and are not optimal especially in a dynamically changing environment like WPANs.
  Link State Routing (LS)
    Each node maintains a view of the entire network and broadcasts the state of the link to its nearest neighbors.

The receiving nodes update their tables and recalculate routes using a shortest path algorithm.

Pros

Widely used and commercialized

Well tested

Well documented

Cons

Well suited for static environments, not for dynamic environments

Infrastructure oriented (dedicated hosts are organized for routing)

Not suited for resource constrained, low power devices

Standard AD-HOC Routing Algorithms

The IETF Mobile Ad-Hoc Networking Standard (MA-NET) has proposed the following AD-HOC routing algorithms.

Destination Sequenced Distance Vector Routing (DSDV)

A version of DV adjusted for AD-HOC networks.

Power management is not considered

Does not have dynamic adaptive load balancing

Convergence times can be large

No support for QOS

No zonal/multi-channel support

AD-HOC On Demand Distance Vector Routing (AODV)

Reactive as opposed to pro-active

Uses L3, hence is shielded from the MAC and PHY layers

Supports only one route per destination

Does not have dynamic adaptive load balancing

Power management is not considered

Does not support unidirectional links

No support for QOS

No zonal/multi-channel support

Dynamic Source Routing (DS)

Reactive as opposed to pro-active.

Routes are learnt on-demand and hence can slow down the performance

Does not have dynamic adaptive load balancing

Power management is not considered

Needs support from either the MAC layer or the network layer for including the route information No support for QOS No zonal/multi-channel support Zone Routing Protocol (ZRP)

Divides the network into zones

Intra-zone routing is left to the implementer

Inter-zone routing uses a reactive as opposed to pro-active protocol

Does not have dynamic adaptive load balancing

Power management is not considered

No support for QOS

Algorithm Design Considerations

No Central Control

AD-HOC WPAN's typically work in environments where there cannot be any level of central intelligence as far as routing and parametric decisions are concerned. This requires the algorithm to be truly distributed and every device must be able to make decisions by itself.

Self-Configuring

AD-HOC WPAN's by definition need to be self-configuring without having the need for any network plan.

Self-Healing/Fault Tolerant

AD-HOC WPAN's need to be self-corrective and fault tolerant. Devices must be able to change their routing decisions in real-time as soon as a path gets clogged or closes down.

Dynamic Adaptive Load Balancing

The load on the network must be balanced fairly across all possible paths, and this decision must happen dynamically in an adaptive manner.

Pro-Active Routing

The routing decisions need to be made on a pro-active as opposed to an on-demand basis. This ensures that the task of routing does not interfere with the device's primary responsibility, which is to accomplish its own functionality.

Varied Bandwidth/QOS/Power Requirements

Devices have varied bandwidth requirements, some need isochronous performance (fixed latency), and some need bounded latency, and some might be power constrained and must use very low power for their transmissions.

Low Memory Footprint

The design of the algorithm must consider the fact that WPAN would typically consist of low footprint resource constrained devices.

Multi-Zone/Multi-Channel Support

The design of the algorithm must consider the support for routing between multiple Pico-cells or multiple network zones.

Network Layer Independent

The algorithm must not depend on the existence of a network layer protocol like IP. The algorithm must directly use the services provided by the MAC sub-layer.

Efficient Topology Lookup and Modification

Every device in an AD-HOC WPAN plays dual roles:

Accomplish its own functionality, which could involve sending packets either directly or via another device. (Primary Role)

Forward packets of other devices. (Secondary Role)

The design of the algorithm must consider the fact that, the primary role of every device on the network is to accomplish its own functionality, and routing of packets of other devices is secondary (unless the device is a special node that is just present for forwarding) and must not affect the performance of its primary role.

For the primary role, this means whenever the device has to send out its own data packet, to another device the routing decision must be very fast.

For the secondary role, this means whenever a device receives from another source destined to another device, it must be able to readily reference the routing decisions made by the source according to its Bandwidth/QOS/Power requirements.

When a device goes down, the topology and the routing decisions need to be modified in real-time so that network performance levels are maintained.

Chapter 2

Technology Implementation

The Algorithm uses control systems approach wherein every device sends out a broadcast heartbeat packet into the medium, at a specified frequency.

Header

```
+----+----+----+----+----+----+----+----+----+----+----+
|SQNR|    TOLL      |      HOP COST     | NC | LP |
+----+----+----+----+----+----+----+----+----+----+----+
  1         4                4            1    1
```

-continued

Payload

```
+----+......+----+
| DEVICE ID |RSSI|
+----+......+----+ ID SIZE
                  1
```

SQNR = 1 BYTE SEQUENCE NUMBER (0-255) TOLL = 4 BYTE DEVICE TOLL COST
HOP COST = 4 BYTE DEVICE HOP COST
NC = 1 BYTE NEIGHBOUR COUNT (0-255)
LP = 1 BYTE LOW POWER/HIGH THROUGHPUT FLAG
DEVICE ID = DEVICE IDENTIFICATION SEQUENCE (e.g. MAC ADDRESS) RSSI = 1 BYTE RELATIVE SIGNAL STRENGTH INDEX
TOTAL SIZE OF HEARBEAT PACKET = HEADER SIZE + NC * PAYLOAD SIZE = 11 + NC * (ID SIZE + 1)

Sequence Number

Sequence Number is a one-byte counter incremented upon the transmission of a heartbeat packet. This counter will wrap to 0 after it reaches a value of 255.

Whenever a device receives a heartbeat packet, it updates the sequence number for the source in its own tables. The device then retransmits the heartbeat packet so that other devices distant from the source can also receive it. If a device receives a heartbeat packet with a sequence number less than or equal to the noted sequence number for the source, the packet is discarded.

Figure 51:
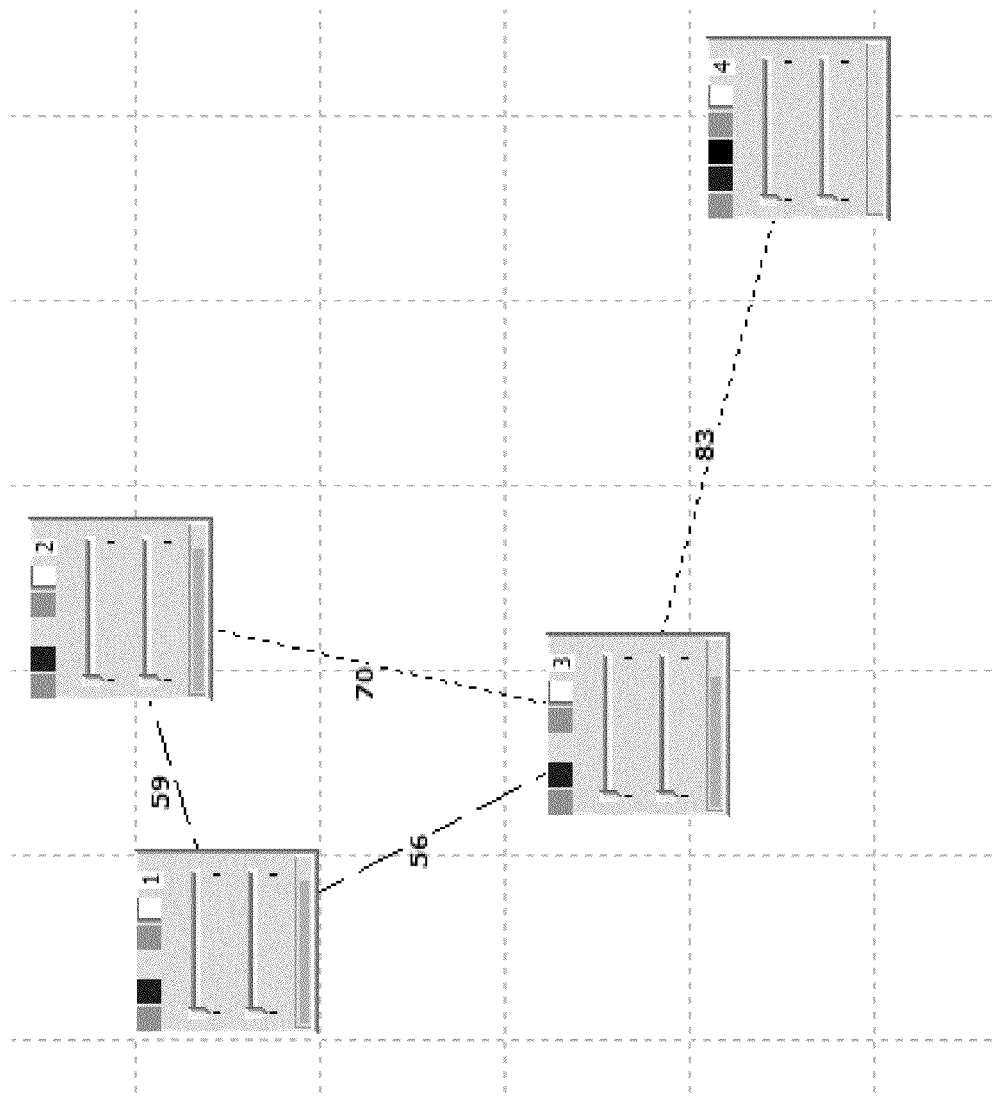
FIG. 51 depicts a series of packet transmission nodes.

The sequence number is significant because of the shared nature of the wireless medium. Lets consider FIG. 51 and a scenario where node "2" has just come up.

When the node labeled "2" sends out its heartbeat with sequence number "1" node "1" and "3" will hear the packet and update the entry corresponding to node "2" with the value "1". Since both "1" and "3" have heard "2" for the first time, they both will retransmit the packet so that distant devices and new devices which have just come up can receive the heartbeat. Lets assume that node "1" relays the heartbeat first. Nodes "2" and "3" would hear the packet again. "2" would discard it because the original sender is itself, whereas "3" would discard it as its tables already indicate sequence number "1" for node "2".

Now "3" relays the packet and "4" receives it and updates its tables before retransmitting it For a network with N nodes every heartbeat packet is transmitted N times for the first time.

Thus the sequence number helps prevent broadcast flooding for heartbeat packets. This mechanism is only used for the first heartbeat packet. For broadcast/multicast data packets and subsequent heartbeat packets, an optimized technique is used which is discussed below.

Figure 52:
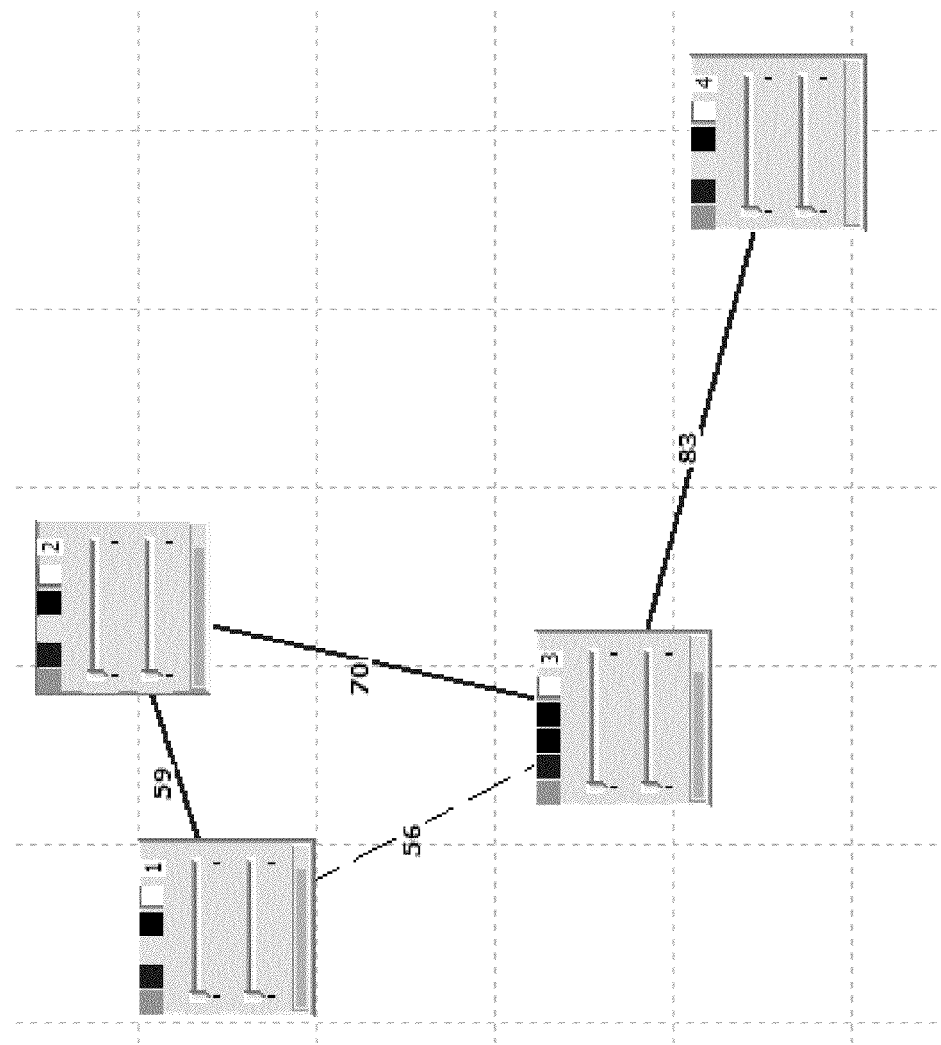
FIG. 52 depicts the Single Source Shortest Path tree corresponding to node 2.
Figure 53:
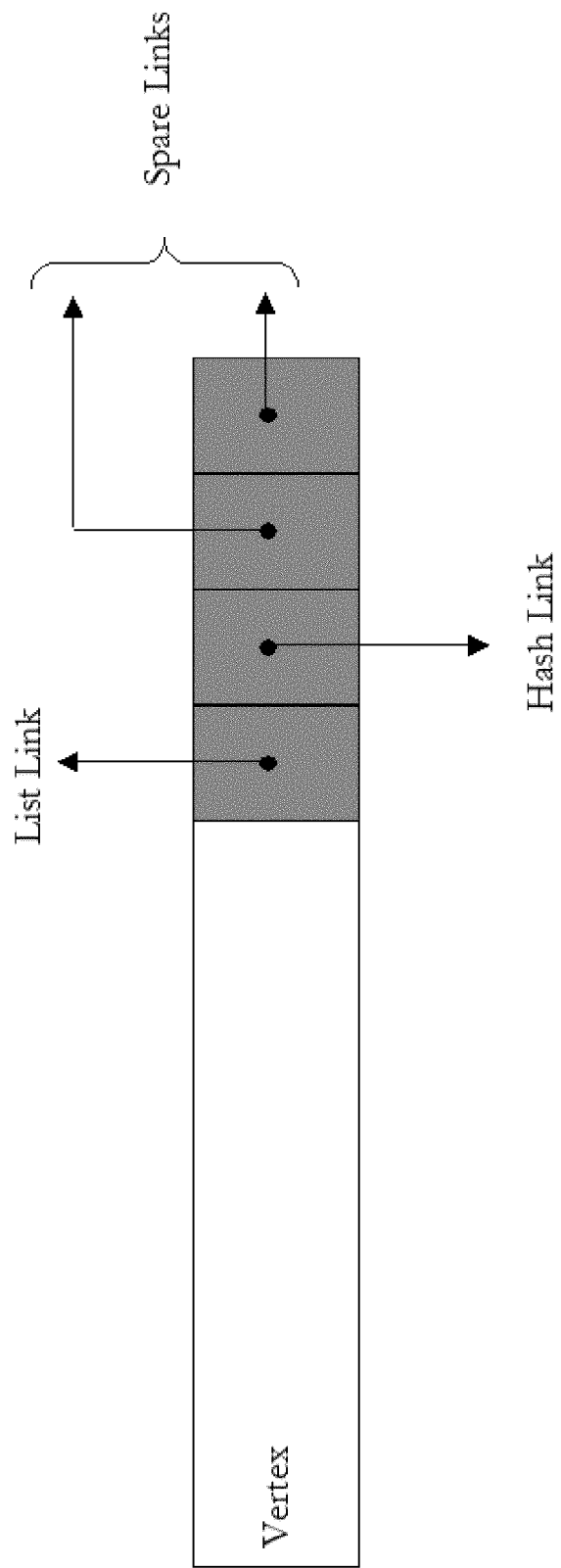
FIG. 53 depicts a graph algorithm data structure.
Figure 54:
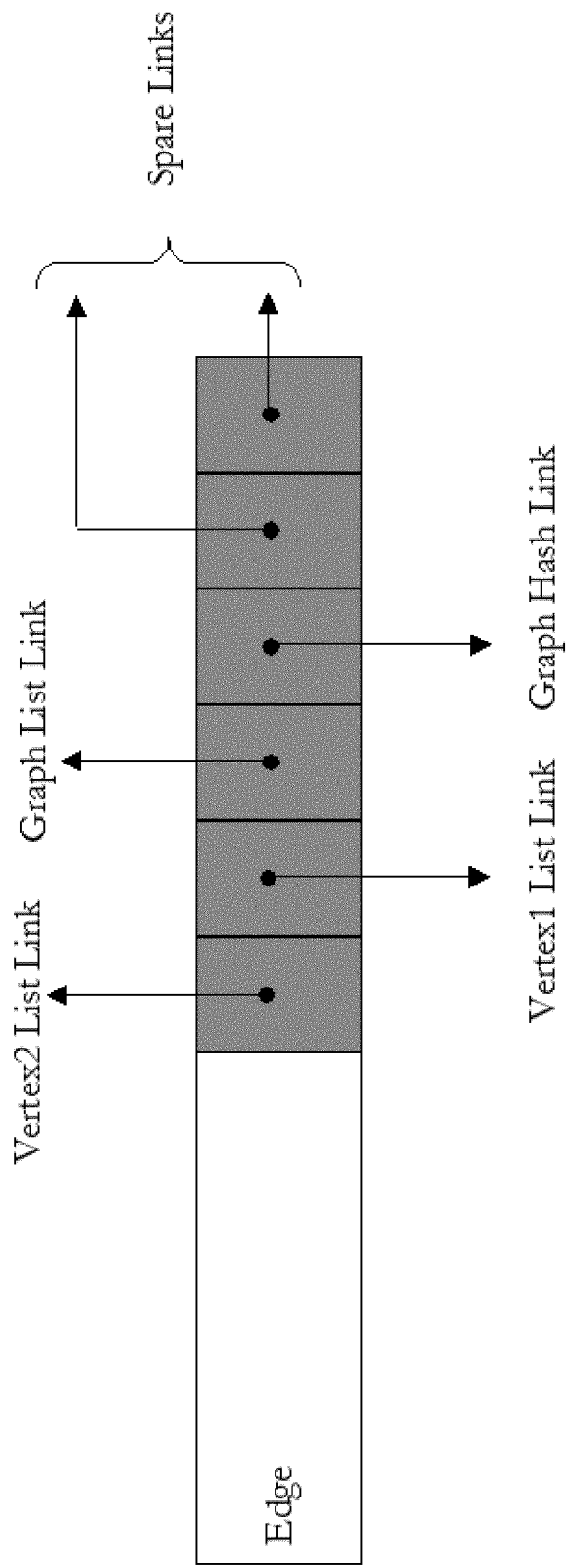
FIG. 54 depicts another graph algorithm data structure.

When the node "2" sends out the heartbeat packet with sequence number "2", both 1 and 3 hear the heartbeat and update the table entries corresponding to node "2". Both "1" and "3" would then refer to the Single Source Shortest Path (SSSP) tree corresponding to node "2" as shown by the solid blue lines in FIG. 52. According to the tree "1" does not have any "child" and hence will not forward the packet further.

"3" on the other hand has "4" as its child and hence will forward the packet to "4".

Hence subsequent heartbeat packets are sent M<=N times, where M is the number of levels in the SSSP tree for the source node, and N is the number of devices on the network.

If in the mean time another node comes up and hears the heartbeat for the first time, it will retransmit the packet, but the sequence number will help other nodes discard the packet.

Multi-zone/Multi-channel support is explained later in the document for the purposes of brevity.

Device Toll Cost (DTC)

The Device Toll Cost is the value charged by the device for forwarding a packet to one of its neighbors. This value is used in determining the optimal routes. This value helps in the dynamic adaptive load balancing of the network.

Device Hop Cost (DHC)

The Device Hop Cost is the expense incurred every time a packet needs to be sent via another device. This value helps in the determining QOS requirements of the node.

Low Power/High Throughput Flag (LP)

This flag is set to "1" for devices that use a routing table optimized for low power consumption/high throughput.

Algorithm Data-Structures

Network Representation

The algorithm uses a Directed Weighted Graph (DWG) for representing the networks, which may have unidirectional links and Un-Directed Weighted Graph (UWG) for networks having bidirectional links only. The devices on the network form the set of vertices for the graph. Based on the information in the heartbeat packet, edges are added to the graph with an initial weight that is inversely proportional to the RSSI.

Graph Representation

Traditionally graphs have been represented using either adjacency matrices or adjacency lists.

Adjacency matrices offer fast O (1) edge lookup and modification, but tend to be wasteful if the number of edges in the graph is a lot less than $N^2$, where N is the number of devices. The maximum number of edges is $^nP_2$ for a DWG and $^nC_2$ for a UWG. Practically the number of edges $N_e$ in a WPAN would be much lesser than $^nP_2$ and hence much lesser than $N^2$ number of edges, for $N>=2$, $^nC_2<^nP_2$, $N_e<^nC_2<N^2$.

Adjacency lists on the other hand save memory, but offer O (M) worst-case edge lookup and modification, where M is the number of edges on the list, and hence tend to affect the overall routing performance. The algorithm uses a specialized representation of a graph that offers acceptable performance and has lowerruntime memory requirements.

A graph object in the algorithm has the following attributes:

A vertex hash table for fast vertex lookup and modification
An edge hash table for fast edge lookup and modification
A vertex list for vertex enumeration
An edge list for edge enumeration
A vertex object exists in both the graph's vertex hash table and on the graph's vertex list. A vertex object also includes an edge list for all incident edges. In addition, a vertex object also has 2 spare link pointers through which it can exist in 2 more lists.

An edge object on the other hand exists not only on both the graph's edge hash table and the graph's edge list, but also exists on the following:

If un-directed, on the edge lists of both the vertices it is incident upon
If directed, on the edge list of the source vertex.

In addition an edge object also has 2 spare link pointers through which it can exist in 2 more lists.

The 2 spare link pointers on the vertex and edge objects are helpful for algorithms that operate on graphs for sorting purposes. These algorithms can sort vertices/edges in any manner they deem without having to allocate/free additional memory.

Graph algorithms can also save custom data pointers within the vertex and edge objects.

This specialized data structure helps answer the following questions regarding the graph very quickly.

Is Vertex 'X' on the graph?
Is there an edge between Vertex 'X' and Vertex 'Y'? If yes what is the initial edge cost?
What are the edges incident upon Vertex 'Z'?
Enumeration of all the edges on the graph
Enumeration of all the vertices on the graph The edge and vertex lookup times are dependent on the bucket size of the hash tables used. The value of the bucket size can be changed as required.

Algorithm Operation

Direct Heartbeat Reception

Upon receipt of a direct heartbeat (from a source we can directly hear), the algorithm takes the following steps:

1. Lookup vertex for the source. If the vertex is not present, create a new vertex for the source and initialize its corresponding custom vertex data.
2. Lookup edge between the source and us. If an edge is not present, create a new edge between the source and us and initialize its corresponding custom edge data.
3. If the sequence number of the heartbeat is less than or equal to the sequence number noted in the custom vertex data, discard the packet. End.
4. Update the RSSI information and the last known good time in the custom edge data.
5. Update the sequence number, toll cost, hop cost, and low power flag in the custom vertex data.
6. If the source was heard for the first time (an edge was just created), then forward the packet by re-transmitting it, and go to step 8.
7. Lookup our position on the source's SSSP tree. If we have nodes below us on the tree forward the packet by re-transmitting it.
8. For every payload entry
    a. Lookup vertex and create it of not present.
    b. Lookup an edge between the source and the vertex, and create it if not present.
    c. Update the RSSI information and the last known good time in the custom edge data.

In-Direct Heartbeat Reception

Upon receipt of an in-direct heartbeat (from a source we cannot directly hear), the algorithm takes the following steps:

1. Lookup vertex for immediate transmitter. If the vertex is not present, create a new vertex for the immediate transmitter and initialize its corresponding custom vertex data.
2. Lookup edge between the immediate transmitter and us. If the edge is not present, create a new edge and initialize its corresponding custom edge data.
3. Lookup vertex for the source. If the vertex is not present, create a new vertex for the source and initialize its corresponding custom vertex data.
4. If the sequence number of the heartbeat is less than or equal to the sequence number entered in the source vertex's custom vertex data, discard the packet. End.
5. Update the RSSI information and the last known good time in the custom edge data, for the immediate sender.
6. Update the sequence number, toll cost, hop cost, and low power flag in the custom vertex data for the source.
7. If the source was heard for the first time (an edge was just created), then forward the packet by re-transmitting it, and go to step 9.
8. Lookup our position on the source's SSSP tree. If we have nodes below us on the tree forward the packet by re-transmitting it.
9. For every payload entry
    a. Lookup vertex and create it of not present.
    b. Lookup an edge between the source and the vertex, and create it if not present.
    c. Update the RSSI information and the last known good time in the custom edge data.

Heartbeat Transmission

Before transmitting the heartbeat packet, the algorithm takes the following steps:

1. Check the last known good timestamp for every edge, and delete edges whose last known good times are greater than K*U, where K>=2 is a chosen constant, and U is the heartbeat update interval chosen for the network.
2. Calculate our own Redundancy Index RI for health indication purposes. This is done as follows:
    a. Initialize Good Nodes Count GNC to 0
    b. For every vertex we can reach, using an edge incident upon us, mark the edge as closed, and try to reach the vertex using any other path. If the vertex can be reached, increment GNC.
    c. Good Nodes Ratio GNR=(GNC/TOTAL_INCIDENT_EDGES)
    d. Incidence Ratio IR=TOTAL_INCIDENT_EDGES/(TOTAL_VERTEX_COUNT−1)
    e. RI=(GNR*0.6+IR*0.4)*100
3. For every vertex compute the SSSP tree for this vertex, using the SSSP algorithm described below.
4. Add every edge incident upon us to the heartbeat packet and send out the heartbeat packet, with our DTC, DHC and sequence numbers.
5. Increment sequence number.

Single Source Shortest Path (SSSP) Algorithm

The SSSP algorithm used here is a modified version of Dijkstra's SSSP algorithm. The original Dijkstra SSSP algorithm uses pre-computed edge costs, where as in this modified algorithm instead of using the edge costs, we compute the Destination Vertex Cost DVC from the RSSI information, dynamically as we proceed in the algorithm.

The modified algorithm makes use of the spare links provided by the vertex and edge objects.

1. Initialize the Vertex Cost VC to, and the Vertex Edge VE to NULL for all vertices, other than the source. For the source vertex, set VC to 0 and VE to NULL.
2. We use the two spare links provided in the vertex object, to form a doubly linked list of vertices, without having to allocate or free any additional memory. Set the source vertex as the head of this doubly linked list, set the Hop Count HC for the source vertex to be 0.
3. For every vertex in the doubly linked list
    a. We use the two spare links provided in the edge object, to form a doubly linked list of edges, without having to allocate or free any additional memory. For every edge incident on the vertex, compute the Final Edge Cost FEC using the equation given below.

$FEC=(100-RSSI)+HC*DHC+TC$ $TC=0 \text{ if } HC=0, DTC \text{ if } HC< >0$

Use insertion sort to insert the edge onto the doubly linked list sorted in ascending order of FEC. We call the vertex in context the Control Vertex, and the edge destination the Destination Vertex.

b. For every edge on the doubly linked list
   i. Compute DVC using the equation given below. For Low Power Consumption:

$DVC=MAX(VC \text{ of Control Vertex}, FEC)$

Otherwise:

$DVC=VC \text{ of Control Vertex}+FEC$ ii. If VC for Destination Vertex=then, set VC for Destination Vertex to DVC, VE for Destination Vertex to the current edge, HC for Destination Vertex to HC of Control Vertex+1. Go to Step iv.
   iii. If VC for Destination Vertex>DVC then, set VC for Destination Vertex to DVC, VE for Destination Vertex to current edge, HC for Destination Vertex to HC of Control Vertex+1. Remove Destination Vertex from doubly linked list.
   iv. Use insertion sort, to insert Destination Vertex into doubly linked list.
4. Create a new graph object for the SSSP tree.
5. Add every vertex in the original graph, to the SSSP tree and every vertex's VE to the SSSP tree.

Chapter 3

Technology Evaluation

No Central Control

The implementation of the algorithm makes it clear that it is truly distributed without the need for any central control. The implementer has to choose appropriate values for K and U depending on the physical characteristics of the network.

Self-Configuring

Any device can join the network instantly. Devices already present on the network can discover the new device after the heartbeat packet transmitted by it is propagated through the network. The device itself can report its health using the value of RI. This information can help the user choose an appropriate location for the device.

Self-Healing/Fault Tolerant

The heartbeat packets sent by the devices, make sure that the system can recover from route and device failures.

Dynamic Adaptive Load Balancing

The devices can adaptively increase or decrease the value of their DTC, so as to trigger changes in the SSSP trees of other devices. E.g. when a device detects that a lot of devices are using it for forwarding packets, it could adaptively increase its DTC so that the traffic then flows through other devices on the network. Similarly when the device detects that the traffic load through it has decreased, it could adaptively decrease its DTC.

Pro-Active Routing

The computation of the SSSP tree by every vertex, for every vertex makes the algorithm very pro-active. This means route planning times are minimized at the time of packet sending and forwarding.

Varied Bandwidth/QOS/Power Requirements

The DHC value of a device changes the way in which its SSSP tree is computed. Low latency driven devices can set DHC to a high value to make sure their SSSP trees are computed with minimum number of hops. Low Power Flag chooses edges so as to minimize the transmit power for the devices.

Low Memory Footprint

The specialized data structures used by the algorithm provided acceptable performance and use reasonably low memory. For a network with very large number of devices e.g. 10,000, the network could be divided into multiple zones, so as to provide acceptable performance using low memory. Multi-Zoning is explained in the next section.

Multi-Zone/Multi-Channel Support

A WPAN can be divided into 2 or more Pico-nets using different RF channels, so as to minimize the interference between them. Two attractive approaches are explained below.

Common Device Approach

Figure 55:
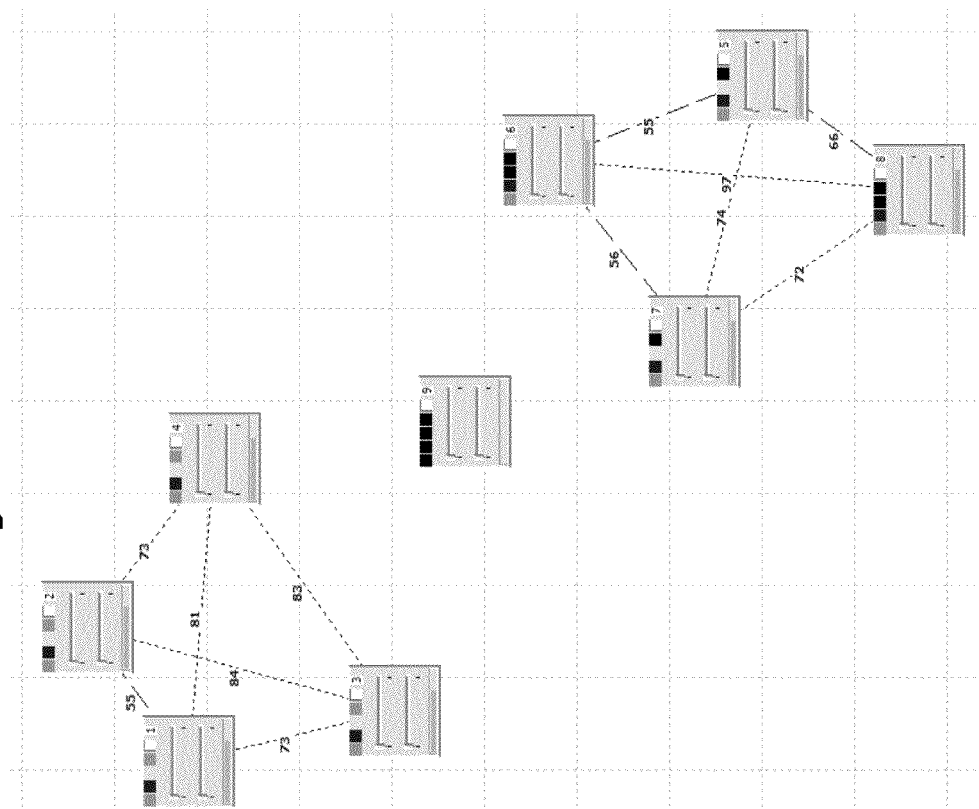
FIG. 55 depicts two Pico-nets.
Figure 56:
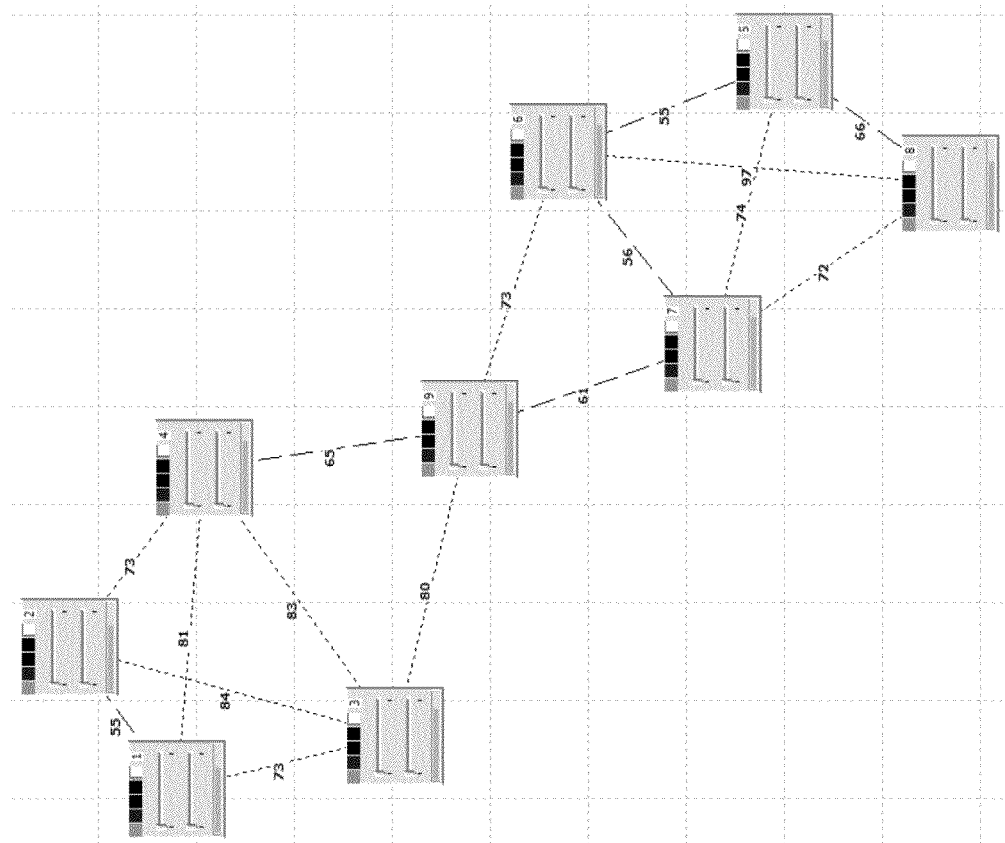
FIG. 56 depicts two Pico-nets sharing a common node.

FIG. 55 shows two Pico-nets comprising of nodes (1,2,3,4) and (5,6,7,8) respectively. Both Pico-nets are operating on different RF channels so as to not interfere with each other. Node 9 is a node having two interfaces, one listening to the RF channel for the first Pico-net and the other listening to the RF channel for the second Pico-net. Hence Node 9 is designated as the Common Device.

When Node 9 is turned off both Pico-nets can only operate independently.

When Node 9 is turned on both Pico-nets can now not only work independently, but can also use Node 9 to route information between the Pico-nets. Node 9 ensures that the heartbeat packets generated in both Pico-nets are forwarded to the other Pico-net. Thus devices of both Pico-nets view the network as one combined Pico-net.

Common Router Approach

Figure 57:
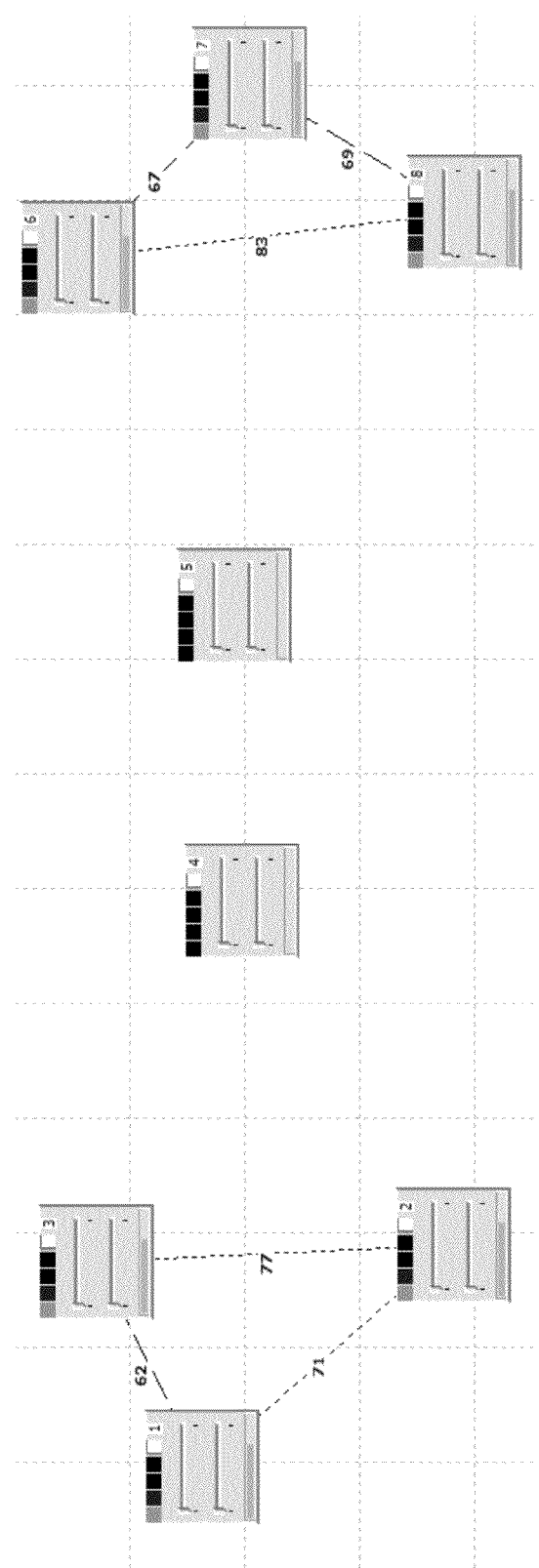
FIG. 57 depicts two Pico-nets.

FIG. 57 shows two Pico-nets comprising of Nodes (1,2,3,4) and (5,6,7,8) respectively. Here the Nodes 4 and 5 have been designated as Common Routers. Separate RF channels are used for the Intra Pico-net and Inter Pico-net communications. When the Common Routers are turned off, both Pico-nets can only work independently.

Figure 58:
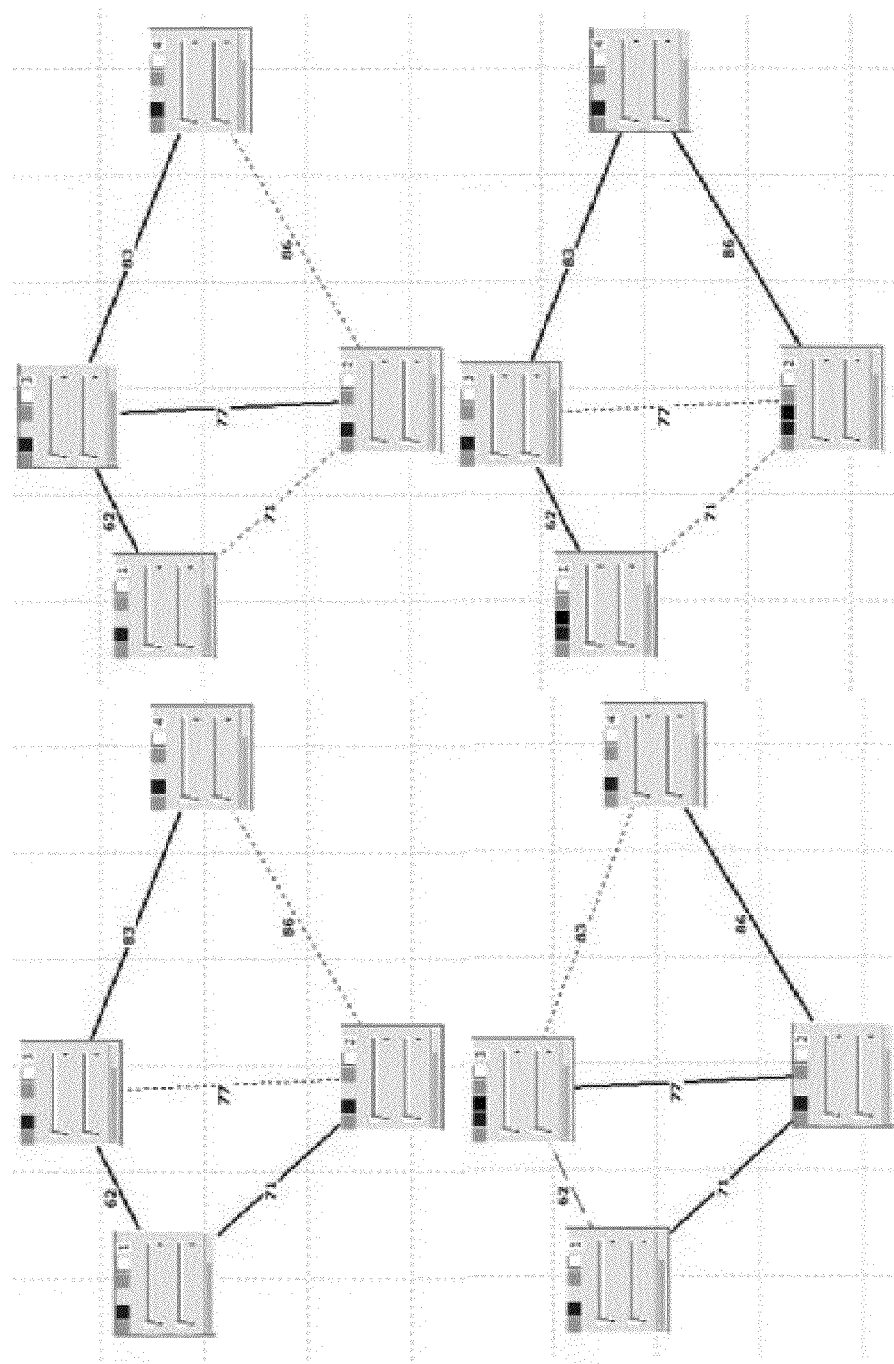
FIG. 58 and FIG. 59 depict the Intra Pico-net Single Source Shortest Path of both Pico-nets shown in FIG. 57.
Figure 59:
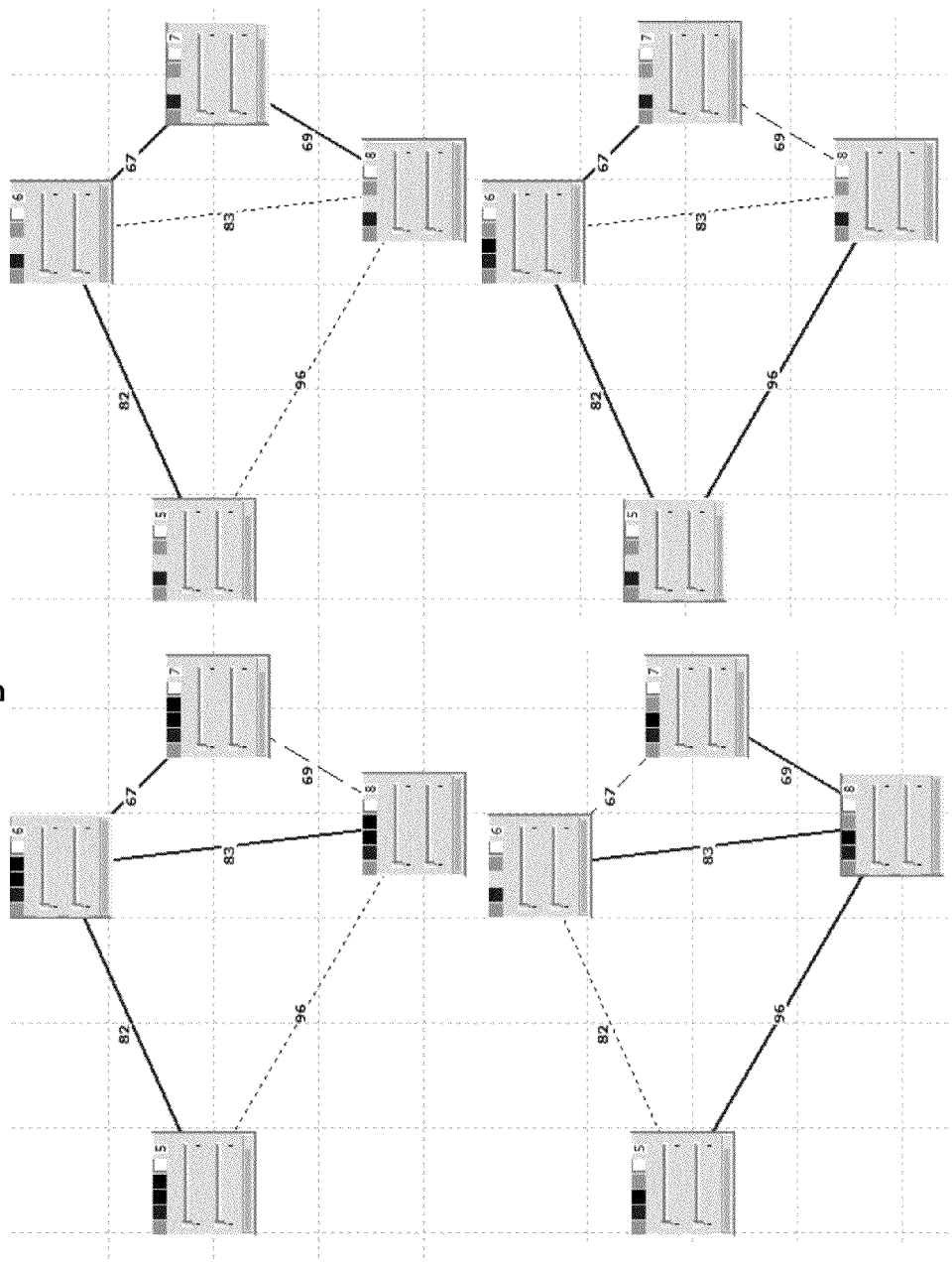
Figure 60:
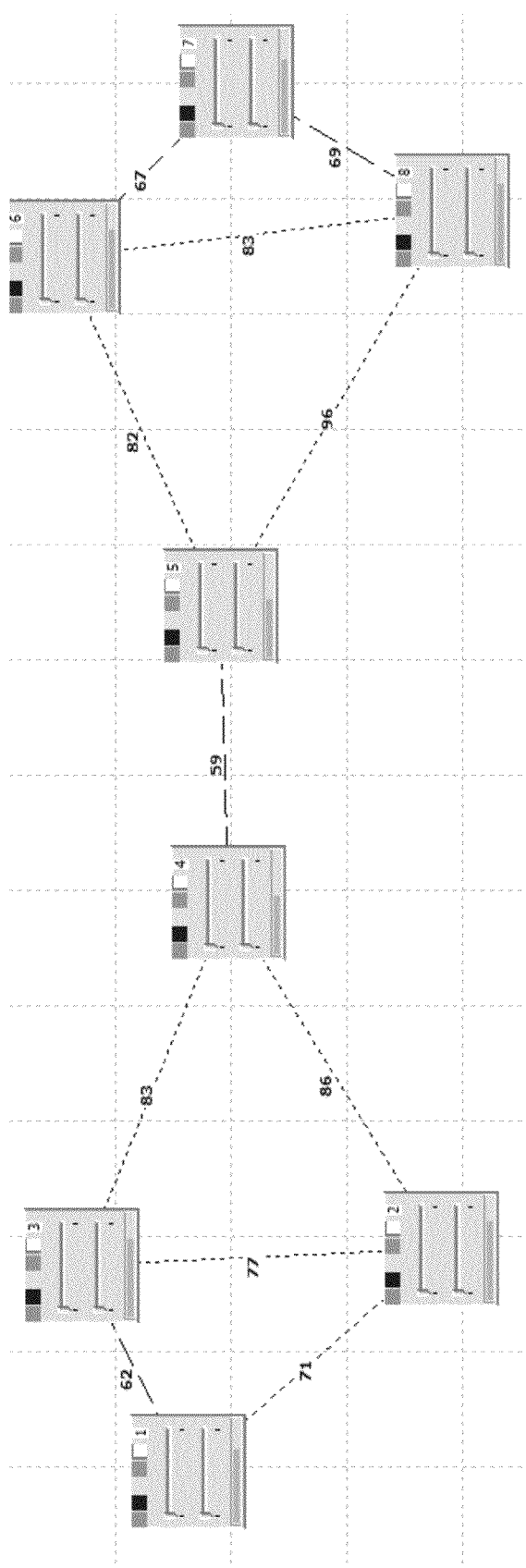
FIG. 60 shows the entire topology of the connected Pico-nets.

When the Common Routers are turned on, the FIGS. 58 and 59 show the Intra Pico-net SSSP trees of both Pico-nets respectively, FIG. 60 shows the entire topology.

The heartbeat packets transmitted by the Common Routers are different for Inter Pico-net and Intra Pico-net communication. For Intra Pico-net communications, the Common Routers include only the Pico-net members they hear in their heartbeat packets. Hence for the first Pico-net, the Intra Pico-net heartbeat sent out by 4 would include entries for Nodes 1,2 and 3. Even though Node 4 can also hear Node 5, the Intra Pico-net will not have an entry for Node 5.

The Inter Pico-net heartbeat transmitted by Node 4 will include entries for Nodes 1,2,3 and 5. Hence only the Common Routers will need to know about the entire topology, whereas individual devices will only need to know the topology of their Pico-net Whenever a device needs to send a packet to a device that is outside its Pico-net, the packet is sent to the Common Router for that Pico-net.

Network Layer Independence

Clearly the algorithm described does not depend on any Network Layer protocol like IP. This algorithm is also independent of the MAC sub-layer although its use is intended to be at the MAC sub-layer.

Efficient Topology Lookup and Modification

The specialized graph data structures used by the algorithm are designed for efficient topology lookup, offering acceptable performance over a reasonably large number of nodes.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

The embodiment of the invention in which an exclusive property or privilege is claimed is defined as follows:

1. A machine-based collaborative social network comprising:
    an organized network segment comprising nodes wherein each node maintains a routing table of adjacent nodes and client devices acting as system participants;
    at least one system participant sending at least one communication chirp; wherein said at least one communication chirp is to be received by the social network and not a particular recipient; wherein said chirp comprises a terse network message repeatedly sent at the edge of the network without recipient information;
    defining at least one schedule preference for each system participant;
    wherein the social network propagator nodes receive and store said at least one communication chirp and wherein the social network further comprises integrator nodes which analyze and act upon chirps from the at least one system participant.

2. The machine-based collaborative social network of claim 1 wherein said integrator nodes comprise the human interface to the social network.

3. The machine-based collaborative social network of claim 2 wherein said integrator nodes provide alarms, exceptions, and other reports for consumption by humans.

4. The machine-based collaborative social network of claim 1 wherein said propagator nodes store information regarding adjacent nodes and system participants to form a near-range picture of the network, locating end devices and other nearby propagator nodes.

5. The machine-based collaborative social network of claim 1 wherein said propagator nodes package and prune the various data messages before broadcasting them to adjacent nodes.

6. The machine-based collaborative social network of claim 1 wherein said propagator nodes disregard redundant chirp messages.

7. The machine-based collaborative social network of claim 1 wherein said propagator nodes receive instructions from integrator nodes to direct messages to a specific direction of the network.

8. The machine-based collaborative social network of claim 1 wherein said propagator nodes bridge various network communications media.

9. The machine-based collaborative social network of claim 1 wherein said system participant further receives at least one communication chirp; wherein said at least one communication chirp is to be received from the social network and not a particular sender.

10. The machine-based collaborative social network of claim 1 wherein each system participant is assigned a name.

11. The machine-based collaborative social network of claim 10 wherein the name of each system participant is not guaranteed to be unique with in within the entire network.

* * * * *